April 18, 1967　　　R. J. CARNEVALE ETAL　　　3,315,235
DATA PROCESSING SYSTEM
Filed Aug. 4, 1964　　　　　　　　　73 Sheets-Sheet 1

INVENTORS
RICHARD J. CARNEVALE
ARTHUR F. COLLINS
JACK E. GREENE
WILLIAM P. HANF
ALBERT A. MAGDALL
CHARLES B. PERKINS JR.
JOHN W. ROOD
ANTHONY E. VILLANTE

BY
AGENT

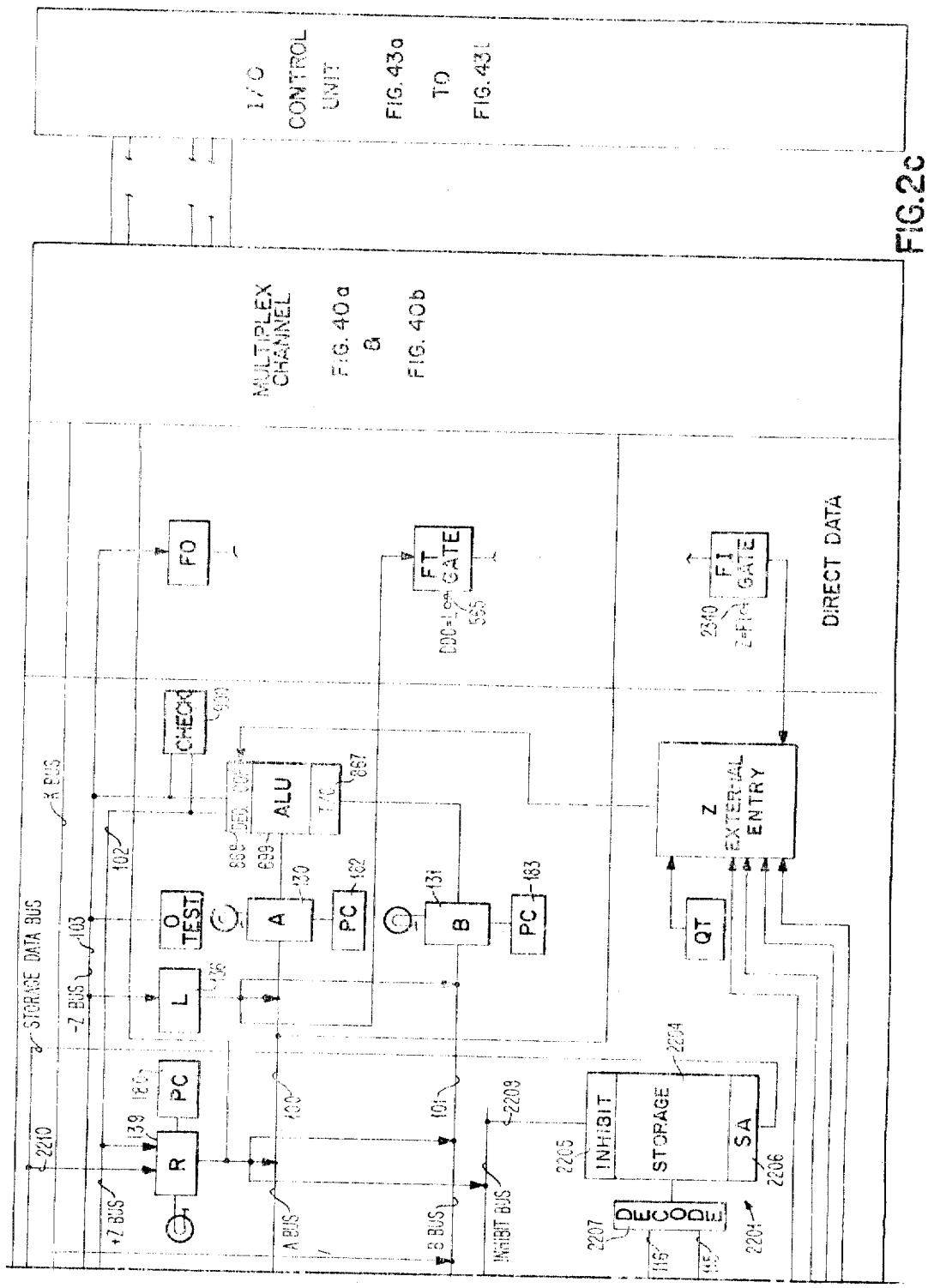

April 18, 1967  R. J. CARNEVALE ETAL  3,315,235

DATA PROCESSING SYSTEM

Filed Aug. 4, 1964

FIG. 4

| FIG.4a | FIG.4b | FIG.4c | FIG.4d | FIG.4e | FIG.4f | FIG.4g | FIG.4h |
|---|---|---|---|---|---|---|---|
| FIG.4aa | FIG.4ab | FIG.4ac | FIG.4ad | FIG.4ae | FIG.4af | FIG.4ag | FIG.4ah |

| FIG.4i | FIG.4j | FIG.4k | FIG.4m | FIG.4n | FIG.4o | FIG.4p | FIG.4r |
|---|---|---|---|---|---|---|---|
| FIG.4ai | FIG.4aj | FIG.4ak | FIG.4am | FIG.4an | FIG.4ao | FIG.4ap | FIG.4ar |

| FIG.4s | FIG.4t | FIG.4u | FIG.4v | FIG.4w | FIG.4x | FIG.4y | FIG.4z |
|---|---|---|---|---|---|---|---|
| FIG.4as | FIG.4at | FIG.4au | FIG.4av | FIG.4aw | FIG.4ax | FIG.4ay | FIG.4az |

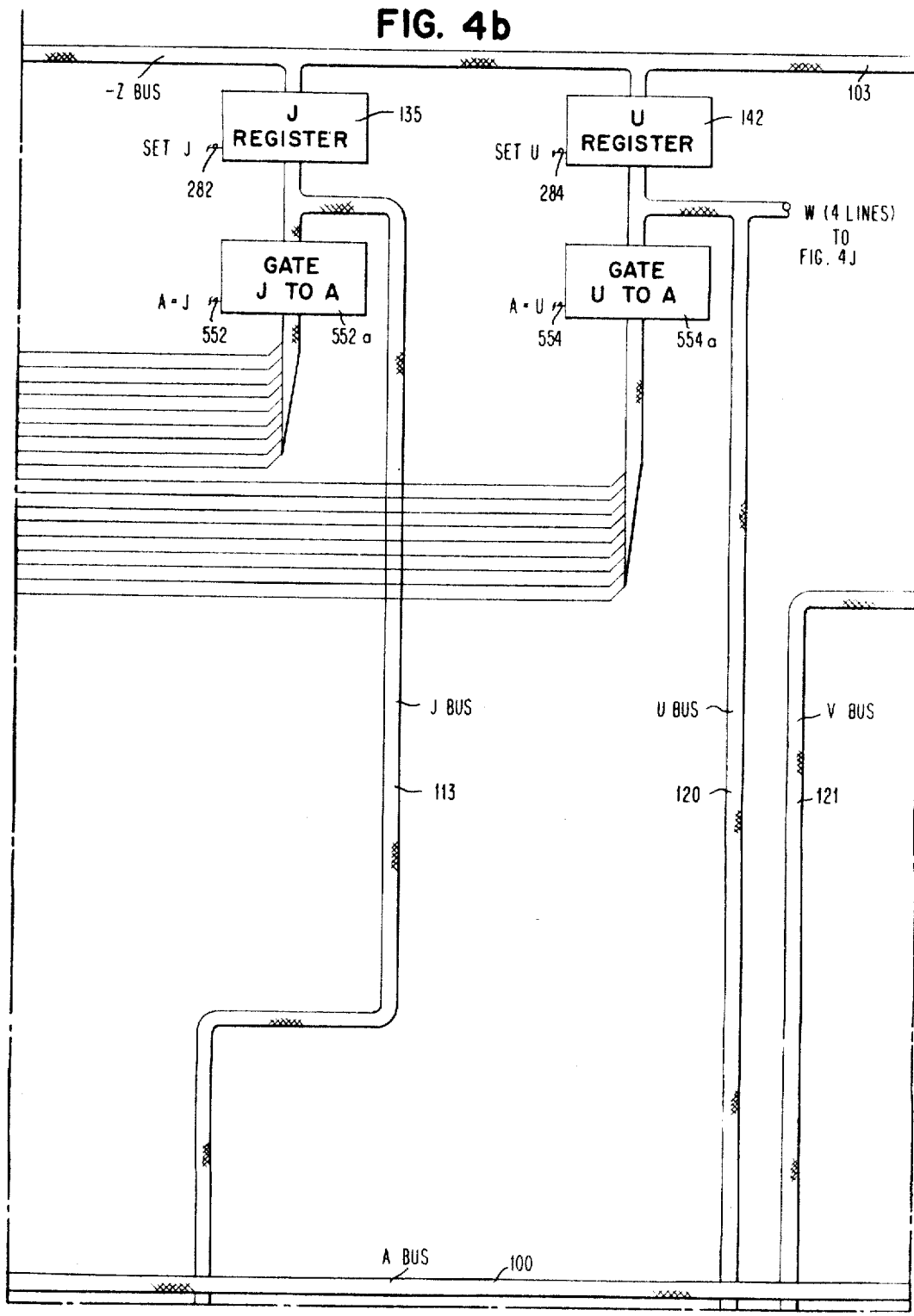

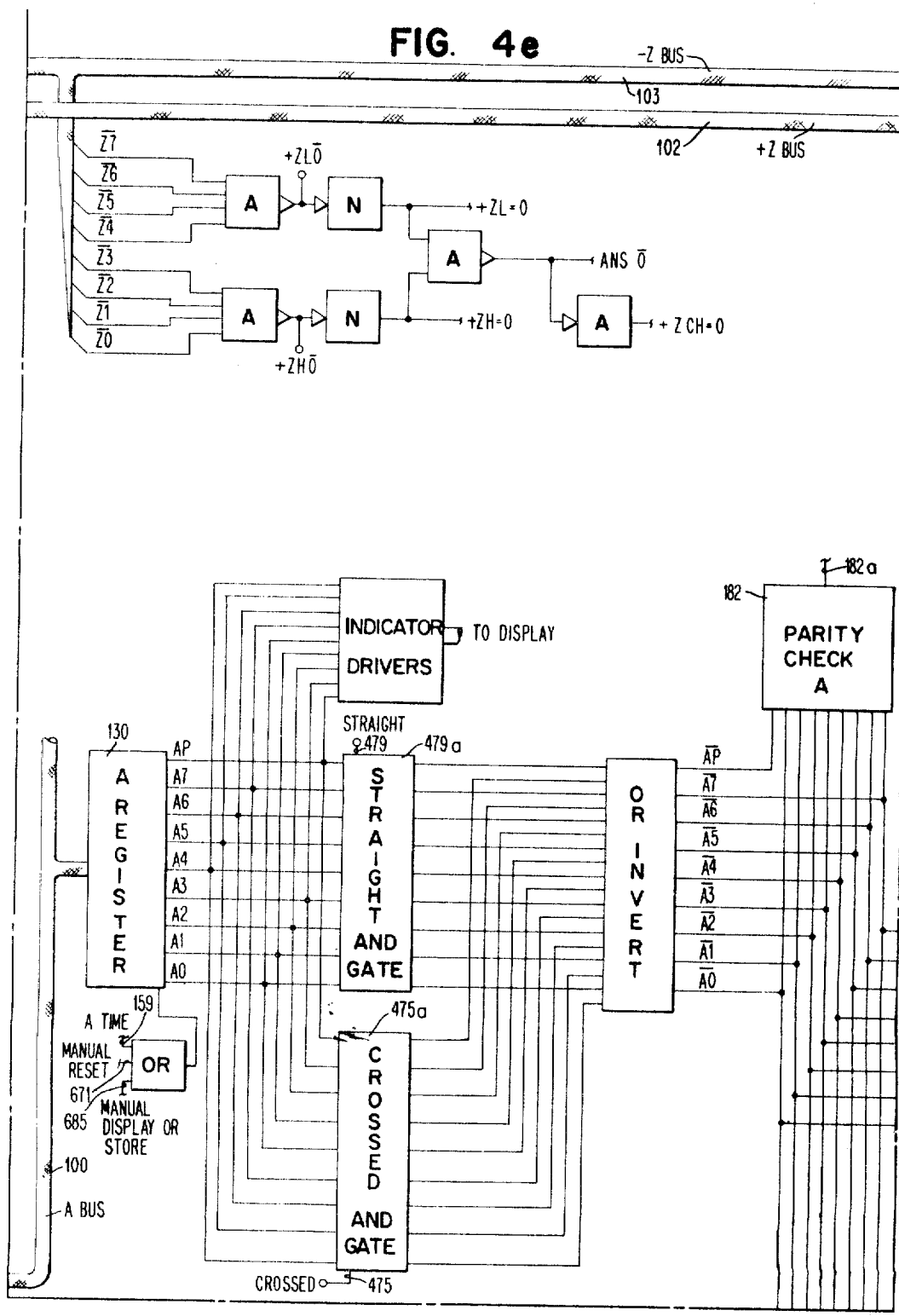

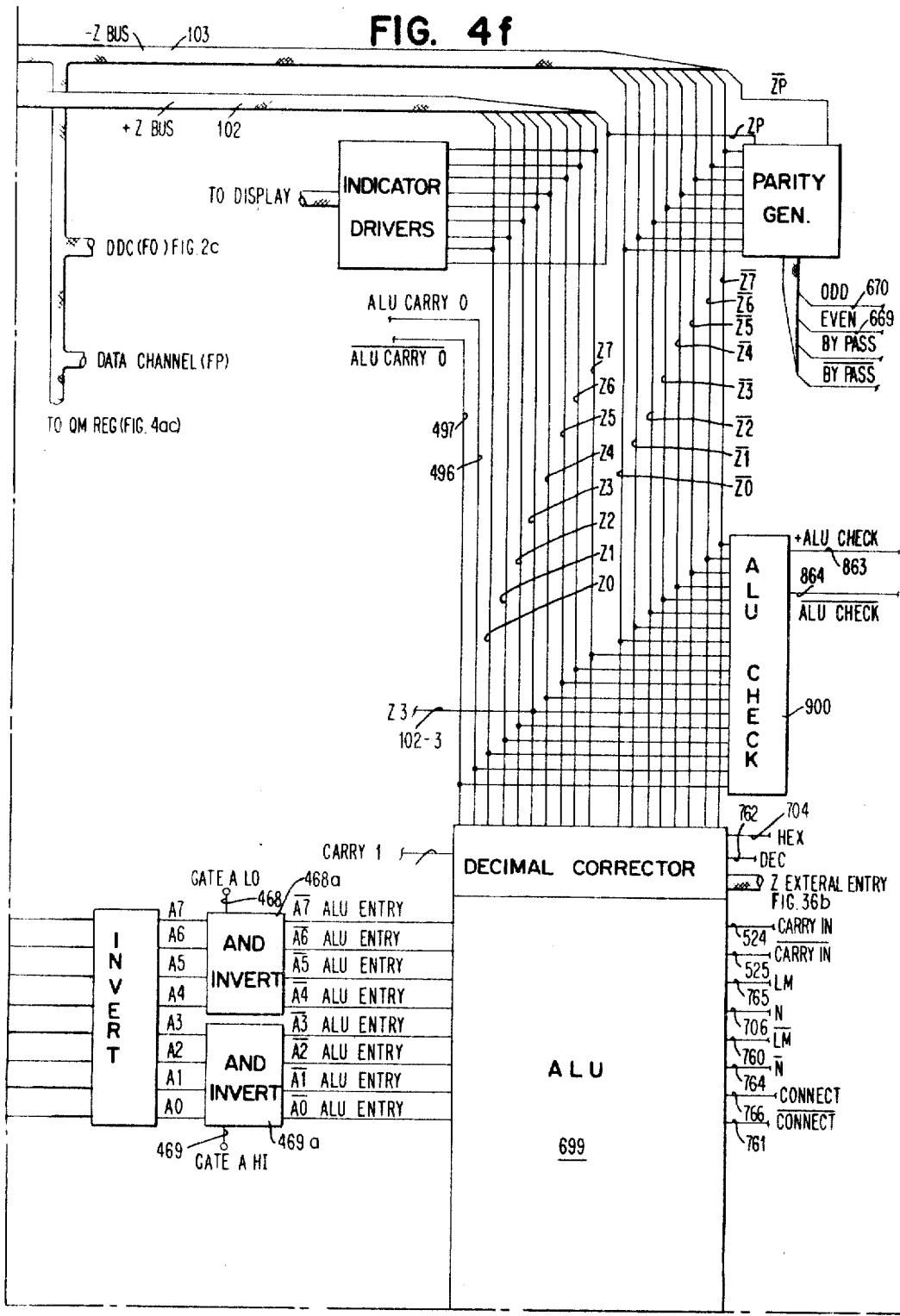

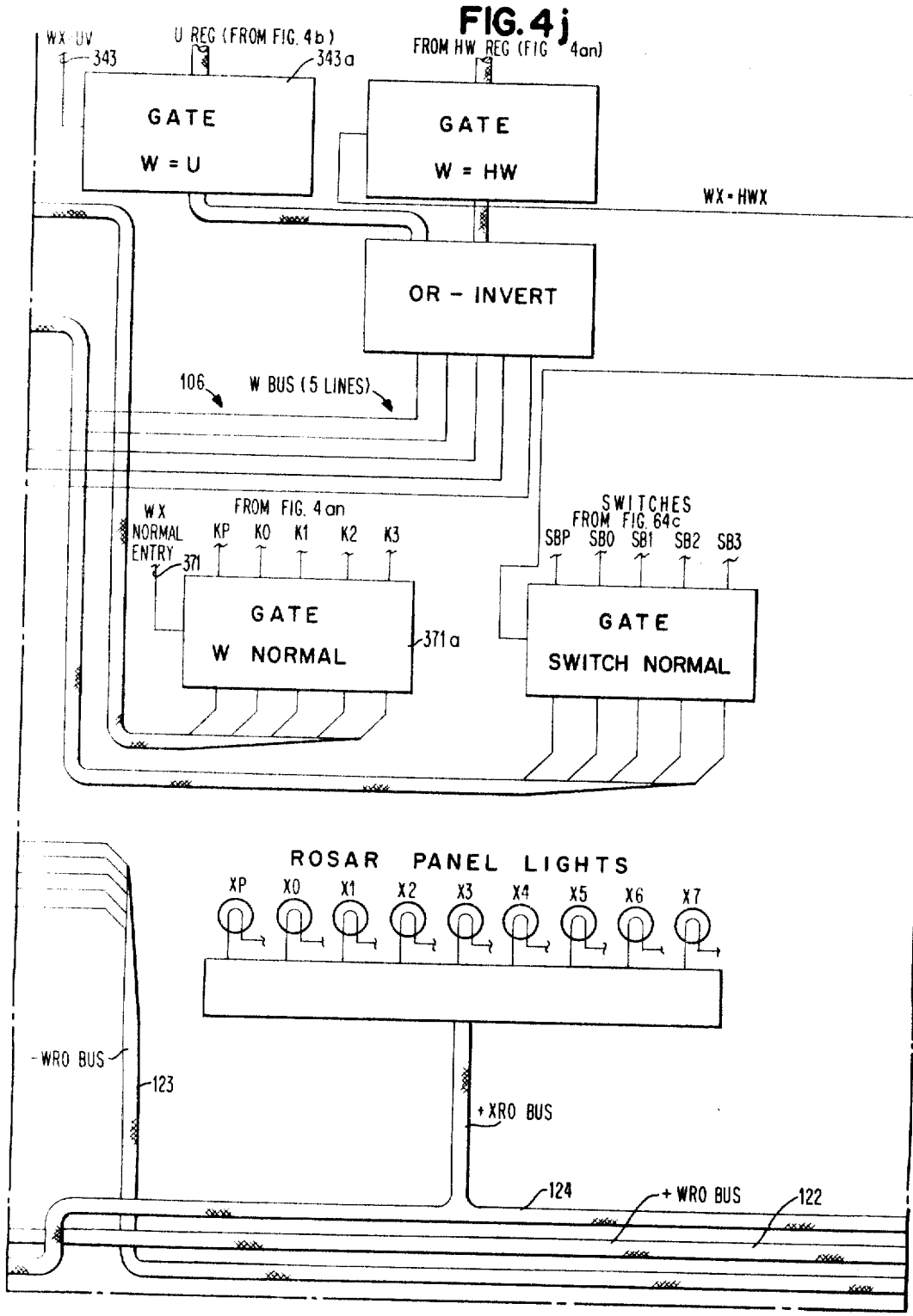

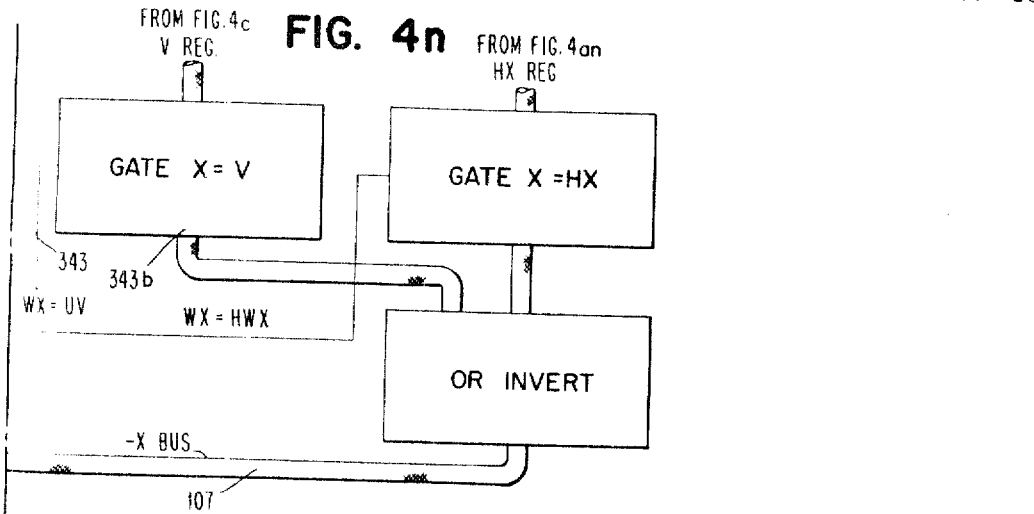
FIG. 4n
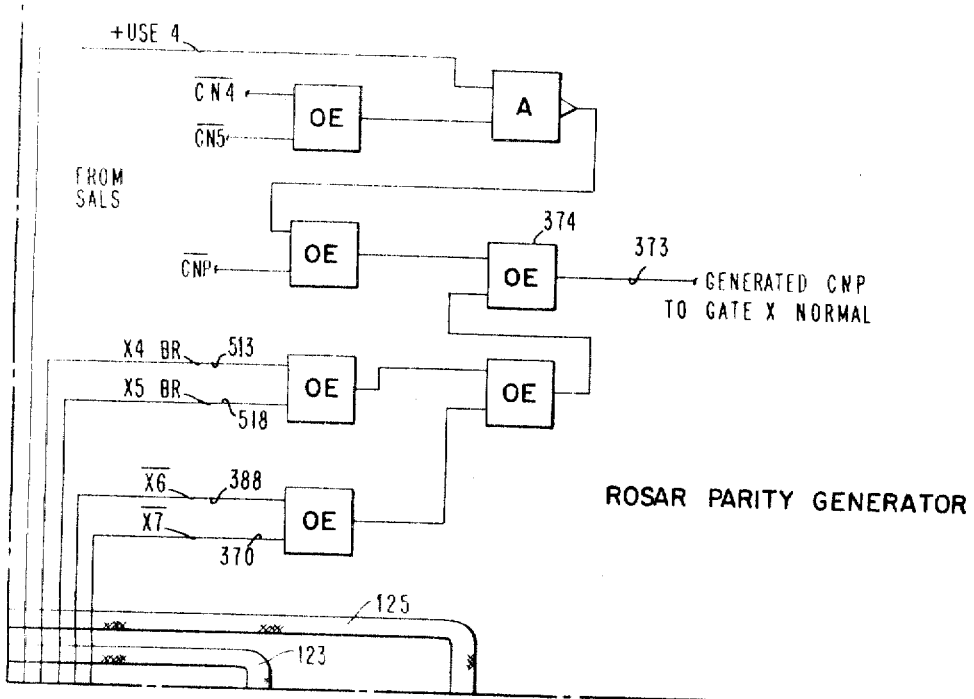
ROSAR PARITY GENERATOR

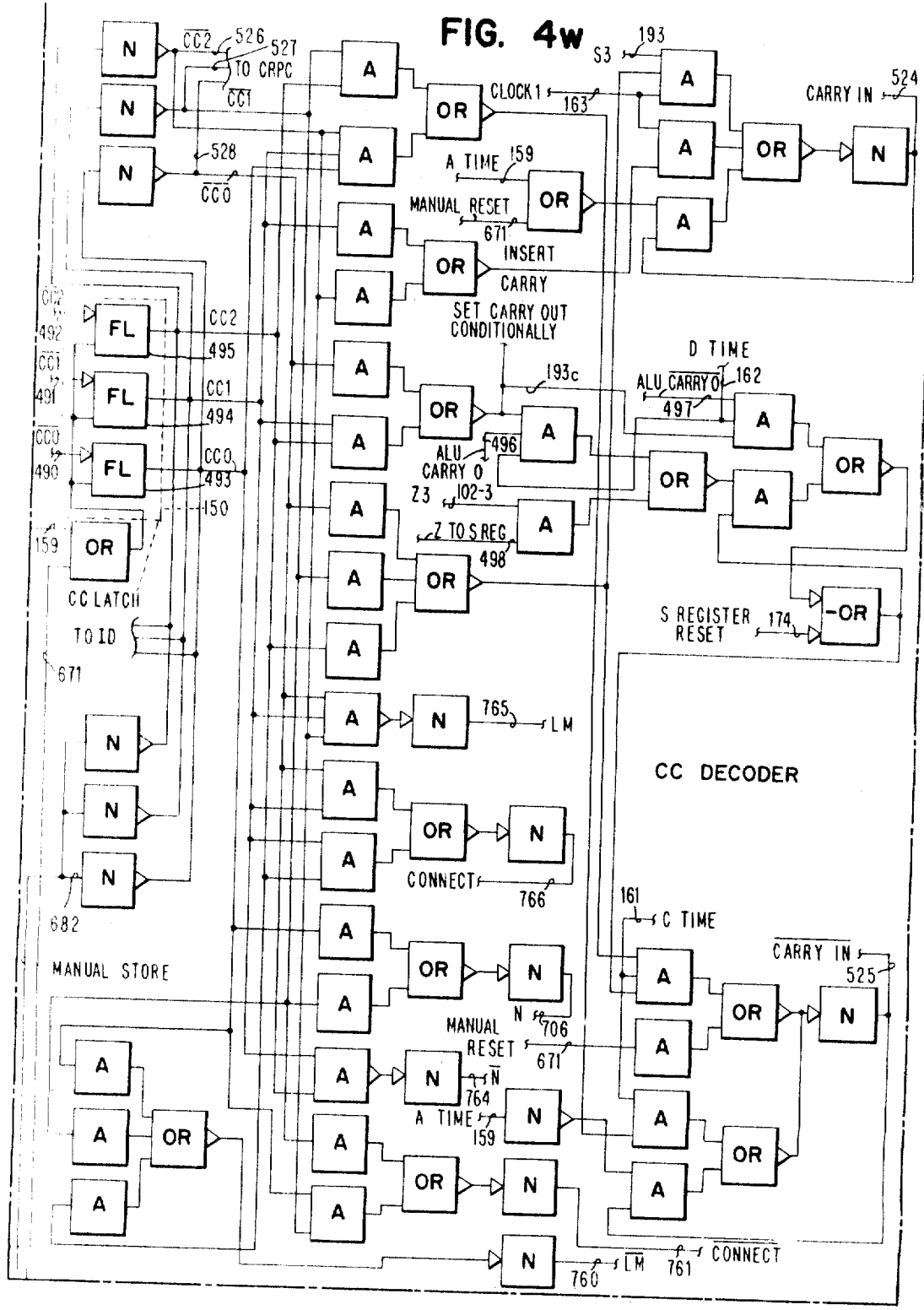

CF, CG DECODERS

CB SOURCE DECODE

April 18, 1967 R. J. CARNEVALE ETAL 3,315,235
DATA PROCESSING SYSTEM
Filed Aug. 4, 1964 73 Sheets-Sheet 34

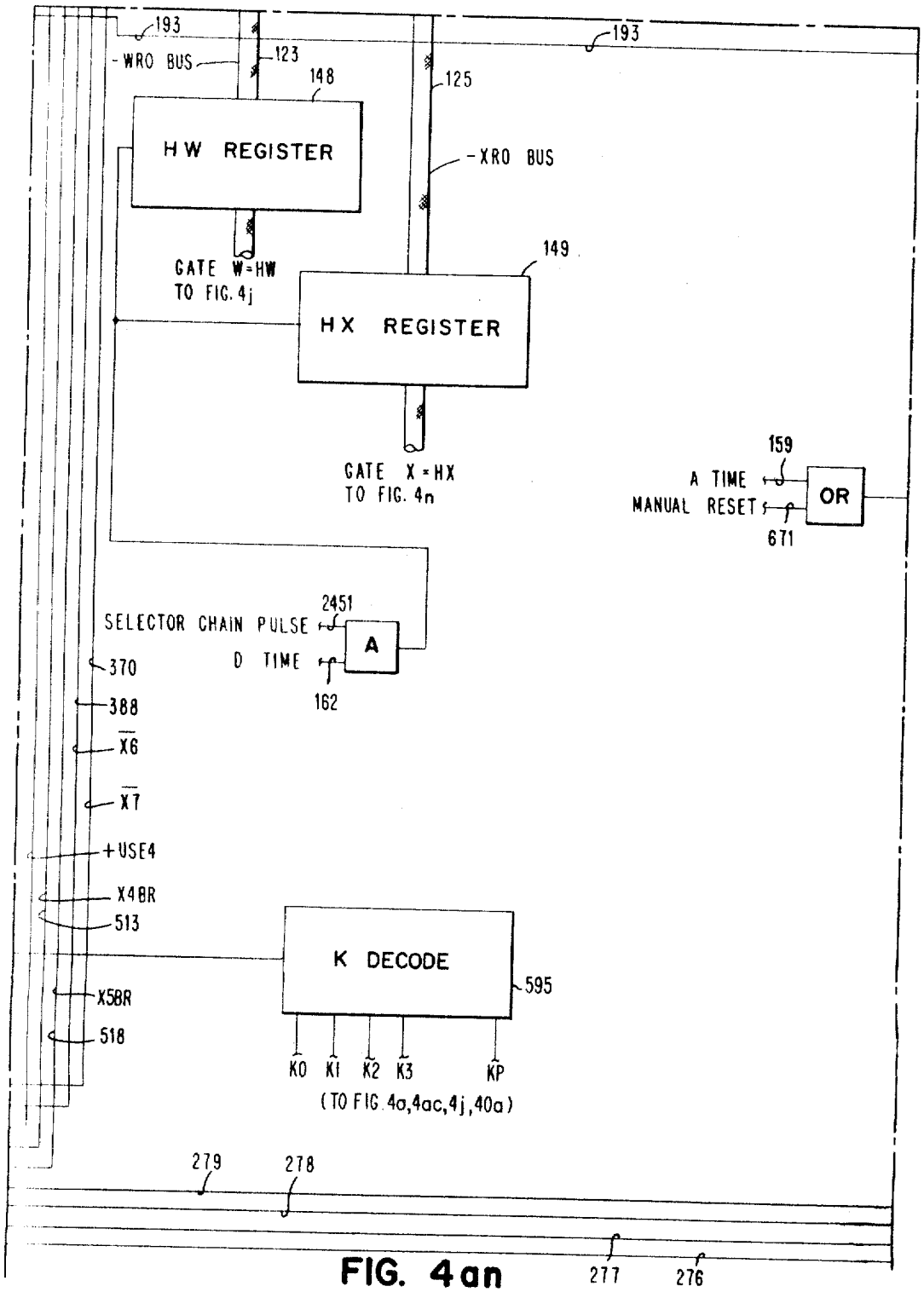

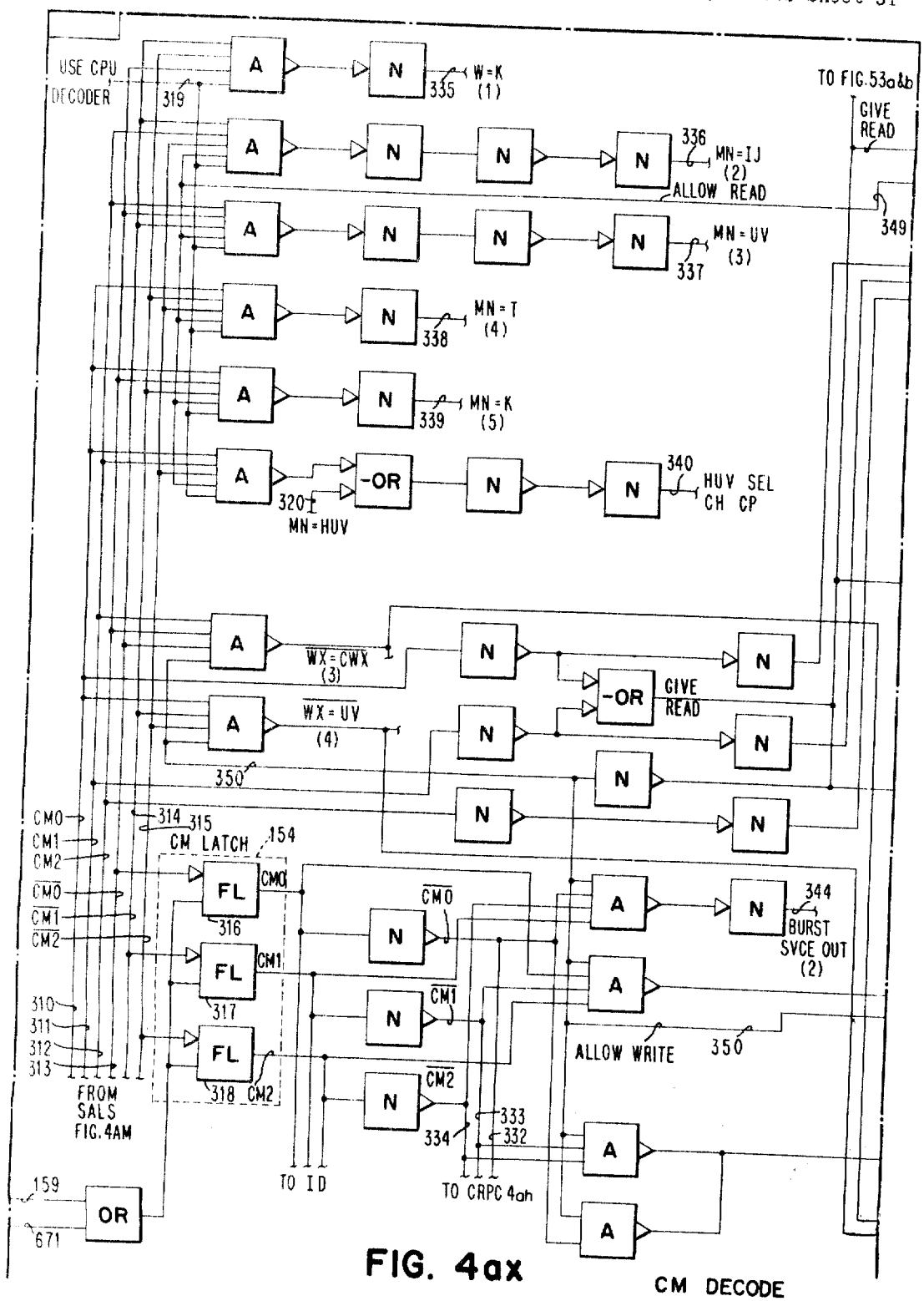
FIG. 4ax    CM DECODE

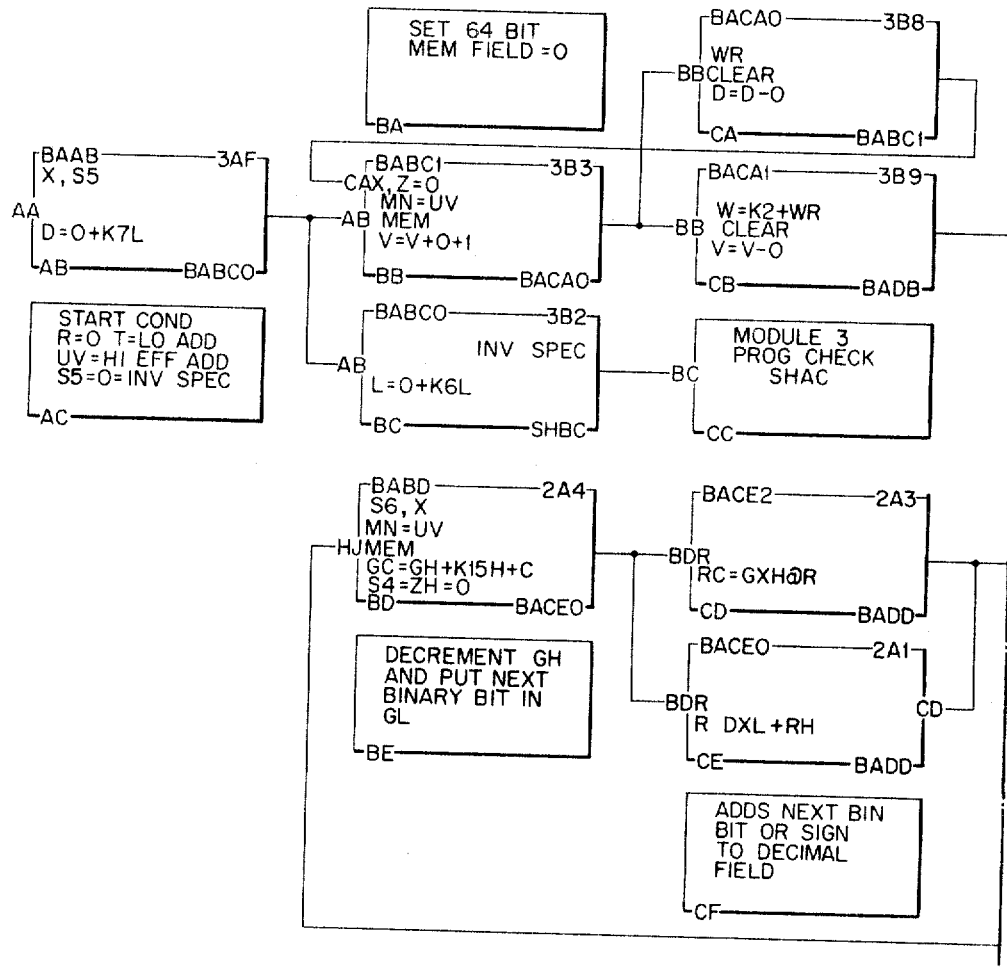
NOTE 1 S0=0 = TRUE ADD
S4=1= ALL BINARY BITS OF 8 BIT BYTE CONVERTED
S5=1= END OF REGISTER
S6=0= END CYCLE
S6=1= NOT END CYCLE
S2=1= REG SIGN MINUS
S2=0= REG SIGN PLUS
CONVERT BINARY TO DECIMAL
FIG. 5ba1

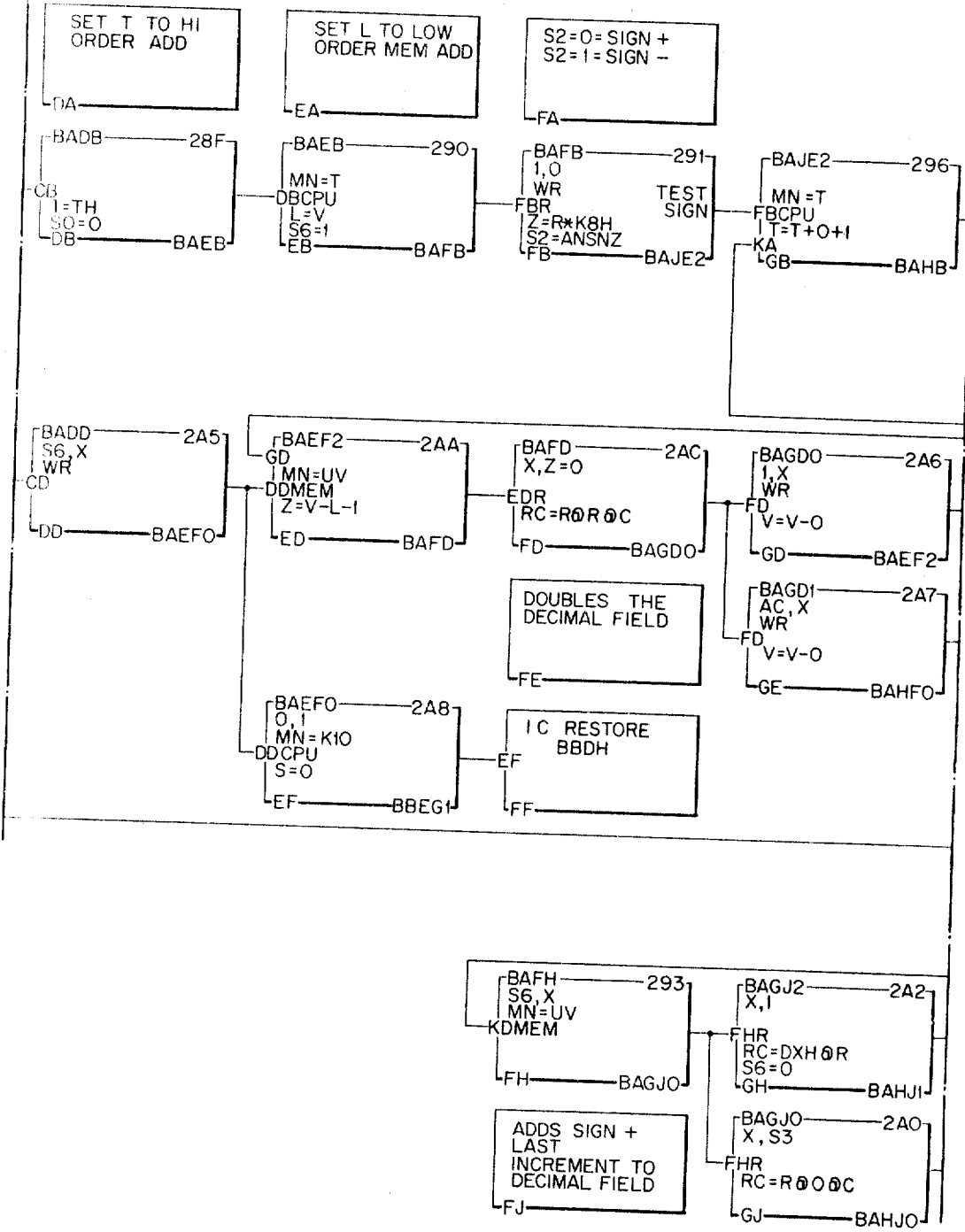
CONVERT BINARY TO DECIMAL
FIG. 5ba2

CONVERT BINARY TO DECIMAL

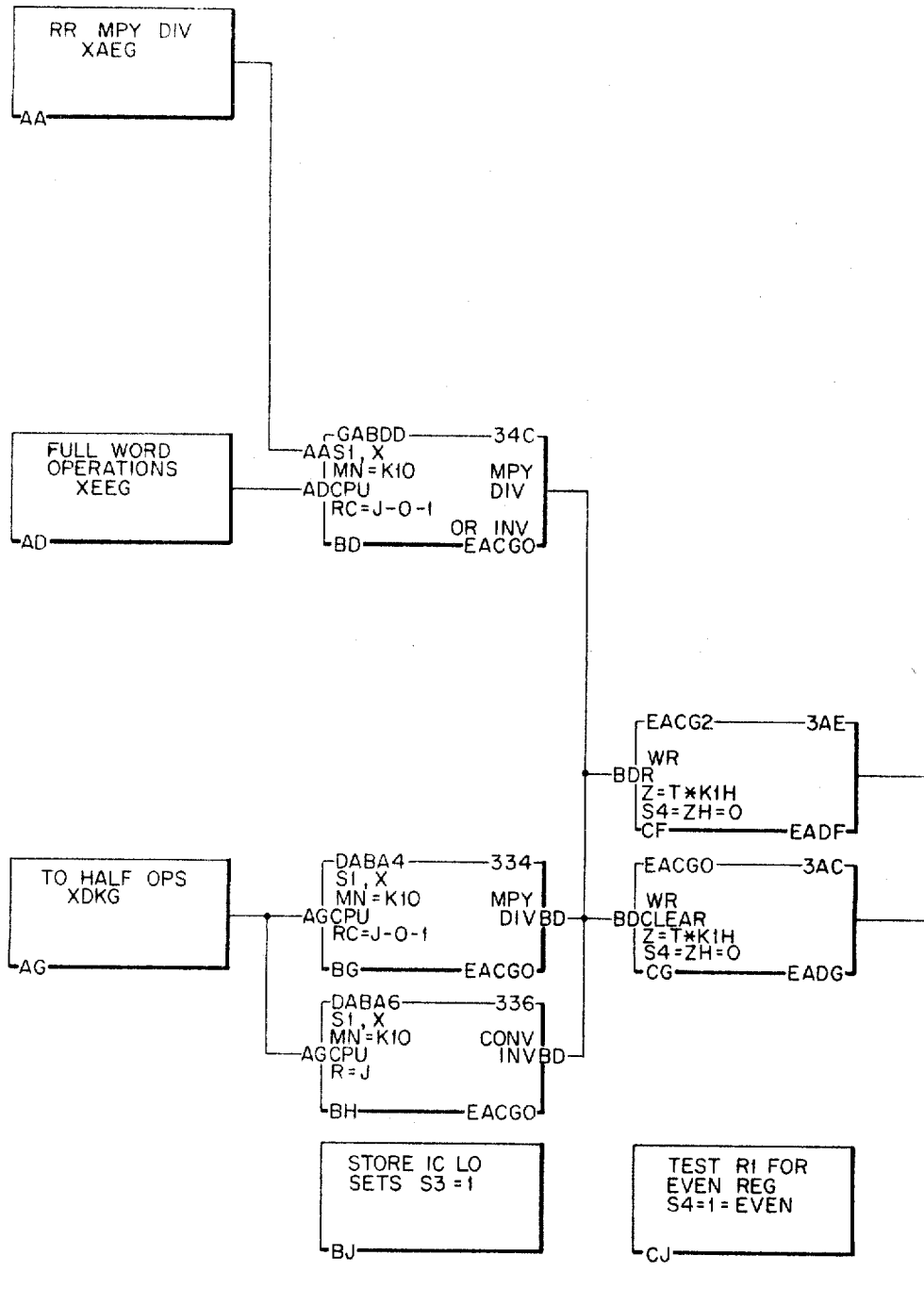
FIG. 5ea1 — BINARY MULT STORE IC

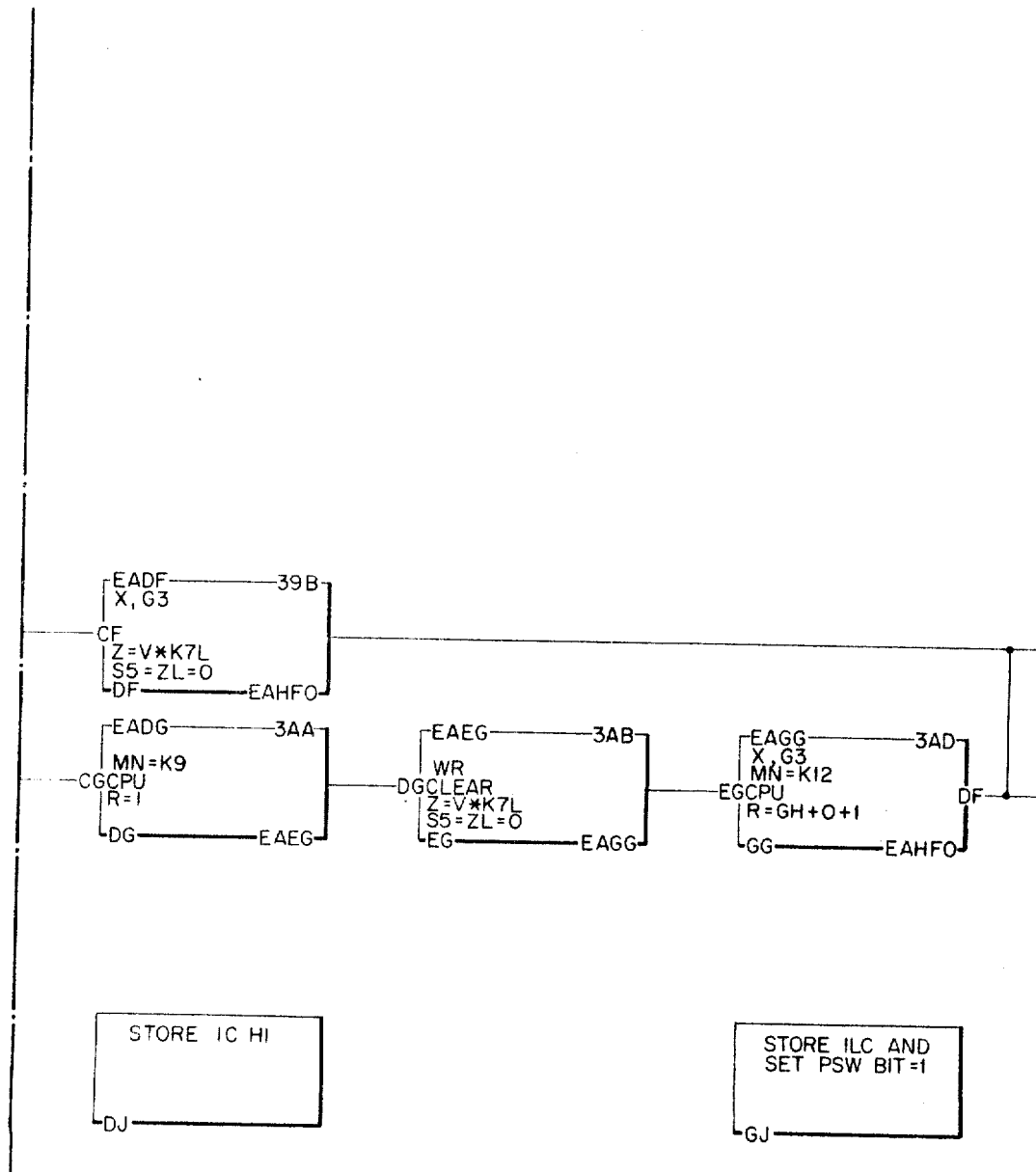
FIG. 5ea2

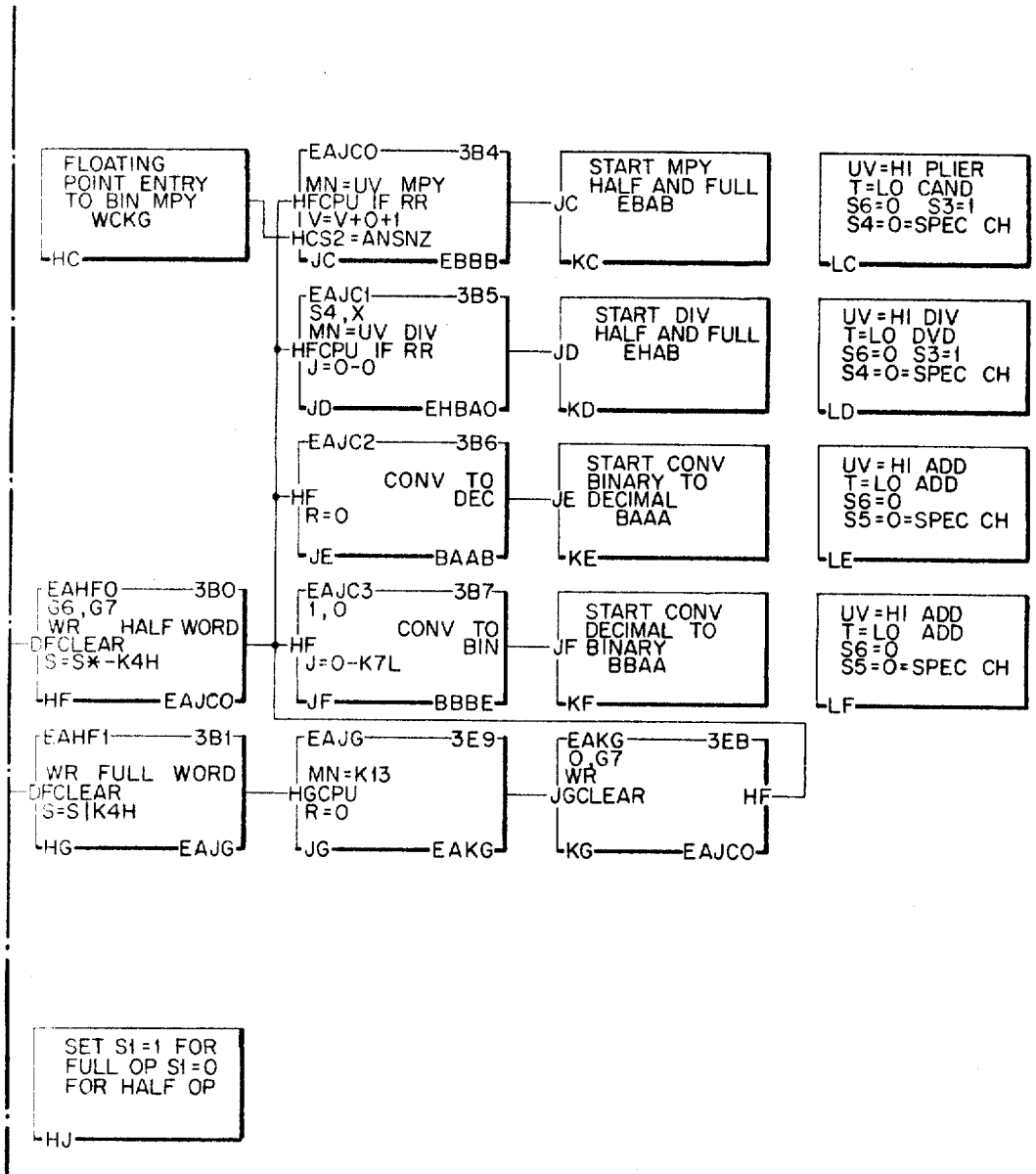
BINARY MULT STORE IC
FIG. 5ea3

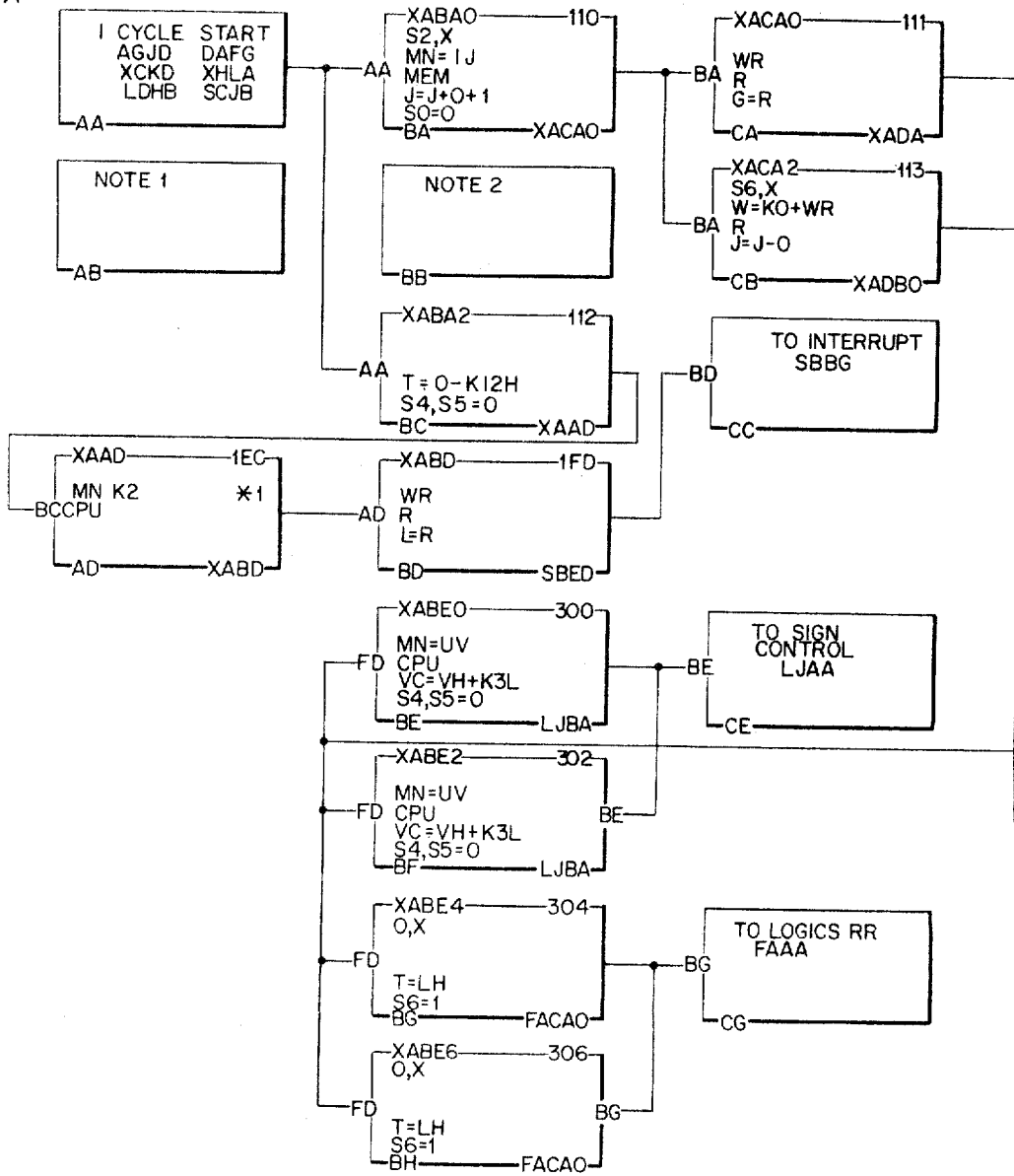
I CYCLES RRI
FIG. 5xa1

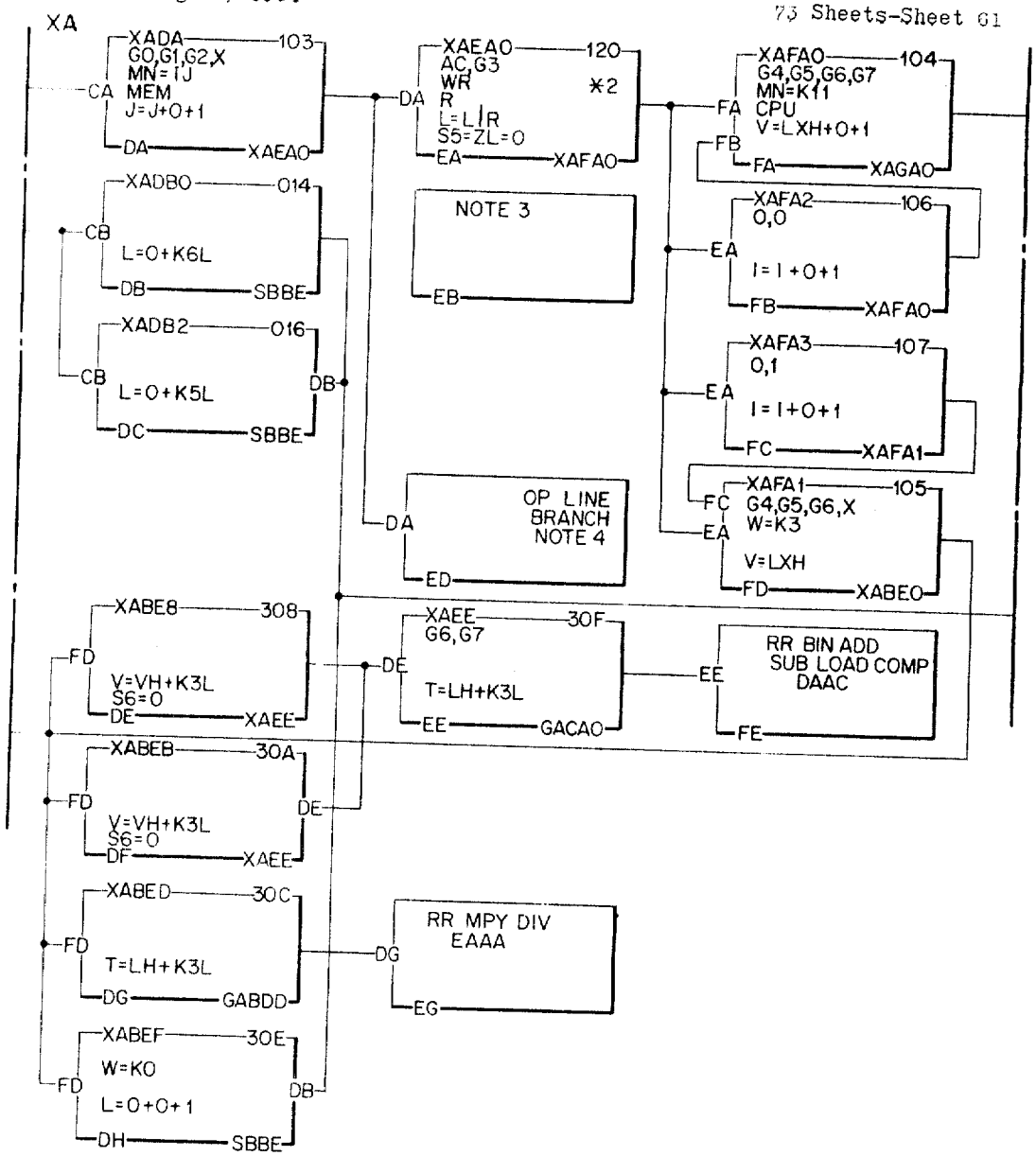
I CYCLES RRI
FIG. 5xa2

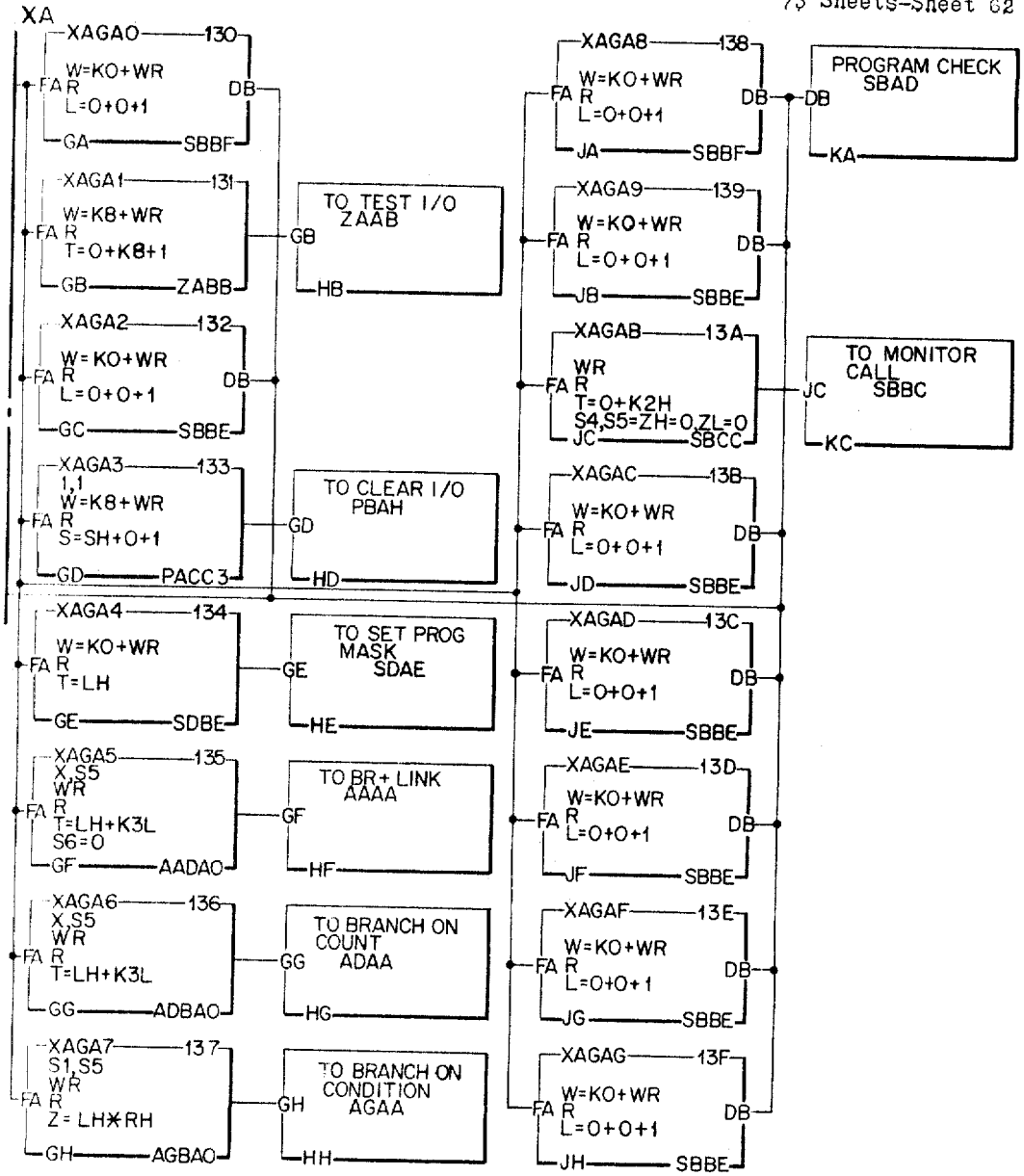
I CYCLES RRI
FIG. 5xa3

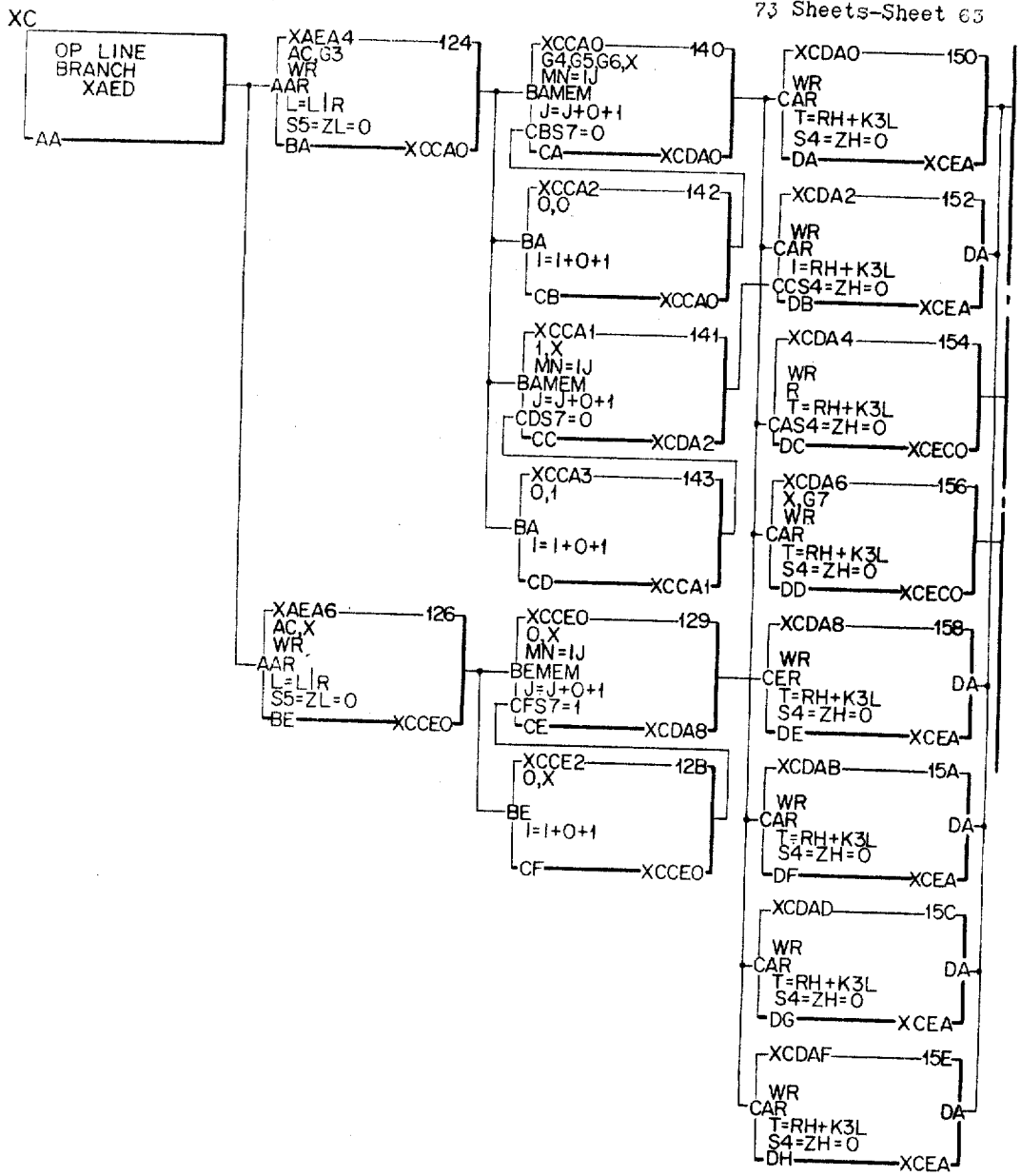
I CYCLES RXI
FIG. 5xc1

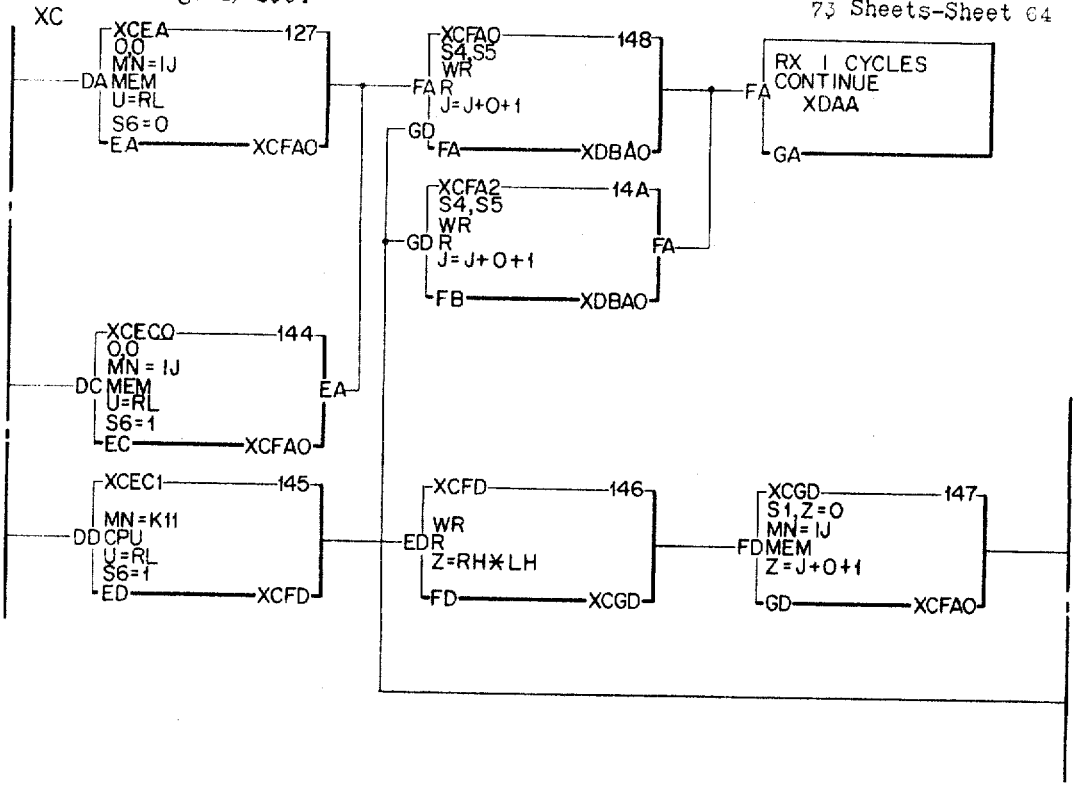
I CYCLES RXI
FIG. 5xc2

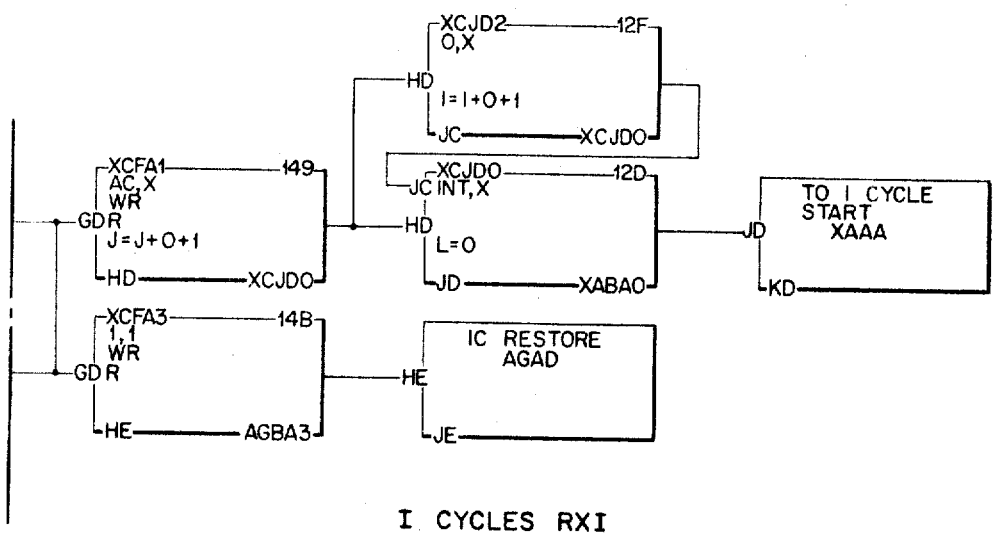
I CYCLES RXI
FIG. 5xc3

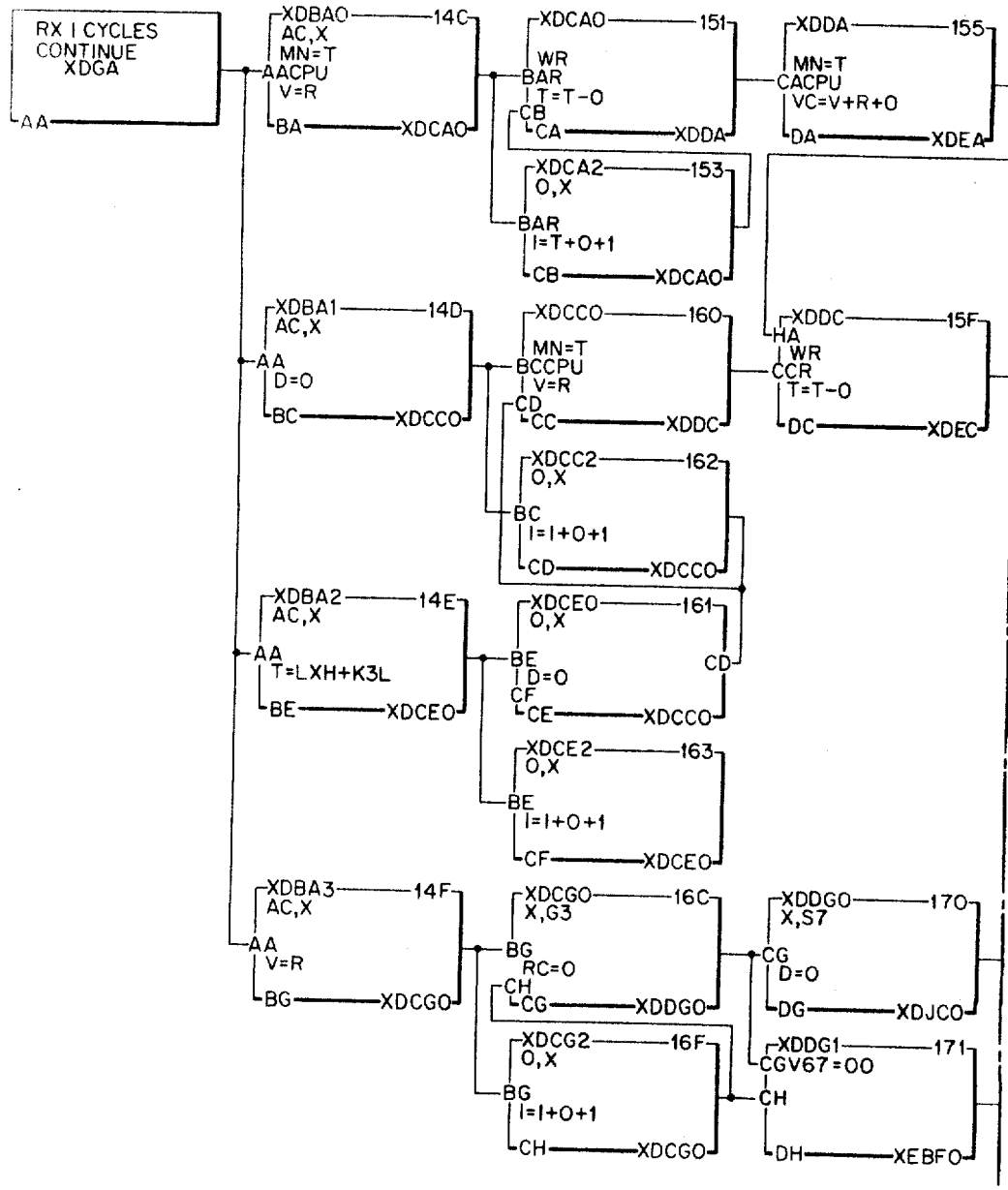
I CYCLES RXII
FIG. 5xd1

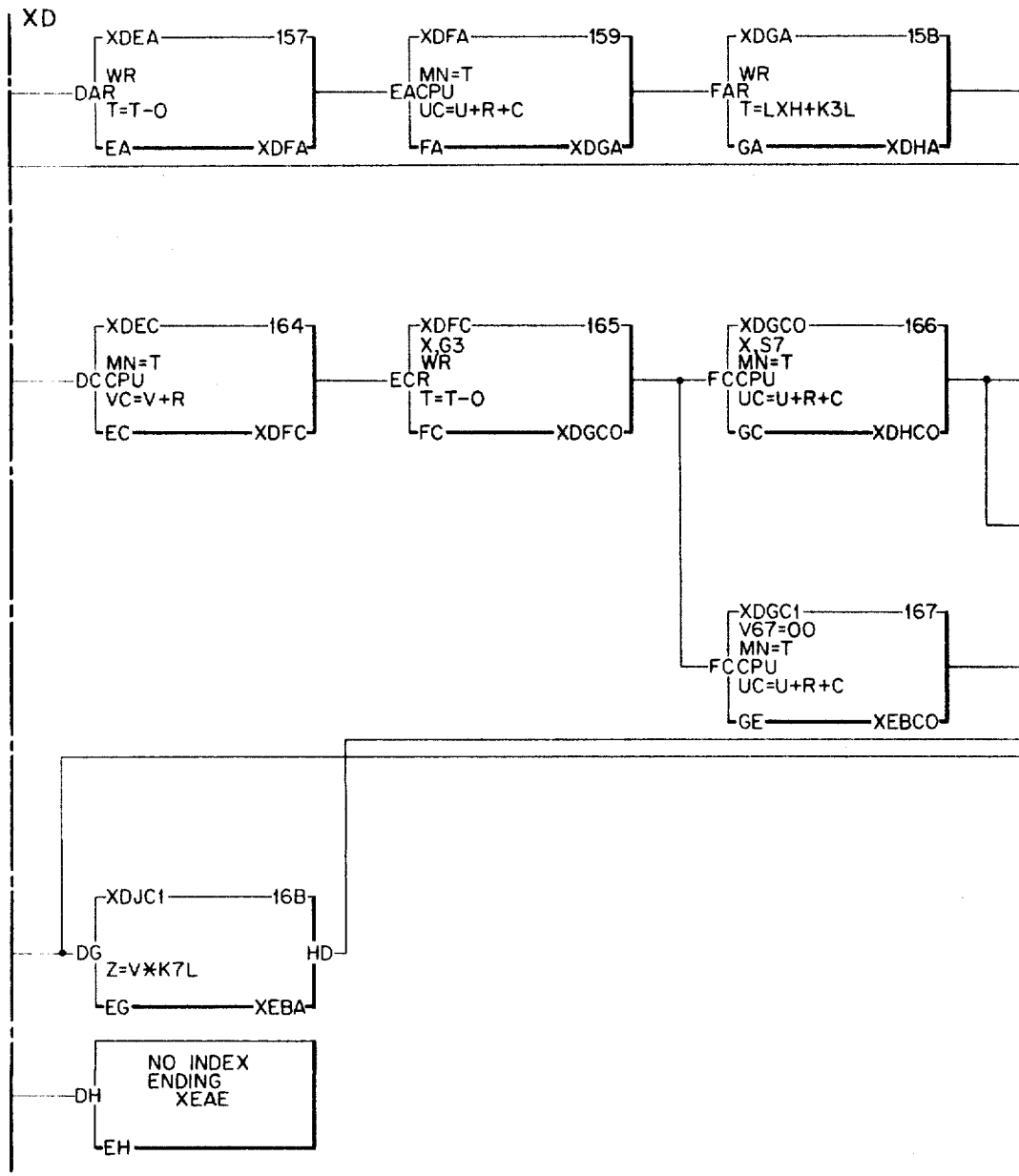
I CYCLES RXII
FIG. 5xd2

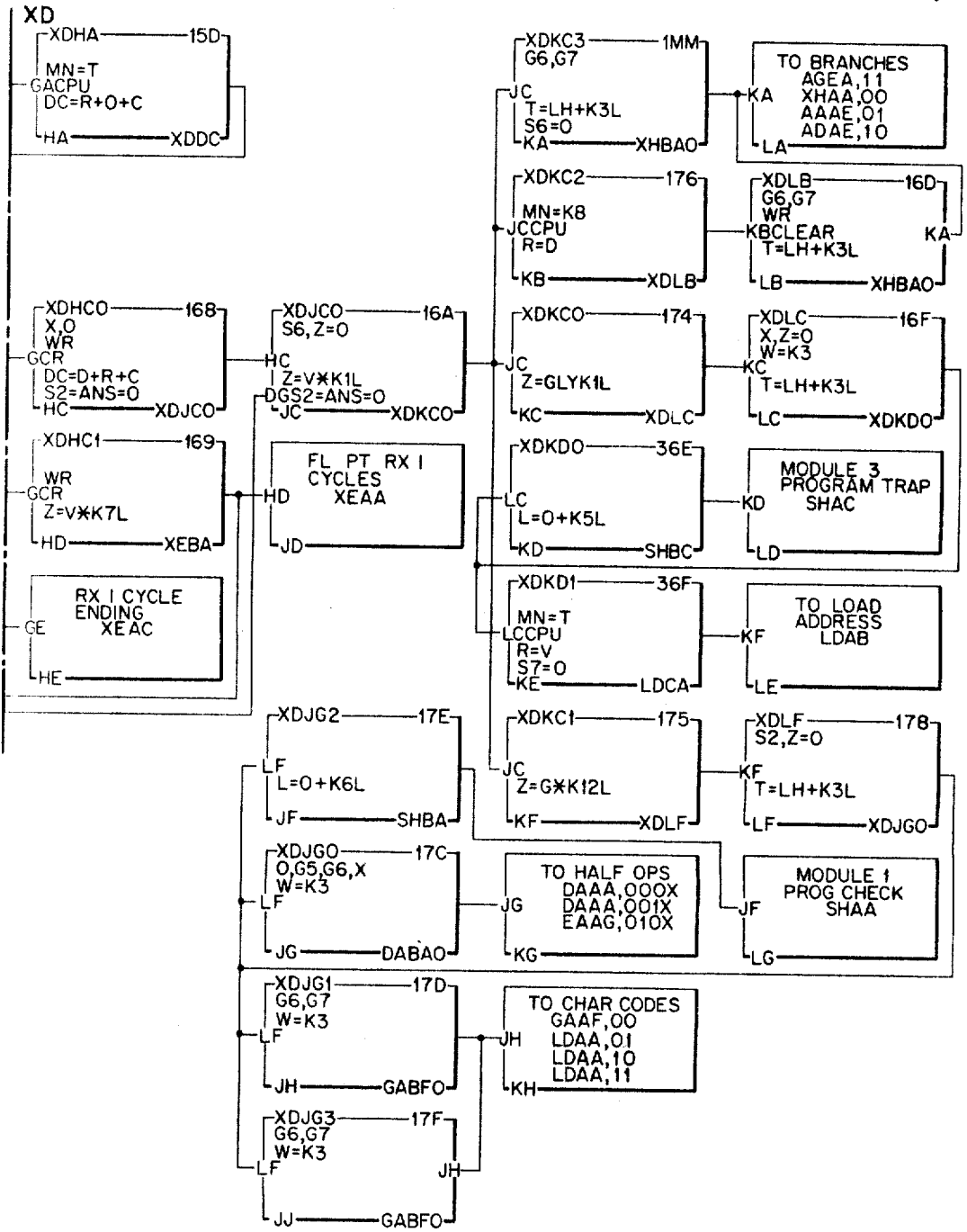
I CYCLES RXII
FIG. 5xd3

United States Patent Office 3,315,235
Patented Apr. 18, 1967

3,315,235
DATA PROCESSING SYSTEM
Richard J. Carnevale, Union, Arthur F. Collins and Jack E. Greene, Vestal, William P. Hanf, Endicott, Albert A. Magdall, Vestal, Charles B. Perkins, Jr., Endicott, John W. Rood, Vestal, and Anthony E. Villante, Binghamton, N.Y., assignors to International Business Machines Corporation, New York, N.Y., a corporation of New York
Filed Aug. 4, 1964, Ser. No. 387,443
27 Claims. (Cl. 340—172.5)

The present invention relates to a data processing system and, more particularly, to a data processing system in which arithmetic and logical functions are effected under control of a main machine instruction, called macro-instructions, stored in a storage, and a related sequence of micro-program instructions stored in a read-only storage.

Each micro-instruction in a sequence issues a predetermined pattern of control signals for effecting a predetermined one of a sequence of basic processing cycles.

The data processing system comprises essentially an arithmetic and logic unit (ALU) having two input channels (buses) and an output channel (bus); a plurality of registers including machine condition and status registers; gating means whereby a selected register communicates with a selected channel; a main storage which contains the main instructions, and the data to be processed; and a read-only storage containing a dictionary of all micro-instructions for carrying out each one of a variety of arithmetic and logic functions.

A primary object of the invention is to predicate control of a data processing system upon basic micro-instructions, each containing a unique pattern of bit manifestations for selective operation of the various parts of the system.

Another object of the invention is to provide a general condition registering means to be utilized for storing condition or status manifestations indicative of a variety of conditions or results which may be achieved by the performance of respectively corresponding operations.

Included in said pattern of bit manifestations of a micro-instruction are the manifestations defining the address of the next micro-instruction of a sequence whereby the addressing facility of a micro-program concept is enhanced.

A more specific object is to provide a condition register for storing conditions or status which arise during the course of an arithmetic function, which conditions are employed to provide appropriate bit manifestations for altering or modifying the contents specifying the address of the next micro-instruction, to thereby increase the power and flexibility of the data processing system without recourse to special branching instructions.

Another object is to provide a data processing system which employs essentially a pair of input channels to communicate all forms of data and instruction words to an arithmetic and logic unit (ALU) under control of gating means selectively rendered operable by the bit patterns constituting the micro-instruction, thereby providing speed, flexibility and versatility far exceeding the prior art data processing systems.

A more specific related object is to provide back-up registers for some of the bit pattern manifestations of the micro-instructions, thereby providing greater speeds in operation by enabling certain functions to be overlapped.

Still another object is to provide a highly flexible arrangement in the input controls to the arithmetic and logic unit whereby power and efficiency in data processing are greatly enhanced.

Yet another object is to provide an improved arrangement for error detection and error control and the micro-program means for utilizing the error conditions in a manner that increases the performance and versatility of data processing.

The foregoing and other objects, features and advantages of the invention will be apparent from the following more particular description of a preferred embodiment of the invention, as illustrated in the accompanying drawings.

In the drawings:

FIG. 1 illustrates the layout of the various cabinets containing the apparatus components of a complete data processing system in accordance with the invention.

FIGS. 2a, 2b, and 2c illustrate the registers, Main Memory, Read-Only Storage, ALU, and their interconnecting buses over which flow of data takes place and connections for Input-Output Apparatus.

Figure 4A:
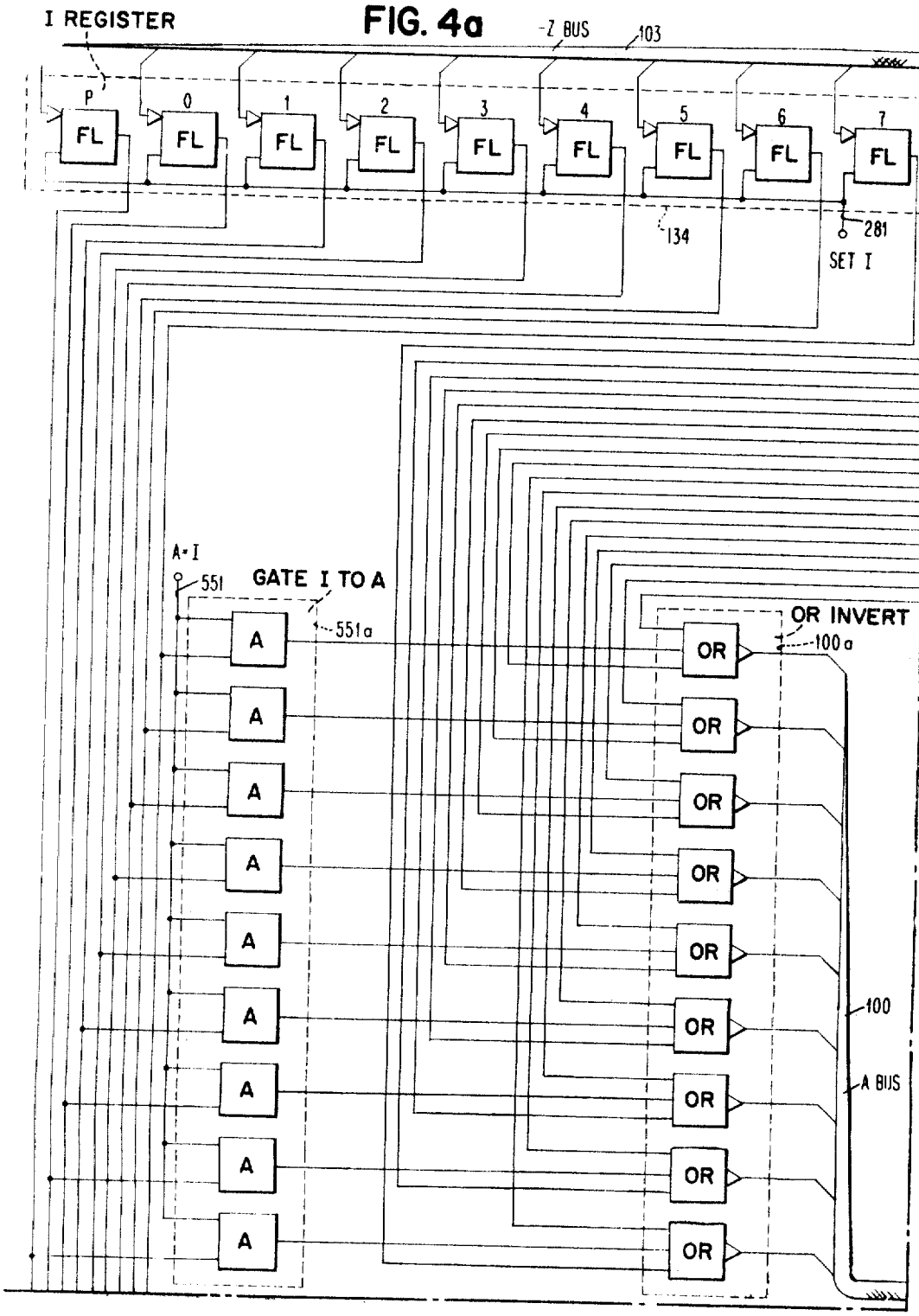
FIG. 4 is a block diagram of the layout of FIGS. 4a to 4az (no 4l or 4al or 4q or 4aq) inclusive.

FIGS. 4a to 4az (with above noted omissions), inclusive, comprise the complete wiring diagram of the CPU and connections thereof to Input-Output Apparatus.

Figure 5B:
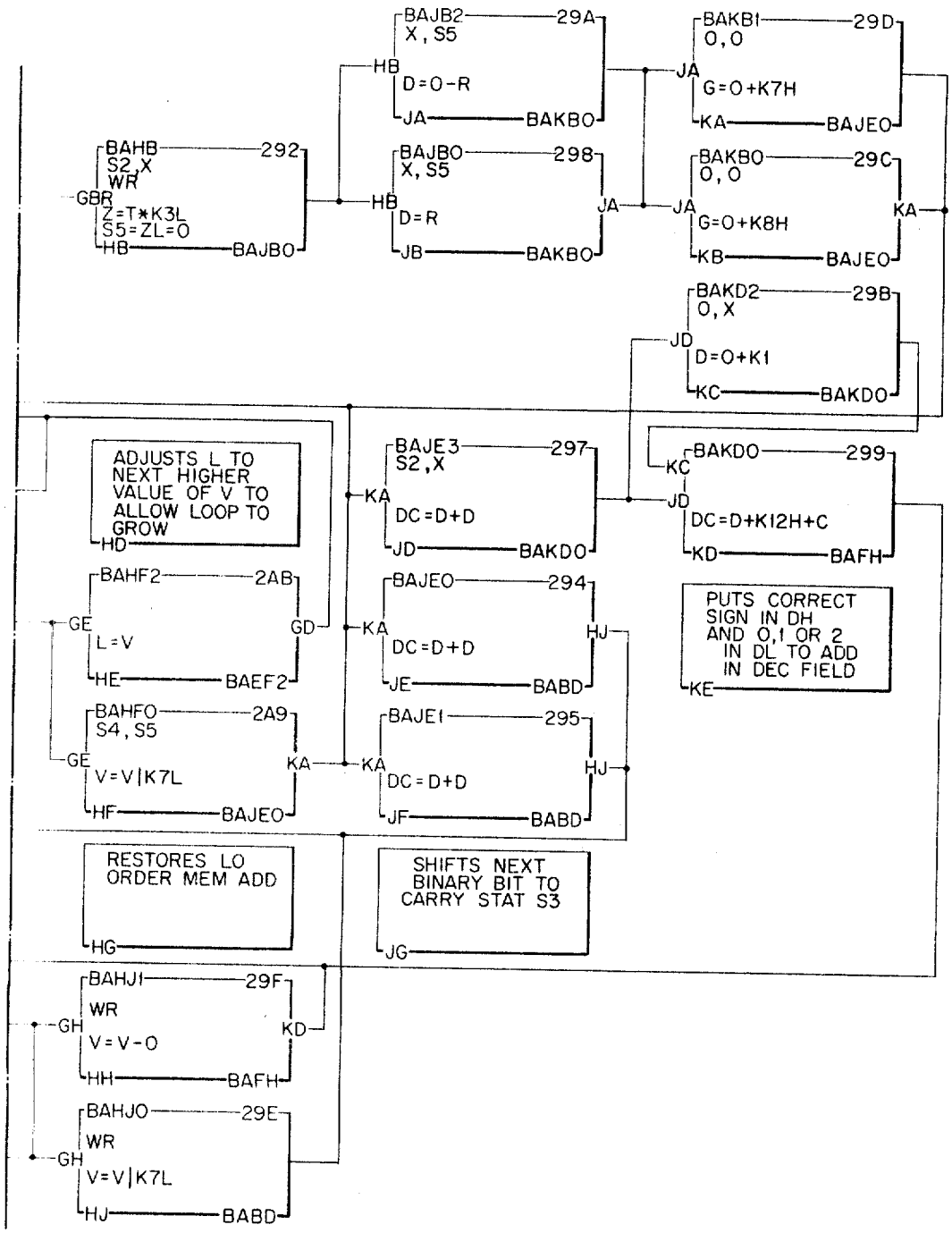

FIGS. 5ba1, 5ba2, and 5ba3 constitute the micro-programs for Convert Binary to Decimal.

FIGS. 5ea1, 5ea2, and 5ea3 constitute the micro-programs for Binary Mult. Store IC.

FIGS. 5xa1, 5xa2, and 5xa3 constitute the micro-programs for I Cycles RRI.

FIGS. 5xc1, 5xc2, and 5xc3 constitute the micro-programs for I Cycles RXI.

FIGS. 5xd1, 5xd2, and 5xd3 constitute the micro-programs for I Cycles RXII.

Figure 6:
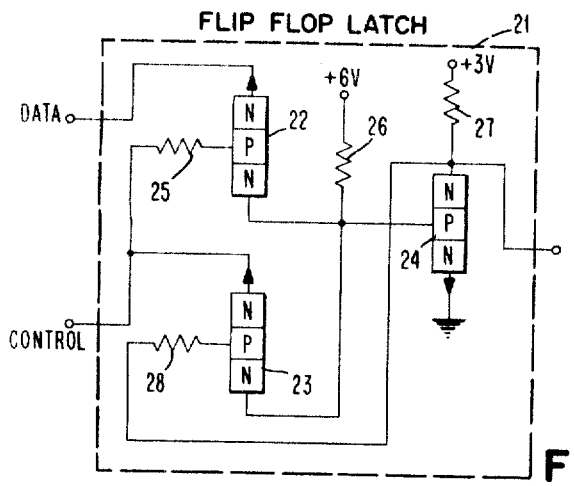

FIG. 6 is a detailed circuit diagram of a flip-flop latch.

Figure 6A:
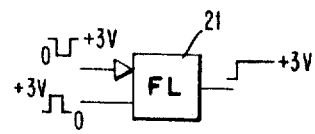

FIG. 6a is a block representation of FIG. 6.

Figure 7:
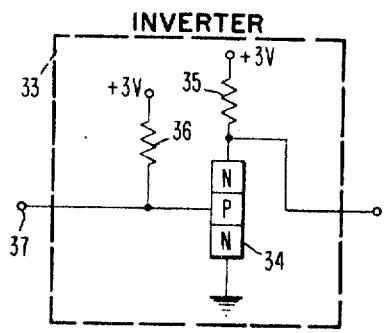

FIG. 7 is a detailed wiring diagram of an inverter.

Figure 7A:
Figure 7B:
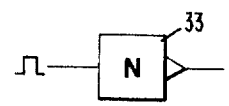

FIGS. 7a and 7b are block representations of FIG. 7 with negative and positive inputs respectively.

Figure 8:
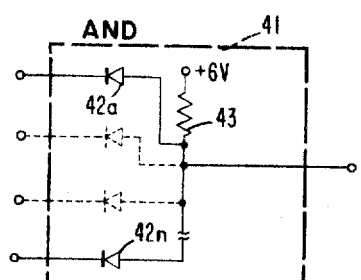

FIG. 8 is a detailed circuit diagram of a logical AND circuit.

Figure 8A:
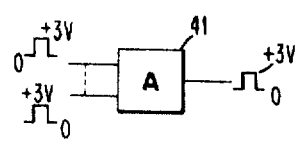

FIG. 8a is a block representation of FIG. 8 with indicated inputs and outputs.

Figure 9:
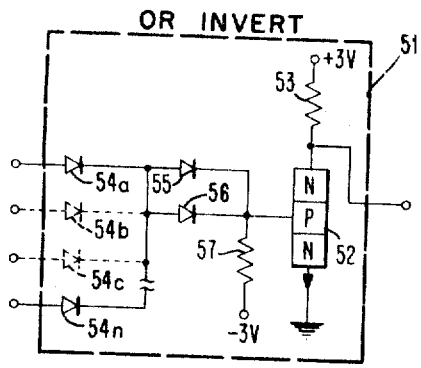

FIG. 9 is a detailed circuit diagram of a logical OR inverter.

Figure 9A:
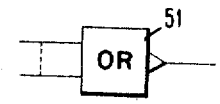
Figure 9B:
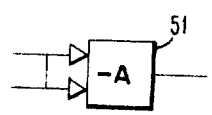

FIGS. 9a and 9b are block representations of FIG. 9 with indicated inputs and outputs.

Figure 10:
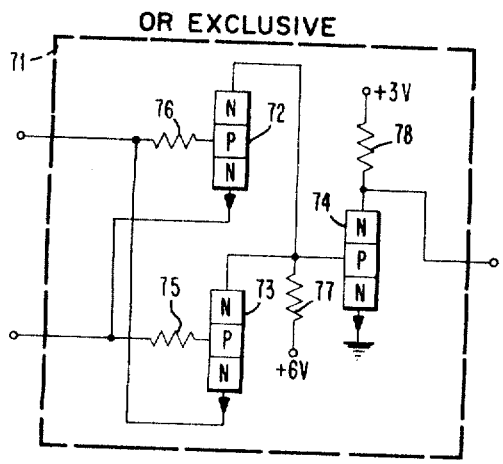

FIG. 10 is a detailed circuit diagram of a logical OR-Exclusive circuit.

Figure 10A:
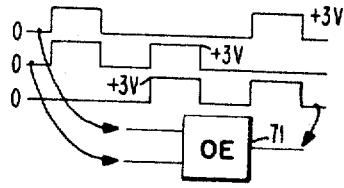

FIG. 10a is a block representation of FIG. 10 with indicated inputs and outputs.

Figure 11:
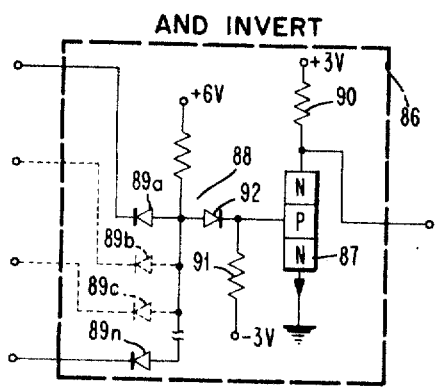

FIG. 11 is a detailed circuit diagram of a logical AND INVERT circuit.

Figure 11A:
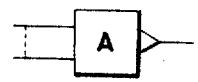
Figure 11B:
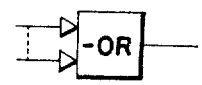

FIGS. 11a and 11b are block representations of FIG. 11 with indicated inputs and outputs.

Figure 12:
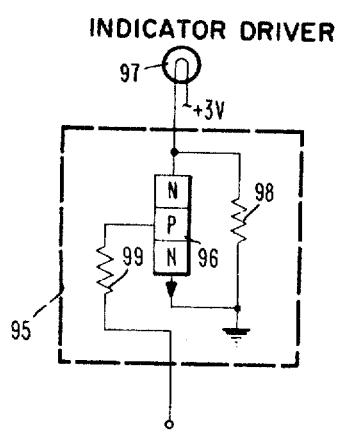

FIG. 12 is a circuit diagram of an indicator driver.

Figure 12A:
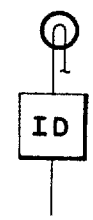

FIG. 12a is a block representation of FIG. 12 with the indicated input.

Figure 13:
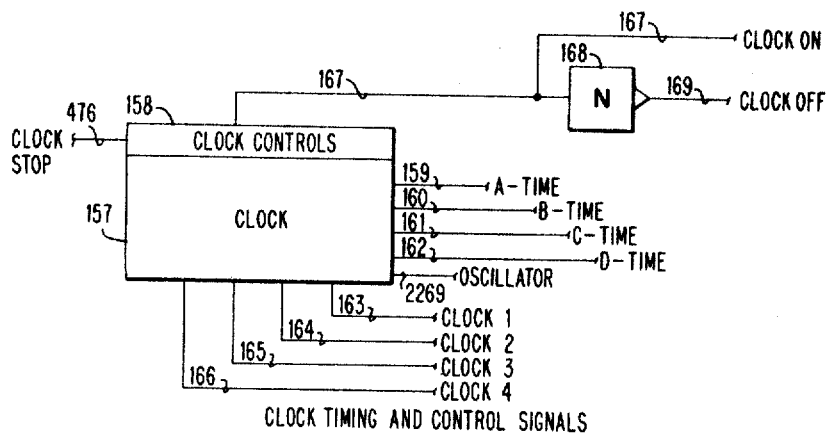

FIG. 13 is a block diagram of the CLOCK TIMING and CONTROL SIGNALS.

Figure 14:
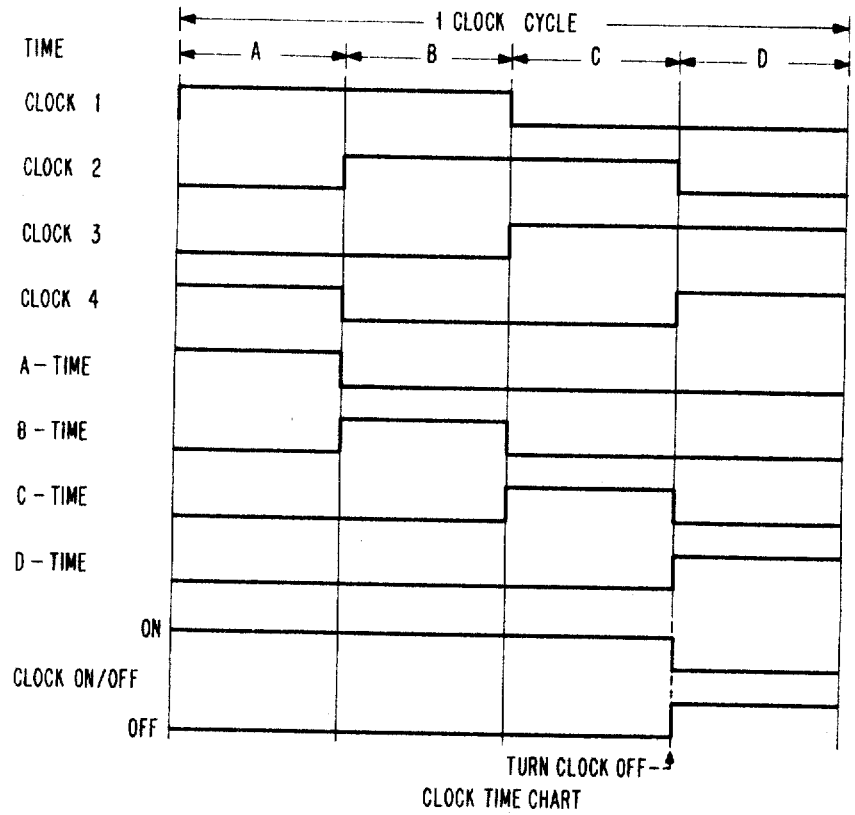

FIG. 14 is a CLOCK TIMING CHART.

Figure 15:
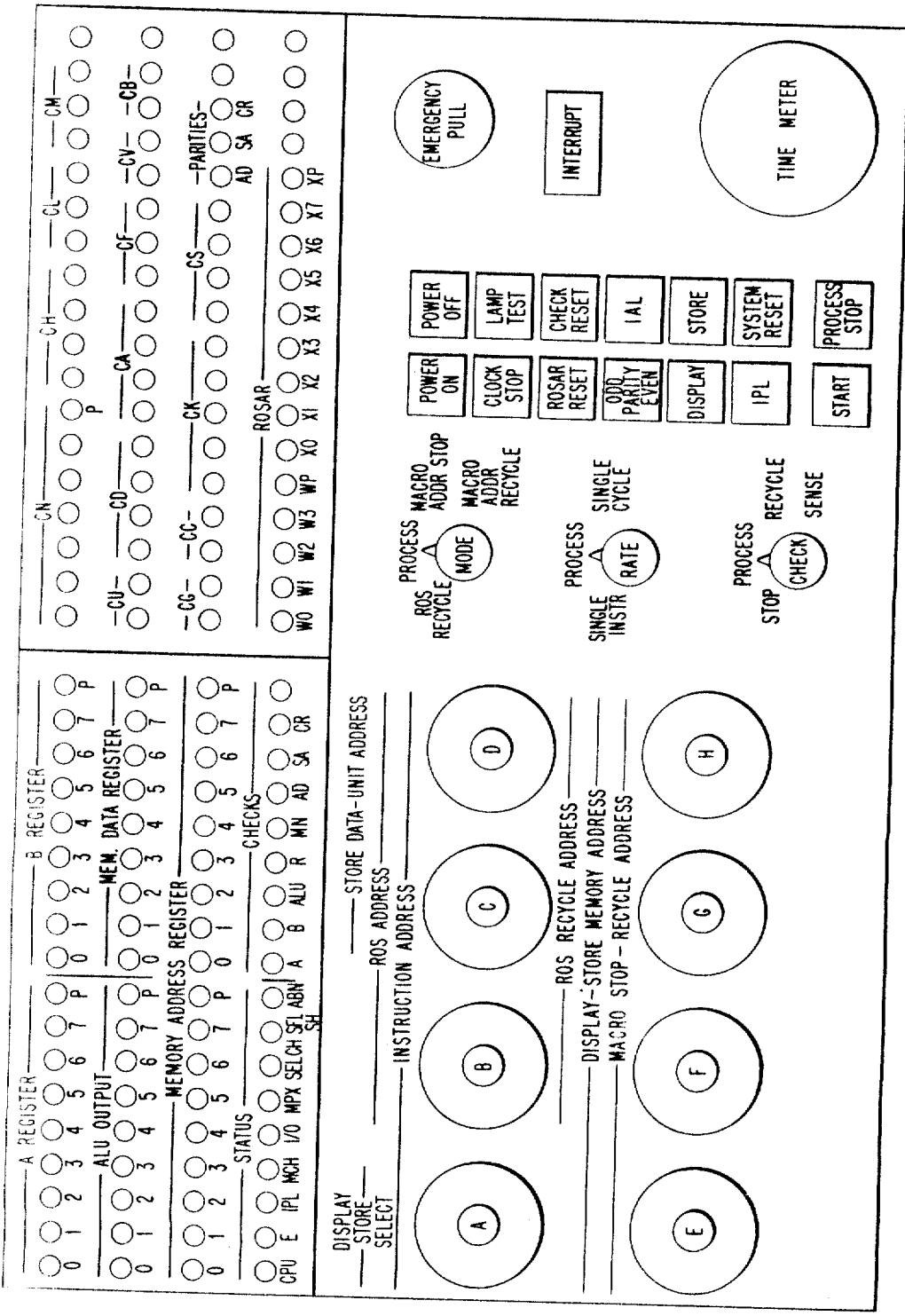

FIG. 15 is a diagram of the layout of the CONSOLE PANEL.

GENERAL INTRODUCTION

In order to visualize a general over-all picture of the central processor, it is necessary to appreciate how data processing occurs at different levels in the processor. From several problem Programs, loaded into the system by an operator, a single Program can be broken down into a succession of machine instructions, each called a Macro-instruction. Each such, in turn, consists of a series of Micro-instructions which are, in effect, the outputs of the Read-Only Storage, referred to above, and any one of which Micro-instructions produces an individual bit pattern. These bit patterns are decoded, by appropriate decoding means as set forth in detail later and gated with clock signals, to provide control signals that control the transmission of data, from a selected source to a selected destination. The different levels of processing may be summed up as follows:

(1) Several Programs are loaded into selected addressable areas of the Main Storage and the timely selection of any one is under the control of a Monitor program.

(2) Each Program is subdivided into machine instructions (referred to as Macro-instructions) executed serially in time.

(3) Each Macro-instruction initiates a series of Micro-instructions executed serially.

(4) Each Micro-instruction, when addressed, selects a unique one, of thousands of ROS (Read-Only Storage) control word, bit patterns; these, in toto comprising the dictionary of Micro-instructions referred to above.

(5) This ROS bit pattern is applied, under control of the clock signals, to appropriate DECODERS which provide the respective control signals.

(6) The respective control signals supervise transfers of data from specified sources to specified destinations.

The processor can only execute, one Micro-instruction at a time, and can operate only in one Mode at a time; for example, Problem Mode or Monitor mode.

As part of the signals pattern constituting the Micro-instruction, there is a portion thereof which contains the address of the following Micro-instruction (which can be altered) by virtue of which an alterable sequence of events is produced from an initial instruction. The logical progression of the processor from one operation to another is by means of these Micro-instruction pattern generators, whose sequence is alterable, and is called micro-program control.

As a preliminary to a more detailed understanding of the invention, it is appropriate at this point to describe, among other things, the basic characteristics of the system, the various data and instruction words and formats. A brief description of the various operation codes employed for the execution and performance of the various novel features constituting the invention is also given.

The internal number system of the present invention employs hexadecimal (straight binary) and decimal notations. The arithmetic system is both Fixed Point and Floating Point. The arithmetic code is basically serial by byte, the latter being constituted of 8 bits; in some specific processing functions, the byte is further divided into two separate 4-bit characters.

The unit of information called a byte consists of eight bits, 0 to 7, and a Parity bit to provide odd parity count. The various configurations of data, instructions and commands are made up of these byte units and are classed into four different groups; namely, Fixed-point Numbers, Floating-point Numbers, Decimal Numbers, and Logical Information. These classes differ in the formats used, in the operations for which the data is intended, and in the way the field length is stated. The formats of the various groups of numbers and the logical information are described in great detail, on pages 90 to 95, in the application Serial No. 357,372; filed April 6, 1964; and assigned to the common assignee.

LOGIC CIRCUIT DETAILS

FIGS. 6–12, inclusive, show the preferred details of the various logic circuits incorporated in the apparatus of the present application. It will be appreciated that these circuits are shown by way of example and that known equivalent circuits can be utilized.

FIGS. 6a–12a, inclusive, illustrate the diagrammatic representations of the corresponding circuits of FIGS. 6–12.

FIG. 6 illustrates a bistable flip-flop latch 21 comprising transistors 22, 23 and 24. A DATA input line is connected to the emitter terminal of the transistor 22, and a CONTROL input line is connected to the base terminal of the transistor 22 by way of a resistor 25 and to the emitter terminal of the transistor 23. The collector terminals of the transistors 22 and 23 are returned to a positive potential source by way of a resistor 26, and they are also connected to the base terminal of transistor 24. The emitter terminal of the transistor 24 is connected to ground potential and the collector terminal is connected to a positive source of potential by way of a resistor 27. A latching feedback connection is made from the collector terminal of the transistor 24 to the base of the transistor 23 by way of a resistor 28.

Logic "1" and "0" conditions on the DATA line are represented by the existence of ground potential and +3 volts, respectively. The CONTROL line is normally at ground potential and is raised to +3 volts by a control pulse.

In the normal logic "0" condition of the latch, the transistors 22 and 23 are nonconducting and the transistor 24 is turned on. When a logic "1" negative-going pulse is applied to the DATA line and a positive-going control pulse is applied to the CONTROL line, the base-emitter junction of the transistor 22 forward biases and the latter begins to conduct applying ground potential to the base terminal of the transistor 24. The transistor 24 turns off, applying a positive potential to the base terminal of the transistor 23. When the control pulse terminates prior to the termination of the data pulse (see FIG. 6a), the transistor 23 turns on to maintain the transistor 24 off. The transistor 22 is turned off by the termination of the control pulse.

The stable logic "1" condition of the latch is therefore characterized by the conduction of the transistor 23 and the nonconduction of the transistor 24.

The latch is reset to its logic "0" state only if a control pulse is applied while the DATA line is at +3 volts (i.e., logic "0").

FIG. 7 shows an inverter 33 comprising a transistor 34 with its emitter terminal connected to ground potential, its collector terminal connected to a positive source of potential by way of a resistor 35, and its base terminal connected to an input terminal 37 and to a positive source of potential by way of a resistor 36. As seen in FIGS. 7a and 7b, the inverter 33 can be operated in two logic modes. In FIG. 7a, a positive potential level is normally applied to the base input terminal causing the transistor to be normally conducting to apply ground potential to its collector output terminal. When a negative-going signal corresponding to a logic "1" is applied to the input terminal, the transistor 34 is turned off, applying its positive collector bias potential to the output terminal.

When the inverter 33 is operated in the logic mode illustrated in FIG. 7b, the transistor is normally turned off, applying its positive collector bias potential to the output terminal, and, when a positive-going input signal corresponding to a logic "1" is applied to the transistor, it turns on, applying ground potential to its collector output.

In FIGS. 7a and 7b, the upper and lower input signal levels are preferably selected as +3 volts and ground potential, respectively. In this regard, one aspect of the logic symbology should be clarified. The arrow applied to the input in FIG. 7a indicates that a relatively negative signal must be applied to the input to fulfill the logic "1" condition, and the absence of an arrow in the output indicates that the output is relatively positive when the relatively negative logic "1" signal is applied to the input. In FIG. 7b, the absence of the arrow in the input indicates that a logic "1" input signal is relatively positive, and the arrow in the output of FIG. 7b indicates that the output is relatively negative when the logic "1" input signal is applied. Throughout all of the logic illustrated diagrammatically in the drawings, this symbology will be used. That is, the presence of an arrow indicates that a logic "1" condition is a relatively negative signal level; the absence of an arrow, a relatively positive logic "1" signal level. One exception appears at the inputs to the OR exclusive circuit of FIG. 10 wherein the logic function is satisfied by either input terminal being positive so long as the other input terminal is negative.

FIG. 8 shows an AND circuit 41 including a plurality of diodes 42a–42n (as required) having their anodes connected to a positive source of bias potential by way of a resistor 43. Input signals are applied to the cathodes of the diodes, and only when all input signals are relatively positive does a positive signal appear at the output. In the preferred embodiment, ground potential and +3 volts are used as the negative and positive signal levels applied to the cathodes and therefore to the output terminal.

FIG. 9 shows an OR invert circuit 51 comprising a transistor 52 having its emitter terminal connected to ground potential and its collector terminal connected to a positive source of potential by way of a resistor 53. Input signals are applied to the base terminal of the transistor 52 by way of positive OR circuit diodes 54a–54n (as required) and coupling diodes 55 and 56. A negative bias potential is applied to the base terminal of the transistor 52 by way of a resistor 57.

When a relatively positive potential is applied to any one of the diodes 54a–54n, this potential will be applied to the base terminal to turn the transistor 52 on. When the transistor 52 is turned on, it applies ground potential to its collector output. When relatively negative signals are applied to all of the diodes 54a–54n, the transistor 52 is turned off; and its positive collector bias potential is applied to the output. In the preferred embodiment, ground potential and +3 volts are selected as the relatively negative and positive input signal levels.

FIG. 9b illustrates the use of the structure of FIG. 9 as a negative AND circuit; i.e., logic "1" is defined as a relatively negative signal level; and, when negative signals are applied to all input diodes, a positive output signal is produced.

FIG. 10 shows an OR exclusive circuit 71 comprising a pair of input transistors 72 and 73 and an output transistor 74. The transistor 72 has its emitter terminal cross-coupled to the base terminal of the transistor 73 by way of a resistor 75, and the emitter terminal of the transistor 73 is cross-coupled to the base terminal of the transistor 72 by way of a resistor 76. The collector terminals of the transistors 72 and 73 are connected to the base of the transistor 74 and to a positive source of potential by way of a resistor 77. The collector terminal of the transistor 74 is connected to a positive source of potential by way of a resistor 78.

The input signal levels applied to the base and emitter terminals of the transistor 72 and 73 are either ground potential or +3 volts in the preferred embodiment. When a +3 volt potential is applied to the base and emitter terminals of the transistors 72 and 73, respectively, and ground potential is applied to the emitter and base terminals of the transistors 72 and 73, respectively, the transistor 72 is turned on and the transistor 73 is held off. The transistor 72 applies ground potential to its collector terminal to turn the transistor 74 off, whereby a positive 3 volts potential is applied to the collector output of the transistor 74.

Alternatively, when ground potential is applied to the base terminal of the transistor 72 and to the emitter terminal of the transistor 73 and a positive potential is applied to the emitter terminal of the transistor 72 and to the base terminal of the transistor 73, the transistor 73 is turned on and the transistor 72 is held off. The transistor 73 applies ground potential to the base terminal of the transistor 74, turning the latter off, whereby a positive output signal appears at the collector terminal of the transistor 74.

When positive signals are applied to the base and emitter terminals of the transistors 72 and 73, both transistors are held off; and the transistor 74 turns on to apply ground potential to its output. Similarly, when ground potential is applied to the base and emitter terminals of the transistors 72 and 73, both transistors are held off; and the transistor 74 is turned on to apply ground potential to its collector output.

It can be seen therefore, that the OR exclusive circuit 71 produces a positive output signal corresponding to a logic "1" only when one of the input signals is relatively positive and the other input signal is relatively negative.

FIG. 11 shows an AND invert circuit 86 which comprises a transistor 87 and an AND circuit 88. The collector terminal of the transistor 87 is connected to a source of positive potential by a resistor 90, and its emitter terminal is connected to ground potential. A resistor 91 connects the base terminal of the transistor 87 to a negative 3-volt potential, and a diode 92 couples the transistor 87 to the AND circuit 88.

The AND circuit 88 is similar to the AND circuit 41 of FIG. 8 and will not be described in detail. Briefly, when relatively positive input signal levels are applied simultaneously to all of the diodes 89a–89n, a positive signal is applied to the base of the transistor 87 to turn the transistor on. When the transistor 87 turns on, it applies ground potential to its collector output.

When ground potential is applied to any one or more of the input diodes, the transistor 87 is turned off to apply a positive 3-volt potential to its collector output.

Attention is directed to the symbolic representations of the AND and AND invert circuits of FIGS. 8a and 11a. In FIG. 11a, the output lead includes an arrow indicating a negative logic "1" output when positive logic "1" input signals are applied, thereby denoting the invert function. On the other hand, FIG. 8a shows a positive logic output when a positive logic "1" input is applied.

FIG. 11b illustrates diagrammatically a negative OR invert circuit which is structurally the same as FIG. 11. The difference lies in the logic symbology. A logic "1" at the input is characterized by a relatively negative (i.e., ground) potential level; and a negative signal at any one input will turn the transistor 87 off to produce a positive output signal at the collector terminal.

FIG. 12 shows an indicator driver 95 comprising a transistor 96 having its emitter connected to ground potential, and its collector connected to a source of positive potential by way of the resistance element of a lamp 97 and to ground potential by way of a resistor 98. Inputs signals are applied to the base of the transistor 96 by way of a resistor 99.

When a relatively negative input signal (e.g., ground potential) is applied to the base of the transistor 96, the latter is turned off and the lamp 97 is energized through the resistor 98 at a relatively low level, preferably such that it appears visually to be turned off. When a relatively positive input signal (e.g., +3 volts) is applied to the base of the transistor 96, the latter is turned on connecting the lamp 97 directly between ground potential and the positive potential source to illuminate the lamp.

BUSES

The central processing unit (CPU) has, among other communicating buses, three principal buses identified as Z bus, A bus and B bus. These three principal buses communicate with central processor registers identified, respectively, as I, J, U, V, T, L, D, R, G, A and B, and with an ALU (Arithmetic Logic Unit) portion of the system, illustrated in FIG. 2, and indicated generally by the block labeled ALU in FIGS. 4f and 4af, and identified by 699. This A bus communicates with the A register, indicated as block 130 in FIG. 4e. This A resigter provides data A entries to the ALU (FIGS. 4f and 4af). The B bus communicates with the B register, indicated as block 131 (FIG. 4ae). This B register provides data B entries to the ALU. The Z bus receives the outputs of the ALU and transmits these output data signals selectively into the registers: I, J, U, V, T, L, D, R, G and S.

The A and B buses are negative buses while the plus Z bus has a duplicate negative bus. On the A and B buses, a binary 1 bit is represented by a negative signal and a binary 0 bit by a positive signal. The negative Z bus is similar to the negative A and B buses while on the positive Z bus a binary 1 is represented by a positive signal.

The output of the ALU section, identified by 699 (FIG. 4f), provides outputs not only to the negative Z bus described, but also to said positive Z bus. This positive Z bus communicates data not only to various data channels, but also to the R register 139 (FIG. 4d).

There is also provided an N bus 105 (FIG. 4ab) connected to an N register 138. One source is the K field of the control word (FIG. 4am) indicated by the block labeled "K DECODE" and identified by number 595, which is indicated in FIG. 4an as feeding to FIGS. 4d and 4ac. Referring to FIG. 4ac, this K field feeds to gate K to N 339a, having a control line 339, labeled MN=K, which gates this K field via an OR invert 105c to the N bus 105, leading to the N register 138 (FIG. 4ab).

A T bus connects the output of the T register 141 (FIG. 4c) to the N register (FIG. 4ab) via gate T TO N 338 (FIG. 4ac) having a control line 338 which, when activated by a signal designated MN=T, causes the T register output to pass through the OR invert 105c to the N bus 105.

In a similar manner, data from a Selector Channel SEL CH (FIG. 4ac) is gated by gate HV TO N 340b under control of a signal HUV SEL CH CP applied to a control line 340 and via an OR invert 105b to the N bus 105. The output of the V register 143 (FIG. 4) passes through the V bus 121 to gate V to N 337b (FIG. 4ab) controlled by an MN=UV signal impressed on line 337, and via OR invert 105a to the N bus 105.

The ouputs from switches E, F, G, H on the Console Control are transmitted via gate 686a (FIG. 4ab) and OR invert circuit 105a to the N bus. This gate 686a has a control line 686 which, when activated by means of the appropriate Console switch signals E, F, G, H, actuates said gate to transmit the outputs from the Console Control switches E, F, G and H, respectively.

In like manner, the output of the J register 135 (FIG. 4b) is passed via a J bus 113 to gate J TO N 336b (FIG. 4ab) and via OR invert 105a to N bus 105, said gate being controlled by a signal MN=IJ.

An M bus 104 (FIG. 4aa) supplies data from the I register 134 (FIG. 4a) and the U register 142 (FIG. 4b), employing I bus 112 annd U bus 120, respectively, under control of the respective gate I TO M 336a (FIG. 4aa) and gate U TO M 397a, the signals designated MN=IJ on line 336 and MN=UV on line 397, respectively, activating these gates.

REGISTERS

Introduction

Figure 1:
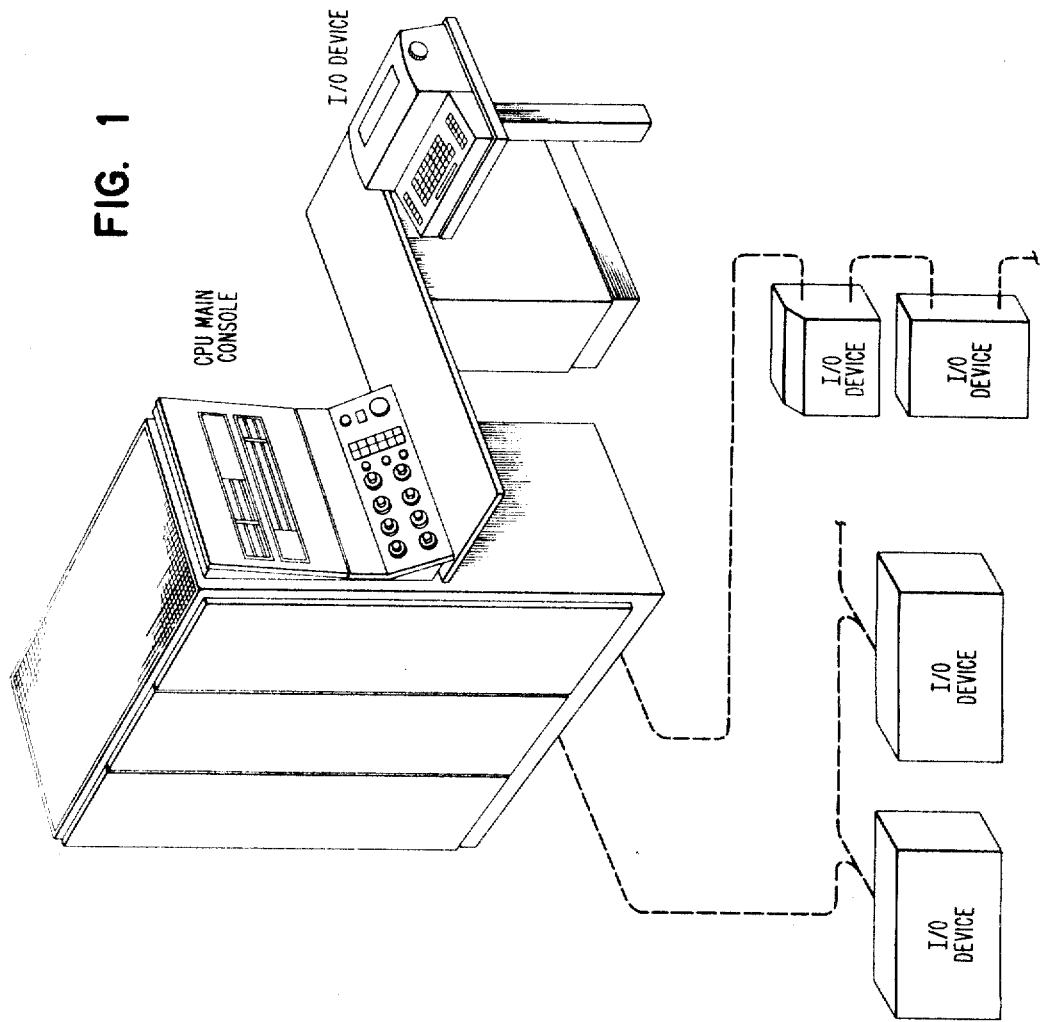
Figure 2A:
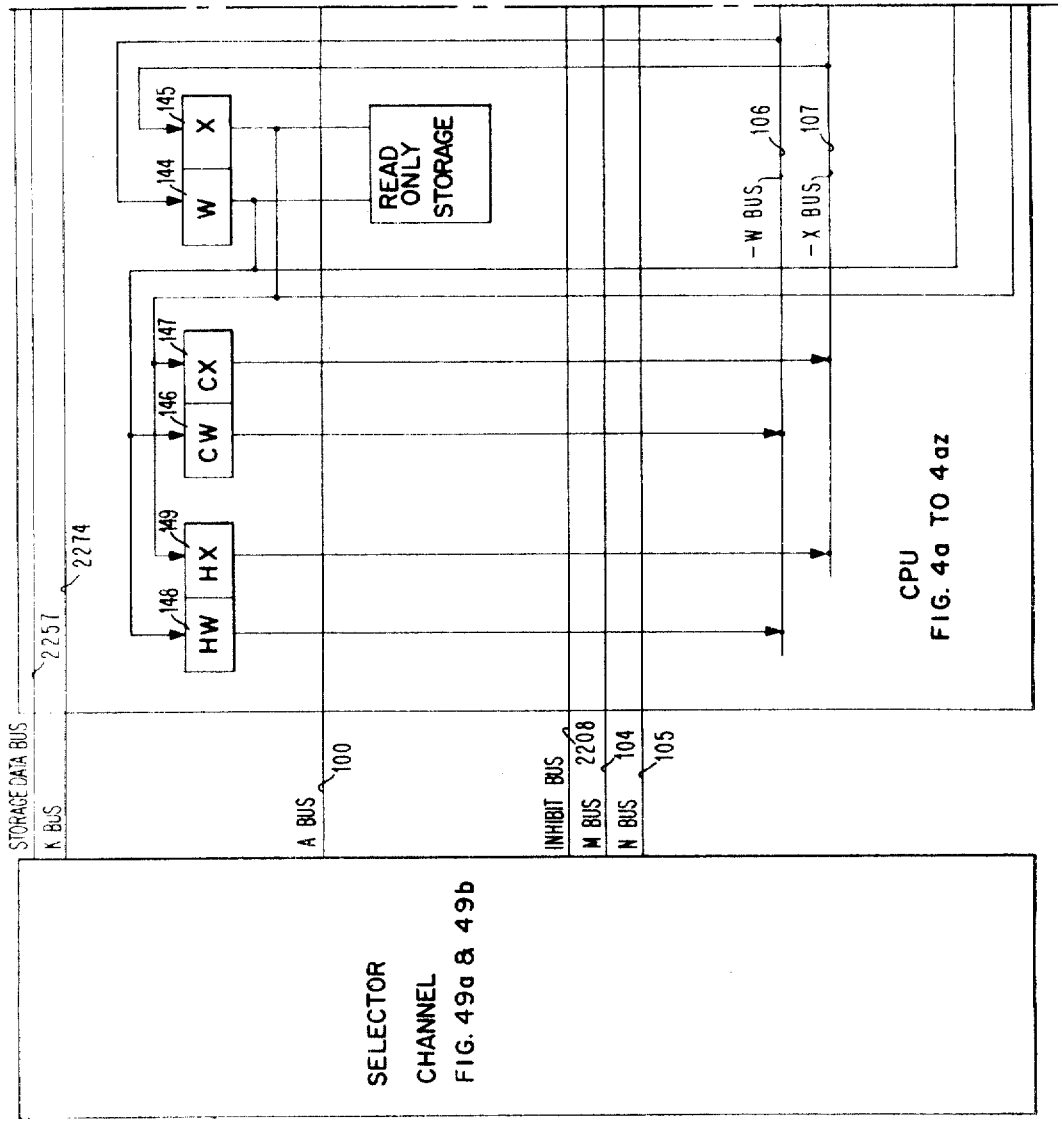
Figure 2B:
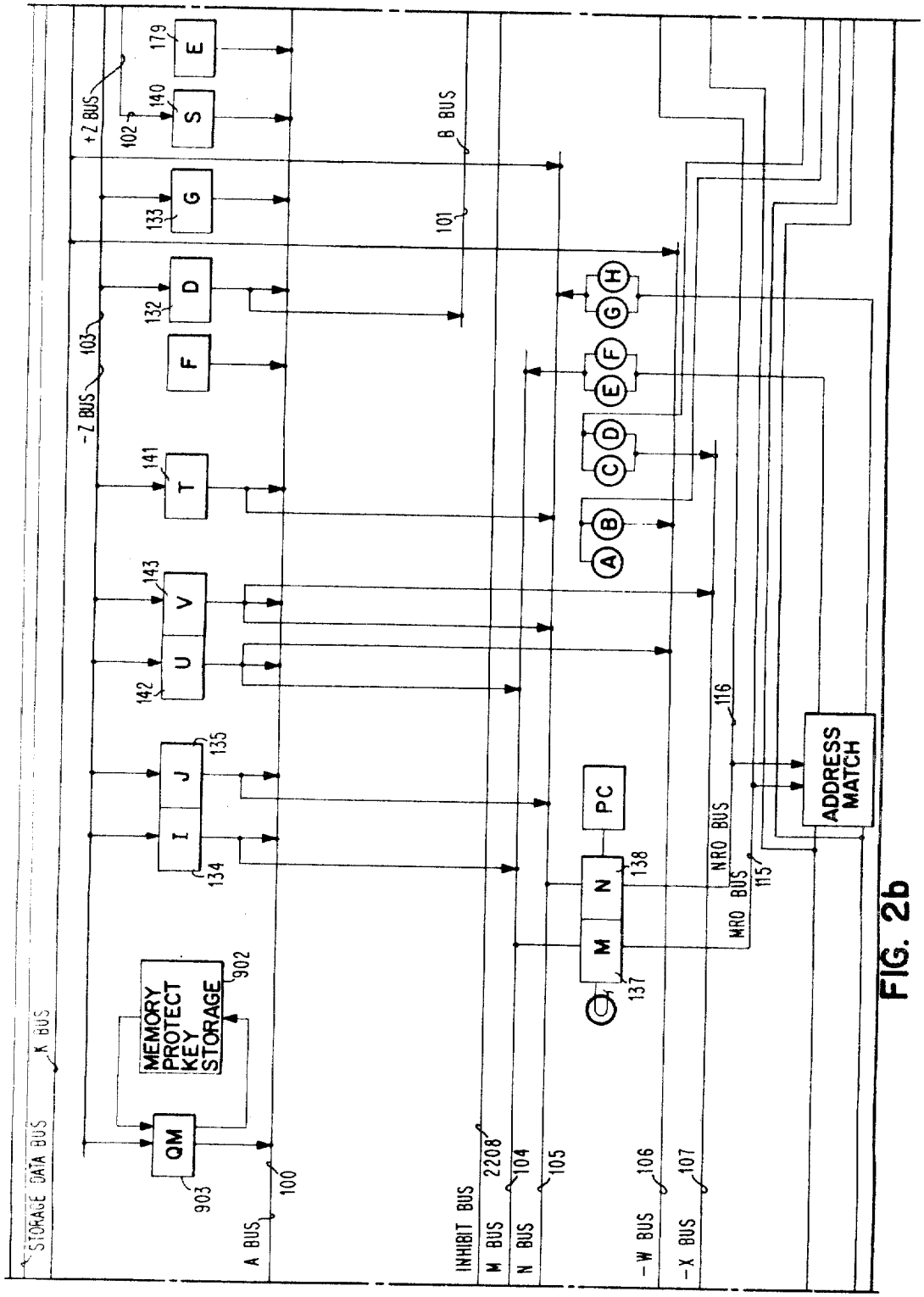

Referring now to FIGS. 2a, 2b and 2c, these illustrate broadly the CPU circuitry illustrated in greater detail in FIGS. 4a–4az, inclusive. This first description will serve as a general introduction to the more detailed description of FIGS. 4a–4az which follows. At the left, in FIG. 4a, is indicated a block, labeled Selector Channel, which provides intercommunication between the CPU and via the I/O control (FIG. 2c) to the I/O units.

A series of buses A, B and Z are provided for communication within the CPU and also for outside communication as developed below. The A and B buses are both "negative"; i.e., a bit presence being indicated by absence of a signal; i.e., down level. There are two Z buses, one positive and one negative. The major source of data for the negative Z bus is the ALU 699 (FIG. 2c). This data can be fed to the I register 134 and the J register 135 (FIG. 2b) which together comprise the Instruction Counter, the I register leading to the M register 137 (FIG. 2a) and the J register feeding the N register 138, these N and M registers comprising the Main Storage Address registers; the U register 142 and the V register 143 (FIG. 2b), respectively, also feed these M and N registers; the T register 141 which comprises a partial address register; an L register 136 (FIG. 2c) which comprises the Length register; a D register (FIG. 2b) which is a temporary data register; and the G register 133 which can serve as a Status register.

The Storage Data bus extending across the top of FIGS. 2a, 2b and 2c is connected to the output of Main Storage 2201 (FIG. 2c).

The A bus (negative) can receive information from all registers, including the E register 179 (FIG. 2b) not heretofore mentioned (except the M, N, W and X registers), the Selector Channel (FIG. 2a) and the Multiplex Channel (FIG. 2c). Information from this bus can be directed only to the A register 130 (FIG. 2c) comprising one of the two inputs to the ALU 699. The B bus (negative) can receive information from the L register 136 (FIG. 2c), D register 132 (FIG. 2b) and the R register 139 which is the memory data register (and also from the K bus). This B bus feeds the B register 131 (FIG. 2c) which comprises the other input to the ALU. All registers, with the sole exception of the S register 140 (FIG. 2b) are identical. Details of the S register 140 (FIG. 2b) are illustrated in FIGS. 4o, 4p and 4r.

The Read-Only Storage A1, merely indicated in FIG. 2a, is also shown in FIG. 4am, and is described in full detail below. Addressing of this Read-Only Storage is provided by the W register 144 and the X register 145 (FIG. 2a), these registers being set, as indicated by means of input buses similarly labeled. An HW register 148 (FIG. 2a), an HX register 149, a CW register 146 and a CX register 147 comprise what is known as "Back Up" registers which store the micro-instruction words from the Read-Only Storage, while the system is performing an Interrupt routine. The CW and CX registers perform this function during a Multiplex Channel operation, and the HW and HX registers are similarly employed for the Selector Channel operations. The W and X registers accept addresses from the U and V registers and also from the HW, HX, CW, and CX registers. The W and X registers can also be set from the Console (see encircled letters A, B, C and D, FIG. 2b).

The Memory data register R 139 (FIG. 2c) is connected to the BUS OUT, which in turn feeds to the Multiplex Channel, indicated by the box in FIG. 2c, and thus through the I/O controls to the I/O equipment.

The registers QM and QT will be described below in connection with their particular functions.

The remaining connections of FIGS. 2a, 2b and 2c are self-explanatory from the captions, from the detailed description of FIGS. 4a–4az, and from the detailed description of various parts thereof which follow, these parts being indicated, merely generally, in FIGS. 2a, 2b and 2c to provide a quick picture of the over-all organization.

REGISTERS

General

In addition to the general-purpose registers forming a part of the CPU bump area 2202 of the main storage 2204, there are 16 basic registers allocated specifically to the processing of data during the course of various arithmetic and logical operations. There are additional registers for Multiplexing and Selector Channel operations; however, these will be described hereinafter.

These 16 basic registers (some of which have been referred to above) are identified as follows: I, J, U, V, T, L, D, R, G, S, A, B, W, X, N and M. Of these registers, the first nine registers are each constituted of 9 EXCLUSIVE OR latches; i.e., FL latches 21, of the type earlier described in detail in connection with FIG. 6. The manner in which these 9 latches 21 are interconnected is shown in the details of the I register 134, seen in the upper portion of FIG. 4a. From left to right, the first FL latch is designated P, and is assigned to the parity bit; following this there are additional latches designated 0 through 7. These eight are employed to accommodate a byte of data 8 bits wide. SET I line 281 is connected to all nine stages of the register. This set line is identified as SET I since, when up; i.e., when a SET I signal is applied thereto, a byte of data can enter this I register from the negative Z bus. The J and U registers, identified 134 and 142, respectively, are shown in FIG. 4b. The J register has a SET J line 282 to which a SET J signal is applied whenever a data byte is to be entered into the J register from the negative Z bus. The U register 142 has a SET U line 284. When a SET U signal is applied thereto, a byte of data is entered into the U register from the negative Z bus.

Figure 4C:
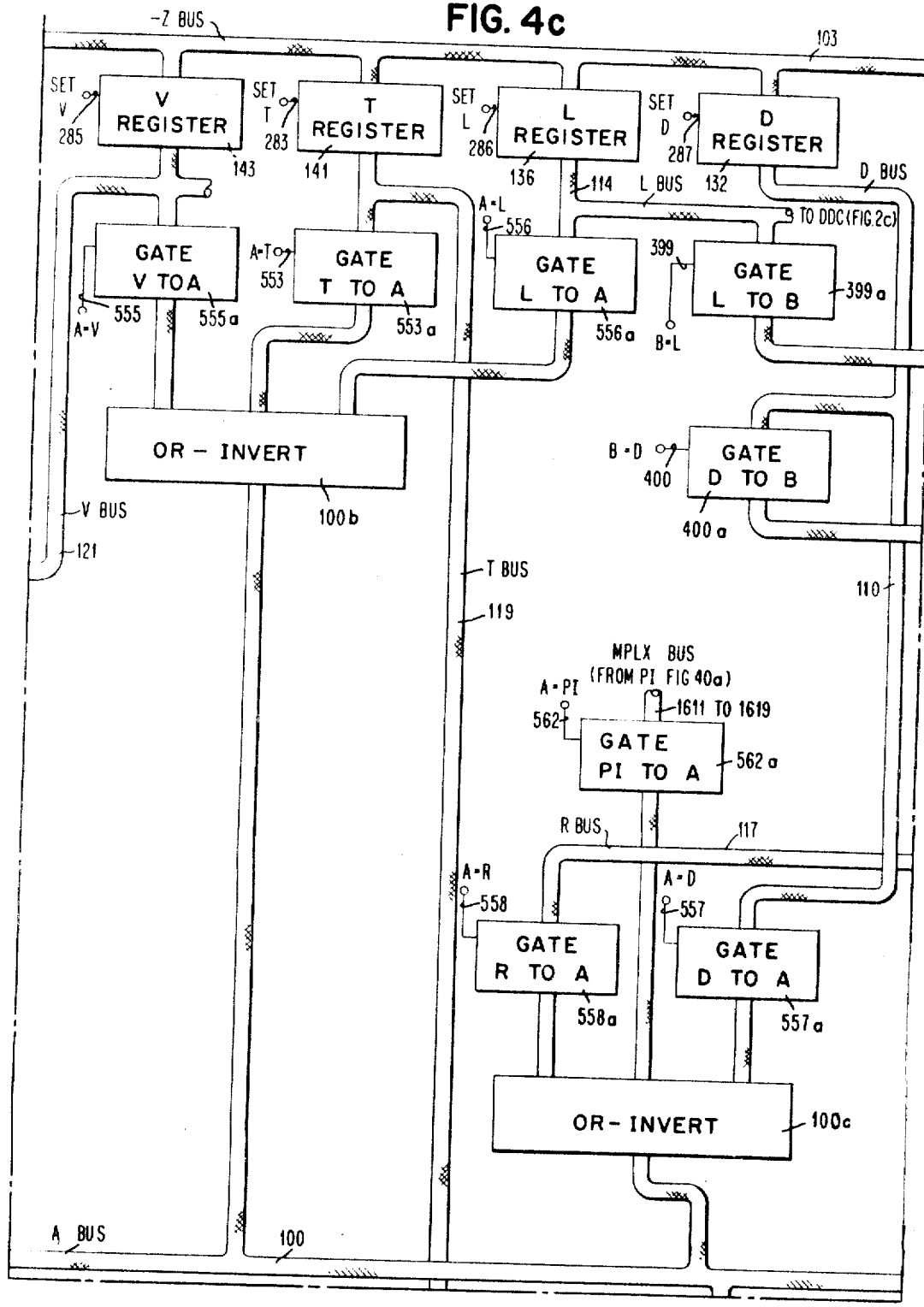
Figure 4D:
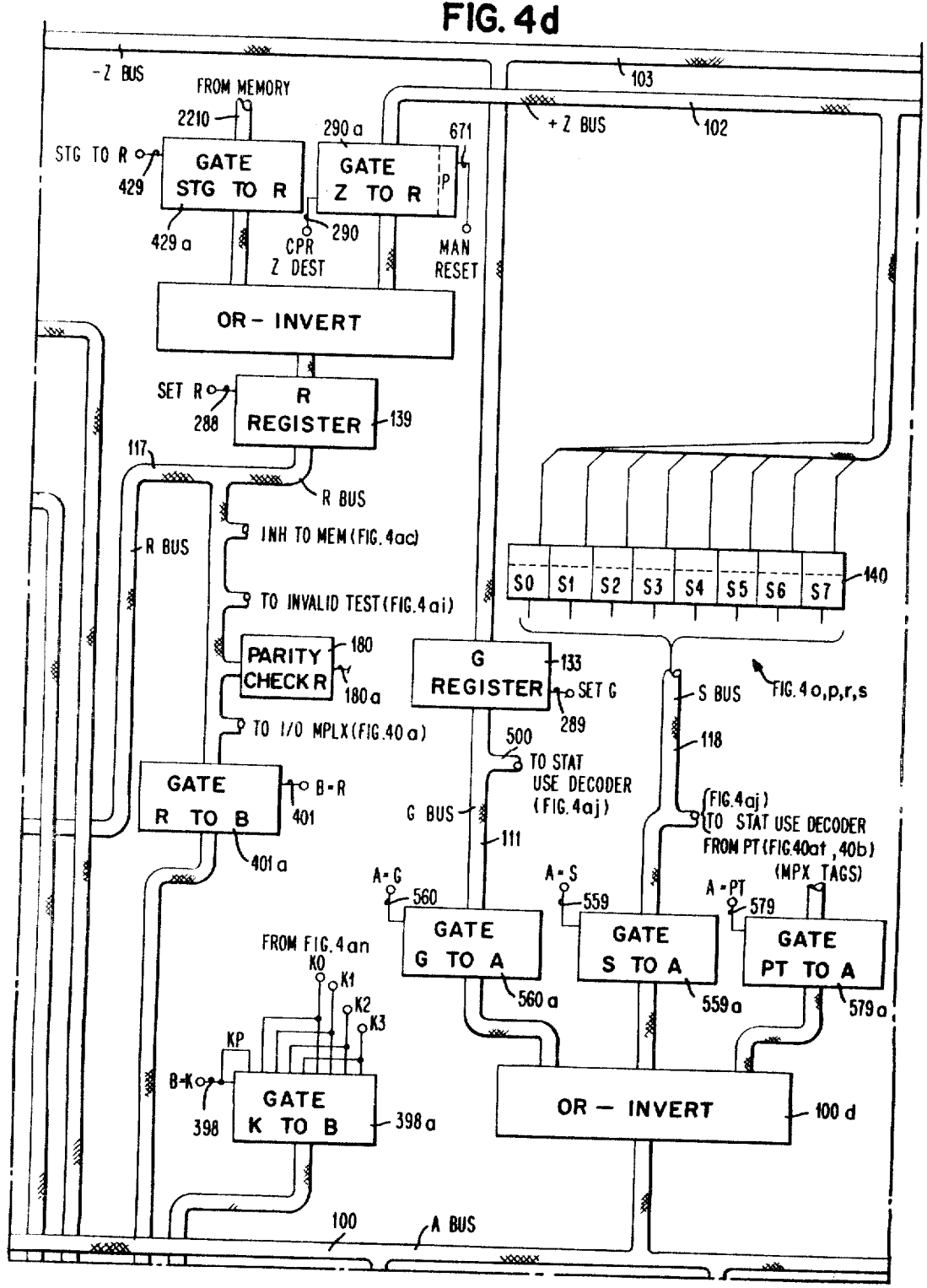
Figure 4G:
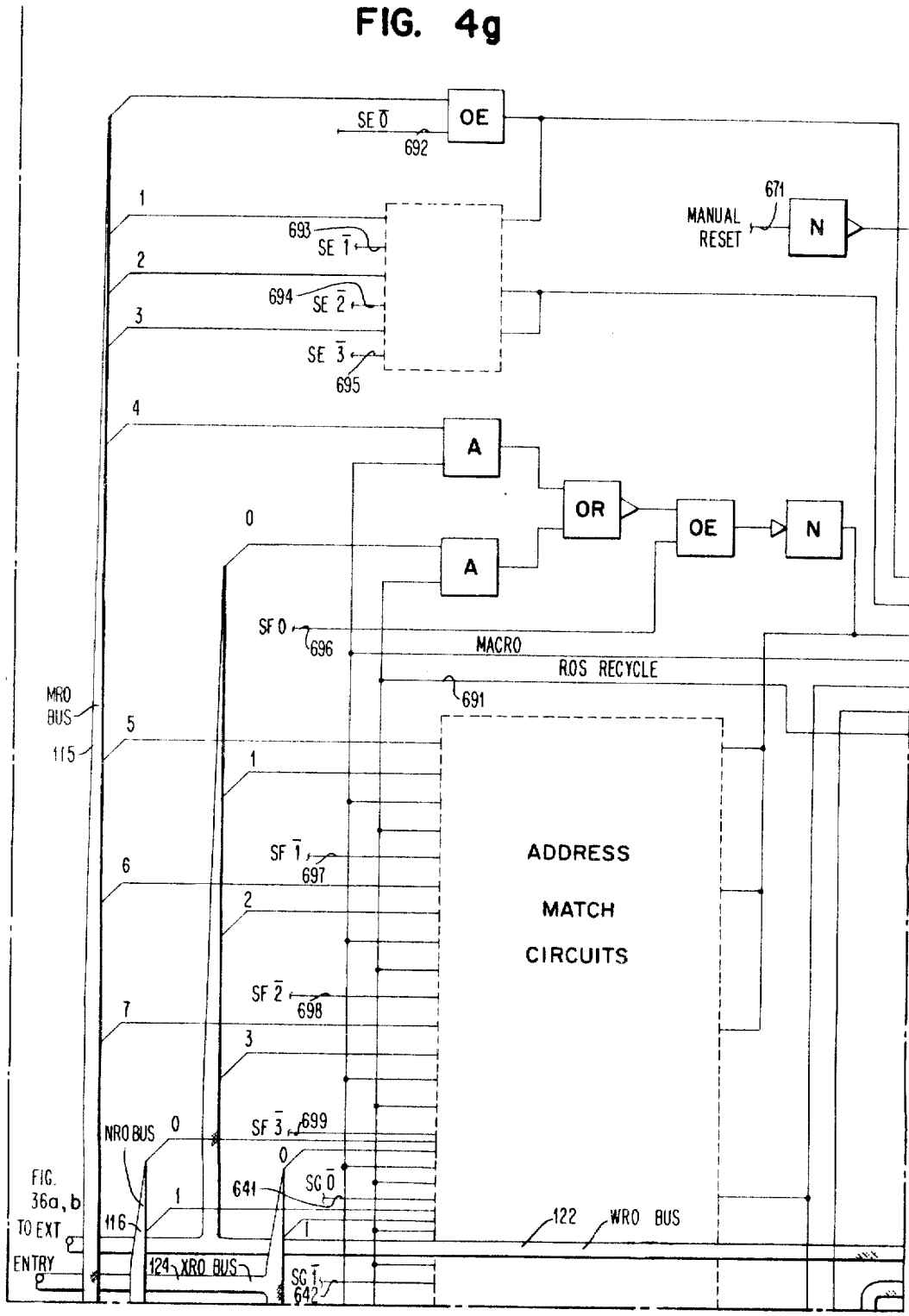

The V, T, L and D registers, shown in FIG. 4c, are identified respectively as 143, 141, 136 and 132. The V register has a SET V line 285 to which is applied a SET V signal that controls entry into the register from the negative Z bus. The T register has a SET T line 283 to which a SET T signal is applied to control entry into the T register from the negative Z bus. The L register 136 has a SET L line 286 to which is applied a SET L signal to control data entry into the L register from the negative Z bus and the D register 132 has a SET D line 287 to which a SET D signal is applied to control data entry into the D register from the negative Z bus.

The R register 139, as seen in FIG. 4d, which comprises the memory register, communicates with the positive Z bus via an OR inverter and gate Z TO R 290 (FIG. 4d), having a control line 290 to which a CPR Z Destination signal is applied to control transmission of data from the positive Z bus to said R register 139. The R register 139 is provided with a SET R line 288 to which a SET R signal is applied to control the entry of data into the R register from the positive Z bus by way of said gate 290a.

The G register 133, seen in FIG. 4d, communicates with the negative Z bus. This register has a SET G line 289 to which is applied a SET G signal that controls entry into the G register from this Z bus.

The A register 130, shown in FIG. 4e, comprising one input to the ALU, and the B register 131, shown in FIG. 4ed, comprising the other input to the ALU, are similar to the I register 134 previously described. The A register has its inputs connected to the A bus and its outputs connected to a straight AND gate 479a and a crossed AND gate 475a. Data bytes are gated from the A bus to and through the A register 130 under control of a set line conditioned by an OR circuit fed by three control lines 159, 671 and 685. For all arithmetic and logic functions, the line 159 will have an "A Time" signal impressed thereon for each active clock cycle of operation. All data passing through the A register is admitted into the ALU section 699 (FIG. 4f) either in a crossed or straight manner, and either the high-order four bits or the low-order four bits may be selectively gated.

The B register 131, shown in FIG. 4ae, is connected to the B bus and has a gate control similar to that described for the A register 130. Data bytes passing through the B register enter the ALU section 699, in either a True form or Complement form. The high-order four bits and the low-order four bits of the byte may be selectively gated in the manner described later under ALU operations.

STORAGE ADDRESS REGISTER (SAR)

M register

The M register 137 (FIG. 4aa) is also similar to the I register. The M register stores the high-order eight bits of the address, the contents of which are gated, through MRO bus 115, to the address decoder 2207 of the main storage 2201 (FIG. 4ac). The address contents of the M register may be derived from the I register, under control of the MN=IJ signal, or from U register under control of the MN=UV signal. The output of the M register is further communicated to the address match circuits, seen in FIGS. 4g and 4ag, by way of the MRO bus 115. Further, the M register outputs are also directed to a Parity Check circuit 181a (FIG. 4aa), a Timer Address Generator 115c and also to Indicator Drivers 115f which control the display of the address contents at the Control Console.

N register

The N register 138, seen in FIG. 4ab, communicates with an N bus 105 through which address data enters the N register in response to an application of a SET MN signal to the set line 351 of the N register. The output of the N register is transmitted through NRO bus 116 connected to the address decoder 2207. The N register receives address data from the J register, the V register, and the T register, which registers are respectively gated by the following signals: MN=IJ, MN=UV and MN=T. The N register, along with the M register, constitute the Storage Address Register called SAR and accommodate a 16 bit address.

READ-ONLY STORAGE ADDRESS REGISTER (ROSAR)

W register

Figure 4H:
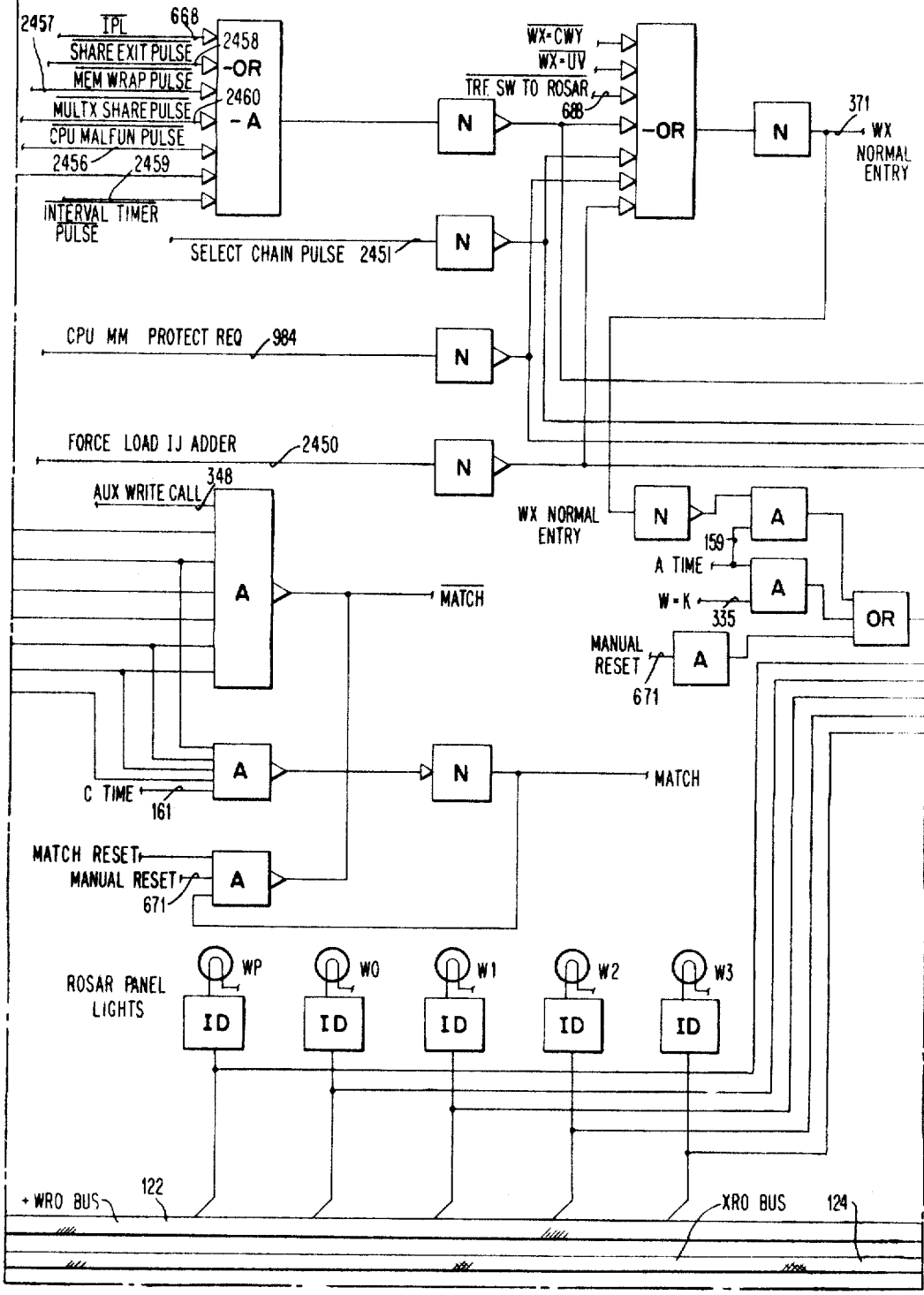
Figure 4I:
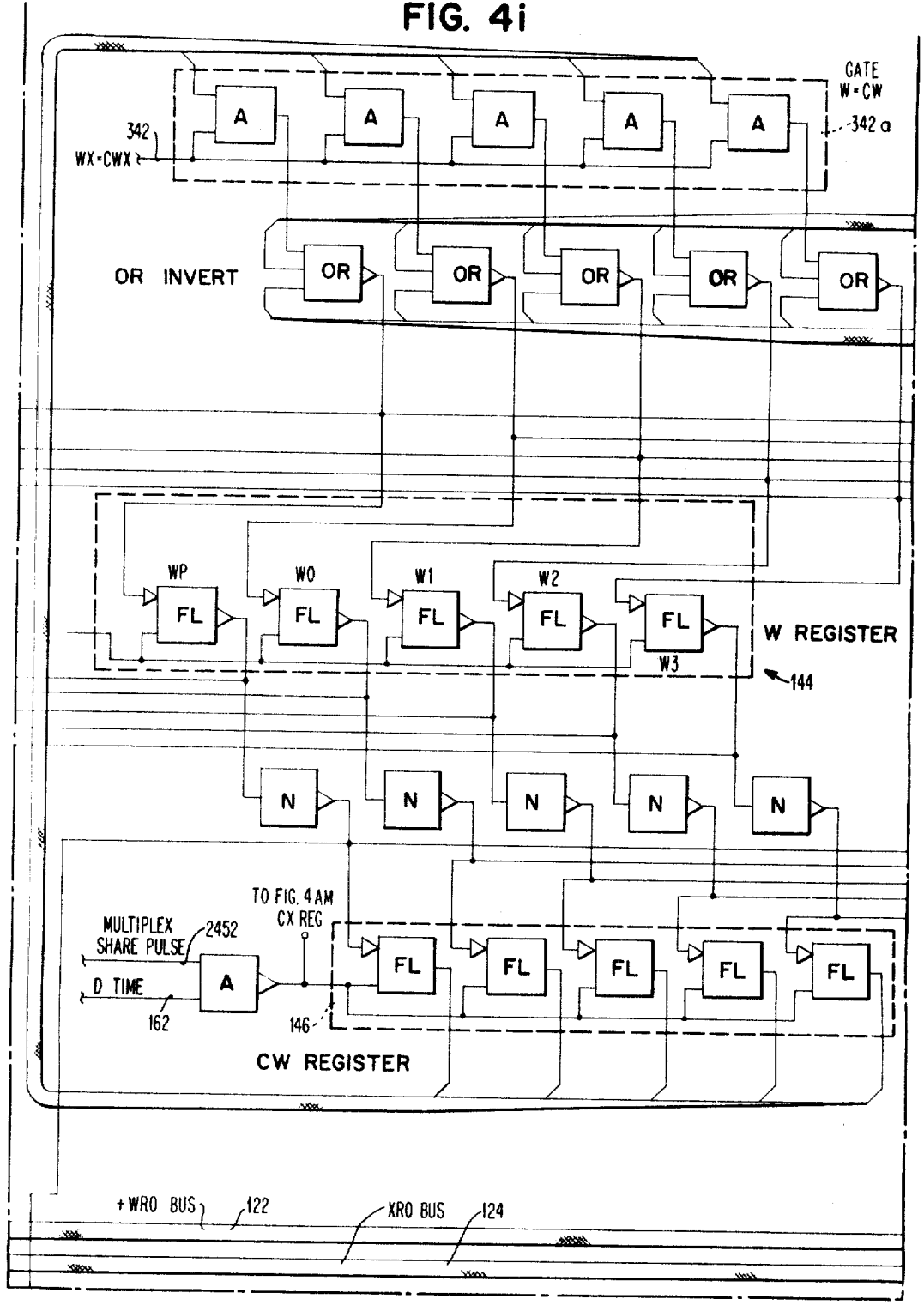

The W register 144, FIG. 4i, is similar to the I register described above, except that its capacity is limited to 5 positions, WP, W0, W1, W2 and W3, with the WP position accommodating the Parity bit and positions W0 through W3, the four high-order bits of the Read-Only Storage Address. A control line 144a, connected to the W register, enables entry into the latter when any one of the following signals are applied thereon: WX NORMAL ENTRY (FIG. 4h); W=K, line 335; and MANUAL RESET, line 671. These signals are applied to said control line 144a by way of a circuit shown in FIG. 4h. In accordance with the control exercised by the signal designated W=K, K constants are entered into the W register from a "K BUS," as indicated in FIG. 4j, through a GATE W NORMAL, through five OR circuits (FIG. 4i) and the 5-line W bus 106 (see FIG. 4h). The GATE W NORMAL is activated in response to a GATE W NORMAL signal applied to its control line. The address contents of the U register 142, FIG. 4b, are gated to the W register through a gate W=U 343a, FIG. 4j, which gate is activated by the WX=UV signal, the output from the gate W=U passing via an OR invert block leading to the 5-line W bus 106.

The contents of an HW register 148 (FIG. 4am) is entered into the W register under control of a GATE W=HW, FIG. 4j, activated by the signal W=HW, under control of a GATE=CW 342a, FIG. 4i, which is activated by line 342 labeled WX=CWX, the contents of the CW register (FIG. 4i) are entered into the W register.

The settings of Console switches SBP, SB0, through SB3, seen in FIG. 4j, may also be gated through the gate GATE SWITCH NORMAL, activated by a signal SW. NORMAL ENTRY to the W register, as noted above for GATE W NORMAL.

The outputs of the W register are fed directly to a minus WRO bus 123 connected to the Read-Only Storage Unit A1 (FIG. 4am), wherein appropriate indicating means, to be later described, are employed to switch the outputs, at time intervals dictated by the Read-Only Storage. The output of the W register 144 (FIG. 4i) is also applied to a positive WRO bus 122 (FIG. 4h) and to the ROSAR panel lights on the Control Panel, and also via said WRO bus 122 to address match circuits, FIGS. 4g and 4ag. The output of the W register is also transmitted to the above-mentioned control register CW146, FIG. 4i, used for multiplexing operations.

X register

Figure 4K:
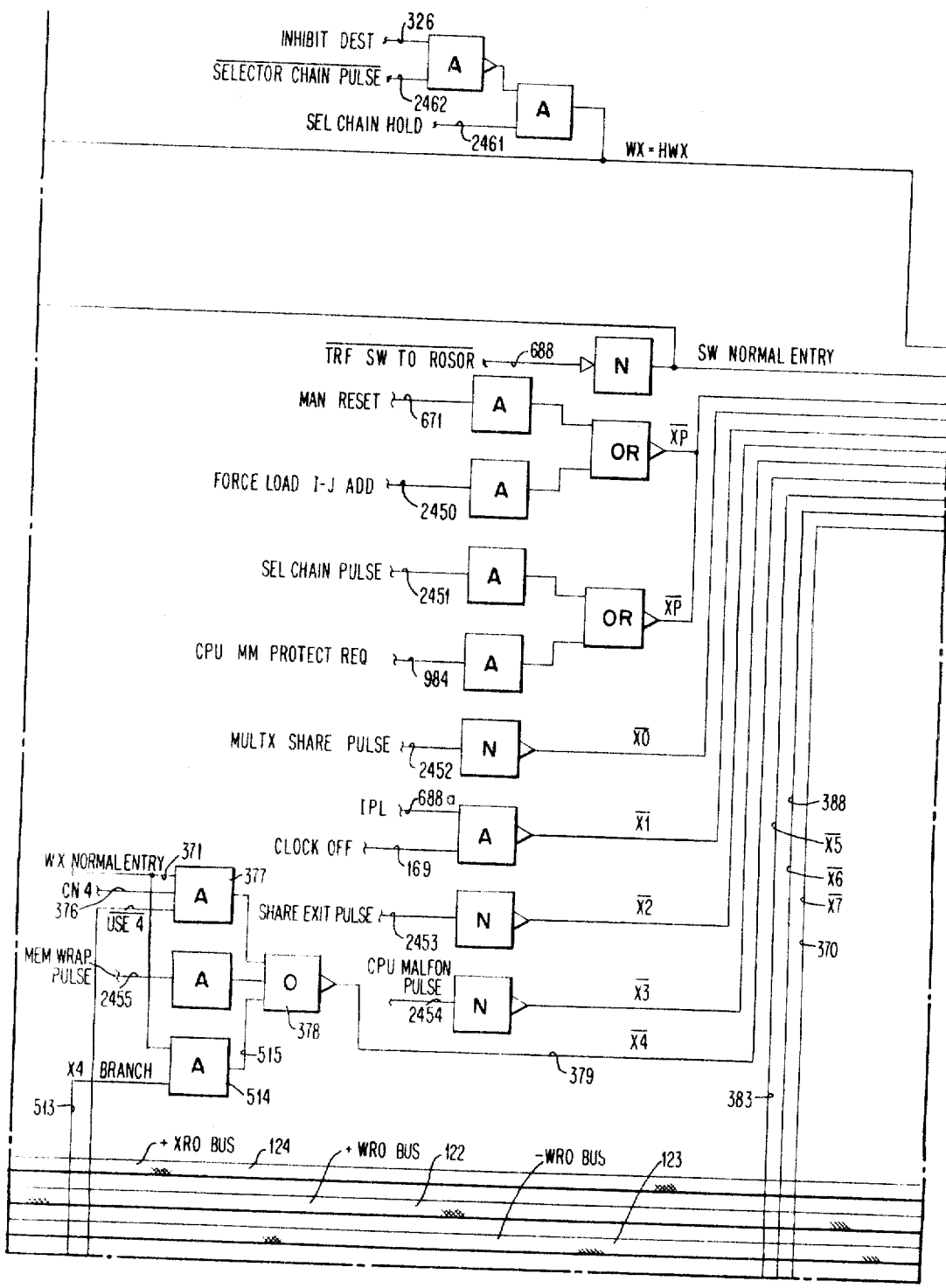
Figure 4M:
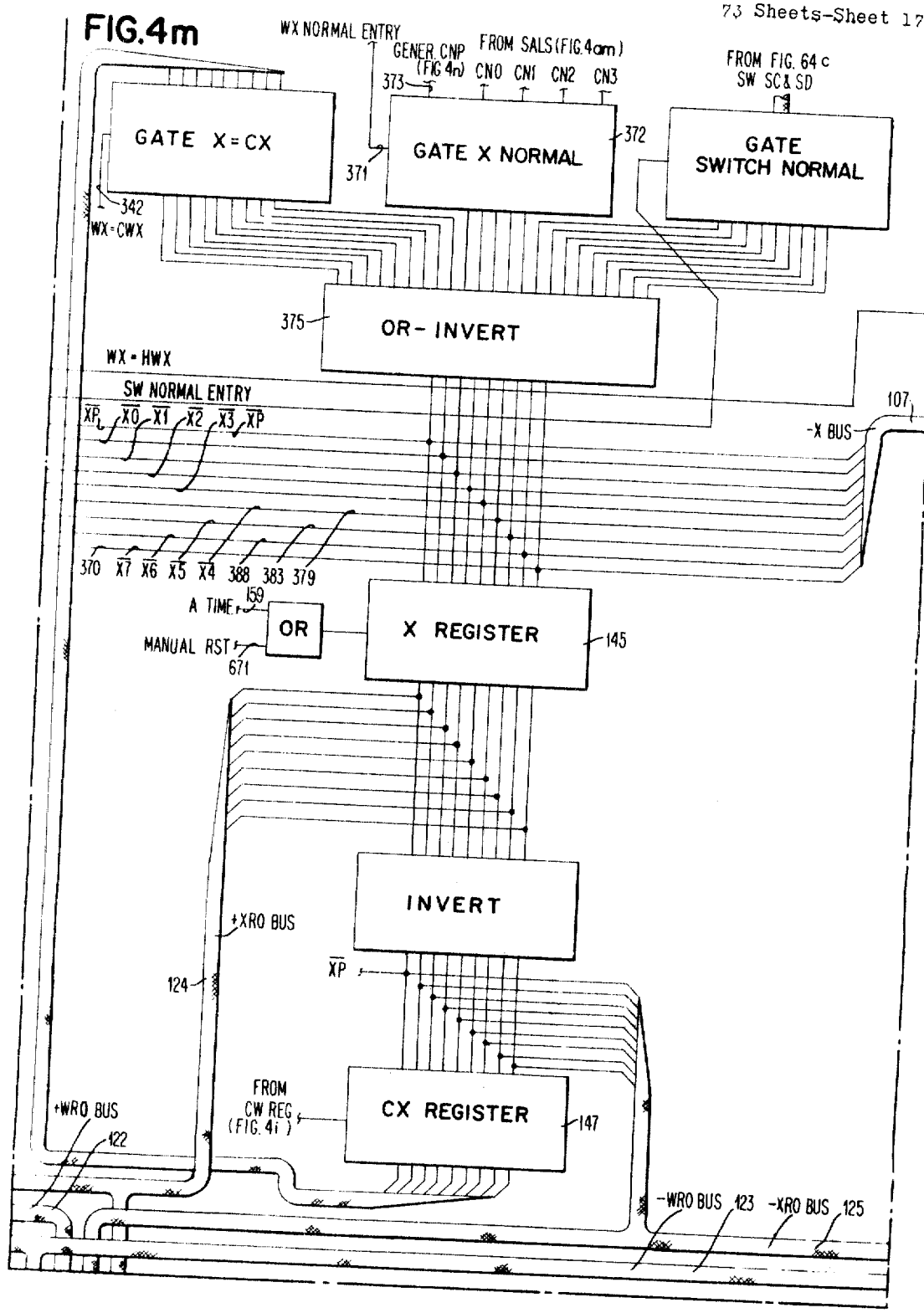
Figure 4O:
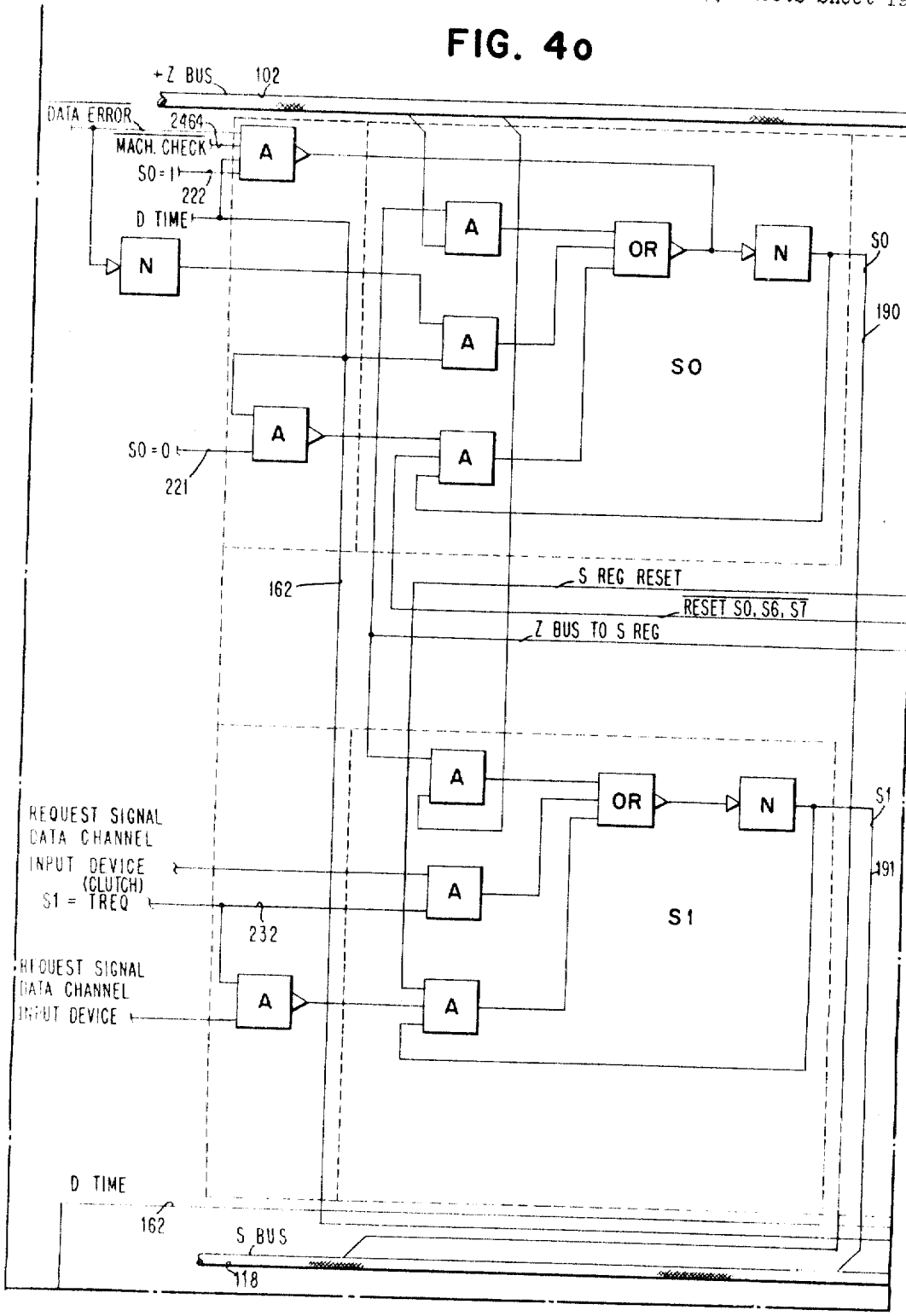
Figure 4P:
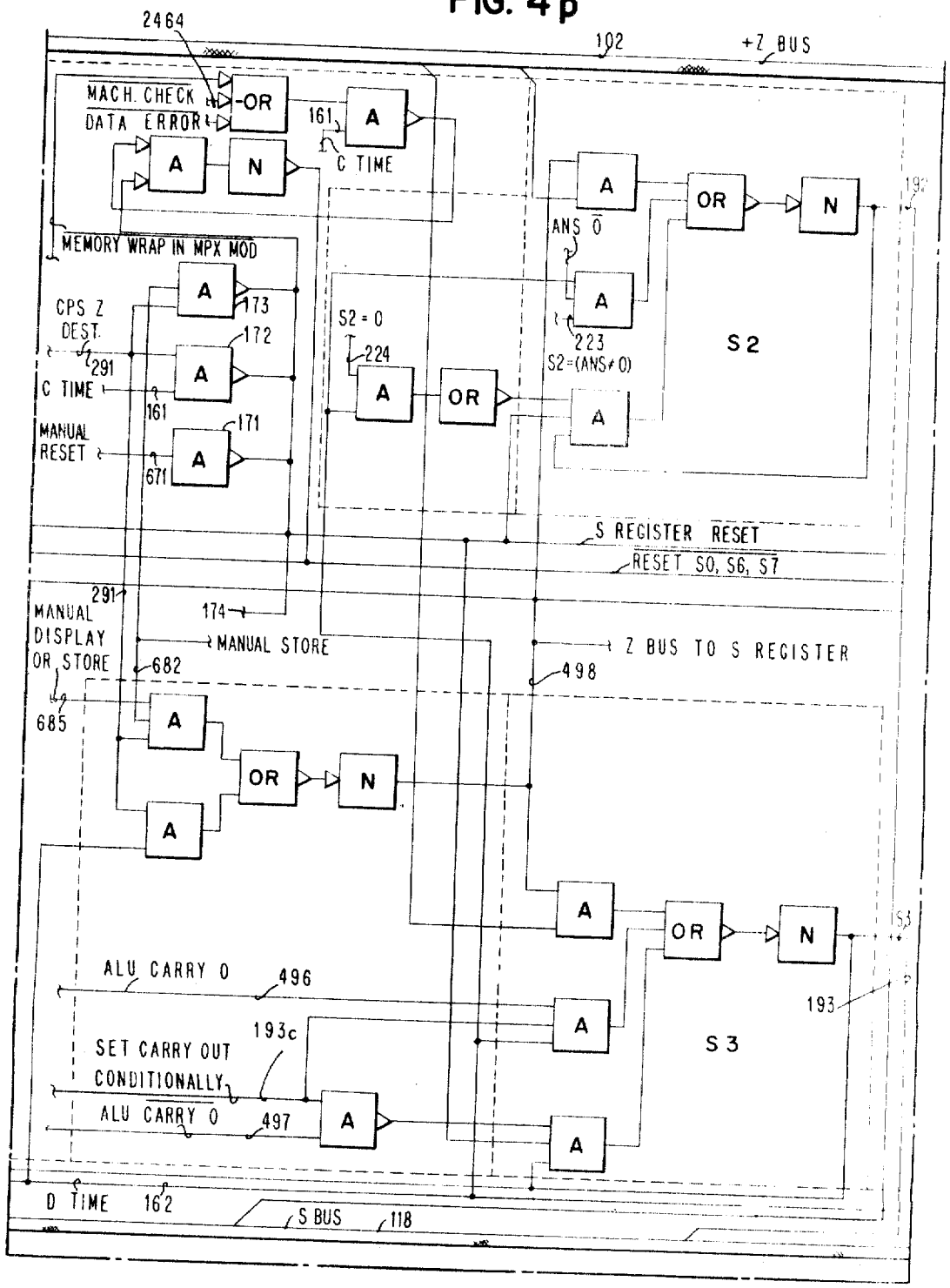
Figure 4R:
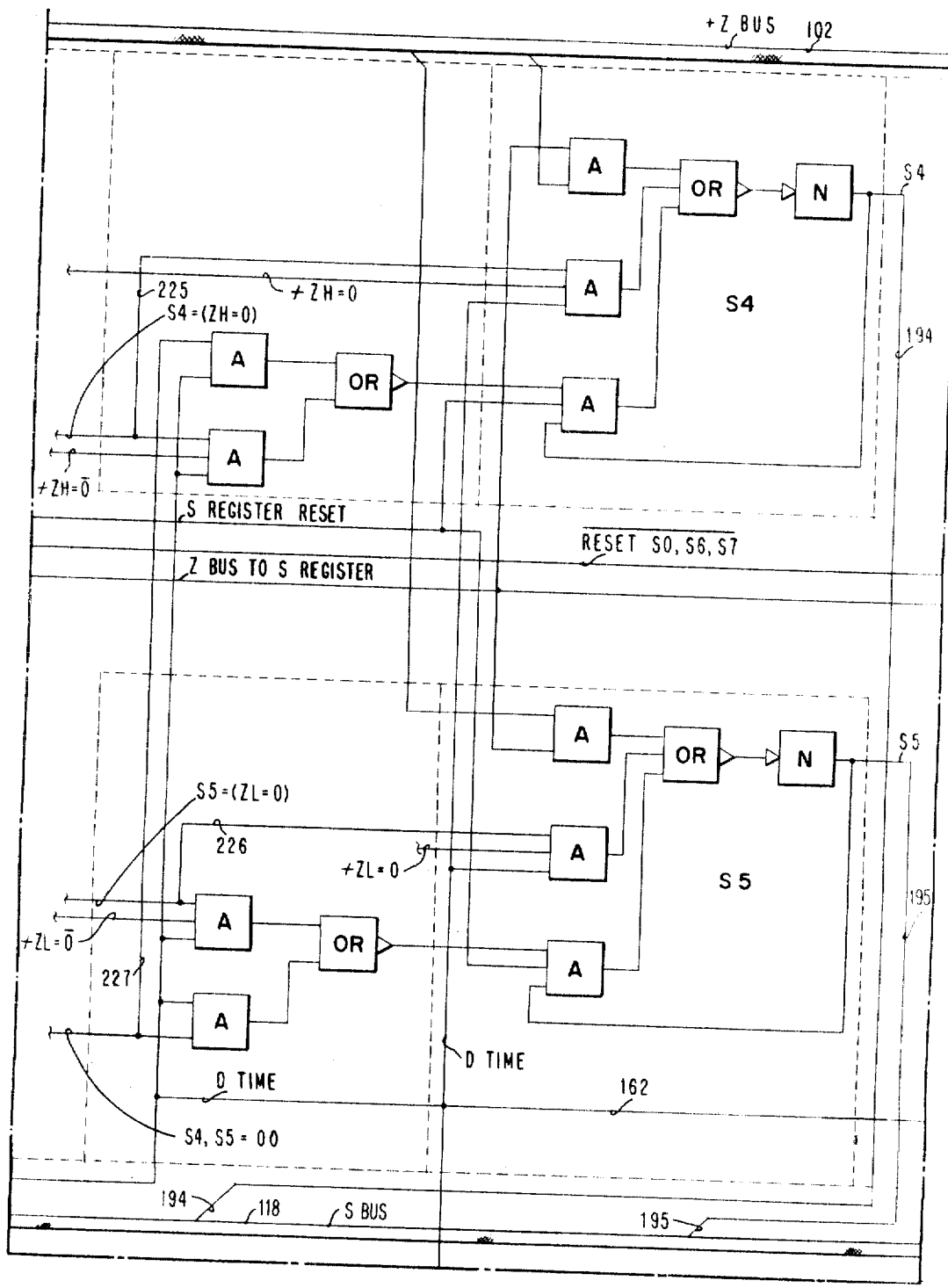

The X register 145, FIG. 4m, is also similar to the I register. The X register has a set line, activated on every machine cycle by an A Time signal impressed on line 159 connected to the register set line, via an OR circuit (FIG. 4m). A MANUAL RESET line 671 enables the X register to be set, by manual intervention at the Control Console. The output of the X register is passed via an Invert to the negative XRO bus and thereby to the Read-Only Storage Unit A1, FIG. 4am, and to an HX register 149, FIG. 4an. The output of this X register is also passed directly to an XRO (positive) bus 124, which leads to said address match circuits, FIGS. 4g and 4 ag. The X register, along with the W register, constitute the address register for the Read-Only Storage and are generally identified as ROSAR; i.e., Read-Only Storage Address Register, which, by means of a 12-bit address, designates, for readout from the Read-Only Storage, one of 4000 control words (micro-program words) in the Read-Only Storage.

STATUS REGISTER

S register

The S register 140 is a machine "Status" register shown as distributed throughout FIGS. 4o, 4p, 4r and 4s. Each of its seven positions, 0 through 7, comprises a latch which is a logic configuration of three AND circuits, an OR invert circuit and an Invert circuit having a latchback circuit path connected to one of the three AND circuits. These logic circuits were described in detail above in connection with FIGS. 8a, 7b and 7a, respectively. Each position of the S register has an individual set control, for turning the latch on or off depending upon the character of the applied signals. When the latch is turned on, it indicates a "one" state. Conversely, when the latch is set off, it indicates a "zero" state. All positions of the "Staus" register are connected to the Z bus and all its positions may be turned, on or off, in accordance with particular bit configurations appearing on said bus. All positions of the "Status" register are connected to the Z bus and all its positions may be turned, on or off, in accordance with particular bit configurations appearing on said bus. All positions of the "Staus" register may also be turned, off or on, by way of the Z bus under the control of a Console manual reset switch. Each position of the "Status" register may be selectively interrogated or changed in accordance with a masking procedure wherein desired bit configurations may be selectively applied to the Z bus. The interogattion is accomplished by gating the contents of the S register, to the A bus, and, at the same time, applying "masked" data to the B bus, and thereafter testing the ALU outputs, applied to the Z bus, by means of the circuit configuration shown in FIG. 4e.

"Status" register position S0 may be turned on by applying to control signal line 222 a signal designated S0=1. The same position S0 is turned off upon application, to signal line 221, of a signal designated S0=0. Position S0 may be interrogated by the CH decoder, FIG. 4aj (labeled STAT USE DECODERS) for the purpose of ascertaining the branching condition for the next control word address. This is accomplished by decoding the output of position S0 on line 190 (FIG. 4aj) connected to the CH decoder. In addition, position S0 serves the function of storing a True or Complement condition. Interrogation of a True/Complement condition is accomplished by passing the condition through output line 190 (FIG. 4aw) into the CU decoder.

Position S1 is turned on by applying to control line 232 (FIG. 4o) a pair of signals designated S1=TREQ and CLUTCH=1, respectively. The same position S1 may be turned off, by way of the same control line 232, by the application of signals designated S1=TREQ and CLUTCH=0. Interrogation of position S1 is accomplished by placing the "status" of S1 on line 191, directed to the CH decoder, FIG. 4aj.

Position S2 is turned on by AND'ing signals designated S2=(ANS≠0), which is applied to control line 223 (FIG. 4p) with signal designated ANS NOT 0; i.e., ANS $\bar{0}$, initiated in FIG. 4e. The ANS $\bar{0}$ signal, along with other signals that relate to the condition of the Z bus, are developed by the circuit configuration connected to the Z bus (FIG. 4e). This circuit, in addition to said ANS $\bar{0}$ signal, also supplies the following signals: (FIG. 4e) ZL $\bar{0}$, ZL=0, ZH $\bar{0}$, ZH=0 and ZCH=0. Position S2 is turned off, by applying to control line 224, FIG. 4p, a signal designated S2=0. Position S2 is interrogated by directing its output, on line 192 (FIG. 4aj), to the CH decoder.

Position S3 is turned, either on or off, depending upon the "carry-out" condition of the ALU. This "carry-out" condition, in conjunction with the CC decoder, FIG. 4w, in which any one of code combinations, 4, 5 and 6, in conjunction with the ALU carry signal, appearing on line 496, turns on position S3. On the other hand, in the absence of such an ALU carry, on line 497, the position S3 will be turned off. Position S3 is interrogated by directing its output, appearing on line 193, to the CL decoder. This S3 output line 193, also is directed to the CC decoder, FIG. 4w, for carry controls.

Position S4 is either turned on or off depending upon the character of the signal on line 225 (FIG. 4r), the character of the signal being determined by the CS decoder (FIG. 4as) and the conditions of the four high-order bit lines of the Z bus. When these four lines are zero, S4 will be turned on. Conversely, when these four bit lines are not zero, position S4 will be turned off. Interrogation is under control of the CH decoder to which S4 output line 194 is connected.

Position S5 (FIG. 4r) is turned on or off in the manner described for position S4 except that the controlling conditions for S5 are concerned with the four low-order bit positions (ZL) of the Z bus. Position S5 is interrogated by means of the CL decoder (FIG. 4ak) to which is connected the S5 output line 195.

Position S6 (FIG. 4s) is turned on, under control of line 229 connected to decoder CS (FIG. 4as) code configuration 1010. Position S6 is turned off, under control of line 228, connected to the CS decoder, when the latter has code combination 1001. Position S6 is interrogated, by the CH decoder (FIG. 4aj), to which the S6 output line 196 is connected.

Position S7 (FIG. 4s) is turned on under control of CS decoder (FIG. 4as), bit configuration 1100. Position S7 is turned off under control of the CS decoder bit combination 1011, appearing on control line 230 (FIG. 4s), Position S7 is interrogated by decoder CL (FIG. 4ah) which is connected to the S7 output line 197.

During operation when a malfunction is encountered in the system, positions S6, S7 and S0 will be turned on by conditions respectively designated: MEM, WRAP IN MPX MODE, MACH. CHECK and DATA ERROR.

ERROR REGISTER

E register

An error register, labeled "E REG" 179 (FIG. 4ad) is similar to the I register and has a capacity for storing 8 error condition bits. This register communicates with the A bus 100, via an OR invert 100e and a "GATE E TO A" 580a (FIG. 4ad) having a control line 580 activated by a signal designated A=E, for transmitting the error conditions fo all 8 positions; namely, position 0 through position 7, of the E register 179 to the A bus. The functions of each of these 8 positions will now be described.

Position 0 stores the Parity condition of the R register, as determined by a PARITY CHECK R circuit 180 (FIG. 4d) connected by way of a line 180a (FIGS. 4d and 4ad) to position 0 of the E register.

Poistion 1 stores the Parity condition of the M register 137, as determined by Parity check N circuit 181 (FIG. 4ab) which is connected by way of line 181d (FIGS. 4ab and 4ad) to position 1 of the E register.

Position 2 stores the Parity condition of the A register 130 (FIG. 4e) as determined by a Parity check A 182 (FIG. 4e) connected by way of line 182a (FIGS. 4e and 4ad) to position 2 of the E register.

Position 3 stores the Parity condition of the B register 131 (FIG. 4ae) as determined by Parity check B circuit 183 (FIG. 4ae) connected by way of line 183a (FIGS. 4ae and 4ad) to position 3 of the E register.

Position 4 stores validity error conditions of the ALU section 699 (FIGS. 4f and 4af) as determined by the ALU check circuit 900, connected by way of line 863 (FIGS. 4f and 4ad) to position 4 of the E register.

Position 5 stores the Parity condition of any one of the following control registers: CC register 150, FIG. 4w; CD register 151, FIG. 4ao; CF register 152 and CG register 153, FIG. 4x; CM register 154, FIG. 4ax, CS register 155, FIG. 4as; and CV register 156, FIG. 4aw. Each of the above registers communicates its Parity condition to a Control Register Parity Check (CRPC) circuit 184, FIG. 4ah. The Parity condition output of this circuit is transmitted by way of line 184a (FIGS. 4ah and 4ad) to position 5 of the E register.

Position 6 stores the Parity condition of the Shaping Amplifier Latches (SAL's) as determined by a SAL Parity check circuit 185, FIG. 4ai, which has its Parity output line 185a (FIGS. 4ai and 4ad) connected to position 6 of the E register.

Position 7 stores the error condition of the ROSAR, as determined by the ROSAR address check circuit 186, FIG. 4ai, which has its error output line 186a, FIGS. 4ai and 4ad, connected to position 7 of the E register.

*Use of the CPU registers*

Although these registers are used for different purposes during the various arithmetic and logical operations, they also have specific functions. The I and J registers, for instance, serve as the Instruction counter, with the I register accommodating the high-order eight bits of an address and the J register the low-order eight bits of the desired address in memory. The outputs from the Instruction counter can be selectively directed to either the A bus or the SAR (Storage Address Register) constituted of the M and N registers.

The U and V registers, together, serve as an address register, the U register accommodating the high-order eight bits of the address and the V register, the low-order eight bits of the address. Information is entered therein, from the Z bus, and is communicated to: the A bus, the ROSAR; i.e., Read-Only Storage Address Register, and also to the MN registers which registers together constitute the Storage Address Register (SAR) of the Main Storage 2201 (FIG. 4ac).

The T register serves as a partial address register. Entry therein is from the Z bus and exit is to: the A bus, or to the N register 138 (FIG. 4ab) which forms a part of the SAR.

L (FIG. 4c) is the length register, entry therein being from the Z bus, and exit therefrom to the A bus, the B bus and also to a Direct-Data Channel (see FIG. 4c).

D (FIG. 4c) is a temporary storage register. Entry therein is from the Z bus and exit therefrom is to either the A bus or the B bus.

R (FIG. 4d) is the memory (Main Storage) data register and is primarily used as a buffer to store data read from the memory and data entering memory. Entry therein is from the plus Z bus or from the memory, and exit therefrom is to memory, the A bus or to I/O Multiplex Channel. The status of the R register can be displayed at the operating console, and it also is checked for parity.

Register G (FIG. 4d) is a general-purpose status register. Entry therein is from the negative Z bus; exit therefrom is to the A bus. Its outputs are interrogated by the STAT. USE DECODERS (FIG. 4aj) to control microprogram branching operations.

The S register (FIGS. 4o, 4p, 4r and 4s) is a special-purpose status register. It is 8-bits wide, with no parity. It has an input from the Z bus from which all eight bits are entered concurrently. At other times, each of the eight positions of the register, 0 through 7, can be individually set or reset to store various machine conditions that arise during the course of a processing operation, arithmetic or logical. This S register has an output to the A bus and is interrogated for branching operations by the STAT. USE DECODERS, FIGS. 4aj and 4ak.

The A and B registers (FIGS. 4c and 4ac) are temporary ALU buffer registers (FIG. 4f) which are fed by the A and B buses, respectively.

The W and X registers (FIGS. 4i and 4m) are designated ROSAR; i.e., Read-Only Storage Address Register, and are used for specifying, by means of a 12-bit address, a particular one of 4000 control words (micro-instructions) in the Read-Only Storage.

The E register stores all Parity conditions and validity checks that arise in the system during the course of an operation.

CONSOLE DESCRIPTION

The Control Console, whose layout is illustrated in FIG. 13, and whose circuit diagram is shown in FIG. 64, of the afore-mentioned application contains various controls comprising rotary switches and pushbuttons to permit Operator communication with the system.

These controls will regulate entry of data into registers or Main Storage, will permit Display of data, will control the system processing mode, establish initial program-loading procedures and facilitate maintenance of the system. The purpose and functioning of some controls are obvious and will not be discussed. A description of the remaining controls follows.

Eight rotary switches A, B, C, D, E, F, G and H are indicated in FIG. 13 and are provided for the manual entry of data, or addresses. Each of these is a 16-position switch and supplies signals for four data bits (bits 0, 1, 2, 3) and a parity bit. Two switches, in combination provide eight bits or a normal data byte, with the byte parity bit being generated by combining the switch parity bits in an EXCLUSIVE OR circuit.

The outputs of four data entry switches; namely, A, B, C and D, are available at the Z bus external entry circuit, FIG. 36, and thus, via the Z buses 102 and 103, FIG. 4f, data from these Console switches can be directed, to any register. Further, the output of switch B can be directed to the W register 144, in FIG. 4i, via the gate SWITCH NORMAL, FIG. 4j, and the outputs of switches C and D can be directed to the X register 145, FIG. 4m, via the gate SWITCH NORMAL, FIG. 4m.

The outputs of switches E and F, lines 692–699, are available at the address match circuit, FIG. 4g, and can be compared with the contents of the M register 137, FIG. 4aa, via the MRO bus 115, and with the W register 144, FIG. 4i, via the WRO bus 122. The contents of switches E and F can also be gated to the M register 137, FIG. 4aa, via AND invert circuit 104c, FIG. 4aa, for manual display or manual store operations.

In the same manner, the settings of switches G and H can be compared by the address match circuit, FIG. 4ag, with either the N register 138, FIG. 4ab, via the NRO bus 116, or with the X register 145, FIG. 4m, via the XRO bus 124. The contents of switches G and H can also be gated to the N register 138, FIG. 4ab, via gate 686, FIG. 4ab, for manual display or manual store.

Switch A of FIG. 13, labeled 650a in FIG. 64, in addition to its function as a data entry switch, is used to select a source or destination when performing a manual display or manual store operation.

The IPL (FIG. 13) (Initial Program Load) pushbutton initiates a micro-program routine that will load the system with data and instructions from a selected input device and will, upon completion of this loading, start processing the data in accordance with the loaded instructions. Prior to depressing this IPL pushbutton, the address of the selected input device is set into rotary switches C and D.

The Display pushbutton is used in combination with rotary switch A, 650a, FIG. 64, to display the contents of a CPU register or a byte stored in either Main Storage, the CPU bump, or the UCW bump. Individual switch positions are provided on switch A for all CPU registers. The desired register is selected, the Display button is depressed, and the data is transferred to the A register and observed in the indicators. One position, namely, Select Memory, is provided for Main Storage. With the switch in this position, the desired Storage address is set into switches E, F, G and H and the Display button is depressed. This initiates a Read and a Write cycle and the selected storage location is displayed by the R register indicator lights.

Two additional positions are provided on switch A, for the selection of either the CPU bump or the UCW bump. In either of these positions, operation is identical to the Select Memory position, with the desired address being set into switches G and H.

Operation of the STORE pushbutton is identical to the DISPLAY function, with the exception that the character, set into switches C and D, is entered into the location that is selected, as described above.

The three positions of the MODE switch, other than the normal process position, are provided to facilitate trouble-shooting procedures. With this MODE switch in the ROM RE-CYCLE position, a micro-program is started, at the address entered into switches B, C and D, and continues until the contents of the W and X registers match the settings of switches F, G, H. When this match occurs, the address, set in switches B, C and D, is entered into the W and X registers, and the cycle is repeated.

With the MODE switch set in the MACRO ADDR. RE-CYCLE position, the mode of operation is similar to the ROM RE-CYCLE mode, with the exception that switches E, F, G and H are compared, with the contents of the M and N registers and, when a match occurs, the address set into switches A, B, C and D is entered into the I and J registers via the Z bus external entry circuit and the cycle is restarted.

With the MODE switch in the MACRO ADDR. STOP position, the system is caused to stop whenever the contents of the M and N registers match the address set into switches E, F, G and H.

The INTERRUPT pushbutton causes an external interruption request, which will be taken when not masked off and when the CPU is not stopped. Otherwise, the request remains pending. Bit 25 of the interruption code is made 1 to indicate that the INTERRUPT button is the source of the external interruption.

MAIN MEMORY

General

The data flow diagram constituted of FIGS. 4a through 4az includes, among other elements and controls, the following principal means; namely, the Main Storage 2201 (memory), the three principal buses; namely, the plus and minus A buses, the plus and minus B buses, and the plus and minus Z buses; the M memory address register 197; the N memory address register 138; Read-Only Storage A1 (control memory); control memory registers W and X; a plurality of other registers; and a plurality of decoders and control gates. Additional buses MRO bus 115, NRO bus 116, M bus 104, N bus 105, and several other buses are also provided. These elements will now be described.

The Main Storage 2201 (memory) is shown in FIG. 4ac and is described in detail in the aforementioned application Serial No. 357,372. This Main Storage includes, in addition to its Main Storage area 2204, the CPU Bump area 2202 and the UCW Bump area 2203, which, as previously described under the section captioned "ADDRESSING" in the aforementioned application, contains all of the control words including the main problem program macro-instructions and the data operands to be processed in the CPU section of the system, which section comprises the detailed circuits shown in FIGS. 4a through 4az.

Access to all the areas of the memory 2201 is under control of an address decoder 2207, described more fully in the aforementioned application. This decoder has three control lines; namely, line 428 designated EARLY BUMP, line 427 designated UCW Bump, and line 426 designated CPU Bump, which control the entry of address data derived from said M and N address registers; namely, the M register 197 (FIG. 4aa) and the N register 138 (FIG. 4ab). The decoder 2207 is connected to the M and N registers respectively by means of said MRO bus 115 and said N bus 116. The output of the memory 2201 passes through a bus 2210 to gate STG TO R 429a (FIG. 4d) which, via an OR inverter, feeds the R register 139 which is called the memory register R. Said gate 429a is provided with a control signal line 429 called STORAGE TO R which is energized under control of a CU decoder (FIG. 4y) labeled CU DECODE described hereinafter. The inhibit input to the memory 2201 is via a bus 2208 which extends from the output of the R register 139, shown in FIG. 4d, to the portion of memory 2201 labeled INHIBIT in FIG. 4ac. Data is transmitted into and out of the memory a byte of 8 bits at a time, plus a parity bit.

Details of the main memory are described beginning on page 399 in the afore-mentioned application Serial No. 357,372.

CONTROL MEMORY

General

The control memory, entitled Read-Only Storage Unit A1, is illustrated in FIG. 4am. Access to the control memory is via four channels, WRO bus 122, XRO bus 124, —XRO bus 125 and —WRO bus 123, which connect to A1 via blocks A102 and A101 (FIG. 4am). The WRO bus 122 leads from the W register 144 (FIG. 4i), the XRO bus 124 from the X register 145 (FIG. 4m), the —XRO bus 125 from the inverter labeled "INVERT" in FIG. 4m, at the output of the X register, and the bus —WRO 123 leads from the W register (FIG. 4i) via the inverters N. These two registers W and X constitute the address register for the control memory A1 and are identified collectively as ROSAR (Read-Only Storage Address Register). ROSAR controls the readout of a desired one of the 4000 control words (micro-programs) stored in the control memory A1. Each such control word has a unique pattern of coded control signals comprising a single micro-program. The pattern of control signals is directed through lines connected to a plurality of sense amplifier latches (SAL's) indicated by the block SALS (FIG. 4am), these lines bearing respectively the following designations: (FIG. 4am) CN, CH, CL, CM, CU, CD, CA, CF, CV, CB, CG, CC, CK and CS. Parity bits are also issued to the SAL's identified as N, A, S and C (FIG. 4am). The outputs from the above-identified SAL's, CN to CS, inclusive, are applied to decoders, bearing corresponding identifications, which are shown throughout the circuit diagrams of FIG. 4. Details of the Read-Only Storage are fully described in said aforementioned application Serial No. 357,372, beginning on page 413.

A group of sixty (60) sense amplifier latches SAL1 to SAL60 is provided for the pairs of sense amplifiers SA1 ODD, SA1 EVEN to SA60 ODD, SA60 EVEN. The sense amplifier latch SAL1 includes three AND circuits, A450, A451 and A452 similar to that shown in FIG. 8. The outputs of the AND circuits A450, A451 and A452 are connected to the input of an OR invert circuit A453 which is similar to the OR invert circuit of FIG. 9. The output of the OR invert circuit A453 is connected to a transistor driver A454. The collector output A455 of the transistor driver A454 forms the TRUE output of the latch SAL1. This output is coupled back to one input of the AND circuit A452 to provide the latch function.

In some instances, both TRUE and COMPLEMENT outputs from the latches are required, in which case an inverter A460 is coupled to the output A455. The inverter A460 is similar to the inverter shown in FIG. 7, and its collector output A461 forms the COMPLEMENT output.

The TRUE output X7 from the X register is applied to a second input to the AND circuit A450 by way of a driver A470 and a driver output line A471. The COMPLEMENT output $\overline{X7}$ of the X register is applied to a second input of the AND circuit A451 by way of a driver A472 and a driver output line A473. If the respective position of the X register has a logic "1" stored therein, the X7 line and line A471 will be relatively positive, conditioning the AND circuit A450 to pass an output pulse from the sense amplifier SA1 ODD to the OR invert circuit A453 in the event that the word bit in the first position of the matrix A2 of the ODD position word readout is a logic "1"; i.e., the portion A23 has not been punched from the card.

If the respective position in the X register has a logic "0" stored therein, the $\overline{X7}$ line and line A473 will be relatively positive to condition the AND circuit A451 to pass a pulse from the sense amplifier SA1 EVEN to the OR invert circuit A453, in the event that a logic "1" word bit is detected by the sense amplifier SA1 EVEN.

Application of a positive pulse to the OR invert circuit A453 causes the driver A454 to be turned OFF. In turning off, the driver A454 applies a relatively positive pulse to the TRUE output line A455 and a relatively negative signal to the COMPLEMENT output line A461. The positive signal on the output line A455 is applied to one input of the AND circuit A452 to latch up the circuit comprising the AND circuit A452, the OR invert circuit A453, and the driver A454.

The ROS RESET line is connected to the other input of the AND circuit A452. The ROS RESET line is normal at a relatively positive level and has applied thereto a negative-going pulse of short duration to effect resetting of the latches SAL1-SAL60. The ROS RESET pulse terminates prior to the time at which the latches are SET by a word read out of the storage matrix A2.

The timer A104 in the preferred embodiment includes delay line A480 and a pair of latches A481 and A482. One output from the delay line A480 is connected to the SET input lines A483 and A484 of the latches A481 and A482. A second output terminal of the delay line A480 is connected to a RESET input A485 of the latch A482. A third output from the delay line A480 is applied to the RESET input A486 of the latch A481. The output of the latch A481 is the ROS READOUT line, and the output of the latch A482 is the ROS RESET line. Since a negative-going ROS RESET pulse is required, an inverter A487 is interposed between the output of the latch A482 and the ROS RESET line.

The latches A481 and A482 may be generally of the type shown with respect to SAL1, that is, each latch includes a SET input to an OR invert circuit similar to A453, a RESET and a latchback input to an AND circuit similar to A452 with the output of the AND circuit being connected to a second input of the OR invert circuit. A driver similar to A454 is connected to the output of the OR invert circuit and provides the latchback function.

The input to the delay line A480 is the positive-going ROS GO signal described above. In the preferred embodiment, the delay line and its output terminals are selected so that the outputs of the latches A481 and A482 go relatively positive one hundred (100) nanoseconds after the beginning of the ROS GO pulse and the outputs of the latches A481 and A482 are restored to their normal negative levels at one hundred fifty (150) nanoseconds and one hundred (100) nanoseconds later, respectively.

As indicated earlier, operation of the read-only storage unit A1 is initiated by the ROS GO signal. The resulting ROS RESET pulse resets the latches SAL1-SAL60, and the ROS READOUT pulse initiates the operation of the decoder sections A101 and A102 to energize the selected transistor driver in the group A103. The selected driver reads out two words of storage into the sense amplifiers SA1 ODD-SA60 ODD and SA1 EVEN-SA60 EVEN. One of these two words from storage is entered into the sense amplifier latch SAL1-SAL60 in accordance with the condition of the X7 and $\overline{X7}$ register output lines.

The time delays encountered in operating the decoder sections A101 and A102, in energizing the selected driver in the group A103, in driving the capacitor matrix A2, in advancing the word bit pulses through the sense amplifiers and in entering the selected word bits into the sense amplifier latches will in one embodiment vary from one hundred (100) microseconds to two hundred sixty (260) microseconds after the initiation of the ROS READOUT pulse. Entry of the selected word data into the sense amplifier latches is therefore assured at least within three hundred sixty (360) nanoseconds after the beginning of the A Time and ROS GO pulses.

ARITHMETIC LOGIC UNIT (ALU)

General

Arithmetic operations add and subtract, as well as logic operations AND, OR and EXCLUSIVE OR, are performed by the arithmetic logic unit (ALU). The ALU is comprised of two identical circuits, shown in detail in FIGS. 35a, 35b, 35c, 35d, 35e and 35f, 35g, 35h, and 35i, in said aforementioned application Serial No. 357,372. Data is supplied to each of the two ALU operand inputs in the form of a byte of eight binary bits presented in parallel. The bit positions in a byte are numbered from 0 to 7 for reference purposes. Bit positions 0, 1, 2 and 3 are referred to as the high-order bit positions of the byte, while bit positions 4, 5, 6 and 7 are referred to as the low-order bit positions. A byte of data presented to either operand to the ALU may represent the operand in 8-bit binary form or it may represent two decimal digits, one digit being represented in binary form in bit positions 0, 1, 2 and 3 of the byte while the other digit is represented in binary form in bit positions 4, 5, 6 and 7 of the data byte. Hence, the ALU is required to operate in either of two modes, binary or decimal, depending upon the form in which the operands are represented. Each time a set of binary bits representing an operand is applied to an input to the ALU, another set of corresponding but inverted binary bit signals is also directed to the ALU so that the ALU performs the desired arithmetic or logic function using the direct bit signals representing the two operands and the same arithmetic or logic function is performed using the inverted bit signals for each operand. Thus, each time the ALU performs an arithmetic or logic function, two results, each in the form of eight parallel binary bits, are developed. The two 8-bit results are directed to a checking circuit where they are compared, and an error signal is developed if the two results are not equal.

In the following explanation of the ALU operation, each of the data input lines for the A operand will be referred to as A1, A2 . . . A7 corresponding to the bit position of the 8-bit data byte with which it is related. Likewise, each of the data input lines for the B operand will be referred to as B1, B2 . . . B7. A line appearing over a signal identification indicates that the subject signal differs from a similarly identified signal which has no line over its identification in that it is inverted. For example, signal $\overline{A2}$ is an inverted A2 signal and signal $\overline{N}$ is an inverted N signal, etc.

The ALU is selectively controlled to perform one of the five arithmetic or logic functions previously noted by means of the following control signals: TRUE, COMP., DEC., HEX, LM, $\overline{LM}$, N, $\overline{N}$, CONNECT and $\overline{CONNECT}$. For a detailed description of the ALU functions see the aforementioned application Serial No. 357,372, pages 439 through 497. The status of each of these control lines required to perform each of the arithmetic and logic functions is shown in the following table:

145, FIG. 4m, by way of a switch called GATE X NORMAL. Entry of the CN signals into the X register 145, in the manner indicated, is gated under control of an A Time clock signal impressed on line 159 connected, via an OR circuit, to the X register.

The CN control word provides the high-order six bits of the X register 145 with address information forming a portion of the next address which will access and read out the next control word in the read-only storage.

The bit pattern constituting the CH field of the control word is entered into four amplifier laches, as seen in FIG. 4am. Each such amplifier issues true and complement signals on a pair of output lines. The four amplifier latches provide four sets of output lines designated CH0, $\overline{CH0}$; CH1, $\overline{CH1}$; CH2, $\overline{CH2}$; CH3, $\overline{CH3}$. These four sets of lines are shown connected to a CH decoder shown in FIG. 4aj. The decoder comprises essentially 16 AND circuits capable of providing 16 coded combinations 0000 to 1111. Reference is invited to Appendix Chart A of the aforementioned application Serial No. 357,372 for a description of each one of the 16 code combinations and the symbol designations applied to each code. The detailed circuit connections for two of these 16 AND circuits are shown for coded combinations 0001 to 0010. These CH

| DEC. | HEX | FUNCTION | COMP. | TRUE | CONNECT | $\overline{CONNECT}$ | LM | $\overline{LM}$ | N | $\overline{N}$ |
|---|---|---|---|---|---|---|---|---|---|---|
| ON for DEC. Mode; OFF for Binary Mode. | ON for Binary Mode; OFF for DEC. Mode. | A+B | OFF | ON | OFF | ON | OFF | ON | ON | OFF. |
| ON for DEC. Mode; OFF for Binary Mode. | ON for Binary Mode; OFF for DEC. Mode. | A−B | ON | OFF | OFF | ON | OFF | ON | ON | OFF. |
| OFF | ON | A and B | OFF | ON | ON | OFF | ON | OFF | OFF | ON. |
|  |  |  | ON | OFF |  |  |  |  |  |  |
| OFF | ON | A or B | OFF | ON | ON | OFF | OFF | ON | OFF | ON. |
|  |  |  | ON | OFF |  |  |  |  |  |  |
| OFF | ON | A or B but not A and B. | OFF | ON | ON | OFF | OFF | ON | ON | OFF. |
|  |  |  | ON | OFF |  |  |  |  |  |  |

DECODING

General

Each control word (single micro-instruction word) issued from the Read-Only Storage comprises 60 bits. However, within the specific capacity of the present embodiment of the invention, only 51 bits are actually required, the remaining nine being available but not used. These 51 bits of the control word pattern are grouped into designated fields CN, etc., as illustrated in FIG. 4am, these bits being stored in the 60 Sense Amplifier Latches (SAL's), shown in FIG. 4am. These designated control word fields, including the number of bits associated with each, are listed as follows:

| Fields | Bits | Fields | Bits |
|---|---|---|---|
| CN | 6 | CB | 2 |
| CH | 4 | CG | 2 |
| CL | 3 | CC | 3 |
| CM | 3 | CK & P | 5 |
| CU | 2 | CS | 4 |
| CD | 4 | N | CNp ⎫ |
| CA | 4 | A | ROp ⎬ PARITY |
| CF | 3 | S | SALp ⎪ |
| CV | 2 | C | Cp ⎭ |
|  |  | Extra | 9 |

DECODING THE FIELDS OF THE CONTROL WORD

The bit pattern constituting the CN field of the control word is entered into five CN amplifiers, seen in FIG. 4am. Each amplifier latch output is connected to corresponding positions; namely, P, 0, 1, 2, 3, of the X register lines, together with other input lines, for example, those from the S register, G register, a carry line, V register signal, interrupt, valid decimal digit line, provide outputs which are communicated to lines designated X4, X5, X6, USE 4, $\overline{USE\ 4}$. These output lines are connected in the manner shown in FIG. 4aj through three inverters whose outputs; namely, X4, X5, X6, are applied by way of the logic circuits shown in FIG. 4ak to positions X4, X5, X6 of the X register 145, in FIG. 4m. The USE 4 line is applied to a parity generator, seen in FIG. 4n. The $\overline{USE\ 4}$ line is applied through the circuit configuration in FIG. 4k to provide an $\overline{X4}$ line that eventually leads to the X register 145.

The bit pattern constituting the CL field of the control word is fed into three amplifier latches which in turn provide three sets of output lines; namely, CL0, $\overline{CL0}$; CL1, $\overline{CL1}$; CL2, $\overline{CL2}$. These lines are applied to a CL decoder shown in FIG. 4ak capable of providing coded combinations 000 to 111. Reference is invited to Appendix Chart B in the aforementioned application for a description of each one of the 8 code combinations and the symbol designations applied to each code. The three sets of amplifier latch output signals are AND'ed with designated output lines from the S and G registers to provide a common output line that communicates a status signal 0 or 1 to position X7 of the X register 145, in FIG. 4m. The contents of the X register positions 0 through 7 provide the address for selecting a specific one of the control words in the read-only storage.

The bit pattern constituting the CM field control word is applied to three amplifier latches in turn providing three pairs of output lines designated CM0, $\overline{CM0}$; CM1, $\overline{CM1}$; and CM2, $\overline{CM2}$. These lines are referenced 310 through 315, respectively, and are applied to three latches designated 316, 317 and 318 constituting the CM register 154, shown in FIG. 4ax. Each of these latches is gated with a clock A Time signal on line 159. The CM register 154 provides signals to various control points in the system, particularly those concerned with the accessing of information to and from the main memory. These control points have time periods of operation which are beyond the fall time of the amplifier latches providing the source signals. Above the register 154 are a plurality of AND circuits to which the lines 310 through 315 are applied in the manner shown. Two of these AND circuits are gated by an ALLOW WRITE signal line 350. The remaining AND circuits are gated by a USE CPU decode line 319. These AND circuits, together with their associated circuits, provide output control lines 332, 333 and 334 connected to a control register parity check circuit CRPC, shown in FIG. 4ah. In addition, the CM decoder provides an output line 335 which gates a constant value K to the W register 144, shown in FIG. 4i, the latter serving to store the four high-order bits of the address in the read-only storage address register. In addition, the CM decoder provides other output lines 336, 337, 338 and 339. These lines communicate gating signals identified respectively by the following statements: MN=IJ, MN=UV, MN=T and MN=K. These statements, in the order named, call for the gating of the contents of the IJ registers, seen in FIGS. 4a and 4b, to the address register MN, seen in FIGS. 4aa and 4ab. The next statement calls for the gating of the contents of the UV register, seen in FIGS. 4b and 4c, to the MN register. The third statement calls for gating the contents of the T register, seen in FIG. 4c, to the MN register. The final statement calls for gating the contents of the constant K to the MN register. As further shown in FIG. 4ax, the CM decoder provides channel selection line designated 340, HUV SEL, and 344, BURST SVCE. OUT. The CM decoder, as further seen in FIGS. 4ax, 4ay and 4az, have the following input signal lines; namely:

| Signal Line | Designation |
|---|---|
| 319 | USE CPU DECODER |
| 320 | MN=HUV |
| 159 | A TIME |
| 671 | $\overline{MACH. R}$ |
| 683 | $\overline{MANUAL\ WR.\ CALL}$ |
| 323 | SEL. WR. CALL |
| 684 | $\overline{MAN.\ RD.\ CALL}$ |
| 325 | SEL. RD. CALL |
| 326 | INHIBIT DEST. |
| 166 | CLOCK 4 |
| 162 | D TIME |
| 671 | MAN. RESET |
| 161 | C TIME |
| 686 | SW. E, F, G, H, ENTRY |
| 685 | MAN. DISPLAY OR STORE |
| 322 | —INHIBIT HR (From Sel. Ch.) |
| 163 | CLOCK 1 |
| 160 | B TIME |
| 687 | $\overline{FORCE\ LOAD\ IJ\ ADD}$ |
| 688 | $\overline{TRF.\ SW.\ TO\ ROSAR}$ |

In addition, there are a group or priority control lines; namely, NOT CPU MALF. PULSE PLUS ERROR, NOT MEM. WRAP PULSE, NO SHARE EXIT PULSE, NO INTERNAL TIMER PULSE, and NO CPU MEM. PRIORITY PROT. PULSE SEL. CHAN. HOLD, for controlling various functions of the processor during priority conditions.

The CM decoder further provides additional output lines, as seen in FIGS. 4ay and 4az These additional lines are as follows:

| Output Line | Designation |
|---|---|
| 342 | WX=CWX |
| 343 | WX=UV |
| 345 | NOT ANY PRIORITY PULSE |
| 346 | READ CALL TO MEMORY |
| 347 | WRITE CALL TO MEMORY |
| 348 | AUX WR. CALL |
| 349 | ALLOW READ |
| 350 | ALLOW WRITE |
| 351 | SET M, N |
| 352 | STORE H, R |
| 353 | STORE R |

Reference is invited to Appendix Chart C of the aforementioned application for a description of each one of the 14 code combinations and the symbol designations applied to each code.

Figure 4S:
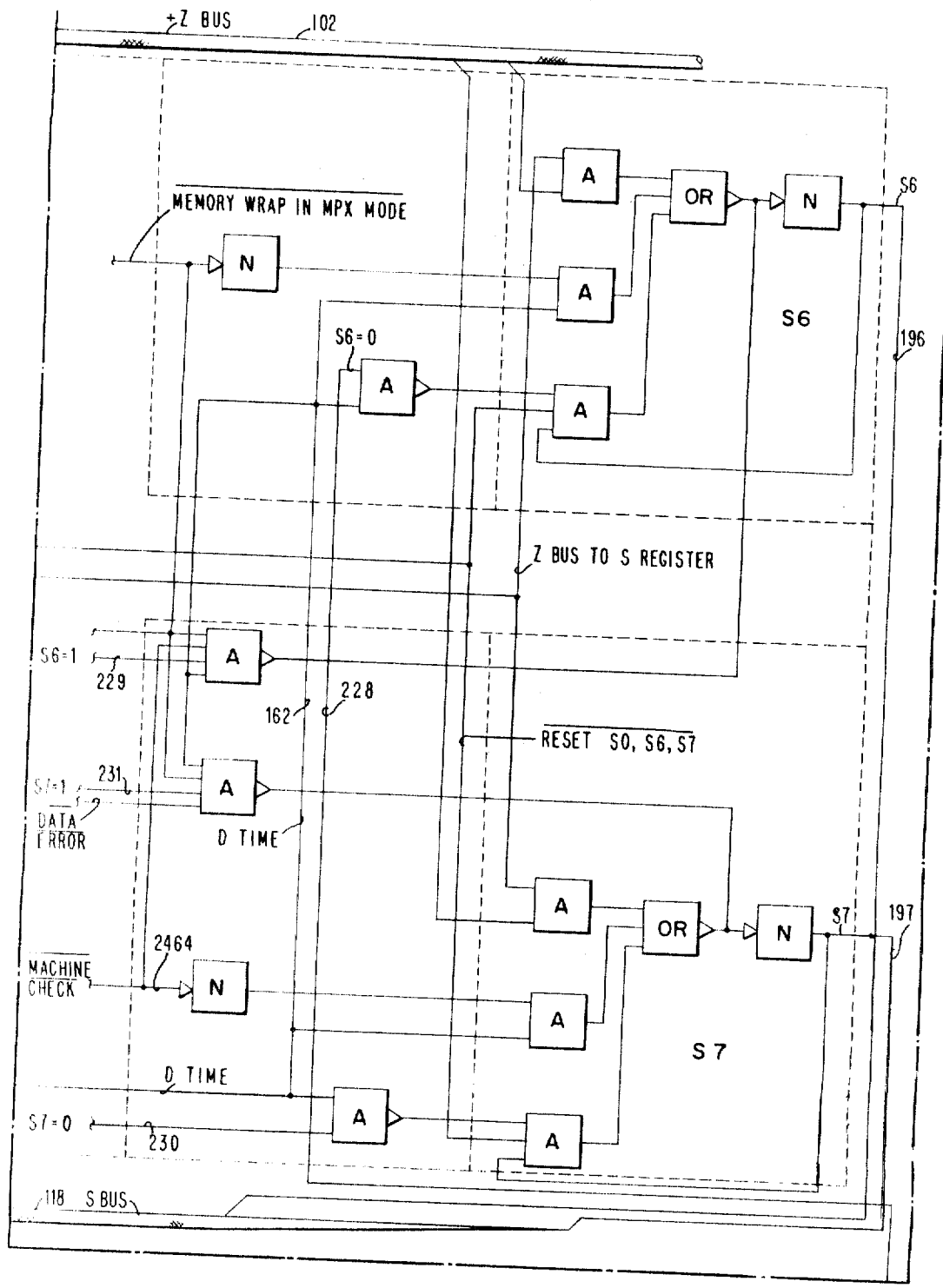
Figure 4T:
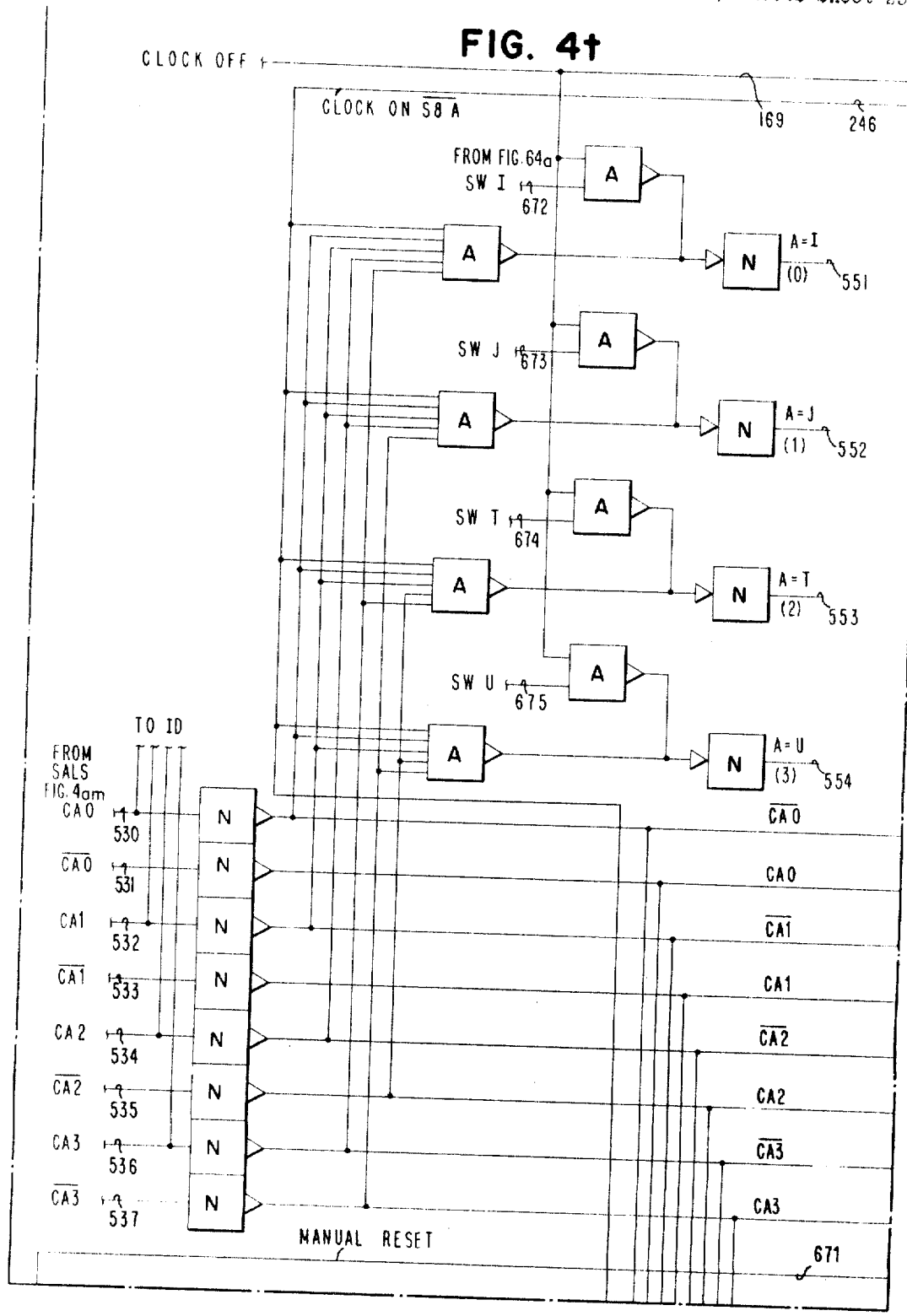
Figure 4U:
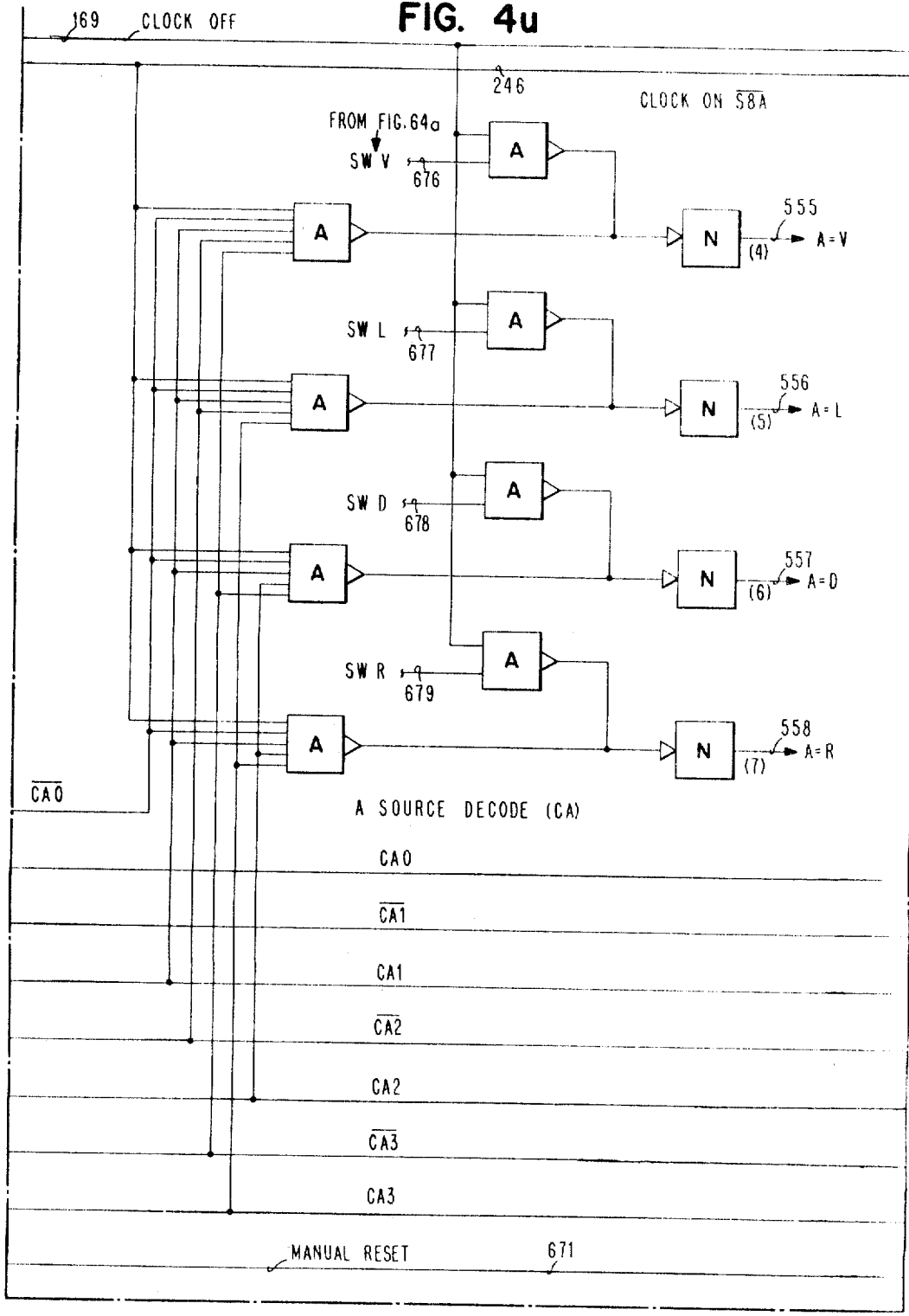
Figure 4V:
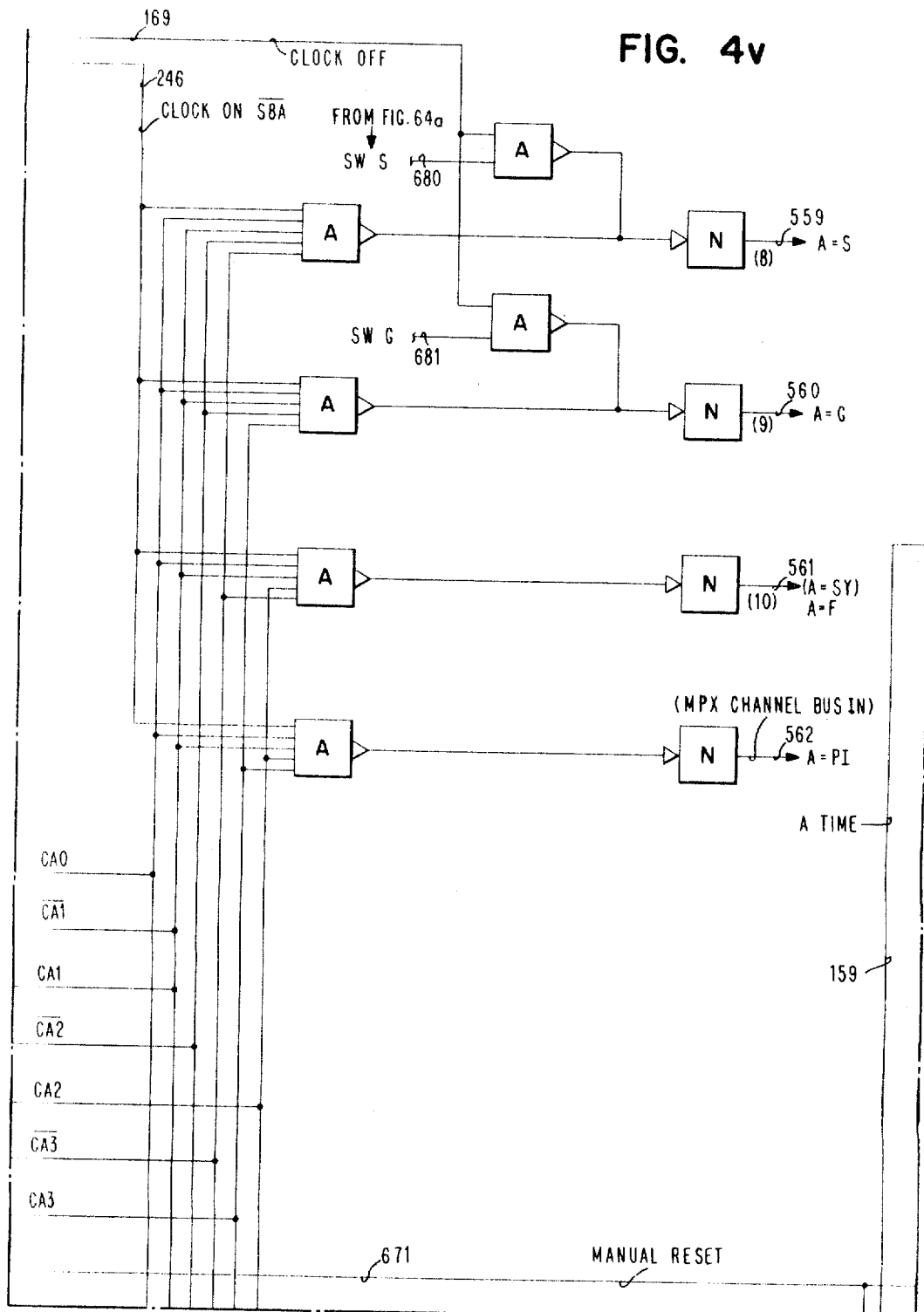

The bit pattern constituting the CU field of the control word is entered into the SAL's, in FIG. 4am, bearing the same designations. The output from these CU amplifiers provides the CU decoder, in FIG. 4y, the following output signals: CU0 on line 405, CU1 on line 406, $\overline{CU0}$ on line 407 and $\overline{CU1}$ on line 408. These signals are AND'ed by way of the circuit configuration in the decoder with lines 409 and 410 respectively designated G0 and G1, the source of these signals being the G register in FIG. 4d. By virtue of these signals, the circuit configuration in FIG. 4y provides a control to an FL latch 424 having an output 426 which, when activated, accesses the CPU bump area 2202 in FIG. 4ac. The circuits of the CU decoder also control an FL latch 425 whose output line 427, when activated, controls access to the UCW bump area 2203; shown in FIG. 4ac. When boh of these latches; namely, 424 and 425, are inactive, an EARLY BUMP line 428 enables access to the main storage area 2204.

The CU decoder has other inputs; namely ALLOW READ, line 349, and ALLOW WRITE, line 350. When the latter is activated, the CU decoder issues an output signal on line 429 designated R to STG. This designation signifies that the contents of the R register, in FIG. 4d, will be transmitted, by way of the bus 2208, and written into the memory. During other conditions when ALLOW WRITE line 350 is activtaed, an output signal READ TO CLEAR will be issued on output line 430. Another condition occurring when line 350 is activated provides a signal on output line 431, designated $\overline{SET\ HR}$.

Selection of the various output signals from the CU decoder output lines 426 through 431 may be exercised manually at the control console to provide the following input lines to the CU decoder; namely, 411, designated USE MANUAL DECODER; line 412, designated SELECT UCW BUMP; line 413, designated SEL. CPU BUMP; line 689, designated MANUAL SET R; line 685, designated MANUAL DISPLAY OR STORE; and line 671, designated MANUAL RST.

When the USE CPU control is active, input line 319, FIG. 4ax, is activated to supply an appropriate input to the decoder.

The ALLOW READ signal line 349 and the ALLOW WRITE signal line 350 are activated under control of associated latches 349a and 350a, respectively, shown in FIG. 4ay.

For timing purposes, an A time signal, line 159, is connected to the various points of the circuit configuration within the decoder.

An inspection of Appendix Chart D in the aforementioned application shows four coded combinations and their associated symbol designations; namely, MEM, CPU, UCW, and CPU IF RR. These are active when the ALLOW READ signal on the input line 349 is activated. In addition, the chart shows three code combinations and their associated symbols; namely, R, CLEAR, and HR, that are active when the ALLOW WRITE signal line 350 is up.

The bit pattern constituting field CD of the control word is fed from the sense amplifiers in FIG. 4*am* by way of lines 250, 251, 252 and 253, carrying the following designations—$\overline{CD0}$, $\overline{CD1}$, $\overline{CD2}$ and $\overline{CD3}$—to a CD control register 151 shown in FIG. 4*ao*. This register comprises four latches 254, 255, 256 and 257. Outputs from these latches are AND'ed with ALLOW READ signal line 349, INHIBIT DESTINATION line 326, and CLOCK 1 signal line 163, to provide destination control signals for all of the registers fed by the Z bus. These destination control signals are issued from various outputs of the CD decoder circuit network shown in FIG. 4*ar*. These designated signals and their transmission lines are as follows:

| Transmission lines | Designation |
|---|---|
| 281 | SET I |
| 282 | SET J |
| 283 | SET T |
| 284 | SET U |
| 285 | SET V |
| 286 | SET L |
| 287 | SET D |
| 288 | SET R |
| 289 | SET G |
| 290 | CPR Z DEST. |
| 291 | CPS Z DEST. |

These destination control signals may also be activated by manual intervention at the control console by setting an appropriate one of the control console switches to the various register settings, each one of which supplies one of the following input lines to the decoder circuit network:

| Input lines | Designation |
|---|---|
| 672 | SW. I |
| 673 | SW. J |
| 674 | SW. T |
| 675 | SW. U |
| 676 | SW. V |
| 677 | SW. L |
| 678 | SW. D |
| 679 | SW. R |
| 680 | SW. S |
| 681 | SW. G |

The CD decoder has additional input control lines; namely, MANUAL STORE, line 682; MEMORY SELECT control lines; and a STORAGE TO R signal, line 429. In accordance with the various circuit combinations within the decoder, as activated under the control of the manual switches of the console, A, B, C and D the following output signals are activated; namely, SAB on lines 292 and 293, and SCD and MANUAL STORE on output lines 294 and 295. In addition, the CD output decoder provides signals designated R=X on lines 296 and 297 and signals designated R=W on lines 298 and 299, shown in FIG. 4*ap*.

The control timing of the signals issued from the CD decoder is such that the destination entries into the various registers are issued during the last part of the clock cycle. An inspection of Appendix Chart E of the aforementioned application shows 16 code combinations 0000 to 1111. The 0000 combination specifies no destination and is used to allow an ALU function where a zero test is required with no change in the current output data. The coded designations 1 through 10 control the destination of the CPU registers. Combinations 11 and 12 control entry into the IJ registers by means of the console switches A, B, C and D. The coded combination 13 concerns reset controls. This is designated by the statement "RESET=K" and coded combinations 14 and 15, respectively, are assigned to statements R=X and R=W.

The bit pattern of the CA field in the control word is entered into the appropriately identified SAL's in FIG. 4*am*, from which signal lines 530 through 537, respectively designated CA0, $\overline{CA0}$; CA1, $\overline{CA1}$; CA2, $\overline{CA2}$; and CA3, $\overline{CA3}$, are connected by way of input inverters to a CA decoder, shown in FIGS. 4*t*, 4*u*, 4*v*, 4*at*, 4*au* and 4*av*. The circuit configuration constituting the CA decoder, in conjunction with a signal line designated CLOCK ON $\overline{S8A}$, which reflects the off state of a status latch S8, see in FIG. 4*at*, enables the transmission of the contents of all specified CPU registers including those concerned with multiplexing operations, through the A bus 110 to the A register 130, shown in FIG. 4*e*. As further seen in FIGS. 4*t*, 4*u*, 4*v*, the CA decoder output lines, including their control designations for enabling a transmission to the A register, are listed as follows: line 551, designated A=I; line 552, designated A=J; line 553, designated A=T; line 554, designated A=U; line 555, designated A=V; line 556, designated A=L; line 557, designated A=D; line 558, designated A=R; line 559, designated A=S; and line 560, designated A=G.

In the above statements, the character to the left of the equal sign designates the destination A register 130, shown in FIG. 4*e*. The character to the right of the equal sign specifies a designated one of the CPU registers I through G, which may be seen in FIGS. 4*a*, 4*b*, 4*c* and 4*d*. In addition to the above designated signal lines, the CA decoder provides the following lines which are concerned with such operations as error conditions, multiplexing and select channel operations. These output lines, together with their control statements are as follows:

| Output Line | Designation |
|---|---|
| 561 | A=SY |
| 562 | A=PI |
| 563 | A=GM |
| 564 | A=FJ |
| 565 | DDC=L |
| 566 | A=HT |
| 567 | HA=K |
| 568 | HB=K |
| 569 | HC=HR |
| 570 | HD=HR |
| 571 | HP=HR |
| 572 | HQ=HR |
| 573 | HR=HC |
| 574 | HR=HD |
| 575 | HR=HU |
| 576 | HR=HV |
| 577 | HPQ=HUV |
| 578 | A=HS |
| 579 | A=PT (MPX CH. TAGS) |
| 580 | A=E (ERROR REG.) |
| 581 | PB=K |
| 582 | PA=K |

Activation may be accomplished by manually setting the appropriate console switch that provides the following input lines to the CA decoder: line 672, designated SW. I; line 673, designated SW. J; line 674, designated SW. T; line 675, designated SW. U; line 676, designated SW. V; line 677, designated SW. L; line 678, designated SW. D; line 679, designated SW. R; line 680, designated SW. S; and line 681, designated SW. G.

The input line 169, designated CLOCK OFF, and CLOCK ON $\overline{S8A}$, are fed into the CA decoder for timing and gating purposes.

An inspection of the Appendix Chart F shows 16 coded combinations (with status latch S8 off) for enabling data transmission to the A register 130. Coded combinations 0 through 9 specify transmission from the CPU registers I through G to the A register 130. Coded combination 10 specifies an external trap. Coded combination 11, designated PI (MPX Ch. Bus In), concerns transmission during multiplexing operations. Coded combination 12, designated PT (MPX Ch. Tags) concerns transmission also during multiplexing operations. Coded combinations 13 and 14, designated respectively PA=K and PB=K, are employed to transfer K constants into the PA and PB registers during multiplexing operations. Coded combinations 15 concerns error register operations.

When the status latch 8, seen in FIG. 4*at*, is in its own state, it enables, among other operations, the transmission of data to and from specified selector channel registers. An inspection of the CA fields within Appendix Chart F in the aforementioned application, when the status latch S8 is on, the following coded combinations designate the various I-O and channel operations. Coded combinations 0 and 1, respectively designated FL and FJ are concerned with I-O operations. Coded combination 2 and its designation DDC=L is concerned with the transmission of contents of the CPU L register into the direct-data channel. Coded combinations 4 through 15 and their associated designations are concerned with a transfer of data to the H registers in the selector channel.

Figure 4X:
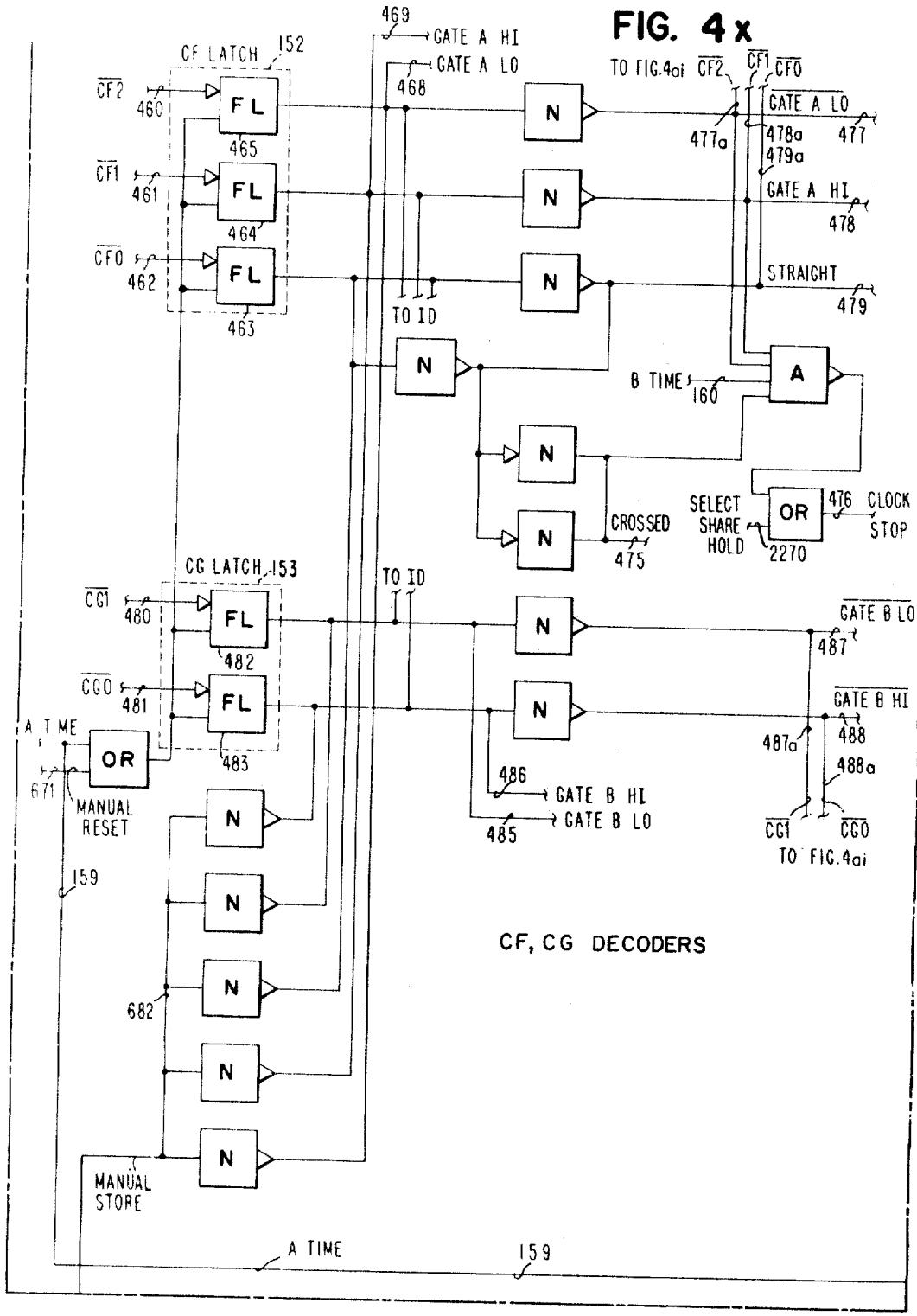
Figure 4Y:
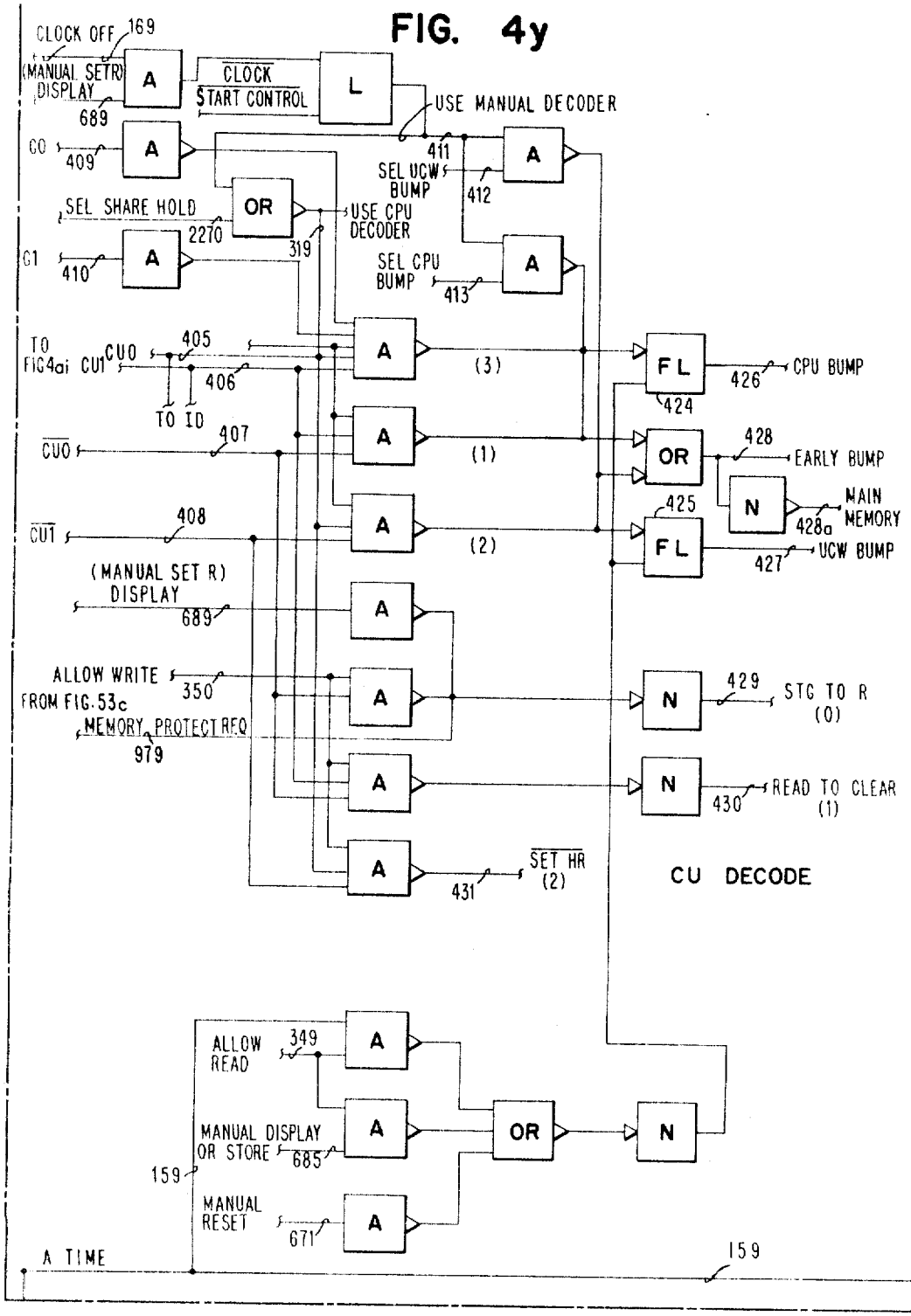
Figure 4Z:
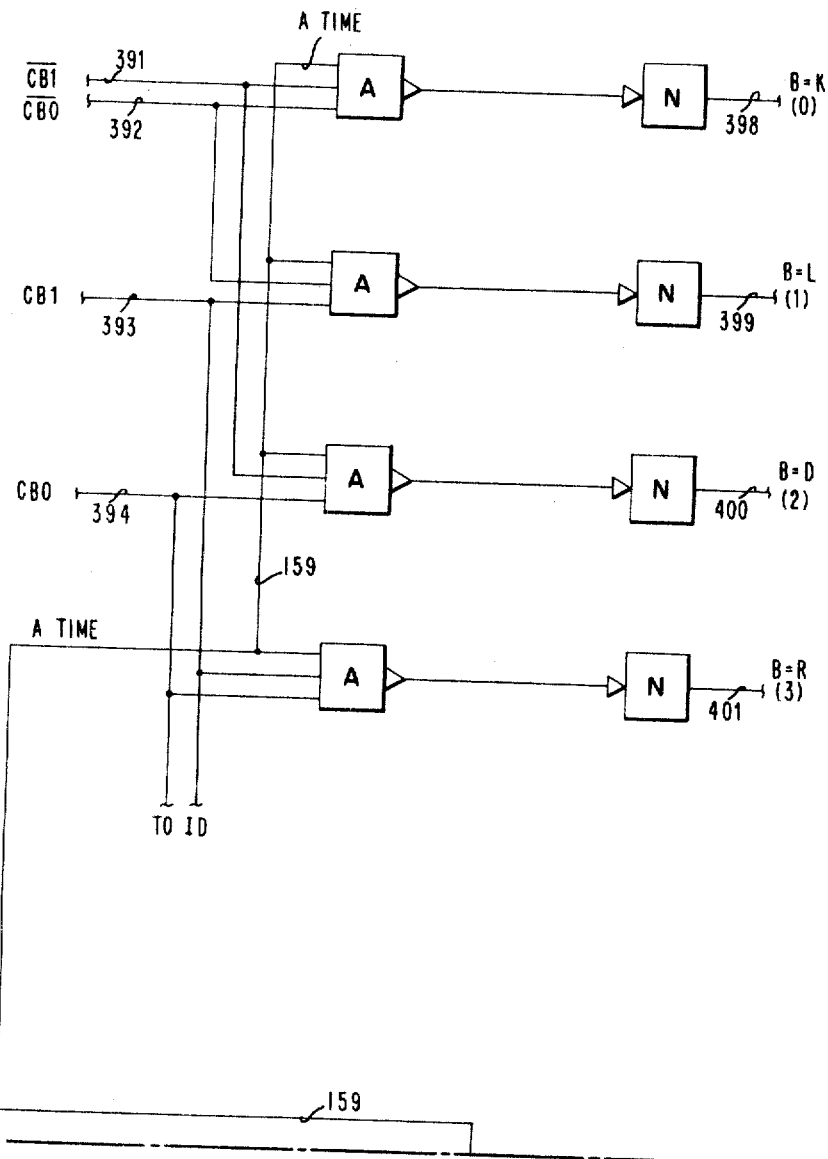
Figure 4A:
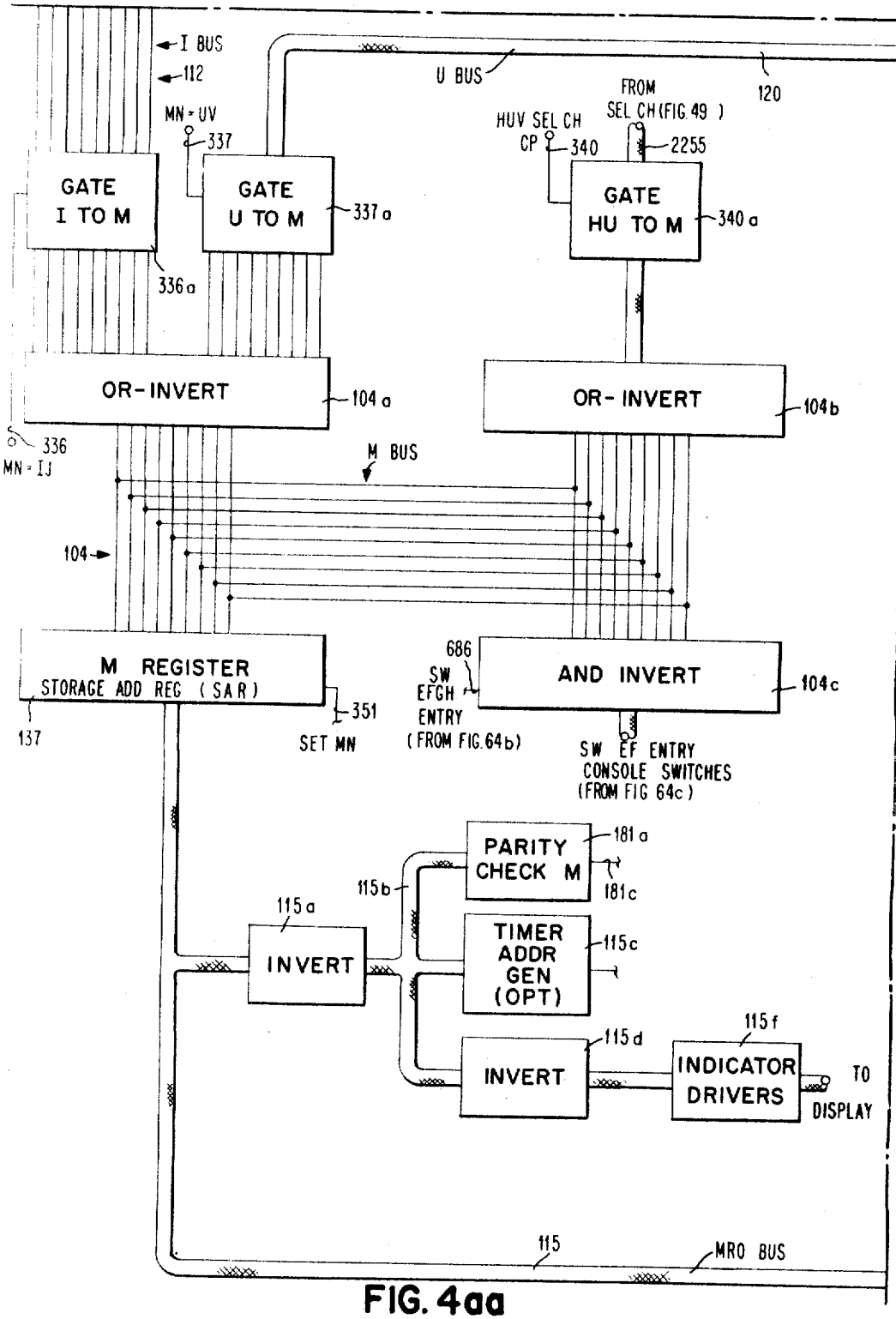
Figure 4A:
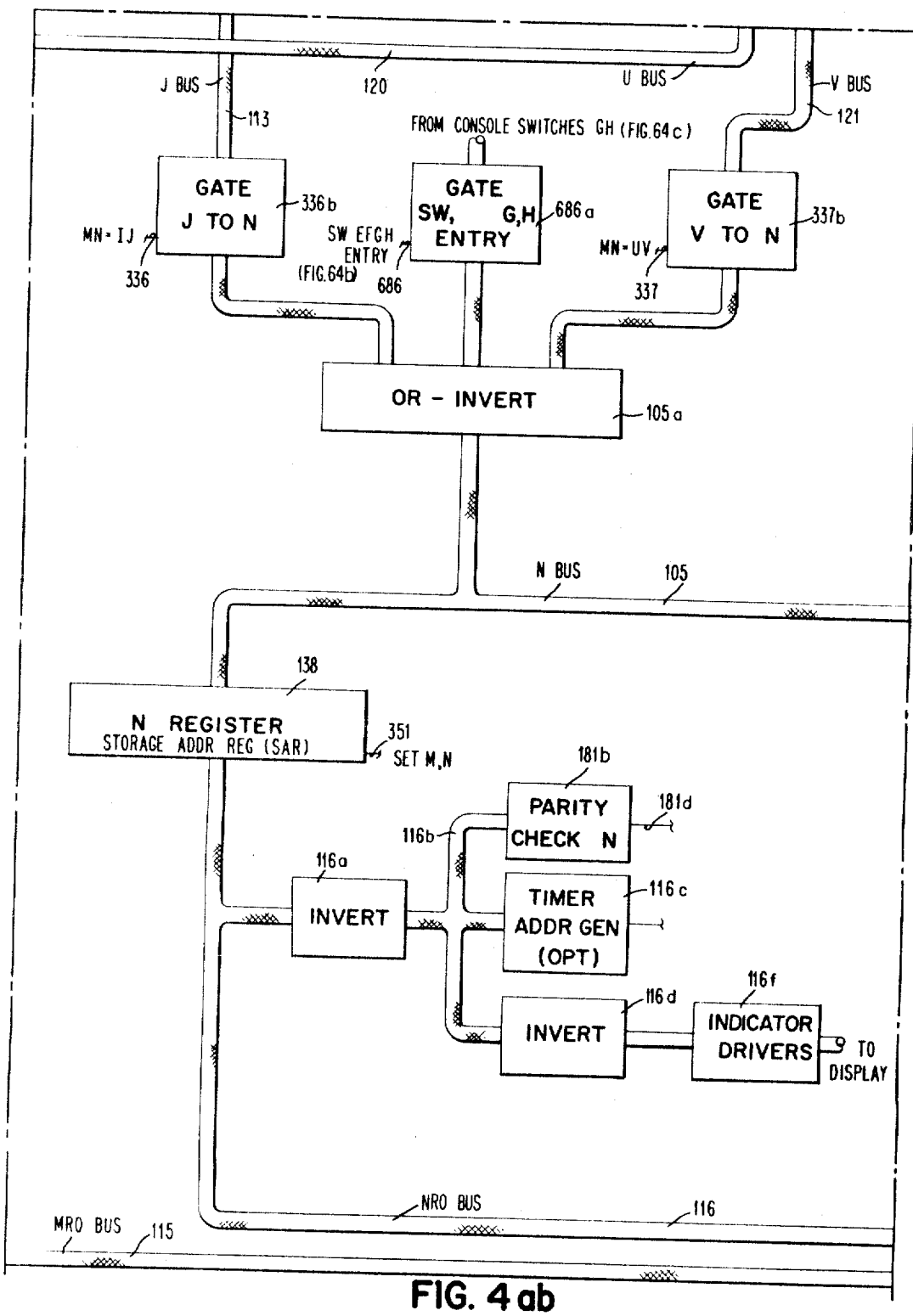
Figure 4A:
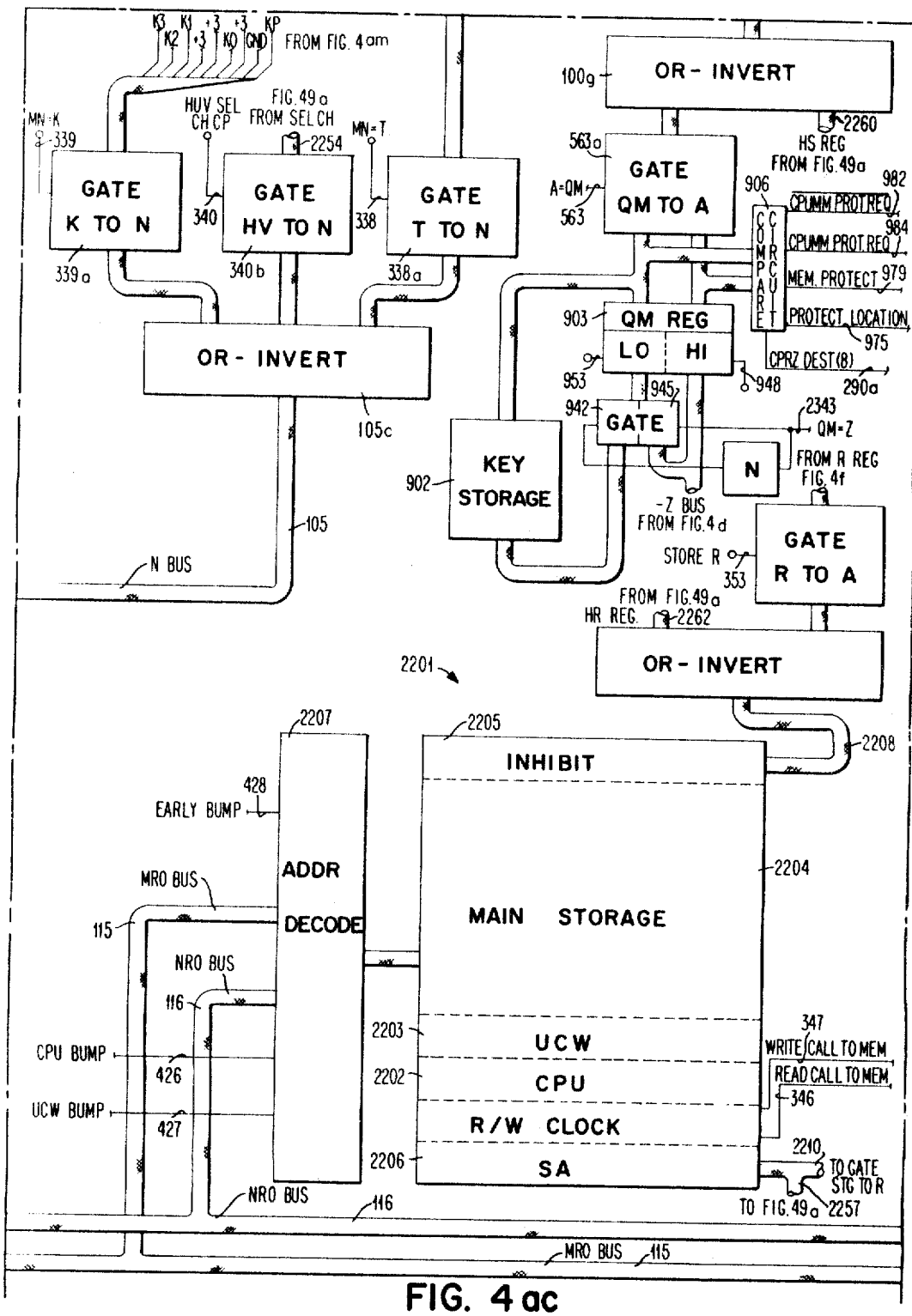
Figure 4A:
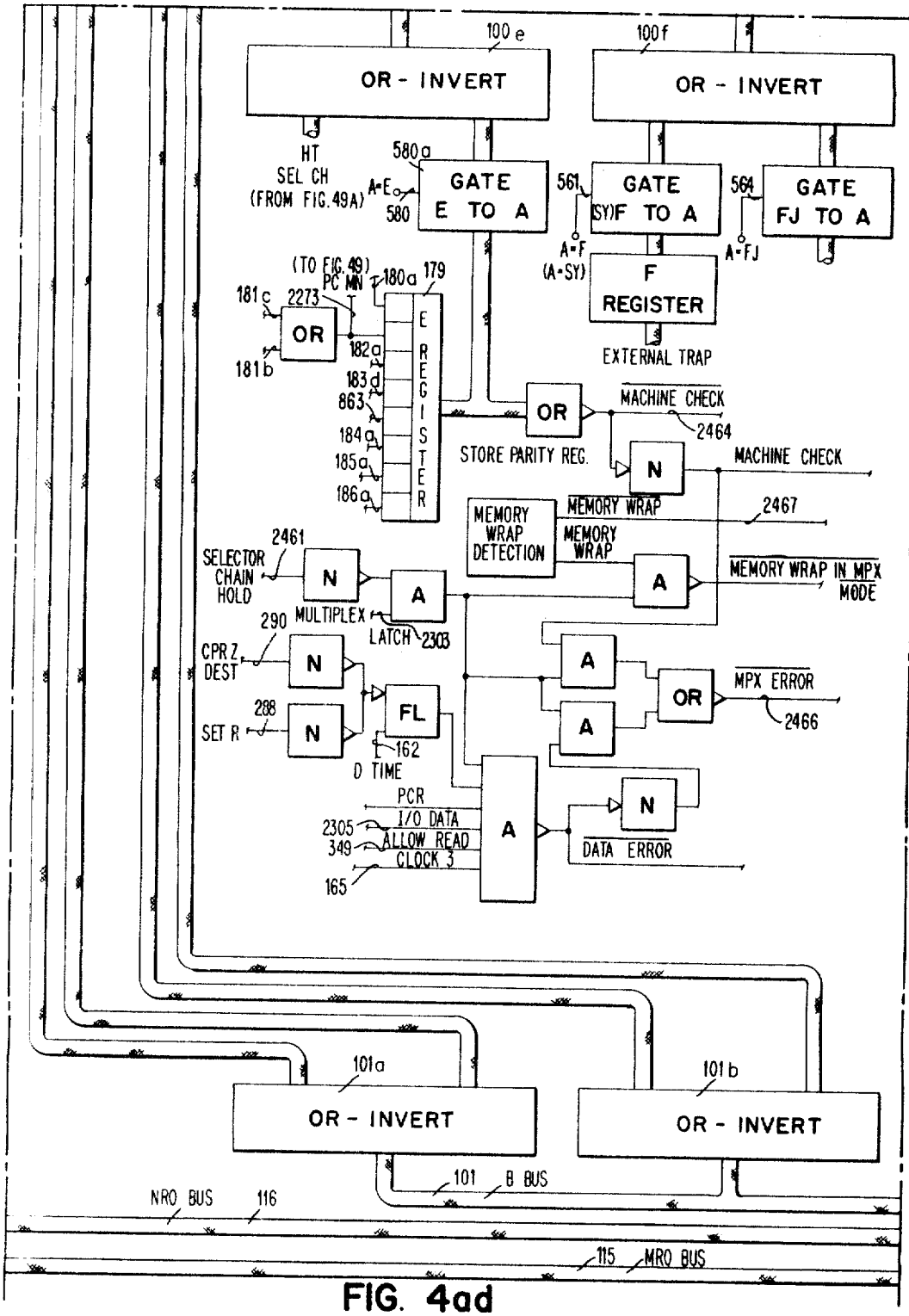
Figure 4A:
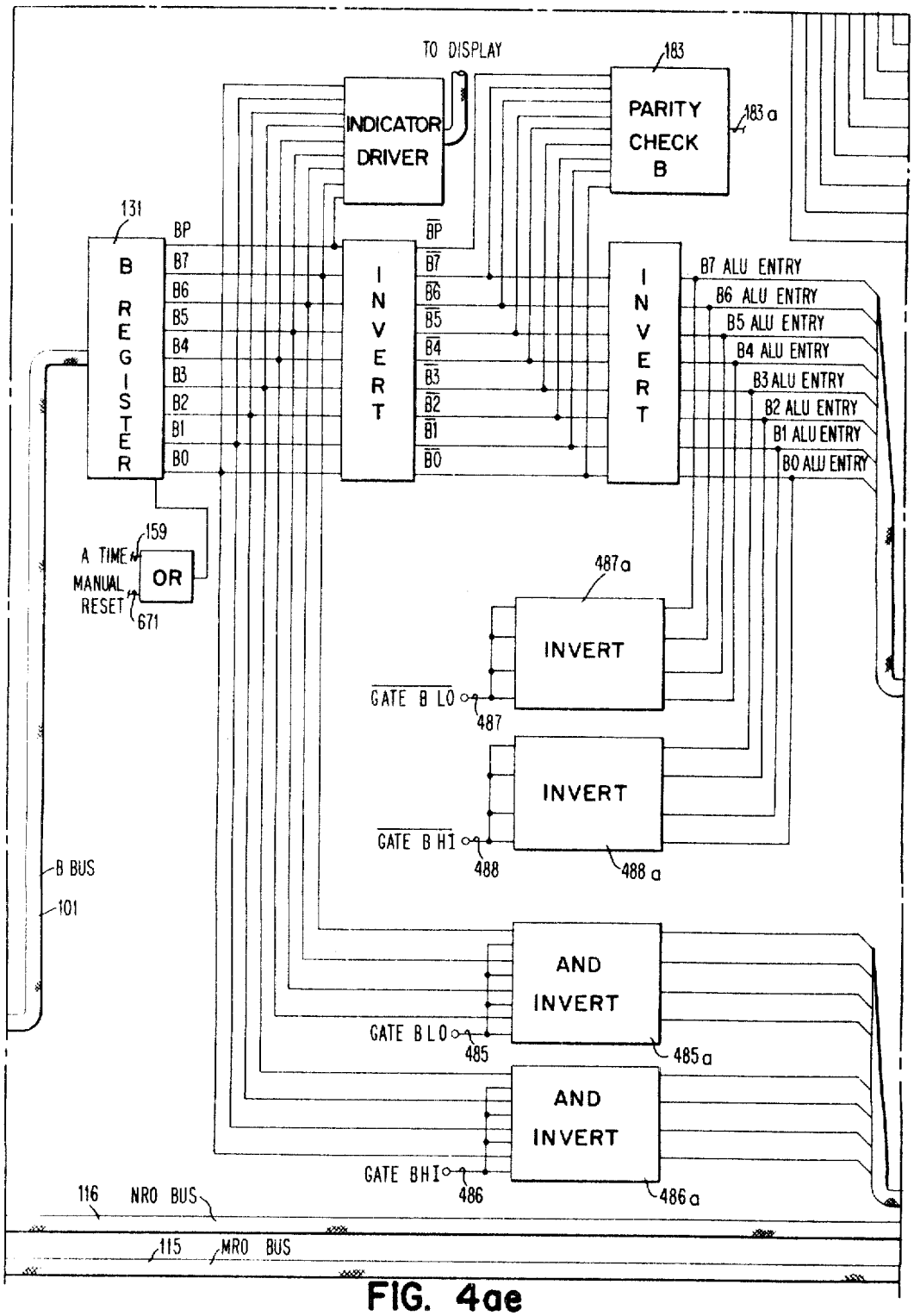
Figure 4A:
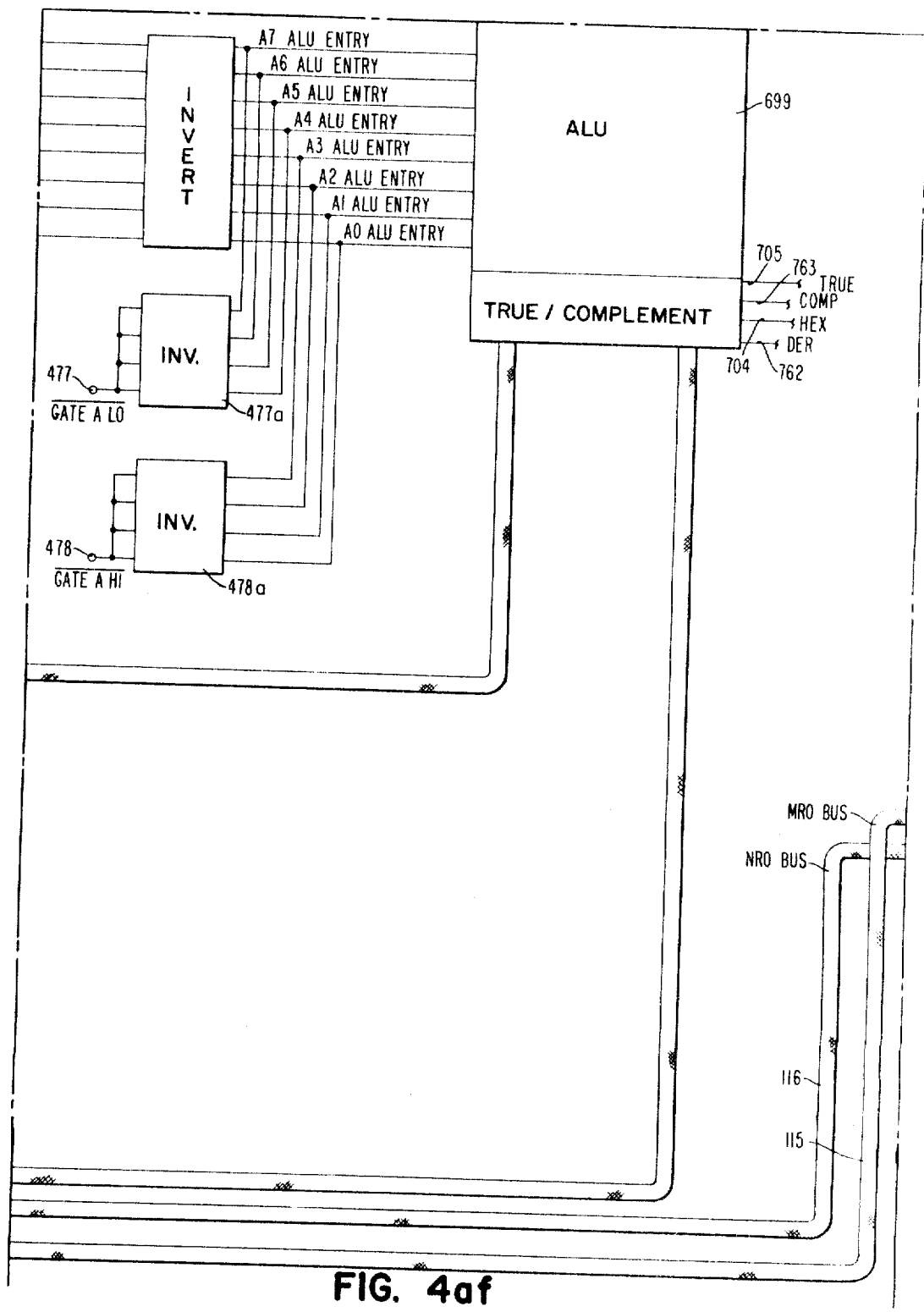
Figure 4A:
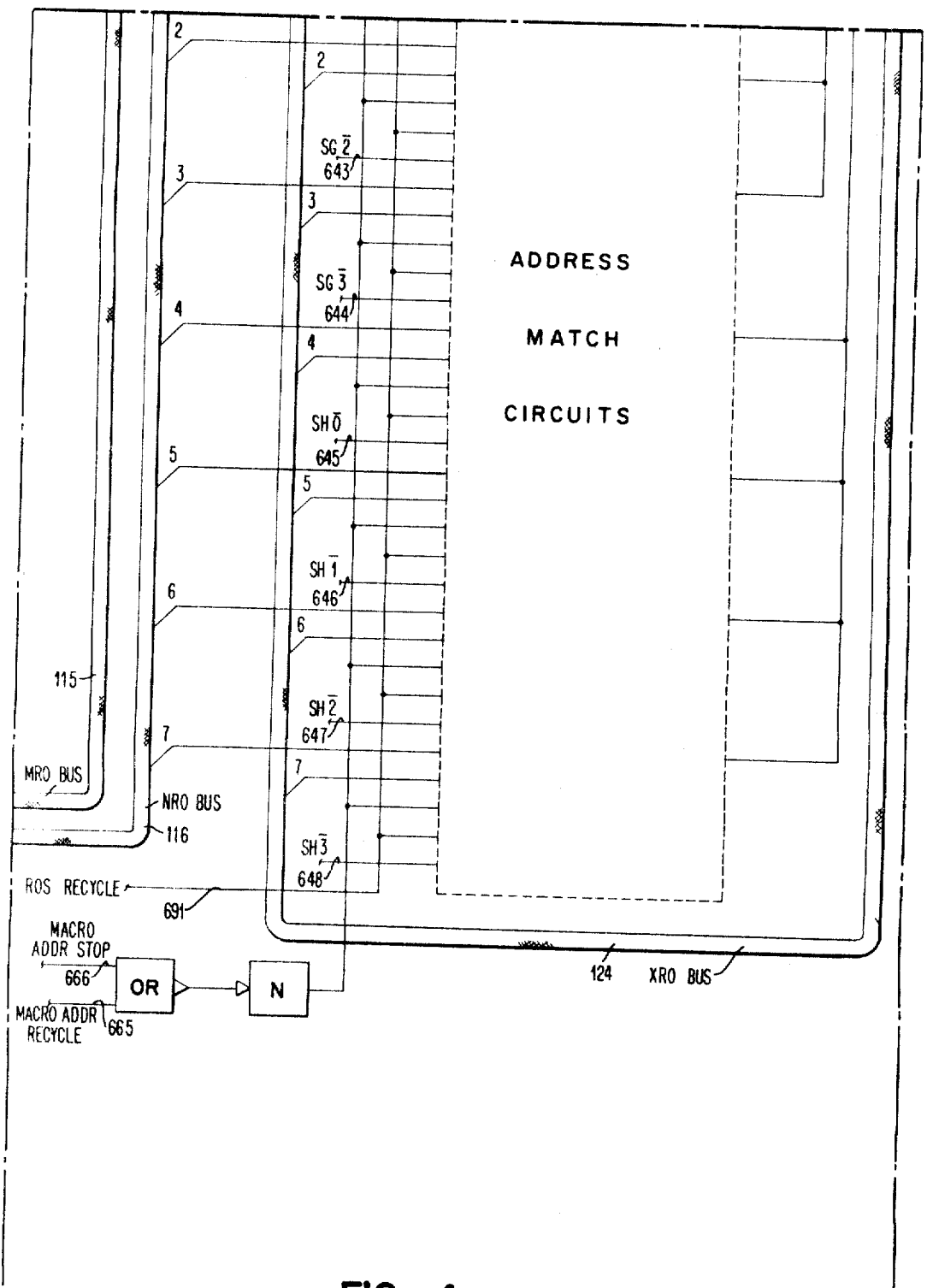
Figure 4A:
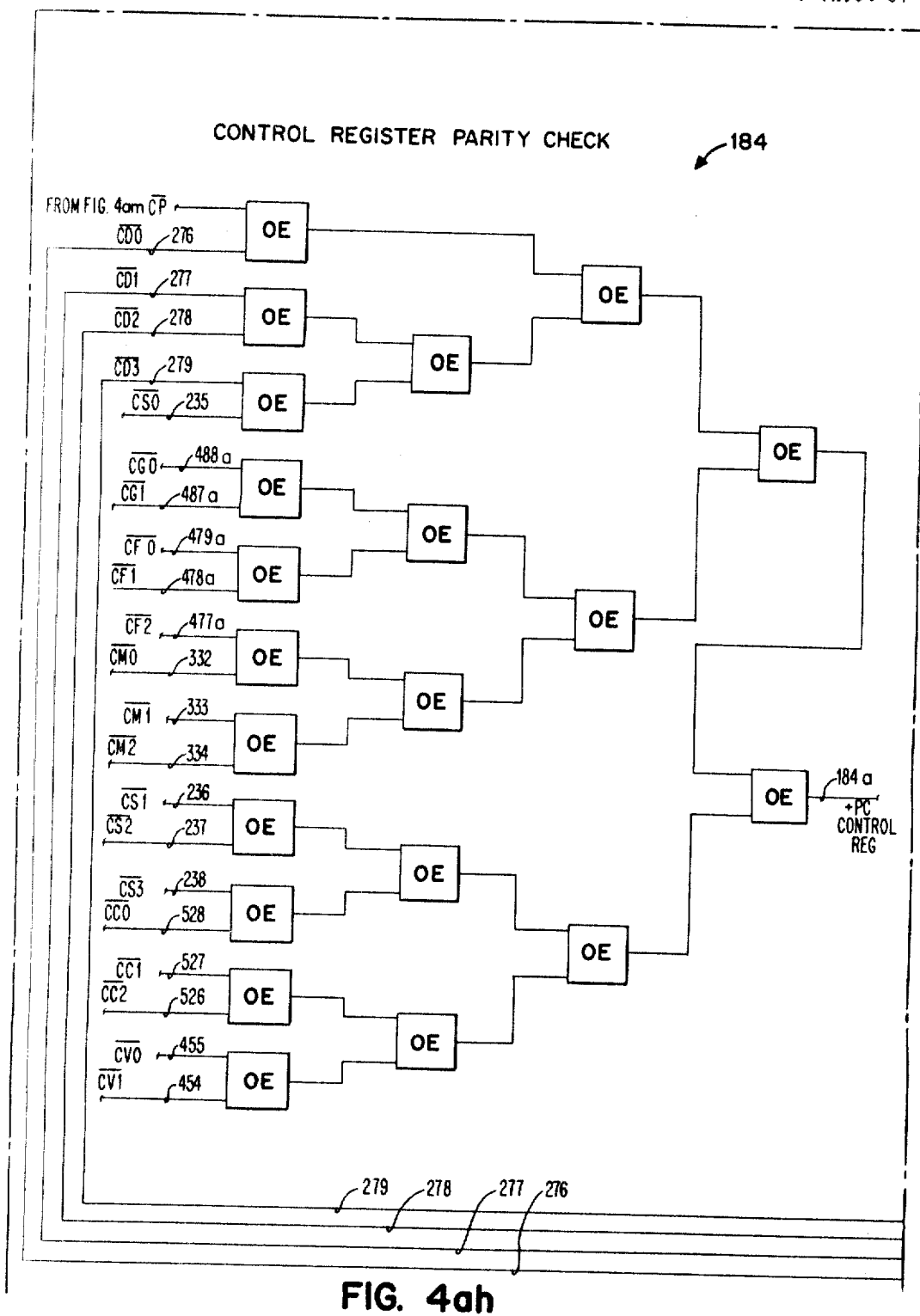
Figure 4A:
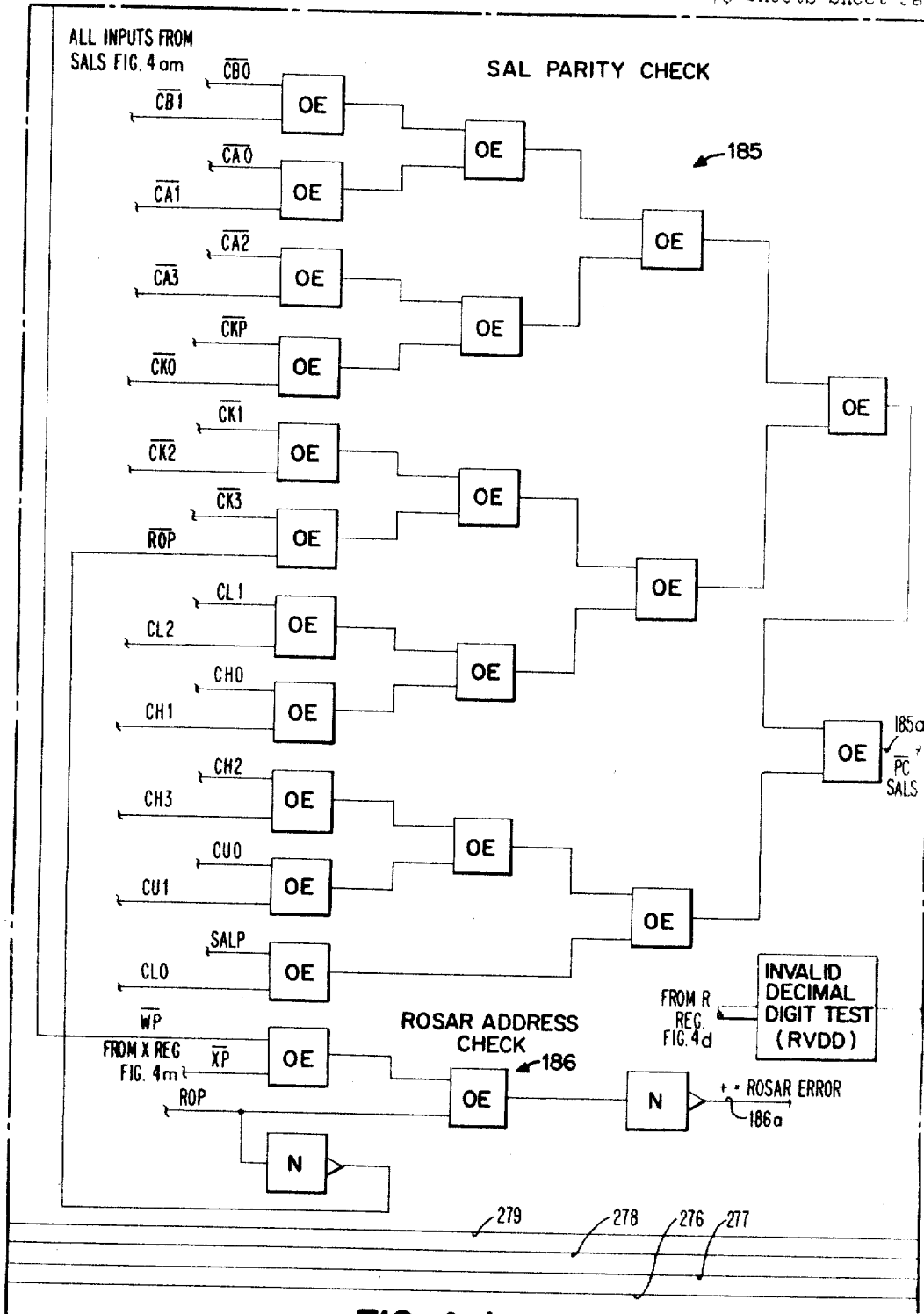
Figure 4A:
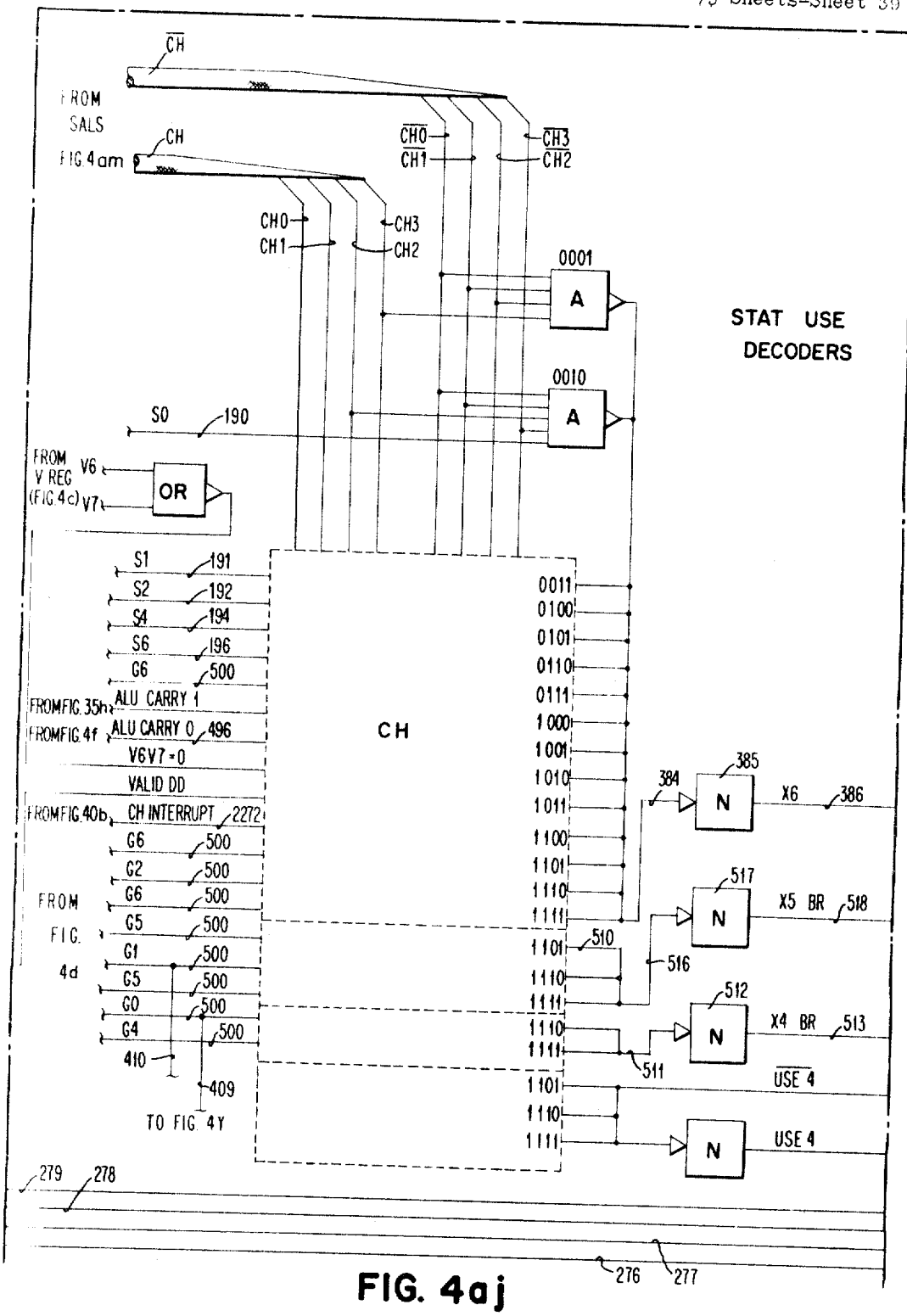
Figure 4A:
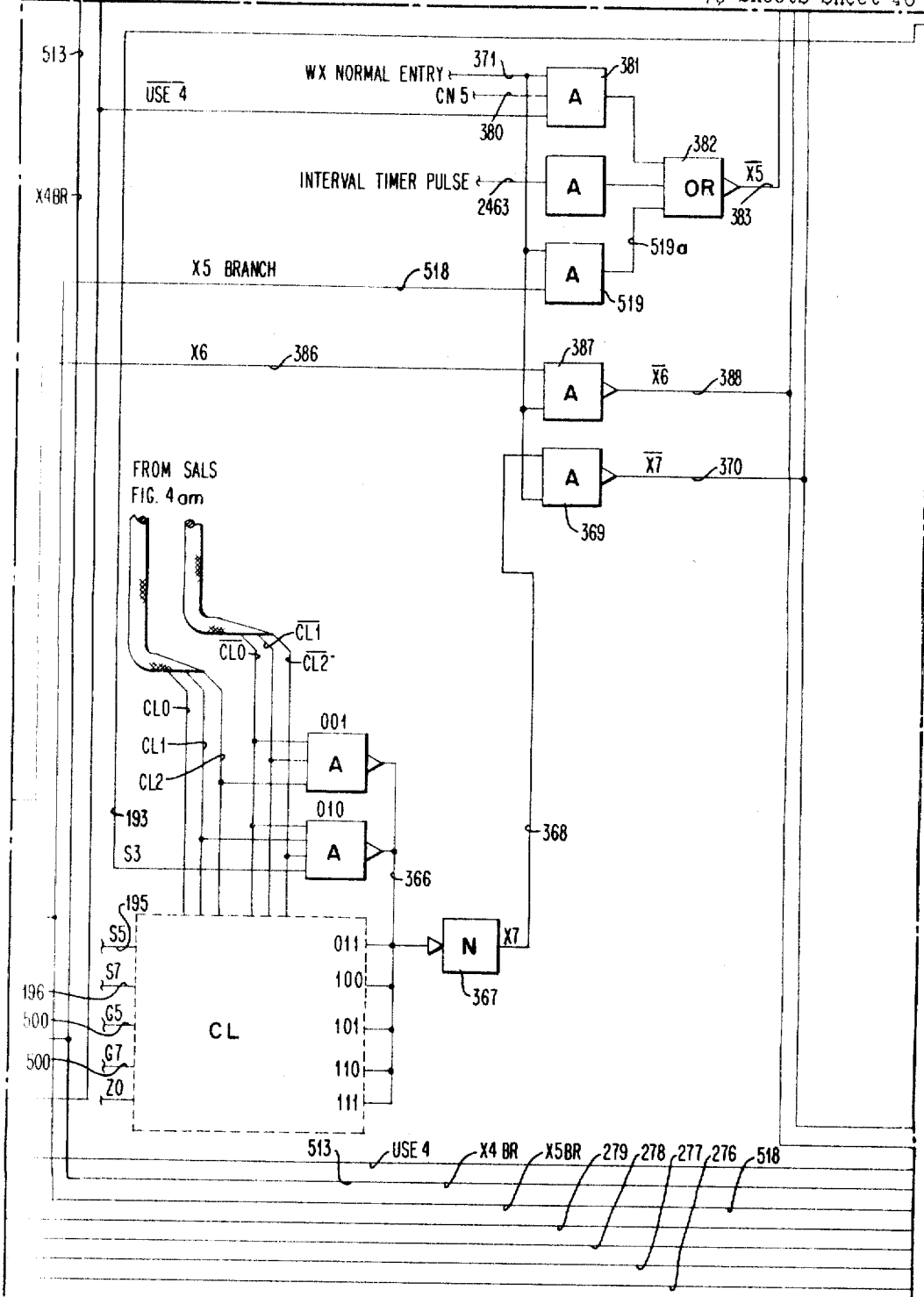
Figure 4A:
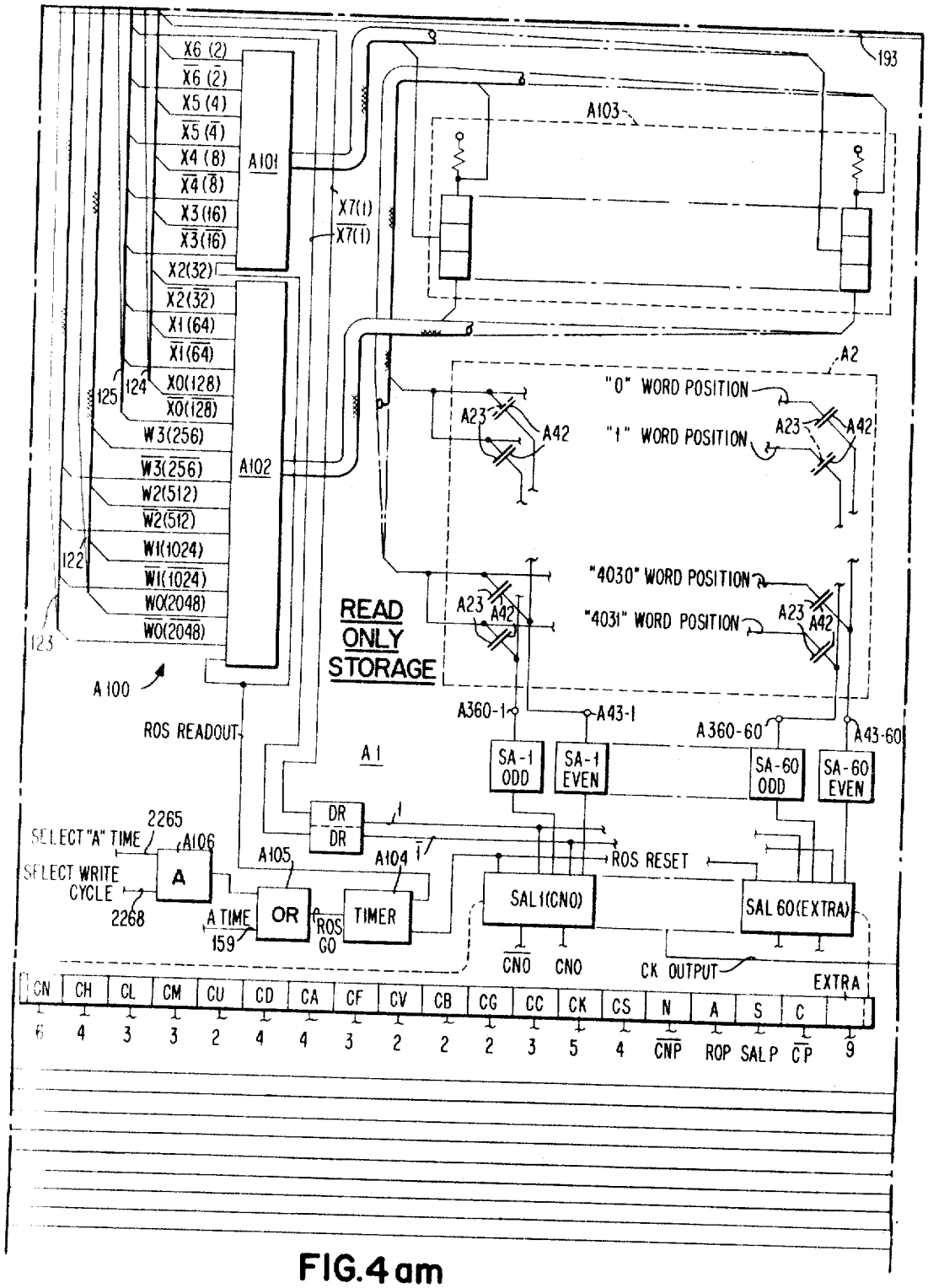
Figure 4A:
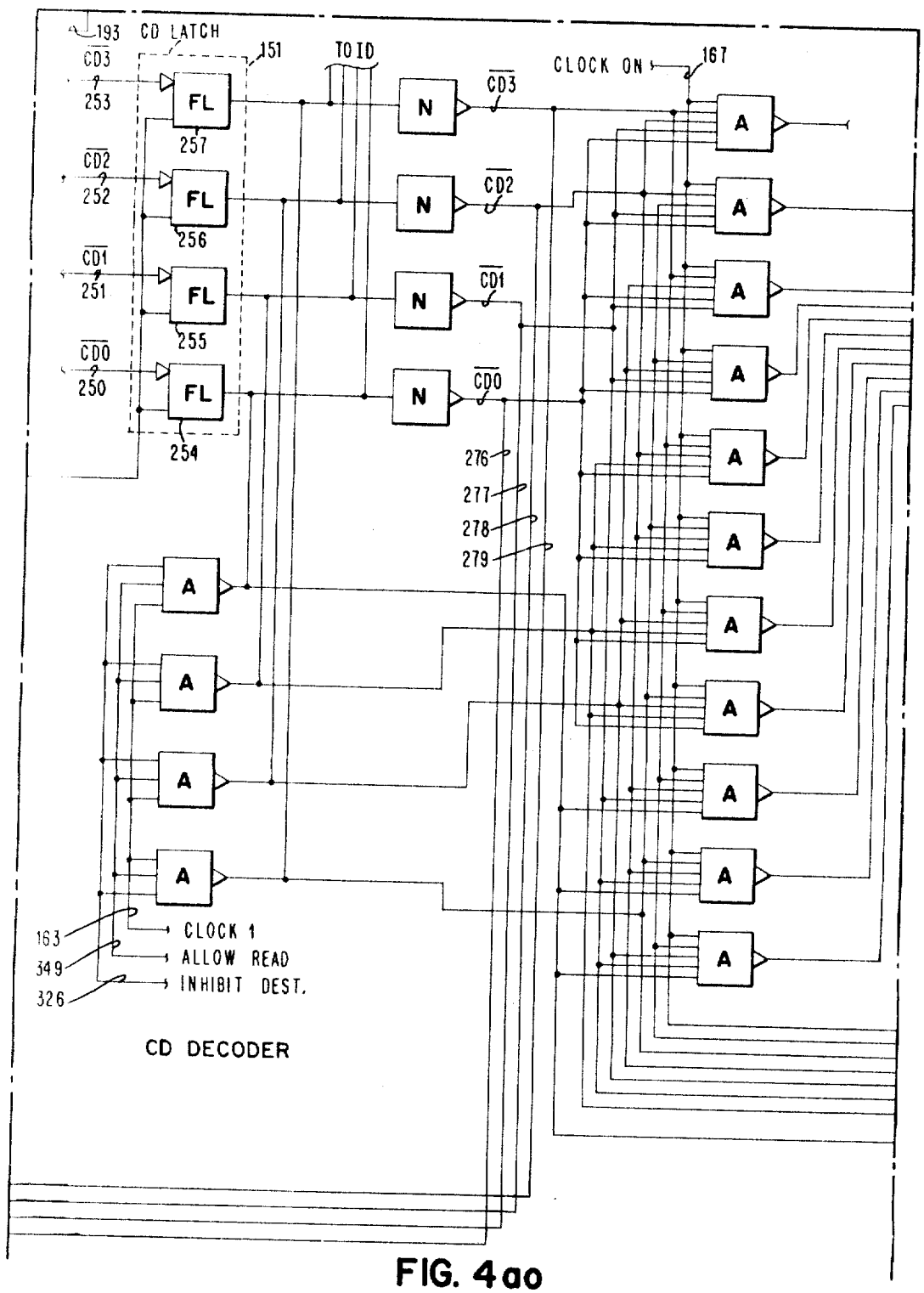
Figure 4A:
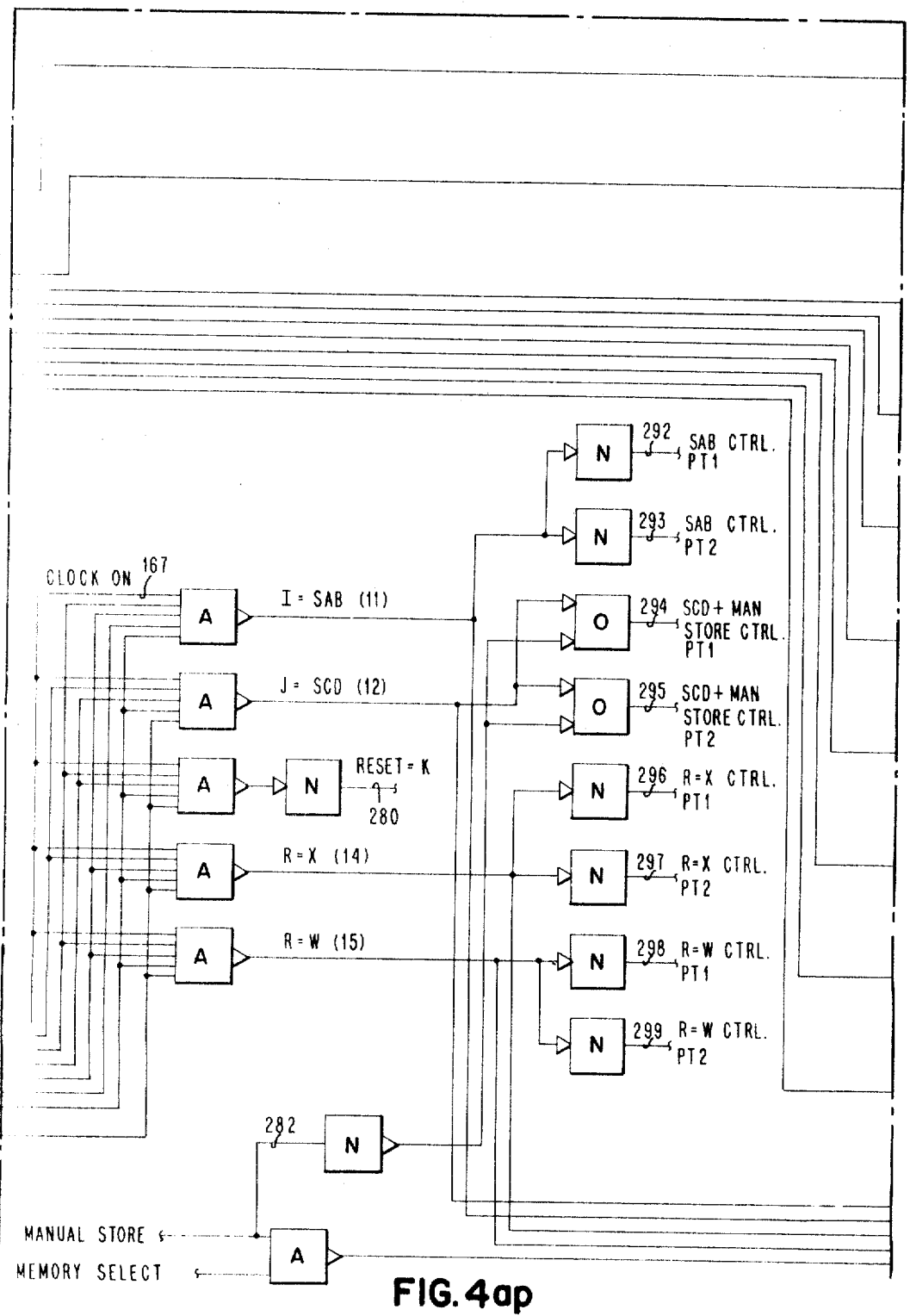
Figure 4A:
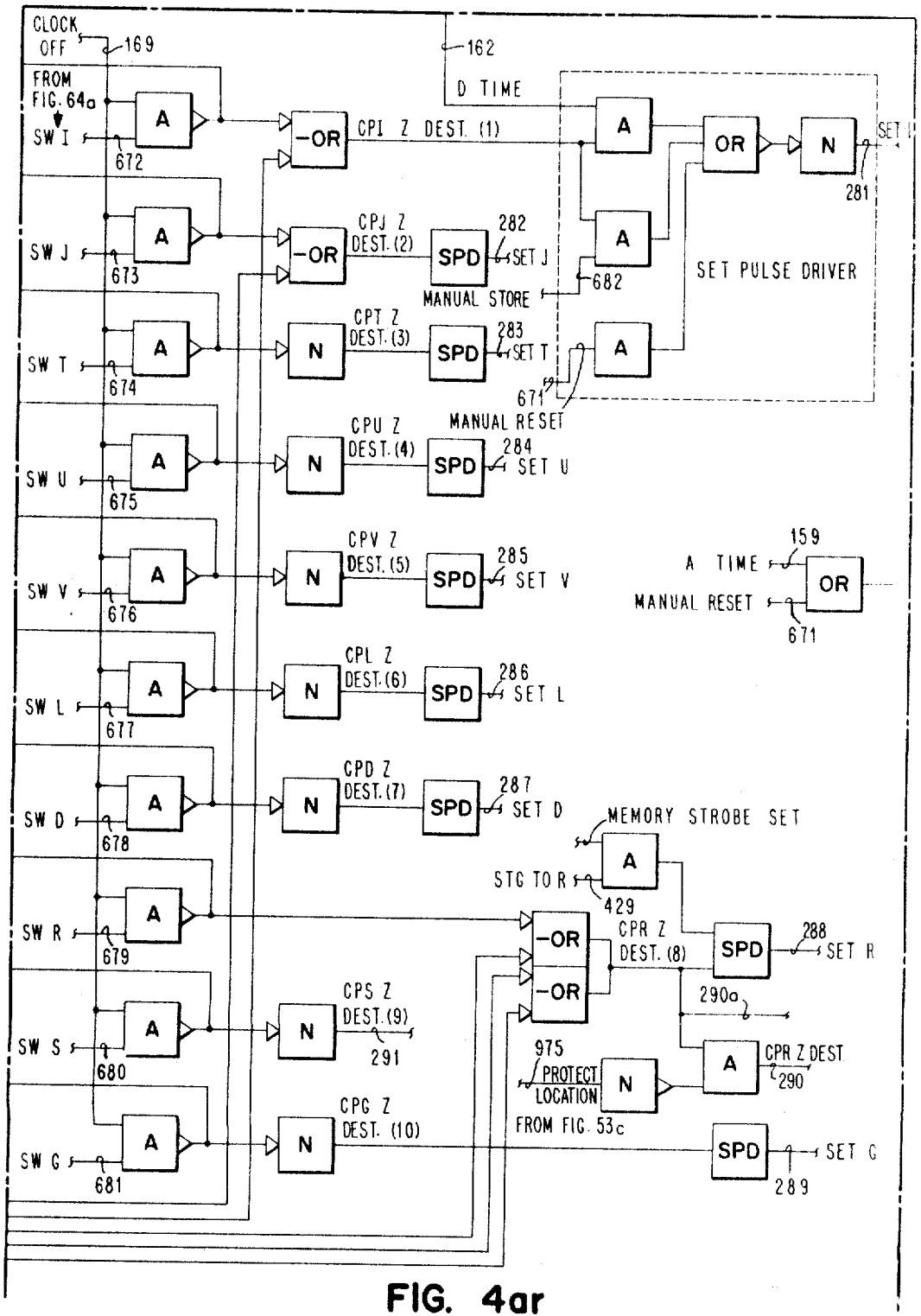
Figure 4A:
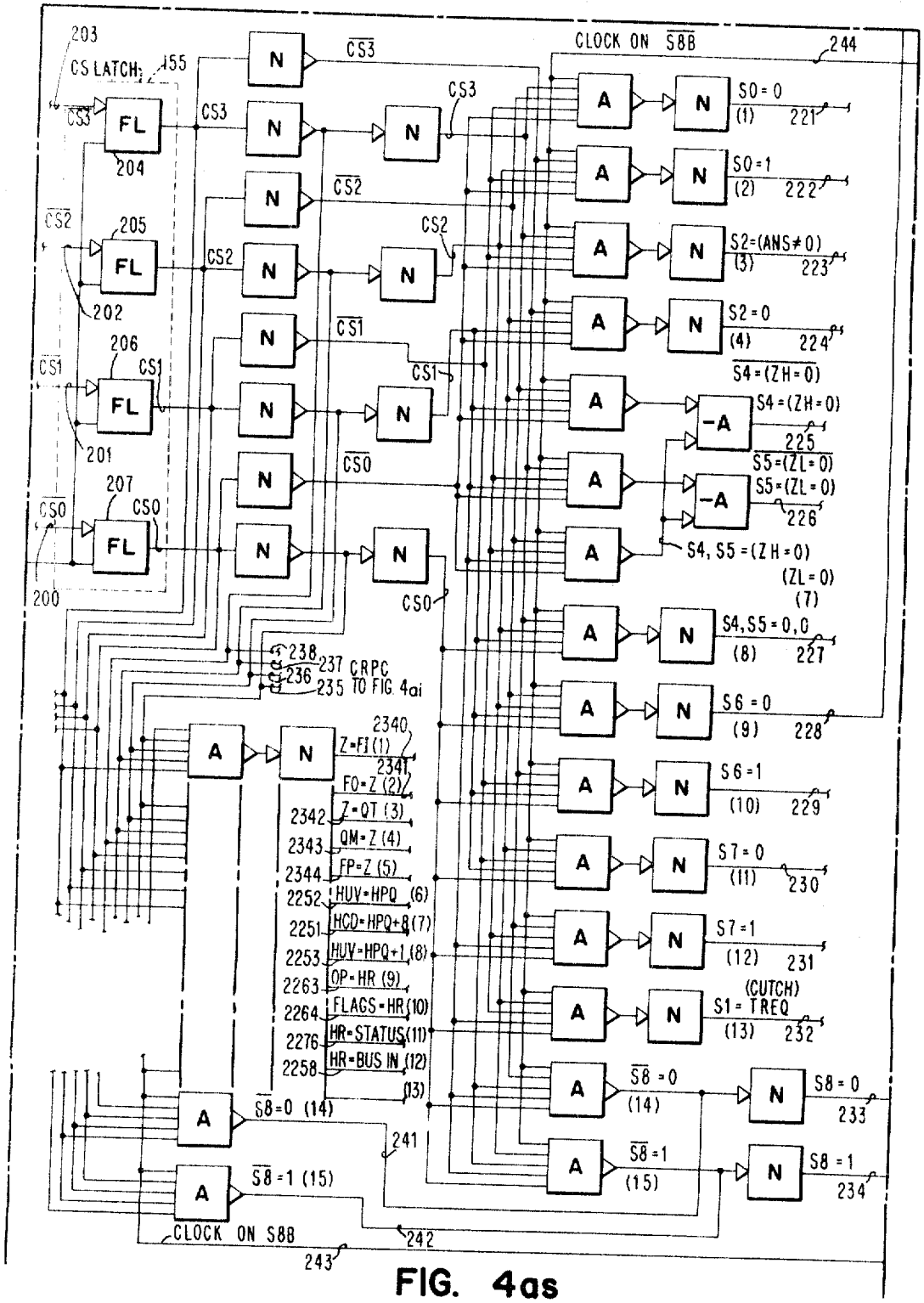
Figure 4A:
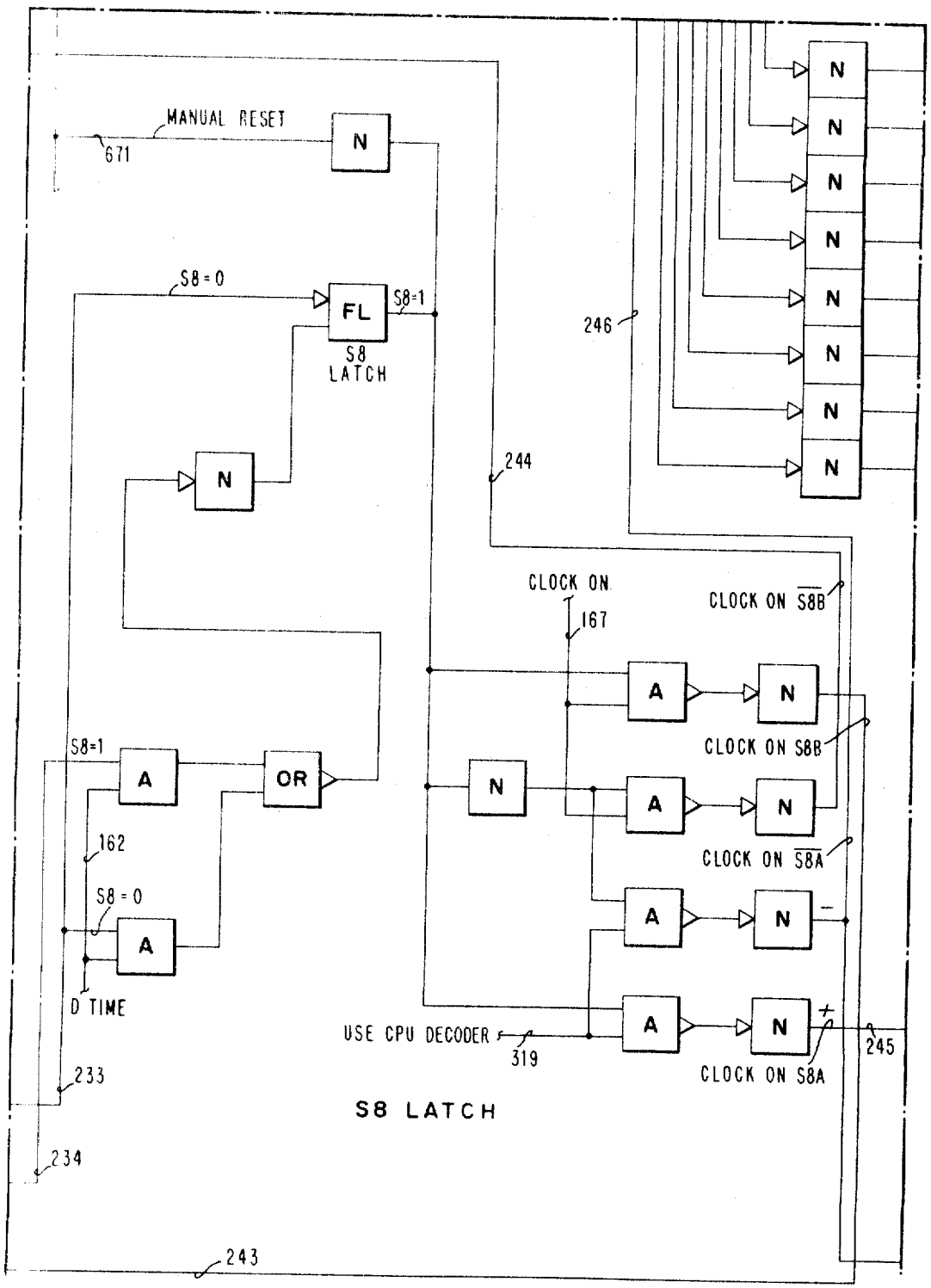
Figure 4A:
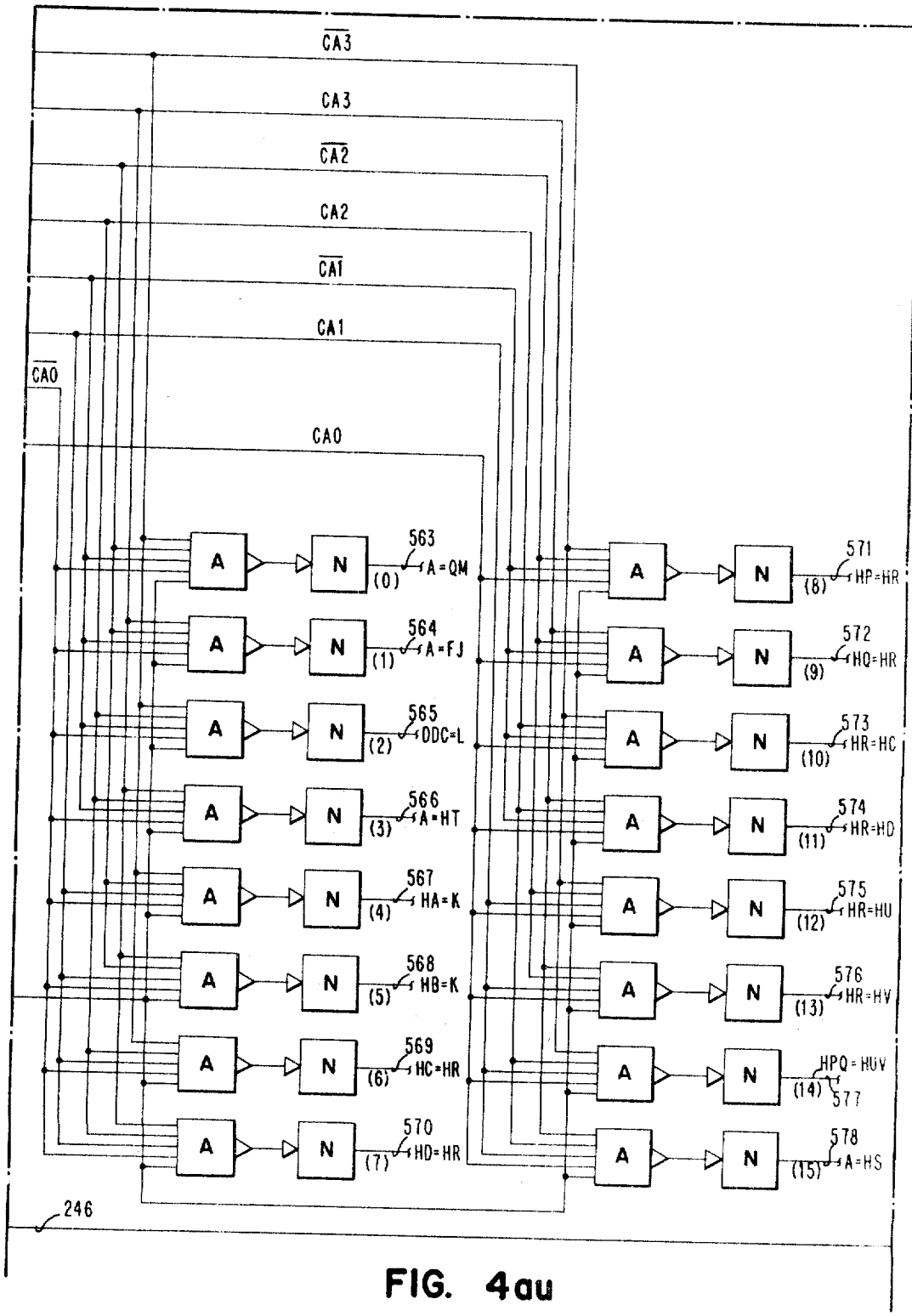
Figure 4A:
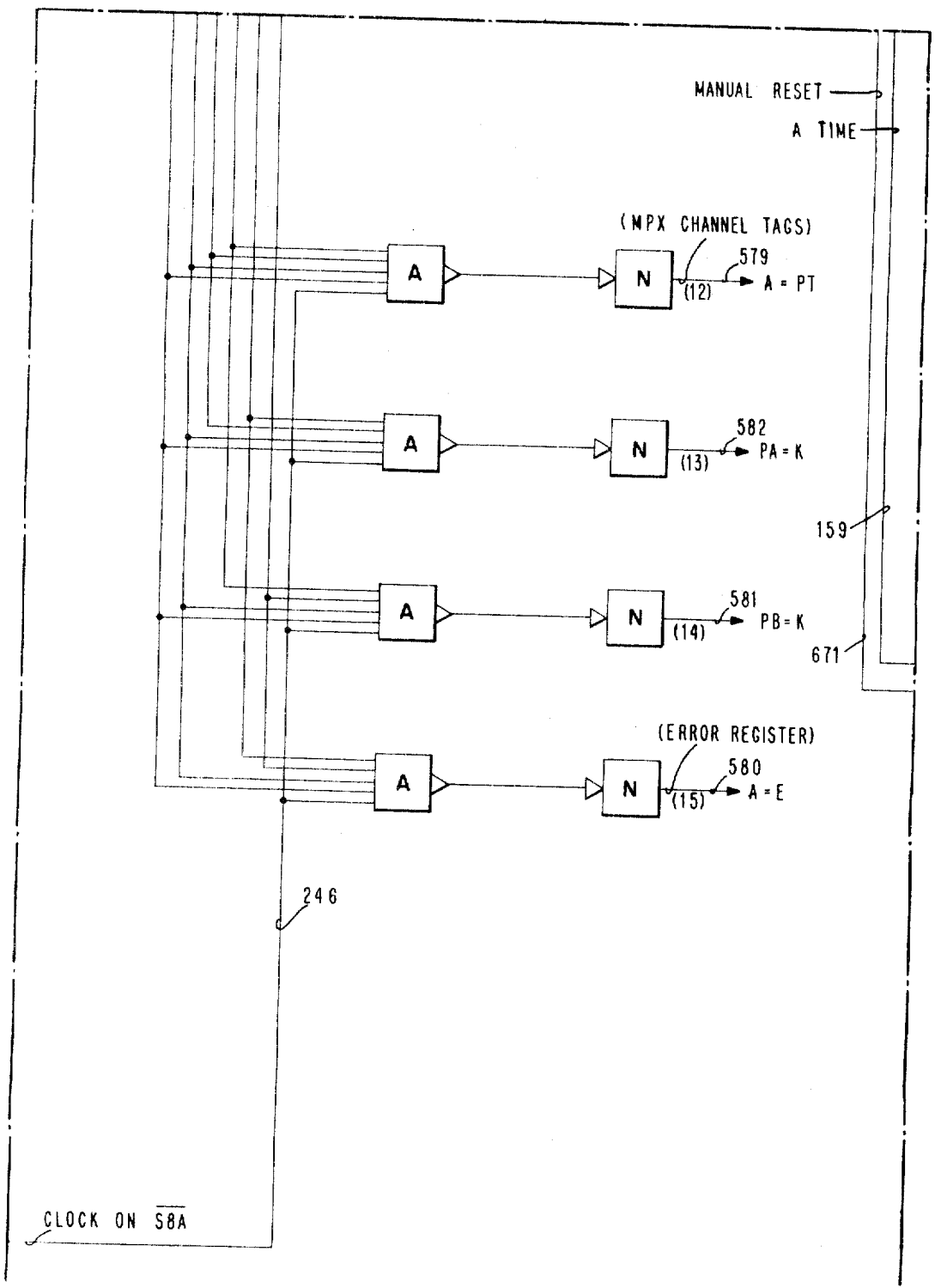
Figure 4A:
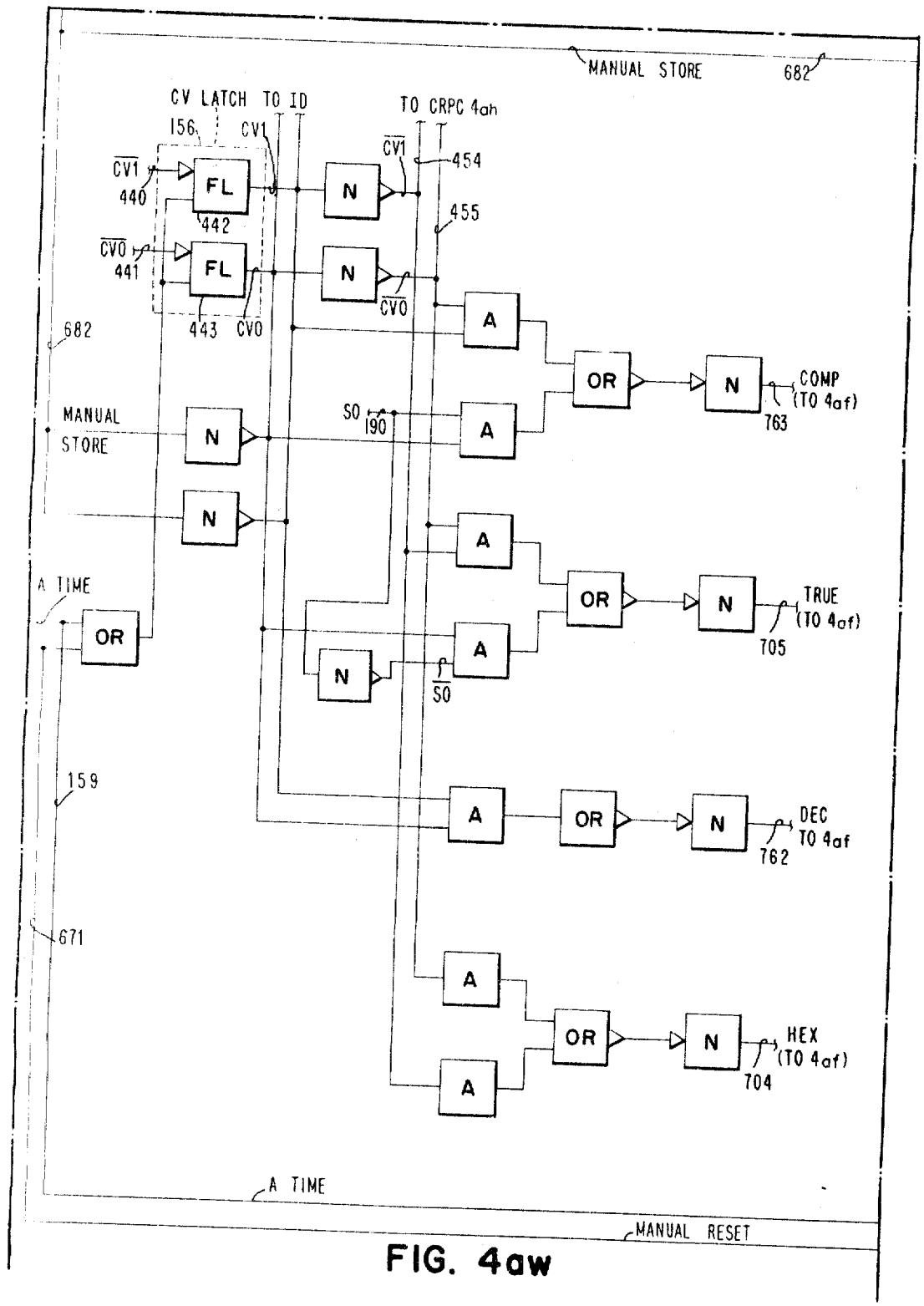
Figure 4A:
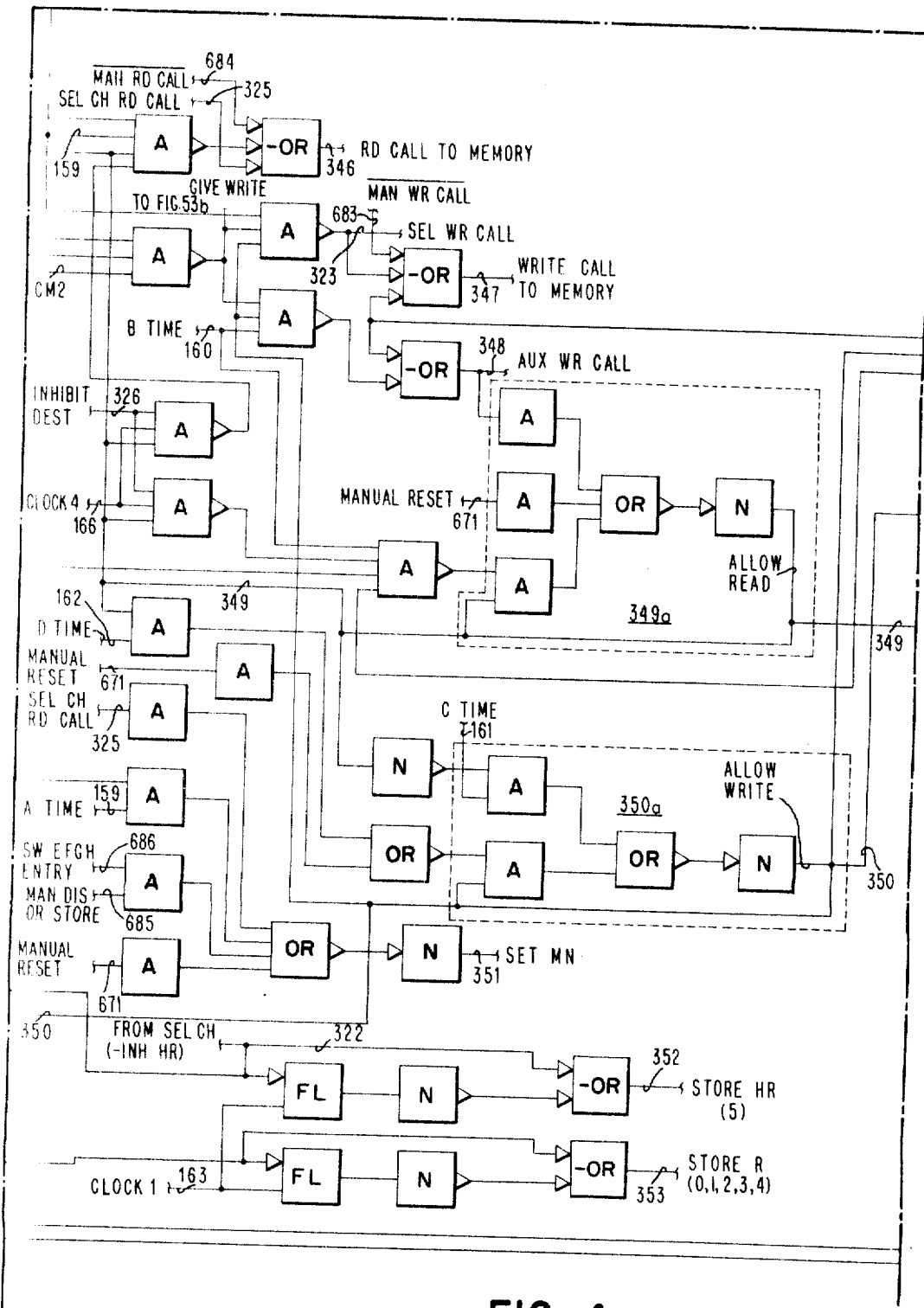
Figure 4A:
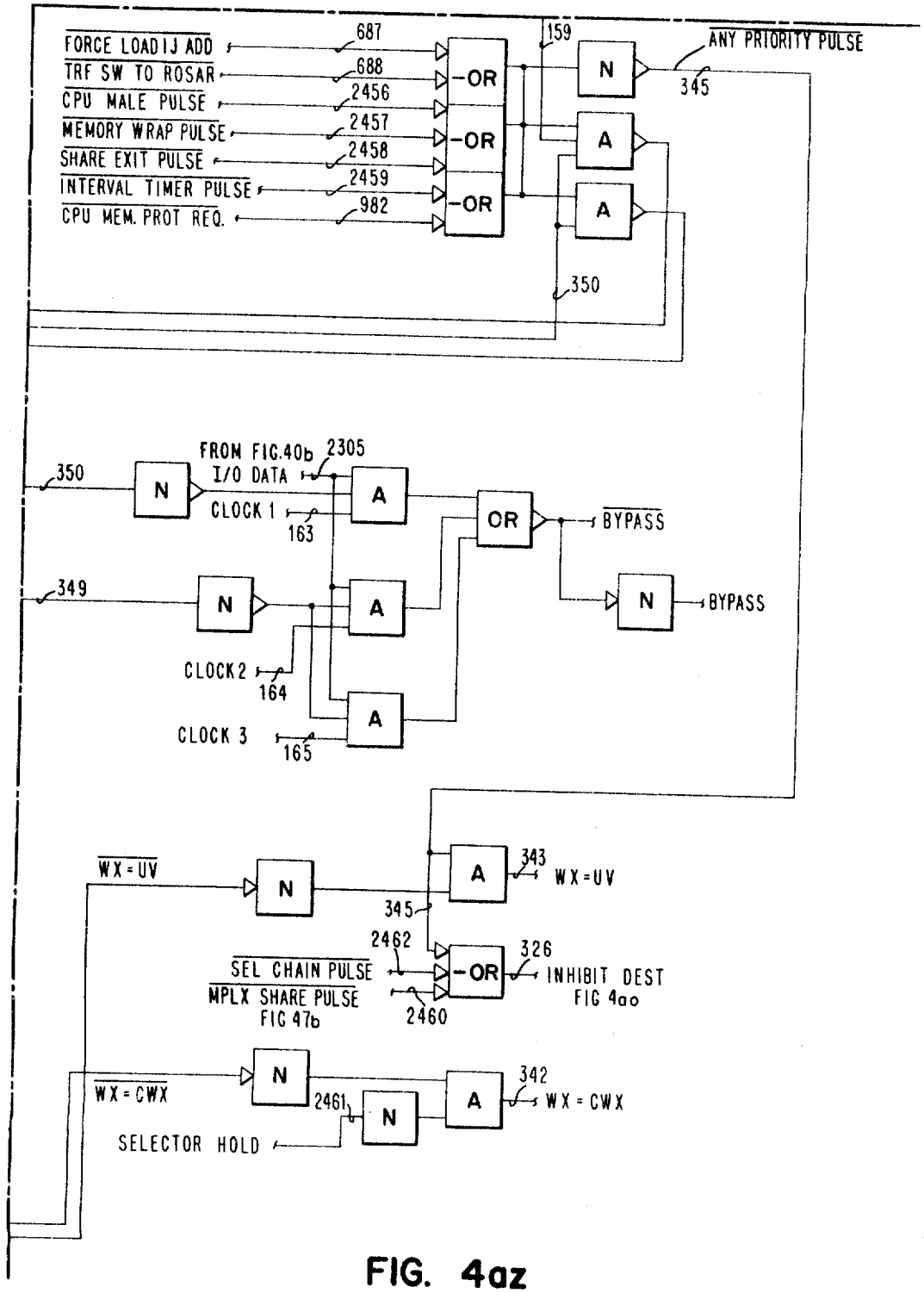

The bit patterns constituting the CF field in the control word are fed into appropriate designated SAL's in FIG. 4*am*, from which signal lines $\overline{CF2}$, $\overline{CF1}$, and $\overline{CF0}$, associated respectively with lines 460, 461 and 462, are connected to the CF control register 152, seen in FIG. 4*x*. This control register is comprised of latches 463, 464 and 465 to which the lines 462, 461 and 460, respectively, are connected. The outputs from these latches are fed into a decoding network to which the following control signals are fed: line 159, designated A Time; line 160, designated B Time; line 671, designated MAN. RST; and line 682, designated MAN. STORE. As a result of these input signals, the CF decoder issues signals that control the high/low and straight/crossed operations to the A entry of the ALU section 699, shown in FIG. 4*f*. These signals and their associated functional designations are, together with their functional designations, as follows: line 477, designated $\overline{GATE\ A\ LO}$; line 477a, designated $\overline{CF2}$; line 478, designated $\overline{GATE\ A\ HI}$; line 478a, designated $\overline{CF1}$; line 479, designated STRAIGHT; line 479a, designated $\overline{CF0}$; line 468, designated GATE A LO; line 469, designated GATE A HI; line 475 designated CROSSED; and line 476, designated CLOCK STOP.

An inspection of Appendix Chart G of the aforementioned application shows the coded combinations and their designated symbols that control the A entries into the ALU section of the system.

The bit pattern constituting the CV field of the control word is fed into appropriate SAL's having the same character designations. Outputs from the latter are applied to a CV control register 156, shown in FIG. 4*aw*. This control has two latches 442 and 443 to which are applied lines 440 and 441 designated CV1 and CV0, respectively, which lines are connected to the CV SAL's in FIG. 4*am*. The outputs from the latches 442 and 443 are connected to a CV decoder network to which also are connected the following lines: line 159, designated A Time; line 671, designated MAN. RST; line 682, designated MAN. STORE; and a line 190, designated SO. As a result of these lines, the CV decoder network provides the following output lines with their associated designations: line 454, designated $\overline{CV1}$; line 455, designated $\overline{CV0}$; line 76, designated COMP; line 705, designated TRUE; line 762, designated DEC; and line 704, designated HEX.

These output lines from the CV field control the true/complement operations as well as the binary and decimal mode of operations in the ALU section, shown in FIGS. 4*f* and 4*af*.

An inspection of the CV field in the Appendix Chart H of the aforementioned application shows the four coded combinations that are employed to control the true/complement binary operations and the true/complement decimal operations. For the true binary operation, coded 0 is employed and any one of the following designations may be used; namely: +, *, V, ∀, and blank. Coded combination 1 controls the binary complement operation and it is designated by a minus symbol. Coded combination 2 controls the binary true/complement latch and it employs a ± symbol. Coded combination 3 controls the decimal true/complement operation and its uses the @ symbol.

The bit pattern constituting the CB field of the control word is directed to the SAL's bearing the same designations shown in FIG. 4*am*. These SAL's have output lines 391, 392, 393 and 394 designated respectively $\overline{CB1}$, $\overline{CB0}$, CB1 and CB0. These lines are connected to a CB decoder network, shown in FIG. 4*z*, which network is also supplied with the A Time signal line 159. The decoder provides four outputs on lines 398, designated B=K; line 399, designated B=L; line 400, designated B=D; and line 401, designated B=R. These designated statements control the transfer of the contents of a K constant and the contents of the CPU registers L, D, R to the B register 131 by way of the B bus 101 shown in FIG. 4*ae*.

An inspection of the CB field in the Appendix Chart I in the aforementioned application indicates four coded combinations; namely, 0, 1, 2 and 3, and their associated symbol designations; namely, K, L, D and R, for controlling the contents of the appropriate register to the B register 131.

The bit pattern constituting the CG field of the control word is issued to the SAL's bearing the same designations, in FIG. 4*am*, having output lines 480 and 481 designated respectively $\overline{CG1}$ and $\overline{CG0}$. These lines are connected to a pair of latches 481 and 482 which comprise the CG control register 153, shown in FIG. 4*x*. The outputs from these latches are fed to the network circuits of the CG decoder. In addition, there are control lines; namely, 159, designated A Time, which provides the timing to the network; and 671 and 682, designated MAN. RST and MAN. STORE, that enable the decoder to provide outputs in response to the operation of the appropriate control switches on the control console.

In response to these input signals, the decoder network provides output control signals that are employed in the high/low switching circuits, shown in FIG. 4*e*, for the B entry to the ALU section 699, shown in FIG. 4*af*. These output lines and their designations are line 485, designated GATE B LO; line 486, designated GATE B HI; line 487, designated $\overline{GATE\ B\ LO}$; line 487a, designated $\overline{CG1}$; line 488, designated $\overline{GATE\ B\ HI}$; and line 488a, designated $\overline{CG0}$.

An inspection of the CG field in the Appendix Chart J of the aforementioned application shows four different coded combinations that control the high/low switching, seen in FIG. 4*ae*, for the B entry to the ALU section. The symbol designations employed are L, H and blank, the L symbol meaning the low four bits of the B entry, and H meaning the high four bits of the B entry.

The bit pattern constituting the CC field of a control word is directed to the SAL's having the same designations shown in FIG. 4*am*. The outputs from the SAL's are directed along lines 490, 491 and 492, respectively designated $\overline{CC0}$, $\overline{CC1}$, and $\overline{CC2}$, to three latches 493, 494 and 495 constituting the CC control register 150, seen in FIG. 4*w*. The outputs from these latches are directed to a decoding circuit network along with the following time signals; namely, 159, designated A Time; 161, designated C Time; 162, designated D Time; and 163, designated CLOCK 1. From the control console, according to the setting of appropriate reset and manual store switches, the lines 671 and 682 connected to the decoder network are activated to provide appropriate output signals at the decoder. The status of the position 3 of the Z bus 102–3 is also connected to the CC decoder network. The output of the carry latch; namely, S3 position of the stat. register, is also directed to the decoder by way of line 193. The carry and no-carry lines; namely, 496 and 497, indicating the condition of the ALU carry out, are also directed to the input of the decoder network. A control line 498, designated Z TO S REG., and the line 174, designated S REG. RST, are also connected to the input of the decoder. In response to these control signals, and the condition of the CC signal lines 490 through 492, the decoder network provides output lines which control all arithmetic functions and logical operations that are performed in the ALU section 699, FIGS. 4$f$ and 4$af$. The output line 524, designated CARRY IN, and the line 525, designated $\overline{\text{CARRY IN}}$, are connected to the ALU section shown in detail in FIG. 35$b$. The set carry-out condition 193$c$ line is connected to the input of position S3 of the status register seen in FIG. 4$p$.

The output lines to the ALU that control all arithmetic and logical functions are connected to a detail of the ALU section shown in FIG. 35$e$. These output lines are 760, designated $\overline{\text{LM}}$; 761, designated $\overline{\text{CONNECT}}$; 765, designated LM; 766, designated CONNECT; 706, designated N; and 764, designated $\overline{\text{N}}$.

An inspection of the Appendix Chart K of the aforementioned application shows eight code combinations 000 to 111, which control carry-in operations to the ALU and the logic functions, AND, OR and EXCLUSIVE OR (XOR).

The bit pattern constituting the CS field of the control word is directed to SAL's bearing the same designation, shown in FIG. 4$am$. The SAL's provide signal lines 200, 201, 202 and 203, respectively designated $\overline{\text{CS0}}$, $\overline{\text{CS1}}$, $\overline{\text{CS2}}$ and $\overline{\text{CS3}}$, which are connected to four latches, seen in FIG. 4$as$; namely, 207, 206, 205 and 204 which comprise the CS control register 155. The outputs from the control register are directed into the CS decoder network. In addition, timing signals designated A Time and MACH. R, respectively, on lines 159 and 671, are connected to the input of the decoder network. In response to these control signals, together with the outputs of the CS control register 155, the decoder network outputs (as further conditioned by a $\overline{\text{COS8B}}$ signal, signifying that the S8 latch is off) provide 16 different signal lines for setting the various positions, S0–S7, of the status register S, shown in FIGS. 4$o$, 4$p$, 4$r$ and 4$s$. These signal lines, together with their statements of function, are: line 221, designated S0=0; line 222, designated S0=1; line 223, designated S2=(ANS.≠0); line 224, designated S2=(0); line 225, designated S4=(ZH=0); line 226, designated S5=(ZL=0); line 227, designated S4, S5=0, 0; line 228, designated S6=0; line 229, designated S6=1; line 230, designated S7=0; line 231, designated S7=1; line 232, designated S1=CLUTCH; line 233, designated S8=0; line 234, designated S8=1; and line 235, designated S4, S5=ZH=0.

An inspection of the CS field in the Appendix Chart L of the aforementioned application shows 16 coded combinations are provided when the S8 latch is off. These combinations designate the control lines (and their statements) for setting all positions (S0 through S7) of the status register, except position S3.

When the status latch S8 is in its on position, the decoder network provides another set of 16 different output lines, twelve of which are concerned with gating data to and from the Z bus to the direct-data channel, the internal timer register, the storage protection register, as well as data transfer to and from the various registers in the selector channel. These twelve output signal lines and their designations, developed while the status latch S8 is on, are: line 2340, designated Z=FI; line 2341, designated FO=Z; line 2341, designated Z=QT; line 2343, designated QM=Z; line 2344, designated FP=Z; line 2252, designated HUV=HPQ; line 2251, designated HCD=HPQ+8; line 2253, designated HUV=HPQ+1; line 2263, designated OP=HR; line 2264, designated FLAGS=HR; line 2276, designated HR=STATUS; and line 2258, designated HR=BUS IN. Two other output lines; namely, S8=1 and S8=0, are used to set the S8 latch (in FIG. 4$at$) on and off, respectively. An inspection of the Appendix Chart L of the aforementioned application shows the different code combinations including statements and their meanings that are used while the S8 latch is in its on state.

The bit pattern constituting the K field in the control word is fed to the SAL's, FIG. 4$am$, from which outputs are directed by way of the K bus to a decoder K block 595 which contains five drivers generally of the type described in connection with FIG. 12. The output lines from the decoder block 595 are transmitter on five output lines designated K$p$, K0, K1, K2 and K3, which lines constitute what is known as the K bus which leads to various gates distributed throughout the system. One gate is identified as the K TO B gate which transmits a K constant to the B register 131, shown in FIG. 4$ae$. The K TO B gate is identified as 398$a$, having a control line 398 designated B=K, shown in FIG. 4$d$.

As previously described, a K constant may also be gated to the M and N registers 137 and 138, respectively, shown in FIGS. 4$a$ and 4$ab$, by means of the K TO N gate 339$a$, as seen in FIG. 4$ac$, under the control of a signal designated MN=K.

A K constant may also be directed to the multiplex controls, particularly to the PA and PB registers, respectively, under control of gate signals designated PA=K and PB=K. The K constant may also be directed to the W register 144, shown in FIG. 4$i$, in the manner previously described, by means of the gate designated GATE W NORMAL, shown in FIG. 4$j$.

In addition, a K constant may also be directed to the selector channel to registers HA and HB under control of gates having control lines designated HA=K and HB=K.

An inspection of the CA field in the Appendix Chart H of the aforementioned application shows the particular code combinations employed for directing the K field to the multiplex and the selector channels.

MICRO-INSTRUCTION BLOCK

Introduction

Now to be explained are the detailed statements and symbols constituting the micro-program shown distributed throughout all of the drawings "generally designated" FIG. 5 in the said aforementioned application Serial No. 357,372. As a preliminary to an explanation of these statements, let us first consider how to find any of FIGS. 5$xa$1, 5$xa$2 and 5$xa$3, for example, among all such FIGS. 5, which we will assume are related to a specific macro-instruction. For example, with regard to these particular three drawings of FIG. 5, as exemplary only, each individual micro-program block thereon is readily identified among said FIGS. 5, since a set of coordinates Y, Y$_1$ are provided for all such figures, with Y designating the columnar coordinate and Y$_1$ the row coordinate. Later, in the explanation of the charts, such as E1, for example, the manner in which these three figures, FIGS. 5$xa$1, 5$xa$2 and 5$xa$3, are represented combinatorially in certain pages of the Appendix will be set forth.

Figure 3:
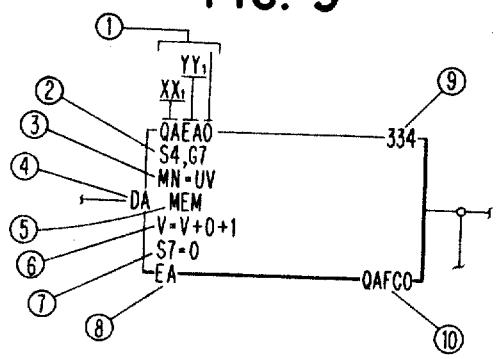
FIG. 3 is a block symbolic representation of a single micro-instruction word with accompanying explanatory symbols indicating the operations performed thereby.

Now refer to the micro-instruction word block, illustrated in FIG. 3.

Description

With regard to FIG. 3, the following statements are made with regard to the encircled numerals 1 to 10, inclusive.

(1) *Specifies location of the micro-instruction.* Reading from left to right, the first two alphabetic characters (for convenience, these are noted as $XX_1$) identify the page number; i.e., group of three or less FIG. 5's (see upper left corner of each FIG. 5).

The next two characters, Y and $Y_1$, respectively (third and fourth), to the right denote the coordinate location of the instruction block. This third character (Y) denotes the column coordinate, each column being identified by one of the alphabetic characters A–K (not counting I). This fourth character ($Y_1$) denotes the row coordinate, the rows being identified by alphabetic characters A–L (not counting I).

The fifth designation ("0" in FIG. 3) is a branch code which may specify one, of up to 16 possible, branch conditions. When this designation is "0," the exact coordinate location of the block is specified by Y and $Y_1$. When other than "0," the exact coordinate location is specified by the information indicated in FIG. 3 by the encircled numeral 8.

(In case of an exception to the above rules, an appropriate footnote is placed on the drawings to specify the proper location.)

Under some conditions, a block may contain only location data, in which condition the specification relating to the location of the next micro-instruction word appears within the block rather than in the position designated by the encircled numeral 10.

(2) *Specifies branching conditions* in accordance with the various coded combinations containing in ROS fields CH and CL, FIG. 4*am* (reference is invited to Appendix Charts A and B of the aforementioned application for coding details and statements employed). Field CH determines the settings, for positions 4, 5, 6 of the X register, in FIG. 4*m*. Field CL determines the settings of position 7, of the same X register.

(3) *Specifies main storage access controls,* under control of field CM, FIG. 4*am*, for reading and writing operations (refer to Appendix Chart C of the aforementioned application for the various codes and statements employed).

(4) *Defines the coordinates, of the preceding block.*

(5) *Specifies access,* under control of field CU, to and from various defined areas of the Main Memory (reference is invited to Appendix Chart D of the aforementioned application for the codes and statements employed).

(6) *Specifies an arithmetic statement which has the following format:*

| | 2 | = | 3 | 4 | 5 | 6 | 7 |

Block 1 above specifies the destination for data on the Z bus.

Block 2 specifies ALU carry-out controls (CC decoder).

Block 3 specifies data input to the ALU via the A register, also X, H and L controls.

Block 4 specifies the various arithmetic operations and logic functions of the ALU.

Block 5 specifies data input to the ALU via the B register including H and L controls.

Block 6 specifies some of the operations defined by block 4.

Block 7 specifies carry-in controls to the ALU section (details of indented items, blocks 1–7, are explained subsequent to an explanation below of encircled numeral 10.

(7) *Specifies status conditions,* defined by Status Register S, shown in FIGS. 4*o*, 4*p*, 4*r* and 4*s*. The positions S0 to S7 of this register are set to their respective conditions by means of various coded combinations, shown in Appendix Chart L of the aforementioned application.

(8) *Specifies the precise coordinate locations of the block.*

(9) *Defines the address (in hexadecimal notation) of the instant micro-instruction.* This address is found in the ROSAR (Read-Only Storage Address Register) comprising the W and X registers, shown in FIGS. 4*i* and 4*m*, respectively.

(10) *Defines, in the manner explained under item 1 above, the location of the next micro-instruction block.*

*Detailed explanation of arithmetic statement*

[See paragraph 6 above]

| 1 | 2 | = | 3 | 4 | 5 | 6 | 7 |

The numerals surrounded by blocks have the following characteristics:

Block 1 contains one of the following characters which designates a destination for data on the Z bus:

| | |
|---|---|
| Z—No Destination | L—Register |
| I—Register | D—Register |
| J—Register | R—Register |
| T—Register | S—Register |
| U—Register | G—Register |
| V—Register | |

Destination codes are explained in Appendix Chart E of the aforementioned application.

Block 2 specifies the following ALU carry-out controls:

Transfer the ALU carry-out to the carry latch (S3).
Ignore ALU carry-out if Block 2 is blank.

Refer to Appendix Chart K of the aforementioned application for the codes employed.

Block 3 contains one of the following characters which designates a source for and controls (see below) of the A input to the ALU, via the A bus and the A register.

*Source*

| | |
|---|---|
| I—Register | R—Register |
| J—Register | S—Register |
| T—Register | G—Register |
| U—Register | F—(External Trap) |
| V—Register | PI—(MPX Bus) |
| L—Register | PT—(MPX Tags) |
| D—Register | E—Register |

Appendix Chart F of the aforementioned application shows the various codes employed.

*Controls*

X—Transpose the low-order 4 bits with the high-order 4 bits.
H—Admit only the high-order 4 bits to the ALU.
L—Admit only the low-order 4 bits to the ALU.
(Blank)—Admit all bits (straight). (See Appendix Chart G of the aforementioned application.)

Block 4 specifies one of the following operation symbols for ALU control:

+   Binary add, true
−   Binary add, complement
±   Binary add under control of true/complement latch (S0)
@   Decimal add under control of true/complement latch
\*   AND
\*−   AND (complement the ALU B input)
V or 1   OR
V- or 1-   OR (complement the ALU B input)
∀   Exclusive OR
∀−   Exclusive OR (complement the ALU B input)

For arithmetic operations, the Appendix Chart K of the aforementioned application is used. When logic functions are stated, Appendix Charts H and K of the aforementioned application are used; and for each logic function, the CV specification is 00.

*Block 5* specifies one of the following characters which defines a source or controls (see below) of the B input to the ALU via the B bus and the B register:

Source

| | |
|---|---|
| L—Register | R—Register |
| D—Register | K—Field [1] |

[1] When the K field is specified, the K is followed by a constant expressed in decimal form. The constant will enter both the high- and low-order 4 bits of the B register. Thus, K11 will result in the entry of a "literal"; namely, 1011 1011 into the B register. In order to expand the constant from a 4-bit field to a 5-bit field, the parity bit line is employed into which is introduced a "0" or a "1" signal, as indicated by means of the following expression: K11 I/O. After the literal (11), a comma, followed by a "1," indicates a 5-bit K field, in which the low order thereof is a "1." When the comma is followed by a "0," the low order is a "0."

Controls

H—Admit only the high-order 4 bits to the ALU.
L—Admit only the low-order 4 bits to the ALU.
(Blank)—Admit all bits.

*Block 6* employs the same symbols used in Block 4 when a symbol is specified for Block 6.

*Block 7* defines one of the following characters for ALU carry-in control:

1—Carry in 1
C—Gate the output of the carry latch (S3) to the ALU carry input

When Block 7 specifies a symbol, Block 6 will also specify a symbol.

If Blocks 6 and 7 are both blank, there will be no carry input to the ALU.

SPECIAL STATEMENTS

I=SAB  Place the contents of console switches A and B in the I register.
J=SCD  Place the contents of console switches C and D in the J register.
RESET=K  Reset machine latches specified by the K field.
R=X  Place the contents of the X register in the R register.
R=W  Place the contents of the W register in bits 4–7 of the R register.
PA=K  Place the contents of the K field in the multiplex channel PA register.
PB=K  Place the contents of the K field in the multiplex channel control PB register.

VARIATIONS OF THE BASIC ARITHMETIC STATEMENT (1) *Blocks 6 and 7* may be omitted.
(2) *Block 5* may be blank. This indicates that the output from the B register to the ALU will be clamped off, although the K field will enter the B register.
(3) *Block 4* may be omitted. When omitted, *Block 5* must also be omitted although *Blocks 6 and 7* may be present.
(4) *Block 2* may be omitted.

BASIC I CYCLE OPERATIONS

The various steps employed in processing an operation specified by a particular macro-instruction is carried out under two basic operations; namely, Operation I and Operation II.

*Operation I* is assigned the function of fetching the macro-instruction from the Main Memory and placing the various fields of the macro-instruction into designated registers of the CPU, and computing, in some cases, an effective address for one of two specified operands.

All such steps carried out under Operation I are designated I (Instruction) cycles.

*Operation II* is assigned the task of processing in accordance with the specifications designated in the "Op." code (operation designating portion of the Instruction), the operands specified in the Instruction to bring about a result, arithmetic or logical as the case may be, and placing the result or function into a specified destination, either a Main Storage location or a location in a specified general-purpose register.

All such steps carried out under Operation II are designated E (Execute) cycles.

Bearing in mind that the system may be set into operation by one of five different Instruction formats; namely, RR, RX, RS, SI and SS, shown respectively in FIGS. 21, 22, 23, 24 and 25 in the aforesaid application Serial No. 357,372, the RX format will be selected as a representative one of these five formats to explain the basic I cycles, constituting Operation I. An understanding of the I cycles involved in carrying out an RX format will also serve to explain each of the other four formats.

The particular RX format, taken as a single example only of such an RX format, contains an 8-bit "Op." code; namely, 0100 1110, for Converting Binary to Decimal (in the said aforementioned application, see Appendix Chart N; Operation Codes Format Class RX; Fixed-point, Half-word and Branching; 0100; and, in the column under this RX, "Convert Decimal X," whose code is seen, at the left thereof, to be 1110). The general objectives to be considered before entering into a detailed explanation of the various micro-instruction words and the relation of the latter to the circuitry shown in FIGS. 4a through 4az will be explained below, following the explanation of the details of the RX format for the Binary-to-Decimal Convert Instruction.

This Instruction is 32-bits (4 bytes) long. As stated above, the "Op." field thereof is 0100 1110, as specified in bits 0–7 of this Instruction. The $R_1$ field (see FIG. 22), which comprises bits 8–11, designates the address of a General Register, containing the first operand, which first operand is the binary value to be converted to decimal. The second operand, which will be the result of this conversion, will be placed in Main Storage at an "effective" address obtained by adding the contents of a base register B2 (specified by bits 16–19, see B2, FIG. 22 of the aforementioned application) to the contents of an Index Register (specified by bits 12–15, see X2, FIG. 22) and adding to this sum the contents of the displacement field, bits 20–31 of the Instruction (see D2, FIG. 22).

The objectives can be stated as:
(1) Read the Instruction from Main Storage, in a series of micro-program operations.
(2) Place the 8-bit "Op." code, described above, in Register G, FIG. 4d.
(2a) Decode the "Op." code.
(3) Place the address $R_1$ in the address Register T, FIG. 4c.
(4) Compute the "effective" address. The "effective" address is placed in Registers U and V, FIGS. 4b and 4c, respectively.
(5) Test the "effective" address, for validity as to storage capacity, and as to storage boundaries.
(6) Perform dumping operations under control of the contents of the IJ registers which selected the designated Main Memory addresses, specifically the CPU bump area 2202, FIG. 4ac, preparatory to using the IJ registers in the Execute cycles, constituting Operation II.

MICRO-PROGRAM CONTROL WORDS

In carrying out the above objectives (1 to 6, inclusive, a plurality of micro-instructions, comprising a program, are extracted from the Read-only Memory (designated as "READ ONLY STORAGE," FIG. 4am) beginning with the micro-instruction designated as XABA0, shown in FIG. 5xa1 (top center block) and also written out in detail on Appendix page 996 of the aforementioned application Serial No. 357,372 and entitled "CONVERT BINARY TO DECIMAL," to which reference is invited. As shown on said page 996, each micro-instruction word is identified immediately to the right of the column of line numbers, XABA0 being in line 2. This first micro-instruction word, XABA0, line 2, is followed to the right by W, X, CN, etc., W and X designating the address fields and CN, etc., the remaining fields making up this micro-instruction word XABA0. In view of space limitations in FIG. 5xa1, these fields and their associated bit configurations are found in four lines; namely, 2, 3, 4 and 5, the field designations W, X, CN, etc., appearing in line 2, field designations CB, CG, etc., in line 4, while the bit contents of the respective fields are found directly beneath the field designation. For example, field CN has directly beneath it bits 000100, which define the bit contents thereof. Reading line 2 from left to right, we first find XABA0 which defines this particular micro-instruction, then W and X which specify the current address of XABA0, and, proceeding to the right, to fields CN, CH and CL; these specify the address of the next micro-instruction (which in this case is XACA0, line 11). The contents of these fields CN, CH and CL determine the contents of the positions of the W and X registers, which thus address this next micro-instruction XACA0, the content of the X register is incremented by one and the now contents of registers W and X are shown beneath the letters W and X, in line 12. Fields CM and CU specify Main Storage operations. Field CD specifies a destination register, to which data is transmitted via the output of the ALU section 699, FIG. 4f. Fields CA and CF specify the sources of the data entered via the A register 130, FIG. 4e, into the ALU section, including the mode of entry; for example, straight or crossed, and whether the high four bits, the low four bits or all eight bits are entered into the ALU section, field CV specifies whether an arithmetic operation or a logical function is to be performed on the data entering the ALU section. Fields CB and CG (line 4) specify the source of data to be entered via the B register 131 into the ALU section including the mode of entry; namely, True or Complement, and whether the high four bits, the low four bits or all eight bits are to be entered into the ALU section. Field CC specifies carry control operations, to and out of the ALU section. Field CK specifies a "constant"; field P specifies a Parity condition. The field CS specifies the Status Register S, shown in FIGS. 4o, 4p, 4r and 4s. This field CS has been previously explained during the description of the CS decoder and further amplified under the portion of the specification captioned "MICRO-INSTRUCTION BLOCK," relating to FIG. 3 in which the details of the statements within the micro-instruction block were explained as designating the various branching specifications for selecting the next micro-instruction address out of regular order, if required.

The remaining designations, N, A, S and C, specify Parity conditions. Finally S8 denotes the condition of the alternate decoder latch S8, shown in FIG. 4at.

The development of the address of the next micro-instruction word is predicated primarily on fields CN, CH and CL, whose contents are directed into the X register. The contents of the W register seldom change, except when access is required to an address located in a section or a module of the Read-Only Storage which is physically different from the module or section in which the current micro-instruction is found. When an address change of this nature arises, the contents of the W register are changed by admitting a constant K; otherwise, the address contents of the W register remain unchanged. In the formation of the address for the X register, the 6-bit contents of the CN field are generally conveyed to positions 0 through 5 of the X register. The contents for positions X6 and X7 of the X register are determined as a result of conditions in specified positions of the S and G registers, designated by specific code combinations in the CH and CL fields of the current micro-instruction word.

In order to facilitate understanding of the activity within the processor, as determined by the bit configurations of the various fields constituting the micro-instruction word, statements are set forth (as shown on said page 996 of the Appendix, lines 6 and 7, for example, of the aforementioned application) concerning what is being done by the particular micro-instruction. As an example, in the case of micro-instruction XABA0, all the statements are found in lines 6, 7, 8, 9 and 10 of said page 996. These statements are expressed also in symbolic form (i.e., shorthand) in the block XABA0 shown in FIG. 5xa1.

As a further example, statements relating to the next micro-instruction word XACA0, are found in lines 15 through 18 of said page 996, and again these statements are also expressed in symbolic form, in the corresponding block in said FIG. 5xa1. The specific manner in which these statements are carried out by the circuitry were discussed above in the description, of FIGS. 4a through 4az. However, it will be explained here in detail how these statements are interpreted and how they are related to the circuit diagrams of FIGS. 4a through 4az and the appropriate Appendix Charts of the aforementioned application.

Referring to the statement of line 6, page 996; namely, "READ ONE BYTE FROM MAIN MEMORY ADDRESSED BY IJ"; this statement refers to the control by bit configuration 010 of field CM, and also the bit configuration 00 of field CU. As stated above, these fields specify main storage operations. Referring to the Appendix Chart C of the aforementioned application, the code configuration 010 of field CM is interpreted as MN=IJ (see line 10 of Chart C). Bit configuration 00 of field CU, see the CU field of Appendix Chart D of the aforementioned application, line 7 of said chart, specifies the Main Storage area by symbol "MEM." In relating said statement, "MN=IJ" to the operation under discussion, reference is invited to FIGS. 4a and 4b which show the I register 134 and the J register 135 (which together comprise the Instruction Register or Instruction Counter). The contents of these I and J registers will be transmitted to the destination registers MN, the M register 197 being shown in FIG. 4aa and the N register 138 in FIG. 4ab. One gate which controls this transmission is designated "GATE I TO M" 336a, FIG. 4aa, which gate is provided with the control line 336 on which is impressed the signal MN=IJ. Thus, the contents of the I register are gated to register M. Likewise, gate J TO N 336b, FIG. 4ab, controlled by the signal on line 336 connected thereto and also designated MN=IJ, controls the transmission of the contents of register J to N.

The control of these gates is activated by the CM decoder which, in accordance with the code configuration 010, activates said line 336 (as shown in the upper portion of FIG. 4ax).

The CU decoder (FIG. 4y), under control of the code configuration 00, activates a line 428, entitled "EARLY BUMP," which is connected to the address decoder 2207, FIG. 4ac, which provides access to the address in Main Storage specified by the address now contained in these M and N registers.

The next statement, lines 7 and 8, page 996, of the aforementioned application, reads "INCREMENT THE VALUE OF THE J REGISTER AND PUT THE RESULT IN J." Referring now to the XABA0 block in FIG. 5xa1, this statement is designated in symbolic form by the expression "J=J+0+1," and this is related to the data processing system in the following manner.

The "J" (meaning the J register 135, FIG. 4b) located to the left of said equal sign, specifies register J as the destination register into which the result of the specified incrementing operation is to be placed. The "J," to the right of said equal sign, designates the same register and is specified by the bit configuration 0001 in the CA field (see under CA, line 3, page 996) of the micro-instruction word. Referring to the Appendix Chart F of the aforementioned application, this code configuration 0001 (see line 5) designates the J register (under the column labeled "Symbol"). The CA decoder, seen in FIG. 4t, in response to this code configuration 0001, activates a line 552, entitled "A=J," which means that the contents of the J register will be transmitted to the A register 130, FIG. 4e, and thus to the ALU section 699, FIG. 4f. Said line 552 (FIG. 4b) activates the gate J TO A 552a to effect the transmission of the contents of the J register 135, FIG. 4b, to the A bus 100, which feeds the A register 130, FIG. 4e. The contents of the A register pass to the ALU in a manner dictated by the code configuration 011 contained in the CF field. Referring to the Appendix Chart G of the aforementioned application, code 011 (line 8 of Chart G) calls for the admission of both the high four bits and the low four bits in a straight manner to the ALU (see bottom right of Chart G which indicates that a bit 1 at the extreme right, "Allow Lo Input," a bit 1 to the left thereof, "Allow Hi Input," and 0 in the extreme left position, "Straight"). This is accomplished as follows. Referring to the CF decoder, FIG. 4x, in response to this code combination 011, line 479, "Straight" is energized. Referring now to FIG. 4e, the same line 479 gates contents of the A register straight through AND gate 479a. Further, it should be noted that the CF decoder also activates (FIG. 4x) line 468, GATE A LO, and line 469, GATE A HI. Referring now to FIG. 4f, these same lines 468 and 469 permit both the high and low contents of the A register to pass into the ALU section 699.

The next portion of said statement, "J=J+0+1" is the "+0" portion, which signifies that zeroes are to be admitted to the ALU section via the B register 131, FIG. 4ae. This operation is controlled by the code combination 00, in each of the fields CB and CG (see lines 4 and 5, page 996 of Appendix in the aforementioned application). Also, Appendix Chart I of the aforementioned application, dealing with the CB field, indicates that the 00 code, line 3 of Chart I, indicates a K constant which, in this instance, comprises zeros in view of the requirements of the statement. The CB decoder, shown in FIG. 4z, translates the code combination 00 to energize line 398, entitled "B=K." Referring now to FIG. 4d, this line 398 (B=K) is connected to gate K TO B to thereby gate zeros to OR invert 101b (FIG. 4ad) and thus to the B bus 101. The B bus is connected to the B register 131, FIG. 4ae, which passes zeroes therethrough to the ALU section 699 (FIGS. 4f and 4af) under the control of the CG decoder, FIG. 4x, which translates the code combination 00 of the CG field.

Referring to the Appendix Chart J of the aforementioned application with the code configuration 00, the entry of zeros to the ALU is inhibited by pulling down, to a zero level, the B entry lines into the ALU section (contrast bit value 1 in the low-order which allows Lo Input and ditto for value 1 to the right, which allows Hi Input). Referring now to FIG. 4x, the CG decoder translates code combination 00 into an energization of lines 487 and 488, respectively designated $\overline{\text{GATE B LOW}}$ and $\overline{\text{GATE B HIGH}}$. These lines (FIG. 4ae) are shown connected to inverter circuits 487a and 488a, the result of which is to bring down the B input lines, B0 through B7, "ALU ENTRY," to a zero level, which level is indicative of a zero.

In accordance with the contents 00 of the CV field, the ALU section will be conditioned to undergo an operation, as noted in the Appendix Chart H of the aforementioned application, wherein the code combination 00, line 5, indicates a True Binary operation. In view of the zero contents of the B input, together with the contents of the J register at the A input, and in accordance with this instruction furnished by the CV field; namely, a True Binary operation, the J contents will be combined with the zero contents, as previously explained in the description of the ALU operation in conjunction with FIGS. 35a through 35f.

The final portion "+1" of the statement "J=J+0+1" signifies that a carry in of "1" will be made and carry out ignored. This operation is controlled by the bit configuration 001 in the CC field. This means that the carry-in line to the ALU will have a "1" impressed thereon. Referring now to the CC decoder, FIG. 4w, the CD decoder decodes the 001 code configuration and activates line 524, CARRY IN, which, as is seen by reference to FIG. 4f, is connected to the ALU section 699. This results in the introduction of a carry 1 to the ALU True Binary operation.

The next statement in line 9, page 996 of the Appendix of the aforementioned application, is "TURN S0 OFF." This order is initiated by the code combination 0001 in the CS field (see lines 4 and 5). An inspection of the Appendix Chart L of the aforementioned application, line 8, indicates that code combination 0001 designates the symbols S0=0, meaning that the S0 position of the S register in FIG. 4o is to be set to its zero state.

Referring to FIG. 4as, decoder CS translates 0001 to activate a line 221, labeled S0=0, which, in FIG. 4o, is shown connected via an AND circuit to position S0 of the S register setting this position to 0.

The next statement, line 10 of page 996, is "BRANCH TO XACA0 on S2 and 1." This branch is controlled by code combination 0100, assigned to the CH field, line 3, and code 001, line 3, assigned to the CL field, of the previous microprogram.

All of the above operations are performed in the space of a single microsecond, and the timing of the operations are under control of the clock 157, in FIG. 13, which activates the various gates, at A Time, to enable data transmission from any one of the source registers, to the A register 130, FIG. 4e, by way of the A bus 100 to and through the ALU section 699, and then to the −Z bus. From the latter and under control of the Clock D Time, appropriate gates are activated to enable the data appearing on the −Z bus to be gated into a specified one of the CPU destination registers.

The output of the ALU is transmitted via the Z bus (FIGS. 4f, 4e, 4d, 4c and 4b) to the J register (FIG. 4b), specified as the destination register by the CD field code combination 0010, see Chart E of Appendix of the aforementioned application, line 7.

The next control word; namely, XACA0, line 11, page 996 of the aforementioned application, is fetched from the Read-Only Storage, according to the address contents of the WX register developed from the contents specified in field CN, field CH and field CL of the previous micro-program. From an inspection of the X register contents (disregarding the W register for the moment) of the current control word; namely, XACA0, as indicated in line 11, positions X0 through X5 have the same code configuration as that of the CN field of the preceding control word (see lines 2 and 3, page 996). The circuits by which the complement contents of this CN field are transferred to the positions X0 through X3 of the X register 145, FIG. 4m, are as follows. Beginning with the CN field as set up in the SAL's, FIG. 4am, the outputs from the SAL's are connected to GATE X NORMAL 372, FIG. 4m. The outputs of this gate pass through the OR invert block 375 and into positions X0 through X3 of the X register 145. The complement output of the SAL's for position 4 of the CN field is routed to the position 4 of the X register by means of the following circuit. Referring to FIG. 4k, line 376, labeled CN, which originates in position 4 of the SAL's in FIG. 4am, is connected to AND circuit 377 which, when all input conditions are satisfied, provides an output into an OR circuit 378, having an output line 379, designated $\overline{X4}$, that connects to the X4 position of the X register. The complement condition of position 5 of the CN field is directed into position X5 of the X register by means of the following circuit. Referring to FIG. 4ak, line 380, labeled $\overline{CN}$, which extends from the CN SAL's in FIG. 4am, is connected to an AND circuit 381, which, when all inputs are satisfied, provides an output to an OR circuit 382, whose output line 383, designated $\overline{X5}$, communicates with position 5 of the X register 145. It should be particularly noted that the content of position X6 of the X register is determined in accordance with the coding setup in the CH field which is interpreted by the CH decoder in FIG. 4aj. As seen therein, the output line 384 of the CH decoder passes to an invert block 385 having an output line 386 designated X6 connected to an AND invert block 387 (FIG. 4ak) providing an output line 388 designated $\overline{X6}$, whose content is determined by the status of the specified status latch of the S register 140 and the thus determined content is directed to position X6 of the X register 145 (FIG. 4m).

Position X7 of the X register is set in accordance with the code combination designated in the CL field of the control word. This is interpreted by the CL decoder in FIG. 4ak. As seen therein, the output of the decoder has a common output line 366 which is connected to an N block 367 having an output line 368 designated X7. The latter is fed to an AND invert block 369 having an output line 370, designated $\overline{X7}$, whose content again, as above with regard to $\overline{X6}$, is determined by the status of the specified status latch of the S register 140 and the thus determined content is connected to position X7 of the X register 145 (FIG. 4m).

Thus, as described above in accordance with the bit conditions in the CN, CH and CL fields, the bit specification for the next address will be transmitted to the WX register for the fetching of the next micro-instruction word. Turning now to the thus selected second micro-instruction word, XACA0, the operations to be performed, as indicated in lines 15 through 18 on page 996, are under control of the bit specifications shown in lines 12 and 14. These operations are as follows: line 15, "PUT INFORMATION FROM MEMORY INTO R AND REGENERATE MEMORY"; line 17, "MOVE THE R REGISTER TO THE G REGISTER"; and line 18 specifies "BRANCH TO XADA." Referring to FIG. 5xa1, an inspection of the block XACA0 shows the symbol WR, a symbol R, and the statement "G=R" corresponding, respectively, to said statements set forth in these lines 15 and 17.

In terms of the wiring diagram, the symbol "W" portion is interpreted by the CM decoder, in FIG. 4ax, in response to the CM code combination 000, see lines 11 and 12, to control the regeneration cycle, specifically, the writing of the "Op." byte from the R register, FIG. 4d, back into Main Storage, FIG. 4ac. The "R" symbol portion is interpreted by the CU decoder, in FIG. 4y, in response to the CU code combination 00, see lines 11 and 12, and enables the transfer of the "Op." byte, from Main Storage into the R register. The statement "G=R" as indicated on line 17, calls for moving the contents of the R register 139, FIG. 4d, to the G register 133, FIG. 4d. This move operation is performed by passing the contents; namely, the "Op." byte of the instruction, from the R register through the ALU section 699, then to the Z bus and into the destination register G. This specific operation is determined by the following. Code 0111 in the CA field, see line 11 of Chart F of the aforementioned application, designates the R register 139 in FIG. 4d. Field CF of the control word specifies code combination 011 whereby, in accordance with Appendix Chart G of the aforementioned application, line 8, and the interpretation of bits 011, as indicated in the lower right-hand portion of this chart, both the high four bits and the low four bits of the byte are transferred in a "straight" manner through the ALU section. Fields CB and CG of the current control word contain 00, line 14, page 996 of the aforementioned application; and, in accordance with Chart I of the aforementioned application, line 3 of said chart, code 00 dictates entry of constant K of a value all zeros, into the B entry of the ALU section in the manner described above. Chart J of the aforementioned application shows that code 00 provides for the control of the entry of such zeros into the B input.

The destination field CD of the control word contains code 1010, line 14; and, in accordance with the Appendix Chart E of the aforementioned application, this specifies the G register as the destination register. This is controlled by the CD decoder, in FIG. 4ar, in response to code 1010, which activates line 289, designated SET G. The latter activates the SET G input to the G register 133 in FIG. 4d. At the termination of the second micro-program, the "Op." byte of the instruction is stored in the G register 133.

Before continuing with the explanation of the third micro-instruction word XADA (line 19, page 996), the functions of the Read latch 349a, seen in FIG. 4ay, and the Allow Write latch 350a, also seen in FIG. 4ay, as operated during the Memory Control operations, will be described. The reading and writing operations of the Main Storage are controlled in part by the operations of the Read and Write latches. The conditions of these latches and their relationship to one another is shown in the timing chart of FIGS. 38a and 38b of the aforementioned application. Each Memory cycle starts with a Readout operation to read out data, followed by a Write operation (called the regeneration cycle) in order to preserve in the Memory the contents also read out. Accordingly, the Read latch will be on during the Main Storage Readout operation. During the regeneration cycle, the Write latch will be on and the Read latch will be turned off. At the termination of the Write operation, the Write latch turns off and shortly thereafter the Read latch is turned on.

Having described above the very detailed operations of the CPU under control of the first two micro-instruction words, it is believed unnecessary to continue with the same fine degree of detail. Accordingly, the following description of the succeeding micro-instruction words will be less detailed, but in light of the above, will make clear the operations involved. For a more detailed explanation of the following, reference is invited to the above description of the operation of FIGS. 4a–4az, inclusive.

Turning now to the third micro-program, XADA, line 19, page 996, this particular micro-instruction word is fetched from the Read-Only Storage in response to the address contents in the W and X registers, whose code combination contents are indicated directly under W and X in line 20. The contents 0000 and 0011, of the X register, are developed, as described in detail above, as the result of the contents of the fields CN, CH and CL, of the previous micro-instruction word XACA0. The operations performed by the XADA micro-instruction word are listed in lines 23 through 26, of said page 996, and these are carried out in accordance with the bit configurations indicated in lines 20 and 22, the control fields for which are shown thereabove on lines 19 and 21, respectively. Referring to FIG. 5xa2, this micro-instruction word XADA has, as its current address, 103 in the upper right-hand corner thereof. Within the block are seen the following statements: "G0, G1, G2, X." These are the branch specifications which will be interpreted by the CH and CL decoders, to develop the address of the next; i.e., fourth, micro-instruction word XAEA4 (see line 27, page 996). The next statement in the XADA block, "MN=IJ," is described, line 23 of page 996, which specifies "READ ONE BYTE FROM MAIN MEMORY ADDRESSED BY IJ." This is the second byte (i.e., fields $R_1$ and $X_2$) of the instruction which is read from the Main Storage from an address specified by the contents of the IJ register, which contents, in accordance with the statement, will be directed to the MN registers. The next statement in the block; namely, "MEM," is under control of the CU field and its associated CU decoder to enable reading out this second byte from the Main Storage. The final statement; namely, "J=J+0+1," is the same as that described in detail above, and it calls for incrementing the value of the J register by one (see lines 24 and 25, page 996). The purpose of this operation is to step up the contents of the J register to thereby address the third byte of the instruction, when the opportunity arises, after which the next micro-instruction word, XAEA4 (line 27) will be fetched under the control of the contents of the above CN field, the CH field and the CL field, the latter two fields being controlled by the status of the branching statement in FIG. 5ax2 for block XADA, "G0, G1, G2, X." The portion "G0, G1, G2" specifies the contents of the G register which contents are bit positions 0, 1 and 2 of the "Op." code of the instruction.

These three positions G0, G1 and G2 set the contents of positions X4, X5 and X6 of the X register preparatory to selecting the next micro-instruction word (which is AEA4) and takes precedence over the corresponding positions designated in the CN field of a control word.

The circuit for setting up said position X4 of the X register under control of position G0 of the G register 133, FIG. 4d, is as follows. Referring to FIG. 4aj, the circuit selected by the CH decoder extends from output line 511, through the inverter block 512, output line 513, designated X4, branch to AND circuit 514 (shown in FIG. 4k), output line 515 thereof, through the OR circuit 378, to line 379, designated $\overline{X4}$, and finally to position X4 of the X register 145, FIG. 4m.

The circuit for setting up position X5 of the X register under control of position G1 of the G register 133 is as follows. The CH decoder selects output line 516, FIG. 4aj, connected to invert circuit 517 whose output line 518 is designated X5, branch and feeds to AND circuit 519 (FIG. 4ak) whose output line 519a feeds through the OR circuit 382 to line 386, labeled $\overline{X5}$, and finally to position X5 of the X register 145 (FIG. 4m).

The circuit for setting position X6 of the X register has been previously described.

In response to the settings of the CN, CH and CL fields in combination with the condition specified by the G register statement "G0, G1 and G2," the next control word selected is XAEA4, line 27, page 996 of the aforementioned application. Referring to FIG. 5xc1, the control word has an address 124, designated in the upper-right hand corner of the block, and within the block are seen the following statements:

"AC, G3"
"WR"
"R"
"L=L/R"
"S5=ZL=0"

The first statement, "AC, G3," defines the branching conditions for the next control word (XCCA0), line 7, page 997 of the aforementioned application.

The "WR" statement, as previously described, specifies a regeneration cycle, see line 31, page 996, and concerns reading the contents of the R register back into Main Storage. This is under control of the CM field code 000, see line 28.

The statement "R" specifies readout from Main Storage to the R register. The contents in this instance are those forming the second byte of the instruction (i.e., fields $R_1$, $X_2$).

The statement "L=L/R" is amplified on line 2 of the Appendix page 997. This statement calls for OR'ing the contents of the L register with the contents of the R register and placing the result in the L register 136, FIG. 4d. This OR'ing function is performed in the ALU section 699, with the contents of the L register being admitted through the A entry and the contents of the R register being admitted through the B entry, and the manner of controlling the ALU may be seen from an inspection of the codes specified on lines 28 and 30 of Appendix page 996.

At the conclusion of this function, the contents of the instruction fields; namely, $R_1$ and $X_2$, will be in the L register 136, FIG. 4c. The purpose of OR'ing the L contents with the R is to modify the address $R_1$ without disturbing the contents constituting field $X_2$ of the main instruction.

The final statement in the block; namely, "S5=ZL=0," is set forth in lines 4 and 5 of Appendix page 997. This calls for turning the position S5 of the status register, seen in FIG. 4r, to its on state if the low four bits of the adder output are all zeros; if not zeros, then turn S5 off. This function is under the control of the code 0110 of the CS field, shown on lines 29 and 30 of Appendix page 996. The circuit which tests the low four bits of the adder output is shown in the top portion of FIG. 4e.

The next control word selected is XCCA0, line 7, page 997, which has an address 140, see FIG. 5xc1. Referring to FIG. 5xc1, this control word block contains the following statements:

"G4, G5, G6, X"
"MN=IJ"
"MEM"
"J=J+0+1"
"S7=0"

The first statement specifies that the positions of the G register 133; namely, G4, G5 and G6, when interrogated under control of the CH field, provide the settings for the positions X4, X5 and X6, with the address contents for the next control word. The final character; namely, "X," of this first statement, is decoded by the CL decoder, to set position X7 of said next address.

The statements "MN=IJ" and also "MEM" have been previously described and control a readout operation for reading out a byte of data; in this instance, the third byte of the main instruction from Main Storage. This third byte is constituted of fields $B_2$ and the high-order four bits of field $D_2$ of the main instruction.

The next statement "J=J+0+1" calls for incrementing the contents of the J register by one. This operation has also been previously described. The effect of this increment is to set the address for the fourth byte of the instruction.

The final statement; namely, "S7=0" calls for setting the position S7 of the status register 140, seen in FIG. 4s, to zero.

All of the above statements are under the control of their respective control word fields and codes, shown in lines 7, 8, 9 and 10 in the Appendix page 997.

As a result of the branching condition specified by "G4, G5, G6 and 0," the next control word selected is XCDAF, line 16, page 997, which has an address of 15E (see FIG. 5xc1). Referring to this figure, this control word XCDAF contains the following statements:

"WR"
"R"
"T=RH+K3L"
"S4=ZH=0"

The first two statements "WR" and "R" have been previously explained and call for readout from Main Storage into the R register and regenerating Storage.

The next statement; namely, "T=RH+K3L," is set forth in lines 22 and 23 of page 997. Per this statement, T is the Destination register, and the high four bits of the R register will be gated through the ALU section 699, together with a constant whose four low-order bits contain the binary value 0011, see line 22. This binary value enters the B entry of the ALU section. The sum developed as a result of this operation will pass through the Z bus to Destination T register 141, shown in FIG. 4c. The contents of the T register at this moment are those of the B2 field of the instruction increased by 3; i.e., 0011. This T address will be used in a subsequent program to select byte 3 of the operand in a general-purpose register.

The next statement, namely, "S4=ZH=0," is set forth in lines 24 and 25 of Appendix page 997, "TURN S4 ON IF HIGH 4 BITS OF THE ADDER OUTPUT IS ALL ZERO. TURN S4 OFF, OTHERWISE," this being done under the control of the CS field 0101, shown respectively on lines 18 and 19 of Appendix page 997.

The next control word addressed is XCEA, line 27, page 997. This has an address 127 (see FIG. 5xc2), this control word block being shown in said figure.

Within the micro-instruction word block XCEA (FIG. 5xc2), an address of 127 will be seen in the upper right-hand corner thereof. Additionally, the block will contain the following statements:

"0, 0"
"MN=IJ"
"MEM"
"U=RL"
"S6=0"

This first statement "0, 0" designates a no-branching condition for positions X6 and X7 of the X register 145, FIG. 4m, denoting the next address.

The second and third statements above; namely, "MN=IJ," and "MEM," set the Main Storage for readout of a byte of data (in this instance, the last byte of the instruction).

The statement "U=RL" designates the U register 142, shown in FIG. 4b, as the destination for the contents derived from the low-order four bits of the R register, FIG. 4d (see lines 1 and 2 of Appendix page 998), and this statement is processed, through the ALU section 699, FIGS. 4f and 4af, under control of the code specifications assigned to the various control fields, shown on lines 27, 28, 29 and 30, on Appendix page 997.

The final statement, "S6=0," is under control of the CS field code 1001, which sets position S6, of the Stat. register 140 to zero (FIG. 4s).

The next micro-instruction word selected is XCFA0 (line 5, page 998), seen in FIG. 5xc2. This micro-instruction word block has the address 148 and contains the following statements:

"S4, S5"
"WR"
"R"
"J=J+0+1"

The specifications and explanations of this micro-instruction word XCAF0 specifies a branching under control of conditions in Stat. register 140, positions S4 and S5, FIG. 4r.

The statements "WR" and "R," as previously described, cause the reading of a byte from Main Storage to the R register and to regenerate. (The contents of this particular byte refers to the last byte of the Main Instruction.) The statement "J=J+0+1," as previously described, means incrementing the contents of the J register by one. This sets the J register for the next instruction in accordance with the branch specification "S4, S5," together with the contents of the CN field, the next address generated selects the next micro-instruction word; namely, XDBA0 (line 14, page 998). This micro-instruction word has the coordinates B and A and, referring to FIG. 5xd1, it is seen to contain the following statements:

"AC, X"
"MN=T"
"CPU"
"V=R"

A description of this micro-instruction word XDBA0 is further indicated in lines 14 through 20, Appendix page 998.

The first statement, "AC, X," is, of course, the branch specifications of the next address (namely, 151 four micro-instruction word XDCA0).

Statement "MN=T" effects the transfer of address contents, residing in register T141, FIG. 4c, to the MN address registers, FIGS. 4aa and 4ab, respectively. (This address was previously developed under micro-instruction XCDAF.)

Statement "CPU" specifies a general-purpose register in the CPU bump area 2202 of the Main Storage, FIG. 4ac. The CPU bump area is further shown in the Bump map, FIG. 39 of the aforementioned application, of Main Storage. The specified General-Purpose (GP) register contains a base quantity, which will be combined with the literal quantity, in the D field of the instruction (along with another quantity to be subsequently described) to obtain the effective address of a location in Storage, at which the resultant operand (the binary converted to decimal data) will be placed, the converting operation taking place during subsequent Execute cycles following the completion of the I cycles. Continuing with the explanation of the current micro-instruction word XDBA0, the statement "V=R" indicates transmission of the contents of the R register 139, FIG. 4d, to the V register 143, FIG. 4c, by way of the ALU section 699, FIGS. 4f and 4af, in accordance with the code specifications—listed in lines 14 through 17 of Appendix page 998. (The contents of the V register, at this point, represents the literal, of the fourth byte, of the instruction.)

In accordance with the branching specification "AC, X," together with the contents of the CN field, line 15 of Appendix page 998, the next address developed in the WX registers is 151, specifying micro-instruction word XDCA0, seen in FIG. 5xd1. Within this micro-instruction word XCDA0 are the following statements:

"WR"
"R"
"T=T—0"

The statements "WR" and "R" have been explained previously. The statement "T=T—0" represents a departure, from the arithmetic statements, which have been interpreted according to the rules previously set up and described with reference to FIG. 3. In this statement, "T=T—0," the "0" denotes that zeros from the K bus, originating with the K field, in FIG. 4am, proceed to the gate designated K TO B 398, FIG. 4d, through OR invert circuit 101b, FIG. 4ad, through the B bus 101, the B register, FIG. 4ae, and into the ALU section, in the manner previously described. The minus symbol, in the portion of the statement "T—0," is interpreted by the CV field code 01, line 22 of Appendix page 998. This code 01, according to Appendix Chart H of the aforementioned application, designates a complement binary operation for the ALU section 699. The symbol "T" in the portion of the statement "T—0" is interpreted by fields CA and CF of the current micro-instruction word and, according to the decoding of the CA code 0010 and the CF code 011, respectively, the contents of the T register will enter the ALU, by way of the A register 130, FIG. 4e, and call for gating in a "straight" manner both the high four order bits and the low four order bits of the data byte. As a result of the CV code 01, the zeros entering the B bus will be complemented, so that all one's will enter the ALU section and be added to the T contents entering the ALU section by way of the A entry. The result of this is to decrease the contents of the T register by one, and the decremented address so formed specifies the $B_2$ byte of the base quantity in the operand of the general-purpose register. This particular byte; namely, byte 2, will be placed in the U register 142, FIG. 4b, on a subsequent operation.

43

As a result of the contents of fields CN, CH and CL, line 22 of Appendix page 998, the next address developed is 155, designating micro-instruction word XDDA, seen in FIG. 5xd1.

In this micro-instruction word XDDA, there are seen the following statements:

"MN=T"
"CPU"
"VC=V+R+0"

The various specifications for these statements, together with the codes assigned to their respective fields of the control word of this current micro-instruction word are listed in line 30, Appendix page 998, and in lines 1 through 6, Appendix page 999.

The statement "MN=T" calls for placing the contents of the T register 141, FIG. 4c, into the MN registers 137, 138, FIGS. 4aa and 4ab. The contents, in this instance, is the address of the second byte, of the base quantity, in the specified general-purpose register in the CPU bump storage area.

The statement "VC=V+R+0" denotes an adding operation to be performed by the ALU section 699, FIGS. 4a and 4af, in which the contents of the V register 143, FIG. 4ac, are entered, by way of the A entry, of the ALU section; the contents of the R register 139, FIG. 4d, are entered by way of the B entry to the ALU section; and the sum, thus developed, is placed in the destination register V143, FIG. 4c. The "C" in the "VC" portion of the statement to the left of the equal sign specifies the entry of the "carry" generated from the high order of the ALU section into the carry latch, position 3 of the S register 140, FIG. 4p.

The sum, just developed, is placed in the V register 143, FIG. 4c, and represents the sum of the low-order byte of the D literal and byte 3 of the base quantity.

The next address developed is 157 and this specifies the micro-instruction word XDEA, shown in FIG. 5xd2. Referring to this micro-instruction block XDEA, the following statements are noted:

"WR"
"R"
"T=T−0"

The functions performed by this micro-instruction word are the same as those described previously for XDCA0. The result of this function provides an address in the T register, decremented by one, which address will access byte 1 of the base quantity in the operand of the specified general-purpose register in the CPU bump area.

In accordance with the contents of fields CN, CH and CL of the current XDEA, the next address developed is 159, which specifies XDFA, seen in FIG. 5xd2. In this micro-instruction word block, the following statements are noted:

"MN=T"
"CPU"
"UC=U+R+C"

Explanation of these statements is found in lines 16 through 24 of Appendix page 999.

The statement "MN=T" places the address contents of the T register 141, FIG. 4c, into the MN registers 137, 138, FIGS. 4aa and 4ab. (The T address contents, at this point, is the address of byte 1 of the base quantity in the specified general-purpose register of the CPU bump storage area.)

Statement "CPU" specifies the general-purpose register access in the CPU bump area 2202, FIG. 4ac.

The statement "UC=U+R+C" denotes a function performed by the ALU section 699, FIGS. 4a and 4af, during which the contents of the U register 142, FIG. 4b, are added to the contents of the R register 139, FIG. 4d, including the introduction of a carry (denoted by "+C") into the low-order of the ALU section. The result of this operation (according to the portion of the statement "UC") is placed in the destination register U142, FIG. 4b, and the carry-out from the high order of the ALU section 699 is entered into the carry latch; namely, position S3, of the S register 140, FIG. 4p.

Upon termination of XDFA, the base quantity bytes 2 and 1 will have been added to the literal; namely, the displacement quantity specified in the D portion of the instruction. To this will be added, subsequently, an index quantity contained in an operand of another general-purpose register in the CPU bump area, which operand is specified by the address in the $X_2$ field of the instruction.

Under control of the contents of the CN, CH and CL fields of the current XDFA, lines 16 and 17 of Appendix page 999, an address value of 158 is developed for the next micro-instruction word XDGA. There are noted the following statements:

"WR"
"R"
"T=LXH+K3L"

The first two statements "WR" and "R" call for reading out the $X_2$ field of the instruction from Main Storage to the R register 139, FIG. 4d, and regenerating the storage in the manner described.

The statement "T=LXH+K3L," as explained in detail on line 31 of Appendix page 999, calls for (according to the statement portion "LXH") entering the high-order four bits of the contents of the L register 136, FIG. 4c, under control of the "cross" gate 475, FIG. 4e, according to the code bit configuration 110 in the CF field, line 26, Appendix page 999. These high-order four bits pass into the ALU section 699 by way of the A entry. The B entry contains the constant 0011 (K3L). The output from the ALU699 is passed to the destination register T141, FIG. 4c. At the end of the current micro-instruction word, the base quantity will have been added to the literal D of the instruction and the address of field $X_2$ of the instruction has also been increased by 3 (K3L) to form the address of byte 3 of the index quantity which will be added to the sum now residing in the UV registers (142 and 143, FIGS. 4b and 4c, respectively). The address developed is 15D for the next micro-instruction word; namely, XDHA, shown in FIG. 5xd3. In this block there are noted the following statements:

"MN=T"
"CPU"
"DC=R+0+C"

The statement "MN=T" places the address of the index operand, previously in the MN registers 137, 138, FIGS. 4aa and 4ab, respectively. This address is used in access byte 3 of the index quantity operand. The "CPU" statement designates the bump area in which the index operand is located. The statement

"DC=R+0+C"

is interpreted, see line 9 of Appendix page 1000, so that the contents of the R register 139, FIG. 4d, are added to zeros, together with a carry-in, derived from the carry latch S3 of the S register 140, FIG. 4p. The result is placed in destination register D132, FIG. 4c, and the carry output, from the high-order of the ALU section 699, FIGS. 4a and 4af, is placed into the carry latch position S3 of S register 140, FIG. 4p. The contents developed in the D register, for byte 1 of the operand base quantity will be used in a subsequent micro-instruction to test the validity of the effective address developed.

The next address developed is 15F for micro-instruction word XDDC, shown on column D, row C of FIG. 5xd1, and in lines 13 through 21, Appendix page 1000. In this block are shown the following statements:

"WR"
"R"
"T=T−0"

45

The statements "WR" and "R" call for reading out the X₂ address in the instruction to the R register 139, FIG. 4d, from Main Storage, and regenerating Storage. The statement "T=T—0" has been previously explained in XDCA0 and, in effect, calls for decrementing the contents of the T register, by one, in order to establish the address of the byte 2 of the index quantity contained in the second specified operand in the CPU bump area.

The next address developed is 164 for micro-instruction word XDEC, seen in FIG. 5xd2. In this block are noted the following statements:

"MN=T"
"CPU"
"VC=V+R"

These statements are described in lines 22 through 29, Appendix page 1000. The statement "MN=T" calls for the placement of the contents of the T register 141, FIG. 4c, into MN registers 137, 138, FIGS. 4aa, 4ab. The contents in question will constitute the address of byte 2 of the index quantity operand. The statement "CPU" specifies the location of the index quantity operand as being in the CPU bump area 2202 of the storage, FIG. 4ac. The statement "VC=V+R" calls for adding to the contents of the V register 143, FIG. 4c, the contents of the R register 139, FIG. 4d, which comprises byte 3 of the index quantity. The contents of the V register at this point contains a fully developed partial effective address for the destination operand. This function, according to the above statement, is processed through the ALU section 699, FIGS. 4a and 4af, by way of the A and B entries. The processed sum from the ALU section is directed to the destination register V143, FIG. 4ac. Further, a carry from the ALU output, should one develop, is directed into the carry latch; namely, position S3 of the S register 140, FIG. 4p.

Following this, the next address developed is 165 which specifies micro-instruction word XDFC, seen in FIG. 5xd2. In this block the following statements are noted:

"X, G3"
"WR"
"R"
"T=T—0"

These statements are defined in lines 30 and 31 of Appendix page 1000 and lines 1 and 2 of Appendix page 1001, and described in lines 2–7. The statements "WR" and "R" call for reading the address contents from Main Storage into the register of byte 2 of the index quantity and regenerating Storage. The statement "T=T—0" calls for decrementing the T register 141, FIG. 4c, in the manner previously explained. The decremented contents represent the address of byte 1 of the index quantity operand which is placed in the T register 141. In accordance with the branch specification "X, G3" the next address developed is 166 for micro-instruction word XDGC0, shown in FIG. 5xd2.

In this block are noted the following statements:

"X, S7"
"MN=T"
"CPU"
"UC=U+R+C"

These statements are defined and described in lines 8 through 16, Appendix page 1001. The statements "MN=T" and "CPU" prepare the CPU Main Memory portion 2202 for reading out of byte 2 of the index operand.

The statements "UC=U+R+C" calls for adding the contents of the U register 142 (FIG. 4b) containing the partially developed address contents; namely, B₂+Dₐ, to the contents of the R register 139 (FIG. 4d) which contains byte 2 of the index quantity, plus a possible carry. The result, which is now the fully developed effective address, is placed in the destination register U142 (FIG. 4b).

The next address developed is 168 for micro-instruction word XDHC0. Therein are noted the following statements:

"X, 0"
"WR"
"R"
"DC=D+R+C"
"S2=ANS=0"

These statements are defined and described in detail in Appendix page 1001, beginning with line 17 and ending on line 27.

All statements, except "DC=D+R+C," have been fully described hereinabove. This statement

"DC=D+R+C"

is performed for the purpose of testing the high-order byte position of the finally developed effective address. If the sum, as a result of this function, is zero, the operation indicates that the effective address of the high-order byte is valid. If the result is not zero, then the S2 position of the S register 140, FIG. 4p, is turned on.

In accordance with the branching condition specified by the CH and CL fields, together with the contents of the CN field, the next address developed is 16A for micro-instruction word XDJC0. This is shown in FIG. 5xd3. Within this block are noted the following statements.

"X6, Z=0"
"Z=V*K1L"
"S2—ANS=0"

These statements are all defined and described beginning with lines 28 through 31 of Appendix page 1001 and also lines 1, 2 and 3 of Appendix page 1002. This micro-instruction word, according to the statement "Z=V*K1L," will perform an AND function, whereby the low-order byte of the effective address, contained in the V register 143, FIG. 4c, is AND'ed with a constant 0001 (K1L), as specified in the CK field, lines 30 and 31 of Appendix page 1001. The purpose of this operation is to check bit 7 of the low-order byte of the effective address. If the result is zero, the low-order byte of the effective address is valid. However, should a value other than zero result, the S2 position of the S register 140, FIG. 4p, will be turned on (S2=1).

The next address developed is 175 for the next micro-instruction word; namely, XDKC1, seen in FIG. 5xd3.

The statement, "Z=G*K12L" in this block, is an AND'ing function to test bit positions 4 and 5 of the G register 133, FIG. 4d, in which the "Op." code is stored. These bit positions 4 and 5 of this G register are AND'ed with a constant 1100 (K12L) which is derived from the K bus and directed to the B entry of the ALU section 699, FIGS. 4a and 4af. An inspection of the various control word fields and their bit configurations will aid in understanding the operations performed by the ALU section and how the entires; namely, A and B entries, are controlled for the performance of this AND function. The operations performed by this statement are set forth and described in detail in lines 4 through 9 of Appendix page 1002.

The next address developed is 178 for the next micro-instruction word XDLF, shown in FIG. 5xd3. In this block are noted the following statements:

"S2, Z=0"
"T=LH+K3L"

The branch statement "S2, Z=0" represents a departure from the normal branching functions previously explained. The net result of this branching function is to develop a branch, if the Z bus contents are equal to zero.

The statement "T=LH+K3L," as performed by the ALU section 699, increments the address contents in the L register 136 (which contents is specified in the field R₁ of the instruction) by a constant 0011 (K3L). This incremented address specifies byte 3 of the binary operand destined for conversion from binary to decimal. This operation is a preliminary step to the Execute cycles to follow, wherein the conversion will take place.

The next address developed is 17C, for micro-instruction word XDJC0. This contains a branch specification; namely, "0, G5, G6, X," and also a statement "W=K3," the latter specifying the W register 144, FIG. 4*i*, as the destination for a constant 0011 (K3), which is directed to the W register, by way of the gate W NORMAL, as seen in FIG. 4*j*. A detailed description of this step is indicated and described in lines 17 through 21, Appendix page 1002.

The result of this operation is dictated by the fact that the next micro-instruction word; namely, DABA6, is located in a module different from the module containing micro-instructions previously described. The contents of the W register, together with the contents of the X register, as dictated by the CN, CH and CL fields of the current micro-instruction word XDJG0, develop the next address 336 for micro-instruction word DABA6, seen in FIG. 5*ea*1, having the coordinate specification B and H. This DABA6, together with the following EACG0, having an address 3AC; EADG, having an address 3AA; EAEG, having an address AB; EAGG, having an address 3AD; and EAHF0, having an address 3B0, are employed to store the contents of the IJ registers 134, 135, FIGS. 4*a* and 4*b*, respectively, into the CPU bump area 2202, FIG. 4*ac*. These micro-instruction words are seen in FIGS. 5*ea*1, 5*ea*2 and 5*ea*3. The statements within these blocks have been previously explained, and detailed explanations of each one may be had by reference to these, beginning with DABA6, which is set forth and described in lines 22 through 31, Appendix page 1002; lines 1 through 31, Appendix page 1003; and lines 1 through 10, Appendix page 1004.

In EAEG, seen in FIG. 5*ea*2, coordinate location E and G, the statement "Z=X*K7L" is utilized to test the effective address in registers U and V, 142 and 143 (FIGS. 4*b* and 4*c*) for validity of boundary characteristics. The details of this statement are set forth in lines 15 through 23 of Appendix page 1003. Testing for validity of the boundary characteristics is made in view of the fact that the result of the binary-to-decimal conversion requires a double word storage location. The effective address developed during the preceding I cycles must contain zeros in the low-order positions 5, 6 and 7 of the V register 143, FIG. 4*c*. These three positions of the V register are tested by AND'ing them with 0111 (K7L), in accordance with the statement "Z=V*K7L." If the output from the ALU section 699, FIGS. 4*a* and 4*af*, is zero, as a result of this AND'ing function, the effective address developed is valid, and position S5 of the S register 140, FIG. 4*r*, is turned on; otherwise, S5 will be turned off (S5=0) should the ALU output be other than zero.

The final step in the I cycles has an address 3B6 for EAJC2, line 11, Appendix page 1004. The statement contained within this block, "R=0," is employed merely to set the contents of the R register 139, FIG. 4*d*, to zero.

EXECUTE CYCLES FOR CONVERT BINARY TO DECIMAL

The micro-instruction word steps controlling the conversion of a binary operand to a decimal operand constitutes that phase of the operation referred to earlier hereinabove as Operation II. It may be helpful, during the course of the ensuing description, to make reference to FIGS. 59*a* and 59*b* in the aforementioned application wherein is charted the course of action including branch conditions encountered during the I cycles and the Execute cycles of the conversion process. In this operation, the binary value resides in a specified register of the CPU bump area of Storage and is 4-bytes long (32 bits). This operand is accessed by the T register 141, FIG. 4*c*, a byte at a time, beginning with the high-order byte, zero, and ending with the low-order byte 3. The Storage location into which the converted decimal value is eventually placed is accessed under control of the UV registers 142, 143 (seen in FIGS. 4*b* and 4*c*).

As a preliminary to an explanation of the detailed steps involved in this conversion process, it is highly desirable that an over-all general description of the conversion process be given as an introduction to the detailed steps of the process. A first series of introductory micro-instruction word steps are employed to prepare operations, these steps are listed as follows: EAJC2, BABC1, BACA0, and back to BABC1, the last two steps being repeated, eight times, after which a branch is made to micro-instruction words BACA1, BADB, BAEB and BAFB. These steps are utilized to provide preparatory conditions and steps; namely:

(1) Clearing out the Storage destination, (2) Testing the sign of the binary operand (this is assumed to be plus in order to obviate the necessity of further details which would otherwise be required), and (3) Accessing the binary operand, high-order byte zero first.

Following these preparatory conditions and steps, a second series of micro-instruction word steps (called loop A) is employed to provide:

(1) A binary duplation of the accessed binary byte, (2) Storing the resulting carry condition (1 or 0, as the case may be), (3) A decimal duplation, beginning with a zero value and combining therewith the preceding carry condition, (4) Determining decimal boundary conditions, of the destination as an incident to decimal duplation, and (5) Testing ending conditions and setting up test indicators, in accordance with conditions encountered in said loop A.

Loop A is repeated eight times, for each one of the bytes 0, 1 and 2 of the binary operand, and seven times for byte 3 of the binary operand. Following the completion of each loop A, a test is made to ascertain whether the eighth bit of each binary byte has been processed, the test being made by position S4 of the Stat. register 140, FIG. 4*r*. At the conclusion of each eighth loop A, for each byte, 0, 1 and 2, and after the seventh loop A, for byte 4, a branch is made to another series of micro-instruction word steps, called loop B (which loop B also includes the micro-instruction word steps constituting loop A). This loop B is repeated four times during the course of this Binary Conversion, the energization of loop B beginning at the termination of each eighth loop A, for each of bytes 0, 1 and 2, and after the seventh loop B, for byte 3. Upon completion of each loop B, a test is made to ascertain whether the 31st bit of the binary operand; i.e., the low-order bit, has been processed, the test being made to ascertain the conditions of position S5 of the Stat. register S140, FIG. 4*r*.

During each loop A, a decimal duplation sub-loop is employed for forming and developing each decimal byte. The number of times that this sub-loop is repeated depends on the boundary condition of the decimal value; and, as the boundary expands, during the formation of the decimal value, the number of sub-loops is progressively increased.

In following the general over-all outline above described, the first series of micro-instruction word steps utilized to provide the preparatory conditions for clearing the eight bytes of the Storage destination are listed as follows: EAJC2, BAAB, BABC1, BACA0 and BACA1. These are explained, in the minutest detail, in the micro-instruction word dictionary, beginning on page 2 of the Appendix. As an alternative, the Convert-Binary-to-Decimal "Op." code, detailed in the Appendix beginning on page 1004, may also be referred to, with the same detail, for all code combinations employed in each of the control word fields of these steps. With each of these steps, as previously described, are found the various statements which define the functions that each step performs, interpretation of which may be derived from an inspection and analysis of the various code combinations employed in the control word (micro-instruction word) fields. Further inspection of FIG. 5ba1 is invited for the purpose of determining how, with the aid of the coding details listed for each step in the Appendix, the sequence of the above steps is found.

Summarizing the functions of clearing the Storage desination, steps BAAB, BABC1 and BACA0 set all eight bytes of the decimal field to zero. The step BAAB places a 7 (0111) in the D register 132, FIG. 4c. This is directed by the statement, "D=0+K7L." In step BABC1, the following statements are noted:

"MN=UV"
"MEM"
"V=V+0+1

According to the last statement, the V register 143, FIG. 4c, is incremented, after each decimal byte in the Main Storage is accessed. In the next, BACA0, are noted the following statements:

"WR"
"CLEAR"
"D=D—0"

The statement "CLEAR" prevents any change in the contents of the R register 139, FIG. 4d, which was previously set to zero.

The next statement step orders the decrementing, by one, of the D register 132, FIG. 4c. The steps BABC1 and BACA0, constitute the sub-loop, previously referred to, and is repeated eight times, in order to clear out the eight bytes of the Storage destination. In step BABC1, the statement "Z=0" causes a branch out of this sub-loop and into step BACA1, in which step are noted the following statements:

"W=K2+WR"
"CLEAR"
"V=V—0"

The last statement causes the V register 143, FIG. 4c, to be decremented by one since the last time through the above sub-lop caused the contents of the V register to be set to 8 (XXXX 1000) and must be restored to the address of the low-order byte; namely XXXXX 111. This operation terminates the clearing of the decimal destination in Storage and initiates the next operation in response to branch conditions.

This branch develops the next address, 28F, for the step BADB, seen in FIG. 5ba2, the details of the statements within the step are further shown in Appendix page 1005, beginning with line 9. The statements noted within this step are:

"T=H"
"S0=0"

In the first statement, the low-order four bytes of the T register 141, FIG. 4c, are set to zeros. This sets the address to 0000 for accessing the high-order byte "0" of the binary operand for the purpose of interrogating its sign. In accordance with the detailed code specification, in the fields CN, CH and CL, the next address developed is 290 for BAEB. The functions of the statements within this step call for a readout from the CPU storage of the high-order byte zero of the binary operand, this being ordered by the statements "MN=T" and "CPU". The statement "L=V" calls for storing the address contents of the V register 143, FIG. 4c, into the L register 136, FIG. 4c. The L register, as will be appreciated hereinafter, carries a record of the byte address of the binary operand, and its function will be appreciated later on, during succeeding steps, occurring in loops A and B.

The next address 291 develops step BAFB, seen in FIG. 5ba2. Within this step are noted the following statements:

"1, 0"
"WR"
"R"
"Z=R*K8H"
"S2=ANS NZ"

The statements "WR" and "R" call for placing the first byte of the binary operand into the R register 139, FIG. 4d. The statement "Z=R*K8H" is an AND'ing function, performed in the ALU section 699, FIGS. 4f and 4af, wherein the constant K8H (1000) is entered via the B entry and the contents of the R register 139, FIG. 4d, entered via the A entry. This operation is employed to test the sign position of the binary operand. In this instance, it is assumed that the sign is plus; i.e., zero. Hence, position S2 of the Stat. register 140, FIG. 4p, is set to zero, in accordance with the statement

"S2=ANS NZ".

In accordance with the branch specification "1, 0," and the CN field contents specified on line 26 of Appendix page 1005, the next address 296 develops step BAJE2, seen in FIG. 5ba2 and described on Appendix page 1006 beginning with line 3.

This step and the next succeeding steps BAHB and BAJB0 provide access to the loop A. The step BAJE2 orders a readout from the Storage of the binary byte 0 and further, in accordance with the statement "T=T+0+1," orders incrementing of the T register 141, FIG. 4c. The result of this is the development of an address 0001 which provides access to byte 1 of the binary operand. The step BAHB, seen in FIG. 5ba3 and described on Appendix page 1006, beginning with line 11, places the contents of the binary byte 0 into the R register 139, FIG. 4d. The statement "Z=T*K3L" orders and AND'ing function in the ALU section 699, FIGS. 4f and 4af. This causes the contents of the T register 141, FIG. 4c, to be AND'ed with the constant K (0011). This is primarily a test condition (for loop B) which sets S5 on, only when the T register 141 has been incremented, four times, to provide 00 in the low-order bit positions of the address. The loop is repeated, each time the contents are at a value other than 00.

The next step is BAJB0 and is seen in FIG. 5ba3 and further described on Appendix page 1006, beginning with line 21. The statement "D=R" orders the contents of the R register 139, FIG. 4d, placed into the D register 132, FIG. 4c, the contents, in this instance, representing byte 0 of the binary operand.

The next step directs entrance to loop A which consists of the following steps: BAJB0, BAJB1, BABD, BACE2, BADD, BAEF2, BAFD, BAGD1 and BAHF0. Following this last program step, a 4-way branch is encountered, which leads to one of the following steps: BAJE0, BAJE1, BAJE2 and BAJE3, shown in FIGS. 5ba2 and 5ba3. These last four steps, in effect monitor the course of the Conversion process, and a particular one is selected, depending upon conditions encountered. Each branch step provides a specific branch control which causes access to one of the loops A and B, depending upon conditions encountered during a previous loop. The termination of all looping activity is controlled by a final branch, to step BAJE3, during which step the last bit enters the storage destination.

Within loop A is the duplation sub-loop consisting of steps BAEF, BAFD and BAGD0. The control which determines the number of times this sub-loop is repeated is predicated on the boundary carry condition, arising as the decimal value forms during this Conversion process.

The operations involved in passing through the loop A following the introductory steps; namely, BAJB0 and BAKB0, may be explained as follows. Beginning with step BAJB0, shown in FIGS. 5ba3 (and further explained on page 1007, beginning with line 2), the binary duplation step is performed in accordance with the statement "DC=D+D." In this operation, the ALU section 699, FIGS. 4f and 4af, is set up to perform a True Binary operation upon the contents of the D register 132, FIG. 4c, which are concurrently admitted to the ALU section, via the A and B entries, the output of the ALU section re-entering the D register 132. Concurrently, the high-order output of the ALU section 699 transmits the carry condition to the carry latch (that is, position S3 of the Stat. register S140, seen in FIG. 4p). This being the first time through the loop A and the fact that the contents being developed are all zeros, a zero output is transmitted from the high-order position of the ALU section and into the S3 carry latch, setting the latter to zero. Following this, the next step is BABD. By virtue of the statement contained therein; namely, "GC=GH+K15+C," the contents of the G register 133, FIG. 4d, is decremented. (The statement is described on Appendix page 1007, beginning with line 14.) Following this operation an address value of 7 is left in the G register 133, FIG. 4d (which register keeps track of the number of bits shifted out of the binary byte during each binary duplation step). Attending this operation is a carry transmitted through the high order of the ALU section 699. This carry (a "1" in this instance) is transmitted to the carry latch S3. Prior to this, however, the zero content of the carry latch S3 was transmitted to the ALU section, during the decrementing of the contents of the G register 133. (Turning on the carry latch S3 at this time is incidental since this on state is ignored on subsequent operations in the loop.)

The next step encountered in loop A is BACE2, address 2A3. This step initiates a decimal duplation operation in the ALU section 699, FIGS. 4f and 4af. This duplation step is ordered by the statement "RC=GXH@R." During this duplation step, the contents of the G register 133, FIG. 4d, passes through the A register 130, FIG. 4e, through the crossed AND gate 475a, energized by the crossed signal line 475, FIG. 4e, through the high AND gate 469a, energized by line 469, FIG. 4f, and eventually enters the ALU section 699. To the four bits just entered are added the zero contents of the R register 139, FIG. 4d, admitted by way of the B entry to the ALU section 699. Since all zeros are present at this particular time, the ALU output is zero, the zero output condition enters the carry latch S3 of the S register 140, FIG. 4p, at the same time the output (all zeros) of the ALU re-enters the R register 139, FIG. 4d.

The next address, 2A5, selects step BADD, seen in FIG. 5ba2, and further described on Appendix page 1008, beginning on line 1. The statement therein; namely, "WR," causes the contents of the R register to re-enter the low-order byte (byte 7) of the storage decimal destination.

The next address, 2AA, develops step BAEF2, which contains the statements:

"MN=UV"
"Z=V−L−1"

The first statement orders readout from Storage of byte 7 of the decimal value. The next statement

"Z=V−L−1"

orders a Binary Complement operation in the ALU section 699, causing the contents of the L register 136, FIG. 4c, to be subtracted from the contents derived from the V register 143, FIG. 4ac. The result of this subtraction is all zeros, since the L and V values are each zero. The zero result, in this instance, denotes a boundary end for decimal byte 7, which end condition terminates the duplation loop at the termination of the next step wherein the decimal duplation step is carried out.

The next address, 2AC, develops step BAFD. This step is seen in FIG. 5ba2, and is further described in detail on Appendix page 1008, beginning with line 16. The step contains the following statements:

"R"
"X, Z=0"
"RC=R@R@C"

The first statement orders Storage to read out decimal byte 7 into the R register 139, FIG. 4d. The next statement orders the ALU section 699, FIGS. 4f and 4af, to perform a decimal duplation on the decimal value derived from the R register 139, FIG. 4d (the R register containing the decimal byte 7) and re-enters the sum developed into the R register. The statement "X, Z=0," particularly the portion "Z=0," terminates the duplation loop. This portion of the statement is interpreted from an inspection of the CL field, code 111, seen on lines 16 and 17 of Appendix page 1008. Reference is invited to Appendix Chart B, page 1496, for inspection and determination of the significance of code 111. Upon inspection, it is seen that this code specifies the condition to which position S7 of the Stat. register S140, FIG. 4r, should be set (S7=1) when the Z bus output is all zeros. In response to the branch specification, "X, Z=0," together with the code combination in the CN field, on line 17, Appendix page 1008, the next address developed is 2A6, for step BAGD1. This step is seen in FIG. 5ba2 and further described on Appendix page 1009, beginning on line 24. This step contains the following statements:

"AC, X"
"WR"
"V=V−0"

The second statement orders the contents (now doubled) in the R register 139, FIG. 4d, to enter location byte 7 of the decimal destination in Storage. The last statement orders the contents of the V register 143, FIG. 4c, to be decremented by the ALU section 699. This statement further orders the decremented address value (now 6) to enter the V register 143. This address value 6 provides access, on a subsequent step, to decimal byte 6 in the Storage destination.

The branch statement "AC, X," together with the code contents of the CN field, set up the next address, 2A9, for step BAHF0, seen in FIG. 5ba3 and further described in detail on Appendix page 1010, beginning with line 2. In this step, the Binary-to-Decimal Conversion process is tested for an end condition by interrogating the condition of Stat. register positions S4 and S5 (this being specified by the branch statement "S4, S5"). Since the first pass through the loop A results in conditions that prevent latches S4 and S5 being turned on, the branch statement, together with the CN field, calls for a branch to step BAJE0, by means of address 294, seen in FIG. 5ba3.

This step contains the statement "DC=D+D" and orders the ALU section to perform a binary duplation step, in the manner previously described. Since six more operations are necessary to shift the last binary bit out of the current binary byte 0, loop A is repeated a corresponding number of times before position S4 of the Stat. register 140, FIG. 4r, is turned on. On each pass through loop A, the G register is decremented and eventually, on the eighth pass, reaches zeros. From an inspection of step BABD, it is noted that the G register 133, FIG. 4d, is decremented, once, for each pass through loop A; and, following each such operation, the branch specification; namely, "S4=ZH=0," tests the zero condition of the G register. When the G register arrives at zero, S4 is turned on and, at the termination of the seventh pass through the A loop, a branch to loop B is ordered, under control of the "S4=1" condition on step BAHF0.

In addition to the steps contained in loop A, the loop B also contains the following steps: BAJE2, BAHB, BAJB0 and BAKB0. The step BAJE2, previously described, causes binary byte 0 to read out, and the T register 141 (FIG. 4c) incremented by one. [On the previous pass through the loop B, the T register 141 (FIG. 4c) contained 0001; and, as a result of the current incrementing step, register T is advanced to a 2 (0010)].

The next step BAHB, previously described, orders a test of the low-order bit positions of the T register 141, FIG. 4c, by AND'ing the T register with a constant K3L (0011). In this step, position S5 of Stat. register 140 (FIG. 4r) remains off, since the T register 141 has a value other than zero. However, when the low-order bits of the T register 141 are zero, position S5 of the Stat. register 140 turns on. This occurs during the fourth pass through loop B. In passing through loop B, the step BAKB0 enters a count of 8 into the high-order positions of the G register 133 (FIG. 4d). On step BABD, the G register 133 is decremented and, during this decrementing step, the output of the ALU is tested for zero. When not zero, S4 remains off; when the register reaches zero, S4 turns on. Since the G register 133 (FIG. 4d) has a bit address value other than zero, the test condition, at the end of the B loop at step BAHF0, causes a branch to loop A. As a consequence, the T register 141 (FIG. 4c) operations are bypassed and the steps in loop A are repeated 8 times. On the eighth pass through loop A, the G register 133 (FIG. 4d) is decremented to zero, whereupon the S4 latch turns on. At the termination of the eighth pass through loop A, the step BAHF0 directs entrance to loop B, wherein operations, previously described, are repeated and among which the T register 141 (FIG. 4c) is incremented and thereafter tested, in the manner described, since, on this pass through loop B, the low-order bits of the register T141 have a value other than zero; accordingly, latch S5 remains in its off state. At the termination of loop B, the step BAHF0 orders a test of S4 and S5. Since both are in their off states, the branch is directed to loop A. The following operations through loop A eventually encounter a condition wherein, on the final pass through loop B, the T register 141 low-order bits will be zero and, in response to the T register test, latch S5 turns on. In the ensuing pass through loop B, latch S4 remains at zero, since the G register 133 (FIG. 4d) has not been decremented to zero. At the end of loop B, step BAHF0, orders a test of the latches S4 and S5. Since S5 is on and S4 is off, the branch directs entrance into step BAJB0, which causes a branch to step BAKB1, since S5 latch is now on. In this step BAKB1, a count of 7 enters the G register 133 (FIG. 4d) which reaches zero, on the seventh pass through the loop A, whereupon the S4 latch turns on. At the end of the seventh pass through loop A, an end test will be made at step BAHF0; and, since both latches S4 and S5 are now on, a branch is directed to step BAJE3, which initiates the beginning of a series of steps called the end routine. This end routine consists of the following steps: BAKD0, BAFH, BAGJ2, BAHJ1, BAFH, BAGJ0, BAHJ0, BABD, BACE0, BADD, BAEF0, BBEG1, BBFH1, AGGA1, AGGD, AGHD and AGJD.

The step BAKD0, address 299, is seen in FIG. 5ba3. The statement therein; namely, "DC=D+K12H+C" orders the ALU section to add the constant 1100 to the contents of the D register 132 (FIG. 4c) and re-enter the output into the D register. This operation places the plus sign into the Storage decimal destination. The following six steps, beginning with step BAFH and ending with step BAHJ0, are utilized to add the last binary bit of the lowest order. Following this, the next four steps; namely, BABD through BAEF0, are utilized to insert the sign into the decimal destination in Storage. The final six steps, beginning with step BBEG1, are utilized to store the "IC" contents into the UV registers 142, 143 (FIGS. 4b and 4c, respectively). At the termination of this phase of Operation II, the UV registers contain the address of the next

MACRO-INSTRUCTION

It may be appreciated that, if, on the previous step BAFD, a carry had developed from the output of the ALU section 699, a branch in accordance with the statement "AC, X" would have been directed to the step BAHF2, in which step the contents of the V register is directed into the L register (L=V); and the effect of this would have increased the decimal boundary size an additional byte.

The Appendix pages referred to above are found in the aforementioned application Serial No. 357,372.

The foregoing describes in detail the operations of the binary-to-decimal conversion macro-instruction and particularly the manner in which the basic machine cycles are controlled and interpreted in terms of the wiring diagrams of FIGS. 4a through 4az. It must be realized that a considerable portion of the specification has been devoted to an explanation of this conversion process and that the specification would be extremely voluminous if an explanation were given of some of the various operations that the machine is capable of performing, for example, the operation codes listed on pages 1483 through 1491 of the Appendix of the aforementioned application.

However, an understanding of any one of these operation codes may be had by following the procedure outlined in the description beginning on page 583 of the specification in the aforementioned application. It is therefore to be understood that the various operation codes and their explanations are to be considered a portion of the present application, thereby providing a clear explanation and basis for the claims.

While the invention has been particularly shown and described with reference to a preferred embodiment thereof, it will be understood by those skilled in the art that various changes in form and details may be made therein without departing from the spirit and scope of the invention.

What is claimed is:

1. A data processing system comprising:
 a pair of data input buses;
 a data output bus;
 an arithmetic unit having a pair of inputs connected respectively to said pair of data input buses, and an output connected to said output bus;
 a plurality of data registers, each having an input connected to said output bus, an output connected to one of said pair of data input buses, and an input entry control;
 gating means interposed intermediate each register output and the one of said pair of data input buses; and
 a control means for applying entry control signals and gating signals respectively to said input entry controls and said gating means for effecting the transmission of data through said system.

2. A system as in claim 1 in which some of said plurality of data registers have outputs connected to both data input buses, including gating means interposed between the register outputs and the other input bus.

3. A system as in claim 2 in which the input buses are each provided with a buffer register having an entry control responsive to said entry control signals.

4. A system as in claim 3 in which said buses are each comprised of a plurality of data bit signal lines for accommodating a pair of binary coded data characters.

5. A system as in claim 4 in which character selection means are interposed between each of said buffer registers and the respective inputs of said arithmetic unit including character Hi and Low switching means for selectively entering one or both characters or transposing their positions prior to entry into the arithmetic unit.

6. A system as in claim 5 further including true/complement control means on one of said inputs to the arithmetic unit.

7. A system as in claim 1 further including an addressable main memory for storing data and machine instruction words in addressable locations thereof and having a length of a pair of binary coded characters constituting a byte;
   a memory address register for addressing any one of said addressable locations;
   an address register bus connected to said memory address register;
   a plurality of instruction registers connected to said address register bus, including gating means for selectively connecting said registers to said memory address register for transmitting data by bytes; and
   appropriate address gating signals issued by said control means for enabling the transmission of address data from said instruction registers to said memory address register.

8. A system as in claim 7 in which said control means is constituted of a read-only storage containing all of the micro-programs necessary for carrying out the operations of any of the machine instructions stored in said main memory;
   each program constituting a unique pattern of control and gating signals; and
   a timing clock connected to said ready-only storage for controlling the issuance of said patterns on a timed basis to coordinate the transmission of data and instructions through the system.

9. A system as in claim 8 further including a read-only storage address register and channel means connecting certain ones of said instruction registers to said address register for setting up the start address of the first in a series of micro-programs required for the performance of a given instruction.

10. A system as in claim 9 including a constant signal generator for generating and selectively setting up an address constant in a portion of said read-only storage address register.

11. A system as in claim 8 further including a machine status register for storing condition outputs issued by said arithmetic unit, and
   a decoding network responsive jointly to stored condition outputs and the micro-program pattern signals for selectively activating the various data registers and their respective gating means, for carrying out the transmission of data during each micro-program.

12. A system as in claim 11 including a plurality of latches for storing the output signals constituting a micro-program pattern, and
   timed signals issued by said timing clock for controlling the transmission of the stored pattern signals to said decoding network.

13. A data processing system for performing arithmetic and logical operations comprising:
   a main memory having addressable storage locations for storing data and machine instructions for processing said data;
   a memory address register for selecting an addressable location for transmitting or receiving data or instructions;
   a plurality of data registers and instruction registers for storing data and instruction signals;
   an arithmetic and logic unit having a pair of inputs and an output;
   input buses and an output bus communicating data through said registers, memory, and arithmetic and logic unit;
   a read-only storage for issuing micro-programs each constituted of a unique pattern of control gating signals for energizing said gating means, and address pattern signals representing the address of the next micro-program; and
   a read-only storage address register jointly responsive to said address pattern signals and to said instruction signals for selecting sequentially the micro-programs necessary to process the data in accordance with a given instruction.

14. A system as in claim 13 in which said pattern of control signals include specific function signals for storage operations, arithmetic and logic functions and address branch controls,
   a plurality of latches for storing said specific signals,
   a plurality of control decoders connected to the outputs of said latches for issuing patterns of decoded control signals, and
   transmitting means for applying said patterns of decoded control signals to said controllable gating means.

15. A system as in claim 14 further including a plurality of back-up registers interposed between said latches and the decoders for storing the pattern signals concerned with memory, arithmetic and logic functions, and
   timing means for controlling the issuance of the stored pattern signals to said gating means.

16. A data processing system having a main memory containing data and instructions;
   a processing unit for processing said data according to said instructions;
   a system status register for storing selected machine conditions arising during the processing operation;
   a read-only storage for issuing micro-programs for carrying out a processing operation according to said machine instructions, each micro-program constituting signal generating means providing: a unique pattern of control signals for effecting the data processing operations, including address signals specifying a portion of the address of the next micro-program, and further including address branching control signals; and
   a decoding network responsive jointly to said address branching control signals and said machine conditions for supplying final branch signals representing the remaining portion of the address of the next micro-program.

17. A data processing system as in claim 16 further including an instruction register for storing signals specifying the operation portion of a machine instruction and
   means for transmitting the operation signals to said decoding network for supplying control signals, other than said final branch signals, specifying the remaining portion of the address of the next micro-program.

18. A data processing system comprising:
   a memory having addressable locations containing data and instructions;
   a memory address register for accessing any one of said locations for accepting or transmitting data or instructions;
   an arithmetic and logic unit;
   a plurality of registers;
   transmission channels interconnecting said registers, memory and arithmetic and logic unit;
   control means for selectively interconnecting the registers to said channels, memory and arithmetic and logic unit;
   a read-only storage containing signal pattern generators each providing a micro-program constituting a unique pattern of control signals for energizing selected ones of said control means and signals representing a portion of the address of the next micro-program, each current micro-program thus containing a portion of the address of the next micro-program;
   a decoding network responsive to an accessed instruction for supplying the remaining portion of the address for the next micro-program;
   a read-only storage address means responsive to both address portions for accessing the micro-program next following the current micro-program; and
   signal generating means for supplying signals representing an initial address for selecting the first microprogram for initiating activities of the data processing system.

19. A system as in claim 18 in which said micro-programs include preset status representing signals;
   a status register for storing said preset signals; and
   a status decoding network responsive to stored preset signals for supplying address signals supplementing those forming the address of the next micro-program.

20. A system as in claim 18 further including
   a machine status register means connected to said arithmetic and logic unit for detecting certain machine conditions and storing the latter in said status register, and
   a condition network responsive to stored machine conditions for supplying additional address signals for the next micro-program.

21. A data processing system having circuits for initiating and controlling data processing operations comprising:
   a memory for storing instructions in addressable locations thereof;
   a read-only storage having in addressable locations thereof a plurality of micro-programs for carrying out all activities and operations of the system, each micro-program constituting a signal generator for issuing a unique pattern of data processing control signals and signals representing the address of the next micro-program;
   memory addressing means including means for setting up an address for a desired instruction;
   an instruction register for storing the desired instruction;
   read-only storage addressing means;
   means for setting an initial address in said read-only storage addressing means for selecting the first of a series of micro-programs for rendering operable the initiating circuits for data processing operations, each micro-program containing the address for selecting the next subsequent micro-program; and
   a decoding network connected to said instruction register and responsive to operation instruction manifestations to issue signals representing a portion of said address of the next micro-program, thereby rendering operable the circuits for controlling the data processing operation of the desired instruction.

22. A system as in claim 21 further including system condition circuits,
   a status register connected to said condition circuits for storing system conditions arising during the course of a data processing operation, and
   means connecting the status register to said decoding network and responsive to stored system conditions for modifying the signals representing the address portion of the next micro-program.

23. A system as in claim 22, in which said micro-programs each contain signal representing predetermined status control signals, and
   means included in said status register and said network, respectively, for storing and responding to said predetermined status control signals for supplying signals representing the address portion of the next micro-program.

24. A system as in claim 22 in which said micro-programs each contain branch control signals, including means in said network responsive to these signals for supplying the address portion of the next micro-program.

25. A system as in claim 1 further including an addressable main memory for storing data and machine instruction words in addressable locations thereof and having a byte length constituted of a pair of binary coded characters, and said input buses and output buses each constituting a plurality of bit lines for transmitting the bit manifestations of a byte;
   a memory address register for addressing any one of said addressable locations;
   an address register bus connected to said memory address register;
   a plurality of instruction registers connected to said address register bus, including gating means for selectively connecting said registers to said memory address register for transmitting data by bytes;
   appropriate address gating signals issued by said control means for enabling the transmission of address data from said instruction registers to said memory address register; and
   selectively operable control means further conditioning the inputs to said arithmetic unit for selectively entering either or both characters on each of said input buses into said arithmetic unit.

26. A system as in claim 25 in which the manifestations of byte data are negative-going signals, and the gating control signals are positive-going signals; and
   said data registers being constituted of exclusive OR circuits responsive to said data and control signals.

27. A system as in claim 26 in which said buses include a bit line for parity signals, and
   parity checking means for each of said buses and said control signals issued by the read-only storage.

No references cited.

ROBERT C. BAILEY, *Primary Examiner.*

R. M. RICKERT, *Assistant Examiner.*